(12) United States Patent
Xu et al.

(10) Patent No.: US 12,155,058 B2
(45) Date of Patent: Nov. 26, 2024

(54) IMMOBILIZED CHALCOGEN COMPRISING A CHALCOGEN ELEMENT, AN ELECTRICALLY CONDUCTIVE MATERIAL, AND HYDROPHILIC MEMBRANE GATE AND USE THEREOF IN A RECHARGEABLE BATTERY

(71) Applicant: II-VI Delaware, Inc, Wilmington, DE (US)

(72) Inventors: Wen-Qing Xu, Sarver, PA (US); Christopher Koeppen, New Hope, PA (US); Chengkun Xu, Valencia, PA (US); Charan Masarupu, Sewickley, PA (US); Colin Moore, Butler, PA (US); Xiaoming Li, Allison Park, PA (US)

(73) Assignee: II-VI DELAWARE, INC., Wilmington, DE (US)

( * ) Notice: Subject to any disclaimer, the term of this patent is extended or adjusted under 35 U.S.C. 154(b) by 687 days.

(21) Appl. No.: 17/302,212

(22) Filed: Apr. 27, 2021

(65) Prior Publication Data
US 2021/0359290 A1 Nov. 18, 2021

Related U.S. Application Data

(63) Continuation-in-part of application No. 16/893,564, filed on Jun. 5, 2020, now Pat. No. 11,784,303, which
(Continued)

(51) Int. Cl.
*H01M 4/136* (2010.01)
*H01M 4/36* (2006.01)
(Continued)

(52) U.S. Cl.
CPC .......... *H01M 4/136* (2013.01); *H01M 4/362* (2013.01); *H01M 4/5815* (2013.01);
(Continued)

(58) Field of Classification Search
CPC ..... H01M 4/136; H01M 4/362; H01M 4/5815
See application file for complete search history.

(56) References Cited

U.S. PATENT DOCUMENTS

| 2,428,055 A | 9/1947 | Hippel et al. |
| 4,164,608 A | 8/1979 | Coetzer |

(Continued)

FOREIGN PATENT DOCUMENTS

| CN | 101263628 A | 9/2008 |
| CN | 101740231 A | 6/2010 |

(Continued)

OTHER PUBLICATIONS

Xiong, Shizhao, et al., "Effect of Temperature on Discharge Process of Lithium Sulfur Batteries", Journal of National University of Defense Technology, 2012, 34:2, 5 pages.
(Continued)

*Primary Examiner* — Jonathan G Jelsma
(74) *Attorney, Agent, or Firm* — Blank Rome LLP

(57) ABSTRACT

An immobilized chalcogen system or body includes an element of chalcogen, an electrically conductive material, and a hydrophilic membrane gate. The hydrophilic membrane gate may be used to isolate hydrophobic regions, one related to polychalcogenide ion(s) and another related to a hydrophobic electrolyte system. The hydrophilic membrane gate may prevent polychalcogenide from forming, and may provide control of undesirable parasitic mass transport and undesirable electron transport inside a chalcogen-based battery, and thereby allow the battery to cycle at a high specific capacity with a long cycling life. If desired, the immobilized
(Continued)

chalcogen system or body may be employed in a cathode of a rechargeable battery.

21 Claims, 72 Drawing Sheets

Related U.S. Application Data is a continuation of application No. PCT/US2020/017516, filed on Feb. 10, 2020, application No. 17/302,212 is a continuation-in-part of application No. PCT/US2020/017509, filed on Feb. 10, 2020, said application No. PCT/US2020/017516 is a continuation-in-part of application No. 15/434,655, filed on Feb. 16, 2017, now Pat. No. 10,734,638, said application No. PCT/US2020/017509 is a continuation-in-part of application No. 15/434,655, filed on Feb. 16, 2017, now Pat. No. 10,734,638.

(60) Provisional application No. 62/802,929, filed on Feb. 8, 2019.

(51) Int. Cl.
  *H01M 4/58* (2010.01)
  *H01M 4/62* (2006.01)
  *H01M 10/052* (2010.01)
  H01M 4/02 (2006.01)

(52) U.S. Cl.
  CPC ........... *H01M 4/625* (2013.01); *H01M 4/628* (2013.01); *H01M 10/052* (2013.01); *H01M 2004/028* (2013.01)

(56) References Cited

U.S. PATENT DOCUMENTS

| | | | |
|---|---|---|---|
| 9,660,310 | B2 | 5/2017 | Mak et al. |
| 2006/0183165 | A1 | 8/2006 | Zhang et al. |
| 2007/0059588 | A1 | 3/2007 | Lee et al. |
| 2011/0027652 | A1 | 2/2011 | Morigaki |
| 2011/0223487 | A1 | 9/2011 | Johnson et al. |
| 2012/0225352 | A1 | 9/2012 | Abouimrane et al. |
| 2013/0248364 | A1 | 9/2013 | Kahn et al. |
| 2014/0332733 | A1 | 11/2014 | Joo et al. |
| 2015/0064575 | A1 | 3/2015 | He et al. |
| 2015/0295244 | A1 | 10/2015 | Otsuka et al. |
| 2016/0006084 | A1 | 1/2016 | Kabacik |
| 2016/0020491 | A1 | 1/2016 | Dai et al. |
| 2017/0084908 | A1 | 3/2017 | Guo et al. |
| 2017/0194648 | A1 | 7/2017 | Bucur et al. |
| 2017/0301914 | A1 | 10/2017 | Eissler et al. |
| 2017/0352869 | A1 | 12/2017 | Zhamu et al. |
| 2018/0090751 | A1 | 3/2018 | Xu et al. |
| 2019/0312261 | A1 | 10/2019 | He et al. |
| 2019/0312263 | A1* | 10/2019 | Liu ................... H01M 10/0525 |
| 2019/0312283 | A1 | 10/2019 | He et al. |
| 2020/0227733 | A1 | 7/2020 | Solis et al. |
| 2020/0328405 | A1 | 10/2020 | Xu et al. |

FOREIGN PATENT DOCUMENTS

| | | |
|---|---|---|
| CN | 101792900 A | 8/2010 |
| CN | 102078816 A | 6/2011 |
| CN | 103113246 A | 5/2013 |
| CN | 103178246 A | 6/2013 |
| CN | 103187559 A | 7/2013 |
| CN | 103332688 A | 10/2013 |
| CN | 104157860 A | 11/2014 |
| CN | 104201349 A | 12/2014 |
| CN | 104201389 A | 12/2014 |
| CN | 104393304 A | 3/2015 |
| CN | 104617299 A | 5/2015 |
| CN | 104733677 A | 6/2015 |
| CN | 105070892 A | 11/2015 |
| CN | 106025210 A | 10/2016 |
| CN | 106602010 A | 4/2017 |
| CN | 105932252 B | 10/2018 |
| CN | 110683522 A | 1/2020 |
| JP | 2005019122 A | 1/2005 |
| JP | 2009048909 A | 3/2009 |
| JP | 2011509509 A | 3/2011 |
| JP | 2012133916 A | 7/2012 |
| JP | 2012133918 A | 7/2012 |
| JP | 2013225496 A | 10/2013 |
| JP | 2017521847 A | 8/2017 |
| JP | 2018521465 A | 8/2018 |
| JP | 2018534727 A | 11/2018 |
| JP | 2019089158 A | 6/2019 |
| KR | 20090082891 A | 7/2009 |
| WO | WO2015154064 A2 | 10/2015 |
| WO | 2017143021 A1 | 8/2017 |

OTHER PUBLICATIONS

Yafang, Guo, et al., "Latest Research Progress at Modifying the Separators used for Lithium-Sulfur Batteries", China Academic Journal Electronic Publishing House, 2018, 7 pages.

Zhao, Jianghui, "Preparation of Novel Polymer Electrolyte and Its Electrochemical Performance Towards High Specific Energy Lithium Batteries", Master Degree Thesis, Qingdoa University of Science & Technology, 2016, 76 pages.

Examination Report issued in GB2101260.4 on Jul. 16, 2021, 9 pages.

Jia et al. High performance of selenium cathode by encapsulating selenium into the micropores of chitosan-derived porous carbon framework Journals of Alloys and Compounds, vol. 746 (May 25, 2018): pp. 27-35.

Wang, Yaya, et al., Adsorptive Properties and Oxidized Modification of Coal-Based Activated Carbons for Cd2+, Journal of Xingjiang University (Natural Science Edition), 2016, vol. 33, No. 2, pp. 134-140.

Yang et al. Vapor-Infiltration Approach toward Selenium/Reduced Graphene Oxide Composites Enabling Stable and High-Capacity Sodium Storage ACS Nano, vol. 12, Issue 7 (Jul. 11, 2018): pp. 7397-7405.

Zhang, et al., Alkaline Lignin Derived Porous Carbon as an Efficient Scaffold for Lithium-Selenium Battery Cathode, Carbon, 2017, 122:547-555.

Zhang, Qiao, et al., Self-templated Synthesis of Hollow Nanostructures, Nano Today, 2009, 4:494-507.

Zhao, Chenhao, et al., Hierarchical Porous N,O Co-doped Carbon/Se Composite Derived from Hydrothermal Treated Chitosan as Li—Se Battery Cathode, Micro & Nano Letters, 2018, vol. 13, Issue 10, pp. 1386-1389.

Zhao, Chenhao, et al., Porous Carbon Nanoplate/Se Composite Derived from Potassium Citrate as High-Performance Li—Se Battery Cathode: A Study on Structure-function, Colloids and Surfaces A 2019, vol. 560, pp. 69-77.

Search report issued in French Application No. 2101194 on Oct. 26, 2022.

Abouimrane et al., "A New Class of Lithium and Sodium Rechargeable Batteries Based on Selenium and Selenium-Sulfur as a Positive Electrode", Journal of the American Chemical Society {2012}, vol. 134, No. 10, pp. 4505-4508.

C. Zhao et al: Facile synthesis of selenium/potassium tratrate derived porous carbon composite as an advanced Li—Se pattery cathode—RSC Advances, 2016, 15 pages.

Chen et al., "Graphene-Based Three-Dimensional Hierarchical Sandwich-type Architecture for High-Performance Li/S Batteries", Nano Letters (2013), vol. 13, No. 10, pp. 4642-4649.

Han et al., "A Free-Standing and Ultralong-life Lithium-Selenium Battery Cathode Enabled by 3D Mesoporous Carbon, Graphene Hierachical Architecture", Adv. Funct. Mater., 2015, pp. 455-463, vol. 25.

Jiang et al., "Selenium encapsulated into 3D interconnected hierarchical porous carbon aerogels for lithium-selenium Dalleries with

(56) References Cited

OTHER PUBLICATIONS high rate performance and cycling stability", Journal of Power Sources, Jun. 2, 2014 (online), pp. 394-404, vol. 267.
Lee et al., "Micro- and Mesoporous Carbide-Derived Carbon-Selenium Cathodes for High-Performance Lithium Selenium Batteries", Adv. Energy Mater., 2014, pp. 1-7.
Li et al., "A New Salt-Baked Approach for Confining Selenium in Metal Complex-Derived Porous Carbon with Superior ithium Storage Properties", Advanced Functional Materials (2015), vol. 25, pp. 5229-5238.
Li et al., MOF-derived, N-doped, hierarchically porous carbon sponges as immobilizers to confine selenium as cathods for Li—Se batteries with Superior storage capacity and perfect cycling stability, Nanoscale, 2015 vol. 7, pp. 9597-9606.
Li et al., batteries with superior storage capacity and perfect cycling stability, Nanoscale (2015), vol. 7, pp. 9 IU et al., Enhanced electrochemical performances of mesoporous carbon microsphere/ selenium composites by.
Liu et al., "A Se/C Composite as Cathode Material for Rechargeable Lithium Batteries with Good Electrochemical Performance", RSC Advances, 2014, pp. 9086-9091, vol. 4.
Liu et al., "Enhanced electrochemical performances of mesoporous carbon microsphere/selenium composites by controlling the pore structure and nitrogen doping", Electrochimica Acta (2015), vol. 153, pp. 140-148.
Luo et al., "Selenium@mesoporous Carbon Composite with Superior Lithium and Sodium Storage Capacity", ACSNANO, 2013, pp. 8003-8010, vol. 7, No. 9.
Park, Principles and applications of lithium secondary batteries, Hongreung Science Publishing Company, Jan. 19, 2010, pp. 118-11 (original in Korean and English translation).
Sevilla et al., "A general and facile synthesis strategy towards highly porous carbons: Carbonization of organic salts", Journal of Materials Chemistry A, Oct. 14, 2013 (online), 10 pages, vol. 1.
Wu et al., "High-Performance Lithium Selenium Battery with Se/Microporous Carbon Composite Cathode and Carbonate-Based Electrolyte", Science China Materials, 2015, pp. 91-97, vol. 58.
Wu et al., "Lithium Iodide as a Promising Electrolyte Additive for Lithium-Sulfur Batteries: Mechanisms of Performance Enhancement", Adv. Mater., 2015, pp. 101-108, vol. 27.
Yang et al., "Elemental Selenium for Electrochemical Energy Storage", J. Phys. Chem. Lett., 2015, pp. 256-266, vol. 6.
Ye et al., "Advanced Se—C Nanocomposites: a Bifunctional Electrode Material for both Li—Se and Li-ion Batteries", J Mater. Chem. A., 2014, pp. 1-6.

\* cited by examiner

A = R, OR, $NR_2$, X
J = R, OR, $CX_3$
X = F, Cl, Br, I
R = Alkyl, Aryl, H
Z = Chalcogen: O, S, Se, and Te A = R, OR, $NR_2$, X
J = R, OR, $CX_3$
X = F, Cl, Br, I
R = Alkyl, Aryl, H

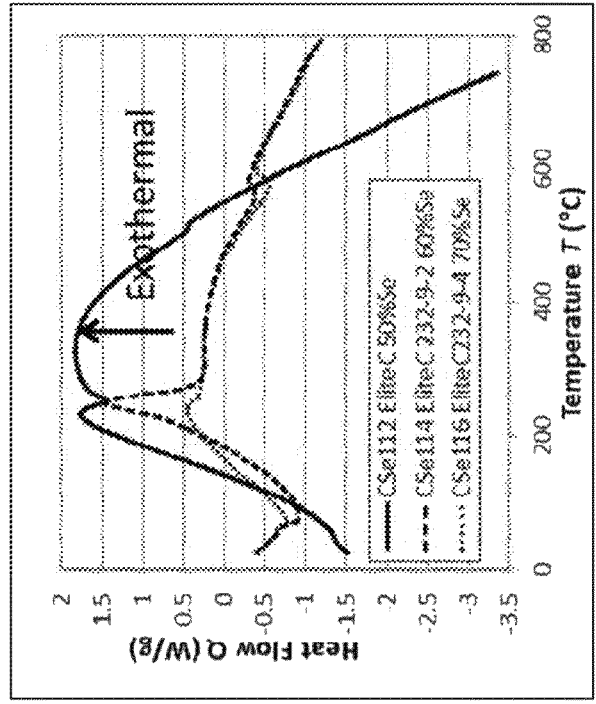
Fig. 22B DSC
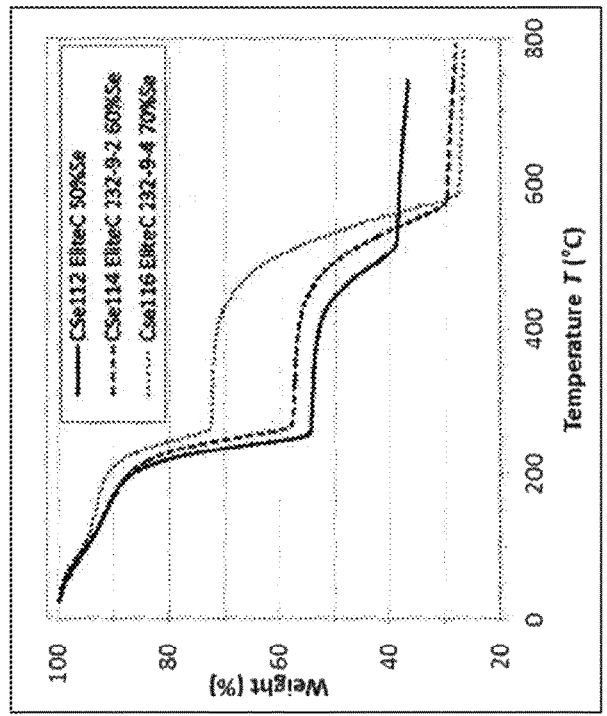
Fig. 22A. TGA

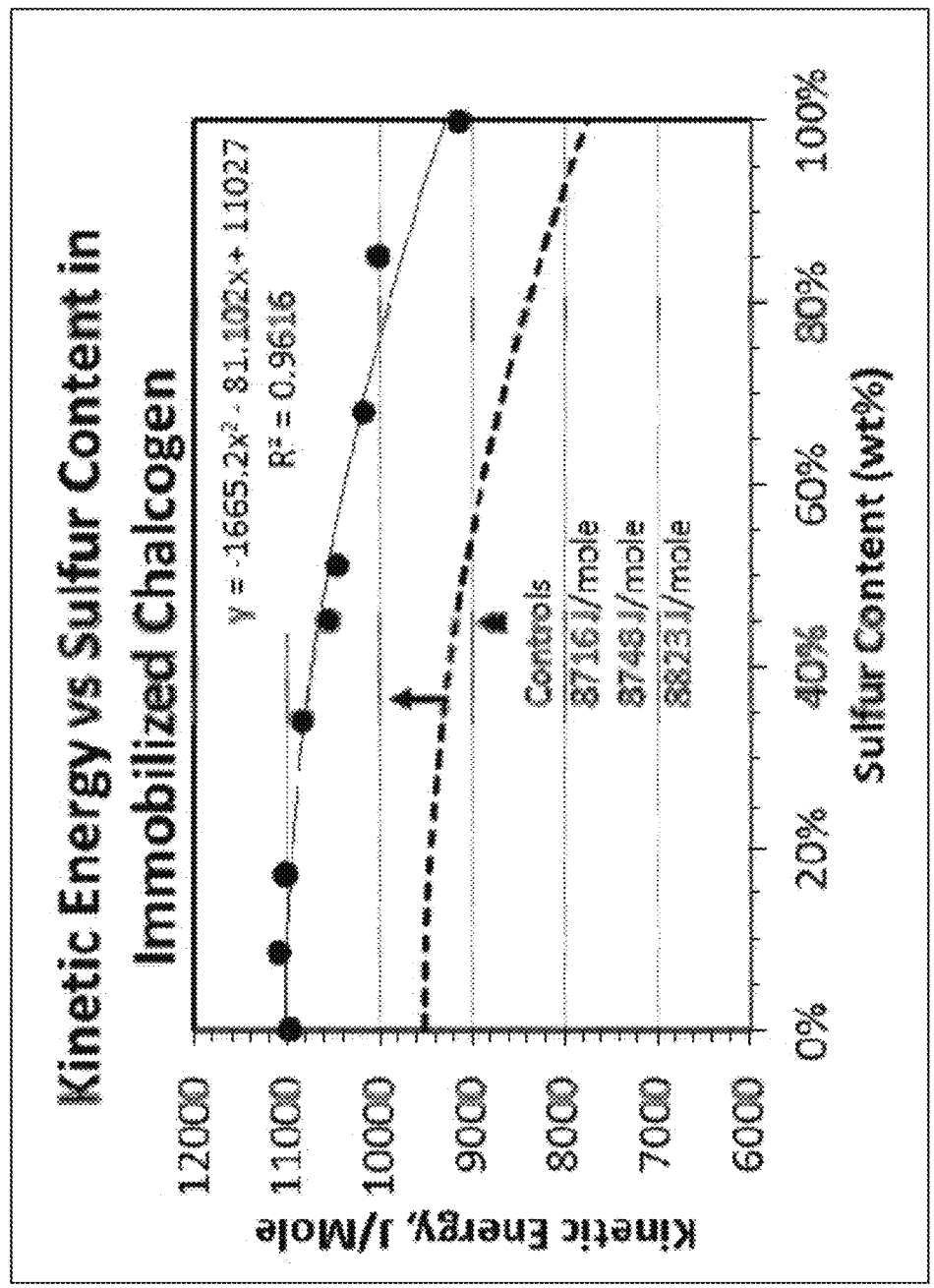

IMMOBILIZED CHALCOGEN COMPRISING A CHALCOGEN ELEMENT, AN ELECTRICALLY CONDUCTIVE MATERIAL, AND HYDROPHILIC MEMBRANE GATE AND USE THEREOF IN A RECHARGEABLE BATTERY

CROSS-REFERENCE TO RELATED APPLICATIONS

This application is a continuation-in-part of U.S. patent application Ser. No. 16/893,564, tiled Jun. 5, 2020, which is a continuation of International Application PCT/US2020/017516, filed Feb. 10, 2020. Application PCT/US2020/017516 is a continuation-in-part of U.S. patent application Ser. No. 15/434,655, filed Feb. 16, 2017, and claims the benefit of U.S. Provisional Patent Application 62/802,929, filed Feb. 8, 2019. This application is also a continuation-in-part of International Application PCT/US20/017509, filed Feb. 10, 2020, which is a continuation-in-part of application Ser. No. 15/434,655, and which claims the benefit of Application 62/802,929. The disclosures of all of the foregoing applications are incorporated herein by reference in their entireties.

BACKGROUND

The present application relates to the field of lithium secondary batteries of high energy density. More particularly, the application relates to a method of preparing carbon-selenium nanocomposite materials and their applications. The present disclosure also relates to immobilized chalcogen comprising chalcogen and carbon. Herein, immobilized chalcogen may comprise, combinations of oxygen, sulfur, selenium, and tellurium. It also concerns a method of making and the utility of the immobilized chalcogen. One of the utilities of immobilized chalcogen is in a rechargeable battery. The present application also relates to a rechargeable battery that can perform discharge-charge cycling at a fast rate (e.g., 10 C-rate) with a minimum level of capacity fading while being able to substantially recover its electrochemical performance, such as specific capacity, when charged at a low rate such as at 0.1 C-rate.

DESCRIPTION OF RELATED ART

With the increasing human demand for energy, secondary batteries with high mass specific energy and high volumetric energy density, such as lithium-sulfur batteries and lithium-selenium batteries, have attracted widespread interests. Group 6A elements in the Periodical Table, such as sulfur and selenium, have shown two-electron reaction mechanisms in the electrochemical reaction process with lithium. Despite the theoretical mass specific capacity of selenium (675 mAh/g) being lower than that of sulfur (1675 mAh/g), selenium has a higher density (4.82 g/cm$^3$) than sulfur (2.07 g/cm$^3$). Therefore the theoretical volumetric energy density of selenium (3253 mAh/cm$^3$) is close to the theoretical volumetric energy density of sulfur (3467 mAh/cm$^3$). At the same time, as compared with sulfur, which is close to an electrically insulating material, selenium is semi-conductive electrically and shows better electrical conductive properties. Therefore, as compared to sulfur, selenium can demonstrate a higher level of activity and better utilization efficiency even at a higher loading level, leading to high energy and power density battery systems. Moreover, a selenium-carbon composite can have a further improvement in the electrical conductivity over sulfur-carbon composite to obtain a higher activity electrode material.

As described in patent publication no. CN104393304A, by passing hydrogen selenide gas through a graphene dispersion solution, the solvent heat reduces the graphene oxide into graphene while oxidizing the hydrogen selenide into selenium. The thus prepared selenium graphene electrode material pairs with an ether electrolyte system, 1.5M lithium bi-trifluoromethane sulfonimide, (LiTFSI)/1,3-dioxolane (DOL)+dimethyl ether (DME) (volume ratio 1:1); the charging specific capacity reaches 640 mAh/g (approaching selenium theoretical specific capacity) in the first cycle. But in the charge-discharge process, polyselenide ions dissolve in the electrolyte, showing significant amounts of the shuttle effect, which causes the subsequent capacity decay. At the same time, the procedures for preparing the graphene oxide raw material that is used in this process are complicated, not suitable for industrial production.

Patent CN104201389B discloses a lithium-selenium battery cathode material, utilizing a nitrogen-containing layered porous carbon composite current-collector which was compounded with selenium. In preparing the nitrogen-containing layered porous carbon composite current collector, nitrogen-containing conductive polymer is first deposited or grown on the surface of a piece of paper, followed by alkali activation and high temperature carbonization, resulting in a nitrogen-containing layered porous carbon composite current collector with carbon fiber as network structure that supports itself; and such nitrogen-containing layered porous carbon composite current collector is then further compounded with selenium. The deposition method for preparing a conductive polymer is complicated and the process for film formation or growth is hard to control. The preparation process is complicated, which associates with undesirably high costs.

Moreover, the demand for a long life, high-energy-density and high-power-density rechargeable battery with the ability of being charged and discharged at a fast rate is ever increasing in electronics, electric/hybrid vehicles, aerospace/drones, submarines, and other industrial, military, and consumer applications. Lithium ion batteries are examples of rechargeable batteries in the above-mentioned applications. However, the need for better performance and cycling capability has not been filled by lithium ion batteries as the technology in lithium ion battery has matured.

Atomic oxygen has an atomic weight 16 and has a capability for 2 electron transfers. A lithium-oxygen rechargeable battery has been studied for the purpose of making high energy density batteries by weight, 6,580 W.hr/kg-Oxygen with an assumption of a Li—O battery voltage of 2.0V. When a battery involves an oxygen cathode that pairs with lithium or sodium metal as an anode, it has the greatest stoichiometric energy density. However, a majority of technical problems in the Li//Na-Oxygen battery remains unresolved, such as, (i) involving more than one chemical transport during electrochemical discharging and charging process, for example, (a) lithium/sodium ion transport from anode to cathode during battery discharging process and backwards during battery charging process, which is very similar to a lithium ion battery, and (b) oxygen transport from gas phase to the cathode surface and being converted into a solid like superoxides, peroxides, and oxides during battery discharging process and being converted back during battery charging process; (ii) an extreme corrosive nature of the intermediates formed during discharging process, particularly, superoxides and peroxides, for inactive cathode materials; (iii) nucleophilic attack of the battery electrolyte by the formed intermediates (superoxides or peroxides). Accordingly, a number of discoveries are needed for successful harness of electrochemical behaviors by using oxygen as an active electrochemical material in a rechargeable battery.

Elemental sulfur is also in the chalcogen group and has the second highest energy density (by weight) when paired with a lithium or sodium metal anode, 2,961 W.hr/kg-S with the assumption of a Li-S battery voltage 1.8V. A lithium-sulfur or sodium-sulfur battery has been widely studied for same purposes. However, a Li/Na—S battery may still involve more than one chemical transport during electrochemical discharging and charging process, at the least, (a) lithium/sodium ion transport from anode to cathode during battery discharging process and backwards during battery charging process, which is very similar to a lithium ion battery, and (b) during battery discharge process, elemental sulfur being converted into a polysulfide ion as intermediates that dissolves in the electrolyte solution and shuttles from cathode to anode. When reaching the anode, a polysulfide anion reacts with lithium or sodium metal, resulting in a loss of energy density, converting the electrochemical energy into heat which is undesirable and requires additional thermal management for a battery system. In addition, it is known that a Li/Na—S rechargeable battery is difficult to discharge or charge at a fast rate due to the extremely low electrical conductivity of sulfur.

Elemental selenium is another chalcogen element that has an energy density less than sulfur and oxygen by weight, 1,350 W.hr/kg-Se. However, selenium has a higher mass density (4.8 g/cm$^3$) than sulfur (2.0 g/cm$^3$) and oxygen (1.14 g/cm$^3$) in a cryogenic form (would be much lower if it is in a gas form). This brings selenium volume energy density by volume to be at a level that is similar to sulfur and oxygen, 6,480 W.hr/L-Se vs. 5,922 W.hr/L-S and 7,501 W.hr/L-Oxygen. In addition, elemental selenium is more conductive electrically than sulfur, which may allow a Li/Na—Se battery to cycle at a higher rate. However, a Li/Na—Se battery may still involve more than one chemical transport during electrochemical discharging and charging process, at the least, (a) lithium/sodium ion transport from anode to cathode during battery discharging process and backwards during battery charging process, which is very similar to a lithium ion battery, and (b) during battery discharge process, an elemental selenium being converted into a polyselenide ion as intermediates that dissolves in the electrolyte solution and shuttles from cathode to anode; when reaching anode, a polyselenide anion reacts with lithium or sodium metal, resulting in a loss of energy density, converting the electrochemical energy into heat which is undesirable and requires additional thermal management for a battery system.

Elemental tellurium is the heaviest chalcogen element that is not radioactive; it only has an energy density of 742 W.hr/kg, with the assumption of the voltage of a Li—Te battery being the same as the one for a Li—S battery, namely, 1.8V. Tellurium has a mass density of 6.24 g/cm$^3$, which leads a theoretical energy density of 4,630 W.hr/L—Te, which is only about ⅓ lower as compared to Li-Oxygen, Li—S, and Li—Se, ranging from 5,922 W.hr/L to 7,501 W.hr/L. The interest in Li/Na—Te battery is not as much as in Li-Oxygen, Li—S, and Li—Se batteries due to its intrinsic low energy density, both by weight and by volume. Tellurium is more electrically conductive than selenium, which may allow the Li—Te battery to be cycled at a higher rate.

SUMMARY

The present disclosure relates to an immobilized chalcogen system or body which includes an element of chalcogen, an electrically conductive material and a hydrophilic membrane gate. The hydrophilic membrane gate may be used to isolate at least two hydrophobic regions, one related to polychalcogenide ion(s) and the other one related to a hydrophobic electrolyte system, preventing polychalcogenide from forming, resulting in control of undesirable parasitic mass transport and undesirable electron transport inside a chalcogen-based battery, and thereby allowing a chalcogen-based battery to cycle at a high specific capacity with a long cycling life. If desired, the immobilized chalcogen system or body may be employed in a cathode of a rechargeable battery.

The present disclosure also relates to process for preparing a two-dimensional carbon nanomaterial which has a high degree of graphitization. The two-dimensional carbon nanomaterials are compounded with selenium to obtain a carbon-selenium composite material, which is used as a cathode material that pairs with anode material containing lithium, resulting in a lithium-selenium battery that has a high energy density and stable electrochemical performances. A similar process can be used to further assemble a pouch cell, which also demonstrates excellent electrochemical properties.

Also disclosed is a method to prepare selenium-carbon composite material with readily available raw materials and simple preparation procedures.

The selenium-carbon composite material described herein can be obtained from a preparation method that comprises the following steps:

(1) Carbonize alkali metal organic salts or alkaline earth metal organic salts in high temperature, and then wash with dilute hydrochloric acid or some other acids, and dry to obtain a two-dimensional carbon material;

(2) Mix the two-dimensional carbon material obtained in step (1) with selenium in organic solution, heat and evaporate the organic solvent, and then achieve compounding selenium with the two-dimensional carbon material through a multi-stage heat ramping and soaking procedure to obtain carbon-selenium composite.

In step (1), the alkali metal organic salt can be selected from one or several of potassium citrate, potassium gluconate, and sucrose acid sodium. The alkaline earth metal organic salt can be selected from one or both of calcium gluconate, and sucrose acid calcium. The high temperature carbonization can be performed at 600-1000° C., desirably, 700-900° C.; carbonation time for 1-10 hours, desirably for 3-5 hours.

In step (2), the organic solvent can be selected from one or several of ethanol, dimethylsulfoxide (DMSO), toluene, acetonitrile, N,N-dimethylformamide (DMF), carbon tetrachloride, and diethyl ether or ethyl acetate; multi-stage heat ramping and soaking section can be referred as to a ramping rate 2-10° C./min, desirably 5-8° C./min, to a temperature between 200 and 300° C., desirably between 220 and 280° C., followed by soaking at the temperature for 3-10 hours, desirably, 3-4 hours; then continue to heat up to 400-600° C., desirably, 430-460° C., followed by soaking for 10-30 hours, desirably 15-20 hours.

Also disclosed herein is a lithium-selenium secondary battery that comprises the carbon-selenium composite materials. The lithium-selenium secondary battery can further include: a lithium-containing anode, a separator, and an electrolyte.

The lithium-containing anode may be one or several of lithium metal, a lithiated graphite anode, and lithiated silicon carbon anode materials (through assembling the graphite and silicon-carbon anode materials and lithium anode into a half cell battery, discharge to prepare lithiated graphite anode and lithiated silicon-carbon anode materials). The separator (membrane) can be a commercially available membrane, such as, without limitation, a Celgard membrane, a Whatman membrane, a cellulose membrane, or a polymer membrane. The electrolyte can be one or several of a carbonate electrolyte, an ether electrolyte, and ionic liquids.

The carbonate electrolyte can be one or several of diethyl carbonate (DEC), dimethyl carbonate (DMC), ethylene carbonate (EC), ethyl methyl carbonate (EMC), and propylene carbonate (PC); and the solute can be selected from one or several of lithium hexafluoro phosphate (LiPF$_6$), lithium bis(trifluoromethanesulfonyl) imide perchlorate (LiClO$_4$) and lithium bis(fluorosulfonyl) imide (LiFSI).

For the ether electrolytic solution, the solvent can be one or several of 1,3-dioxolane (DOL), ethylene glycol dimethyl ether (DME) and triethylene glycol dimethyl ether (TEGDME); and the solute can be one or more of lithium hexafluorophosphate (LiPF$_6$), lithium bis-(trifluoromethanesulfonyl) imide (LiTFSI), lithium perchlorate (LiClO$_4$) and lithium bis-fluorosulfonylimide (LiFSI).

For ionic liquids, the ionic liquid can be one or more room temperature ionic liquid [EMIm] NTf2 (1-ethyl-3-methylimidazolium bis trifluoromethane sulfonimide salt), [Py13] NTf2 (N-Propyl-N-methylpyrrolidine bis trifluoromethane sulfonimide salt), [PP13] NTf2 (N-propyl-methylpiperidine alkoxy-N-Bis trifluoromethane sulfonimide salts); and the solute can be one or more of lithium hexafluorophosphate (LiPF$_6$), bis(trifluoromethylsulfonyl) imide (LiTFSl), lithium perchlorate (LiClO$_4$) and lithium his fluorosulfonylimide (LiFSI).

Also described herein is a lithium-selenium pouch cell battery that includes the carbon selenium composite material.

Compared to the prior art, with respect to the method for preparing selenium carbon composite material disclosed herein, the two-dimensional carbon material has the advantages that the raw materials are readily available at low cost, the preparation method is simple, highly practical and suitable for mass production, and the obtained selenium carbon composite material exhibits excellent electrochemical properties.

Also disclosed herein is immobilized selenium (an immobilized selenium body) comprising selenium and a carbon skeleton. The immobilized selenium comprises at least one of the following: (a) requires gaining enough energy for a selenium particle to reach a kinetic energy of $\geq 9.5$ kJ/mole, $\geq 9.7$ kJ/mole, $\geq 9.9$ kJ/mole, $\geq 10.1$ kJ/mole, $\geq 10.3$ kJ/mole, or $\geq 10.5$ kJ/mole to escape the immobilized selenium system; (b) a temperature of 490° C. or higher, $\geq 500°$ C., $\geq 510°$ C., $\geq 520°$ C., $\geq 530°$ C., $\geq 540°$ C., $\geq 550°$ C., or $\geq 560°$ C. is required for selenium particles to gain enough energy to escape the immobilized selenium system; (c) the carbon skeleton has a surface area (with pores less than 20 angstroms) $\geq 500$ m$^2$/g, $\geq 600$ m$^2$/g, $\geq 700$ m$^2$/g, $\geq 800$ m$^2$/g, $\geq 900$ m$^2$/g, or $\geq 1,000$ m$^2$/g; (d) the carbon skeleton has a surface area (for pores between 20 angstroms and 1000 angstroms) 20% or less, 15% or less, 10% or less, 5% or less, 3% or less, 2% or less, 1% or less of the total surface area.

Also disclosed herein is a cathode or a rechargeable battery comprising immobilized selenium. The selenium may be doped with other elements, such as, but not limited to, sulfur.

Also disclosed herein is a composite including selenium and carbon comprising platelet morphology with an aspect ratio of $\geq 1$, $\geq 2$, $\geq 5$, $\geq 10$, or $\geq 20$.

Also disclosed herein is a cathode including a composite comprising selenium and carbon and comprising platelet morphology with an aspect ratio of $\geq 1$, $\geq 2$, $\geq 5$, $\geq 10$, or $\geq 20$. Also disclosed herein is a rechargeable battery including a composite comprising selenium and carbon and comprising platelet morphology with the foregoing aspect ratio.

Also disclosed herein is a rechargeable battery comprising a cathode, an anode, a separator, and an electrolyte. The rechargeable battery can be charged at 0.1 C, 0.2 C, 0.5 C, 1 C, 1.5 C, 2 C, 3 C, 4 C, 5 C, 6 C, 7 C, 8 C, 9 C, 10 C or faster. The cathode can comprise at least one element of a chalcogen group such as selenium, sulfur, tellurium, and oxygen. The anode can comprise at least one element of an alkali metal, alkali earth metals, and a group IIIA metal or metals. The separator can comprise an organic separator or an inorganic separator whose surface can optionally be modified. The electrolyte can comprise at least one element of alkali metals, alkali earth metals, and a group IIIA metal or metals. The solvent in the electrolyte solution can comprise organic solvents, carbonate-based, ether-based, or ester-based.

The rechargeable battery may have a specific capacity of 400 mAh/g or higher, 450 mAh/g or higher, 500 mAh/g or higher, 550 mAh/g or higher, or 600 mAh/g or higher. The rechargeable battery may be able to undergo electrochemical cycling for 50 cycle or more, 75 cycles or more, 100 cycles or more, 200 cycles or more, etc. The rechargeable battery may retain a battery specific capacity greater than 30%, greater than 40%, greater than 50%, greater than 60%, greater than 70%, or greater than 80% of the $2^{nd}$ discharge specific capacity at a cycling rate of 0.1 C after conducting high C-Rate charge-discharge cycling (e.g., 5 cycles at 0.1 C, 5 cycles at 0.2 C, 5 cycles at 0.5 C, 5 cycles at 1 C, 5 cycles at 2 C, 5 cycles at 5 C, and 5 cycles at 10 C). The rechargeable battery may have a Coulombic efficiency $\geq 50\%$, $\geq 60\%$, $\geq 70\%$, $\geq 80\%$, or $\geq 90\%$. The rechargeable battery can be used for electronics, an electric or hybrid vehicle, an industrial application, a military application such as a drone, an aerospace application, a marine application, etc.

Also disclosed herein is immobilized Chalcogen and its properties, methods of making immobilized Chalcogen, and the use of immobilized Chalcogen in a rechargeable battery.

Various preferred and non-limiting examples or aspects of the present disclosure will now be described and set forth in the following numbered clauses (Clauses 1-14).

Clause 1: An immobilized chalcogen body comprises of a mixture of chalcogen and a carbon, e.g., a carbon skeleton. The chalcogen comprises oxygen, sulfur, selenium, tellurium, or a mixture thereof. The immobilized chalcogen body further comprises at least one of the following:

an activation energy for a chalcogen particle to escape the immobilized chalcogen body $\geq 96$ kJ/mole, $\geq 99$ kJ/mole, $\geq 102$ kJ/mole, $\geq 105$ kJ/mole, $\geq 108$ kJ/mole, or $\geq 111$ kJ/mole;

a Log pre-exponential factor (or Log A) $\geq 7.0$, $\geq 7.1$, $\geq 7.3$, $\geq 7.4$, or $\geq 7.5$;

a collision frequency $\geq 1.0 \times 10^7$, $\geq 1.3 \times 10^7$, $\geq 1.6 \times 10^7$, $\geq 2.6 \times 10^7$, or $\geq 3.2 \times 10^7$;

a kinetic energy for chalcogen particle to escape the immobilized chalcogen body of $1,840.3x^2 + 90.075x + D$, where x is the sulfur weight percentage of the total of selenium and sulfur in an immobilized chalcogen body, and D may be $\geq 9,500$ Emole$\geq 9,700$ J/mole, $\geq 9,900$ J/mole, $\geq 10,000$ J/mole, 10,200 J/mole, 10,400 J/mole, or $\geq 10,600$ J/mole;

a mid-weight-loss temperature of the immobilized chalcogen body=$147.57 x^2+7.2227 x+C$, where C may be ≥510° C., ≥520° C., ≥530° C., ≥540° C., ≥550° C., 560"C, or ≥570° C., and x is the weight percentage of sulfur in the total amounts of selenium and sulfur in the immobilized chalcogen body;

a resistance to ambient oxidation having a shelf life ≥3 months, ≥6 months, ≥9 months, ≥12 months, ≥15 months, ≥18 months, ≥21 months, or ≥24 months, determined by an exothermal weight loss between 200-250° C.≤2.0 wt %, ≤1.8 wt %, ≤1.6 wt %, ≤1.4 wt %, ≤1.2 wt %, or 1.0 wt % in a TGA analysis under a stream of argon;

a d-spacing contraction of carbon ≥0.5 Å, ≥0.6 Å, ≥0.7 Å, ≥0.8 Å or ≥0.9 Å;

an increase D-band Raman shift of the carbon by ≥2 $cm^{-1}$, ≥3 $cm^{-1}$, ≥4 $cm^{-1}$, ≥5 $cm^{-1}$, or ≥6 $cm^{-1}$.

an increase in G-band Raman shift by ≥1 $cm^{-1}$, ≥2 $cm^{-1}$, or ≥3 $cm^{-1}$;

the carbon is highly active to ambient conditions after it is treated under a stream of inert gas, such as argon, under elevated temperatures, for example, ≥400° C., ≥500° C., ≥600° C., ≥700° C., or ≥800° C., e.g., the carbon skeleton treated under a stream of inert gas at the mentioned temperatures may catch fire by itself upon exposure to ambient conditions, such as ambient air at room temperature (e.g., between about 13° C.-27° C.).

releases water ≥100 ppm, ≥200 ppm, ≥300 ppm, ≥400 ppm, or ≥500 ppm, in weight, when the immobilized chalcogen body is heated up to 400° C.;

releases carbon dioxide ≥1,000 ppm, ≥1,200 ppm, ≥1,400 ppm, ≥1,600 ppm, or ≥1,800 ppm, or ≥2,000 ppm, in weight when the immobilized chalcogen body is heated up to 600° C.;

releases carbon monoxide ≥1,000 ppm, ≥1,200 ppm, ≥1,400 ppm, ≥1,600 ppm, or ≥1,800 ppm, or ≥2,000 ppm, in weight, when the immobilized chalcogen body is heated up to 800° C.;

a rechargeable battery comprising immobilized chalcogen body has a one-step discharge process, suggesting a minimal level of polychalcogenide formation during the discharge process;

the rechargeable battery having a battery cycling efficiency ≥90%, ≥95%, ≥97%, ≥98%, or ≥99%, wherein there is no shuttling when the cycling efficiency=100%, wherein that a high cycling efficiency may suggest there is a minimal level of polychalcogenide formation and/or, even polychalcogenide forms during the discharge process, the polychalcogenide is anchored on the cathode;

the rechargeable battery having a discharge mid-voltage ≥1.2V, ≥1.3V, ≥1.4V, ≥1.5V, or ≥1.5V at a C-rate of 1, wherein, a higher mid-voltage is desirable since it suggests that the internal battery voltage is low, allowing for a high C-Rate for discharge and charge of a battery; and/or the rechargeable battery comprising immobilized chalcogen body having a specific capacity of 50% of theoretical capacity of chalcogen for ≥50 cycles, ≥100 cycles, ≥150 cycles, ≥200 cycles, or ≥250 cycles;

Clause 2: The immobilized chalcogen body of clause 1 may form coordination bond, or an electron donor-acceptor bond.

Clause 3: The immobilized chalcogen body of clause 1 or 2, wherein the carbon forming the carbon skeleton may include a deactivation chemical functional group that has a capability of withdrawing electron from the delocalized Extremely Massive Aromatic Conjugated (EMAC) π-bond system of the carbon skeleton.

Clause 4: The immobilized chalcogen body of any one of clauses 1-3, wherein the carbon skeleton may include carbocation center on the EMAC π-bonding system.

Clause 5: The immobilized chalcogen body of any one of clauses 1-4, wherein the deactivating chemical functional group may include an oxygen containing group ≥0.1 mmol O/g, ≥0.5 mmol O/g, ≥1.0 mmol O/g, ≥1.5 mmol O/g, ≥2.0 mmol O/g, ≥2.5 mmol O/g, ≥3.0 mmol O/g.

Clause 6: The immobilized chalcogen body of any one of clauses 1-5, wherein the deactivating chemical functional group comprising oxygen may include at least one of the following: —CHO (formyl group, or aldehyde group), —COR (acyl group, or ketone group), —COOH (Carboxyl group, or carboxylic acid group) or its salt (—$COO^-$), —COOR (a carboxylate group, or ester group), an anhydride group, or a carbonyl group (—CO—).

Clause 7: The immobilized chalcogen body of any one of clauses 1-6, wherein the deactivating chemical functional group may include a nitrogen-containing group ≥0.1 mmol N/g, ≥0.5 mmol N/g, ≥1.0 mmol N/g, ≥1.5 mmol N/g, ≥2.0 mmol N/g, ≥2.5 mmol N/g, ≥3.0 mmol N/g.

Clause 8: The immobilized chalcogen body of any one of clauses 1-7, wherein the deactivating chemical functional group comprising nitrogen may include at least one of the following: a nitro group, —$NO_2$, a nitroso group, —NO, an ammonium group, —$N^+R_3$, where R may be an alkyl group, an aryl group, or a H, a cyano group (—CN), a thiocyano group (—SCN), or an isothiocyano group (—NCS).

Clause 9: The immobilized chalcogen body of any one of clauses 1-8, wherein the deactivating chemical functional group may include a sulfur-containing group ≥0.1 mmol S/g, ≥0.5 mmol S/g, ≥1.0 mmol S/g, ≥1.5 mmol S/g, ≥2.0 mmol S/g, ≥2.5 mmol S/g, ≥3.0 mmol S/g.

Clause 10: The immobilized chalcogen body of any one of clauses 1-9, wherein the deactivating chemical functional group comprising sulfur may include at least one of the following: —$SO_3H$ (a sulfonic acid) group or its salt (—$SO_3^-$), —SCN (a thiocyano group), —$SO_2R$ (a sulfonyl ester) group, where R may be an alkyl group, aryl group or halogen, —$SO_2CF_3$ (a trifluoromethyl sulfonyl ester group), —$SO_2$—O—R, or a sulfonium group (—$S^+R_2$), where R may be an alkyl group, aryl group or other organic functional group and R may not be the same.

Clause 11: The immobilized chalcogen body of any one of clauses 1-10, wherein the deactivating chemical functional group may include a phosphorus-containing group ≥0.1 mmol P/g, ≥0.5 mmol P/g, ≥1.0 mmol P/g, ≥1.5 mmol P/g, ≥2.0 mmol P/g, ≥2.5 mmol P/g, ≥3.0 mmol P/g.

Clause 12: The immobilized chalcogen body of any one of clauses 1-11, wherein the deactivating chemical functional group comprising phosphorus may include at least one of the following: a phosphonic acid group (—$PO_3H_2$) or its salt (—$PO_3H^-$, —$PO_3^{2-}$), a phosphonate (—$PO_3R_2$, —$PO_3HR$, or —$PO_3R^-$), or a phosphonyl group (—POR2), where R is a arkyl, aryl, any organic functional group. The deactivating chemical functional group may be a phosphonium group (—$P^+R_3$).

Clause 13: The immobilized chalcogen body of any one of clauses 1-12, wherein the deactivating chemical functional group may include a halogen-containing group ≥0.1 mmol X/g, ≥0.5 mmol X/g, ≥1.0 mmol X/g, ≥1.5 mmol X/g, ≥2.0 mmol X/g, ≥2.5 mmol X/g, ≥3.0 mmol X/g, wherein halogen (X) may comprise fluorine, chlorine, bromine, and or iodine.

Clause 14: The immobilized chalcogen body of any one of clauses 1-13, wherein the deactivating chemical functional group comprising halogen may include at least one of the following: F, Cl, Br, I, —CF$_3$, —CCl$_3$, —CBr$_3$, —Cl$_3$, and or a highly halogenated alkyl group with more than one carbon.

BRIEF DESCRIPTION OF THE DRAWINGS

FIGS. 22A-22B are respective TGA and DSC graphs of C—Se composites made with Elite C activated carbon (available from Calgon Carbon, Pittsburgh, Pa.) made 27 months after preparation of the C—Se composites;

FIG. 32B shows mid-weight-loss kinetic energy (by TGA Analysis in FIG. 31A) vs. sulfur wt % of the total of Se and S in immobilized chalcogen, wherein the solid circles represent measured data, the dashed line represents desirable mid-weight-loss-temperature (at or above the dashed line), and the solid triangles represent control C—SeS$_2$ composites prepared with MWCNT materials;

DETAILED DESCRIPTION

In conjunction with the specific examples, the present disclosure will be further described below. Unless otherwise specified, the experimental methods in the following examples are all conventional; the reagents and materials are all available from commercial sources.

Example 1

(A) Preparation of Selenium Carbon Composite Material

Figure 1:
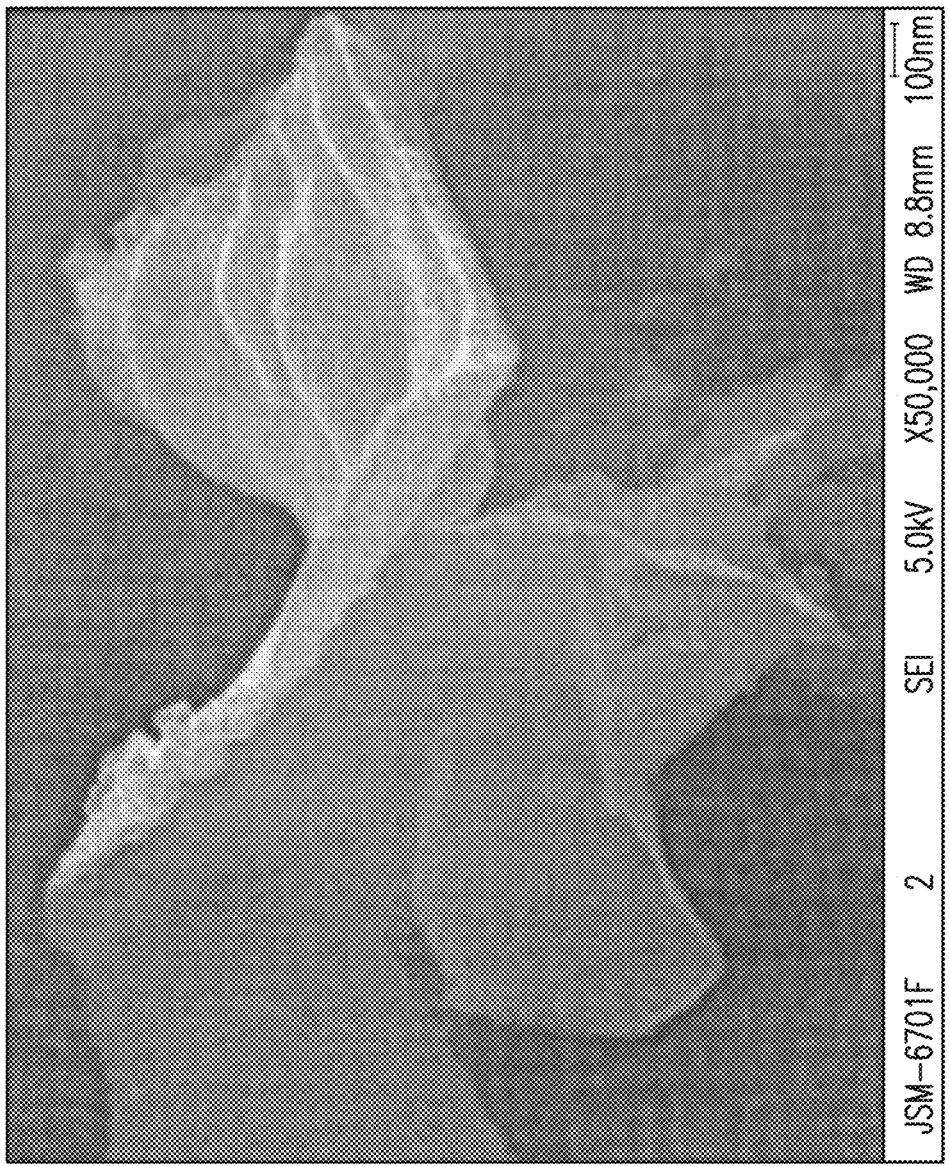
FIG. 1 is a 50,000× scanning electron microscope photograph of the carbon material of Example 1.

After grinding and milling, an appropriate amount of potassium citrate is calcined at 800° C. for 5 hours under an inert atmosphere, and cooled to room temperature. Washed with dilute hydrochloric acid to a neutral pH; filtered and dried to give a two-dimensional carbon nanomaterial (FIG. 1); according to the mass ratio of 50:50, weigh the two dimensional carbon material and selenium, and then stir and mix with the ethanol solution of selenium uniformly; after solvent evaporation, dry the mixture in dry oven; the dried mixture was heated at 5° C./min to 240° C. and soaked for 3 hours; then continues to heat up at 5° C./min to 450° C.; soaked for 20 hours; cooled to room temperature, which resulted in the selenium carbon composite material.

(B) Preparation of the Selenium Carbon Composite Cathode

The above-prepared selenium carbon composites are mixed with carbon black Super P (TIMCAL) and binder CMC/SBR (weight ratio 1:1) along with water by a fixed formulation by pulping, coating, drying and other procedures to obtain a selenium carbon composite cathode.

(C) Assembling Lithium—Selenium Battery

Figure 4:
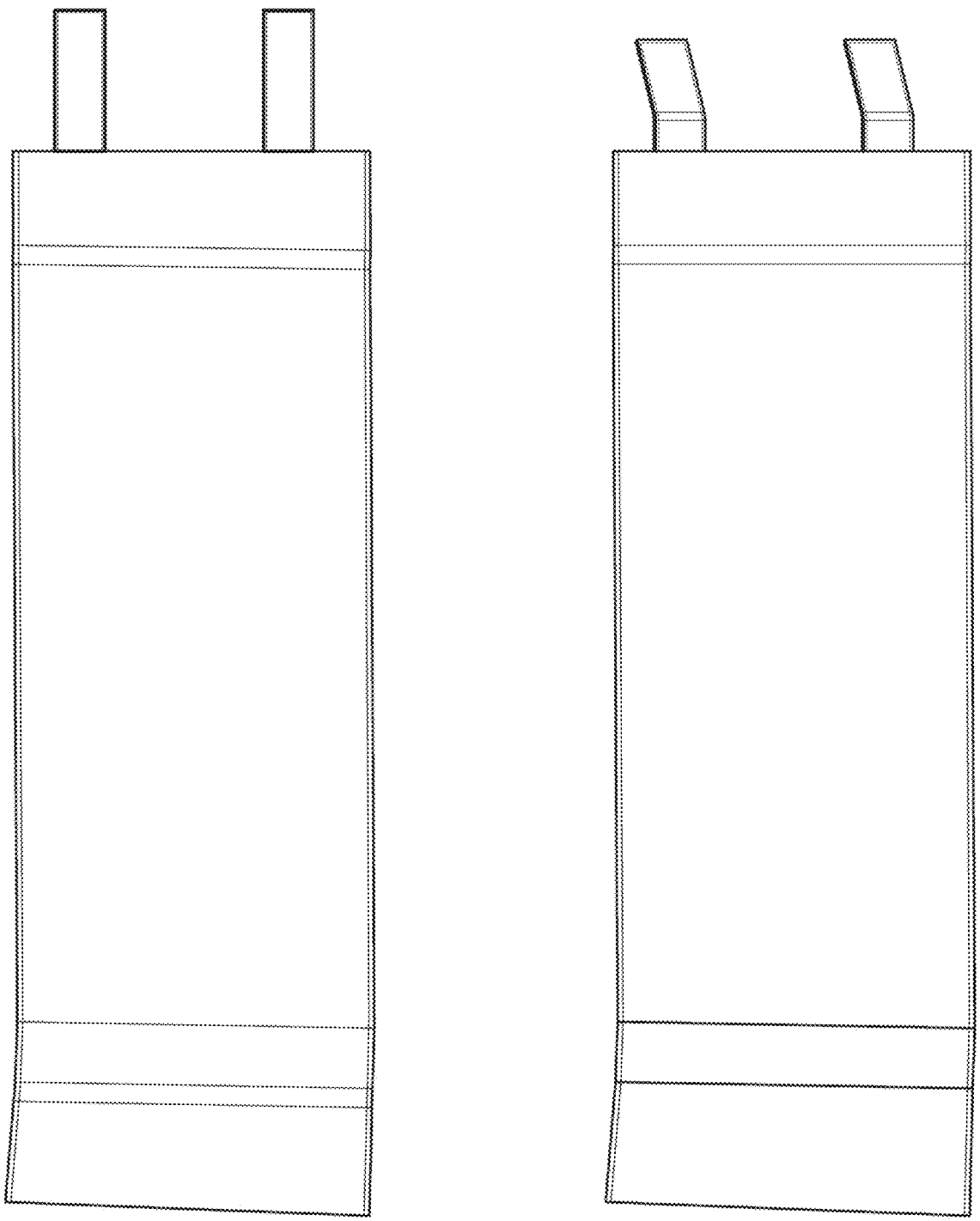
FIG. 4 is a schematic illustration of the pouch cell battery of Example 1.

The above-prepared selenium carbon composite cathode, lithium foil as anode, Celgard diaphragm as separator and 1M $LiPF_6$ in EC/DMC as the electrolyte were assembled into a lithium selenium coin cell battery and a lithium selenium pouch cell battery, a schematic illustration of which is provided in FIG. 4.

(D) Lithium-Selenium Battery Test

Figure 2:
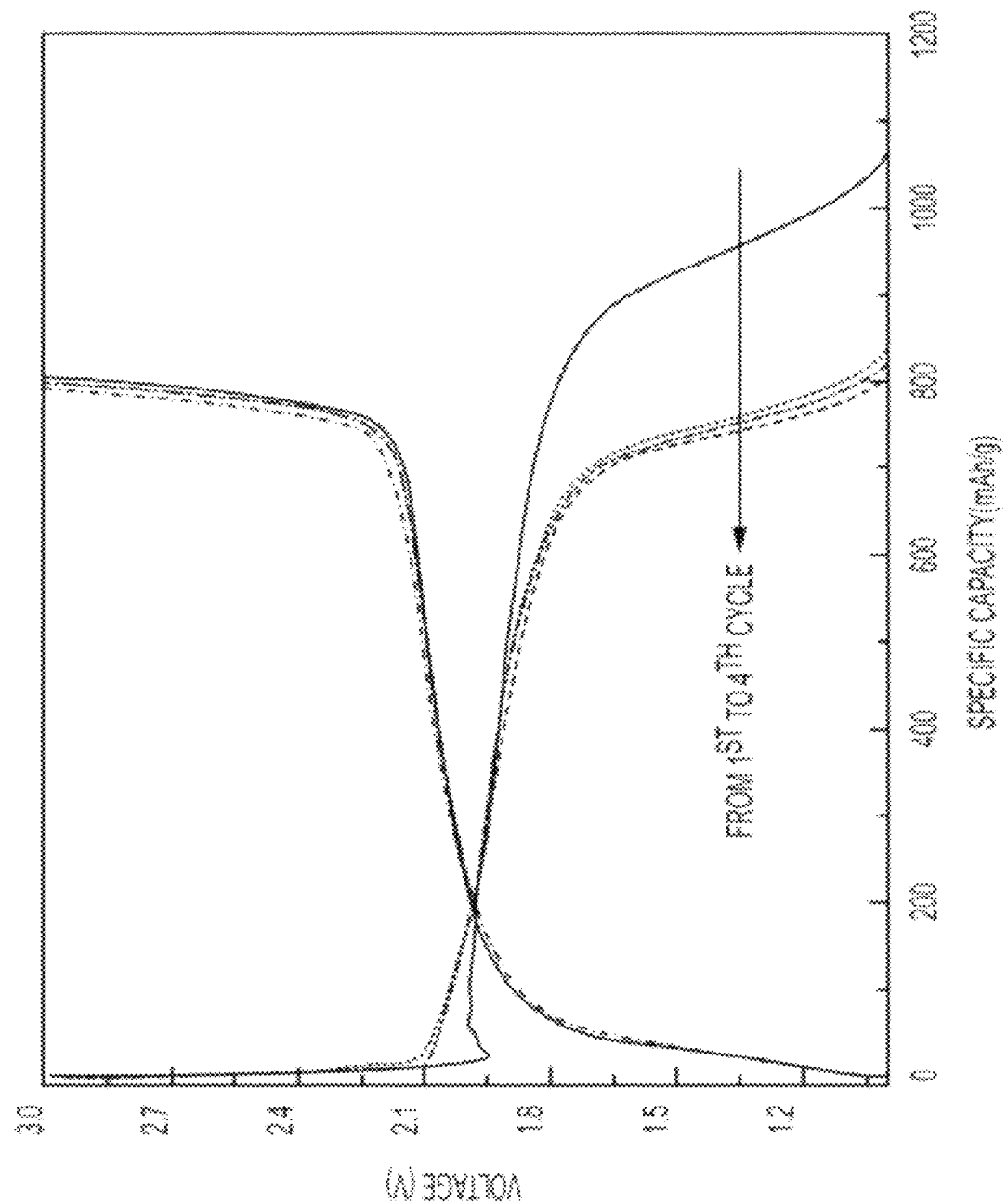
FIG. 2 is a 0.1 C charge and discharge curve of the lithium selenium battery of Example: 1
Figure 5:
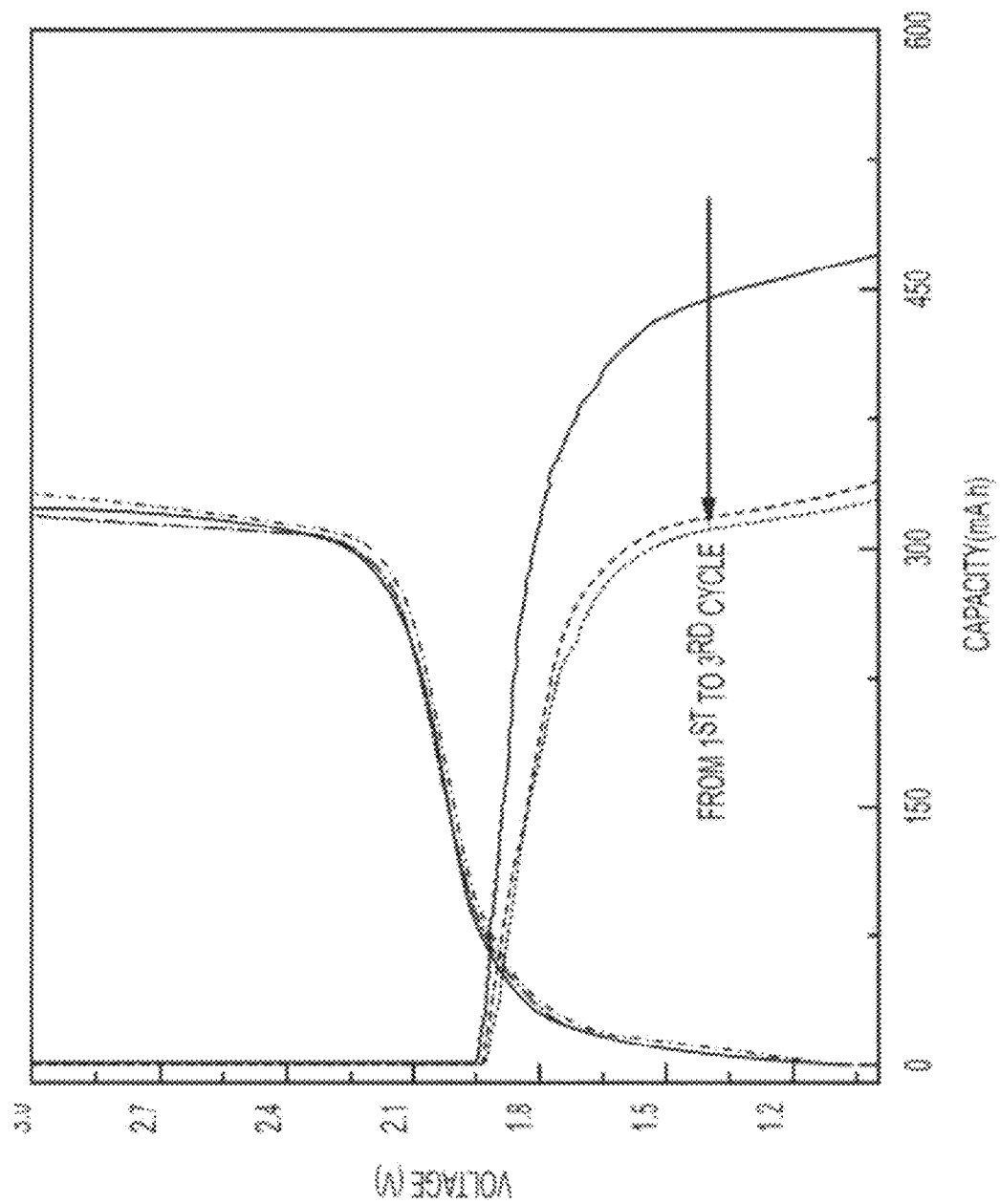
FIG. 5 is a 0.05 C charge and discharge curve of the pouch cell battery of Example 1.

Use a charge-discharge apparatus to perform a constant current charge-discharge test on the lithium-selenium coin cell battery and lithium selenium pouch cell battery. Test voltage range is between 1.0 and 3.0 V and test temperature is 25° C. Discharge specific capacity and the level of charge-discharge current are standardly calculated based on the mass of selenium. The charge-discharge current is 0.1 C or 0.05 C. The lithium selenium coin charge and discharge curve is shown in FIG. 2, the specific test results are shown in Table 1 below. Lithium selenium pouch cell test results are shown in FIG. 5.

Example 2

Conditions are the same as in Example 1, with the exception that the raw material carbonized for two-dimensional carbon is sodium citrate. Battery test results are summarized in Table 1 below.

Example 3

Conditions are the same as in Example 1, with the exception that the raw material carbonized for two-dimensional carbon is potassium gluconate. Battery test results are summarized in Table 1 below.

Example 4

Conditions are the same as in Example 1, with the exception that the high-temperature carbonization temperature for the carbon material is 650° C. Battery test results are summarized in Table 1 below.

Example 5

Conditions are the same as in Example 1, with the exception that the dried mixture was heated at 5° C./min to 300° C. and soaked at this temperature for 3 hours. Battery test results are summarized in Table 1 below.

Example 6

Conditions are the same as in Example 1, with the exception that the dried mixture was heated at 5° C./min to 240° C. and soaked at this temperature for 3 hours, then continued to heat up to 600° C., and soaked at this constant temperature for 20 hours. Battery test results are summarized in Table 1 below.

Example 7

Conditions are the same as in Example 1, with the exception that the lithium-Se battery is packed with lithiated graphite anode, instead of the lithium anode sheet. Battery test results are summarized in Table 1 below.

Example 8

Conditions are the same as in Example 1, with the exception that the lithium-Se battery is packed with lithiated silicon carbon anode, instead of the lithium anode sheet. Battery test results are summarized in Table 1 below.

Comparative Example 1

Conditions are the same as in Example 1, with the exception that the use of polyacrylonitrile as the raw material. Battery test results are summarized in Table 1 below, Comparative Example 2

Figure 3:
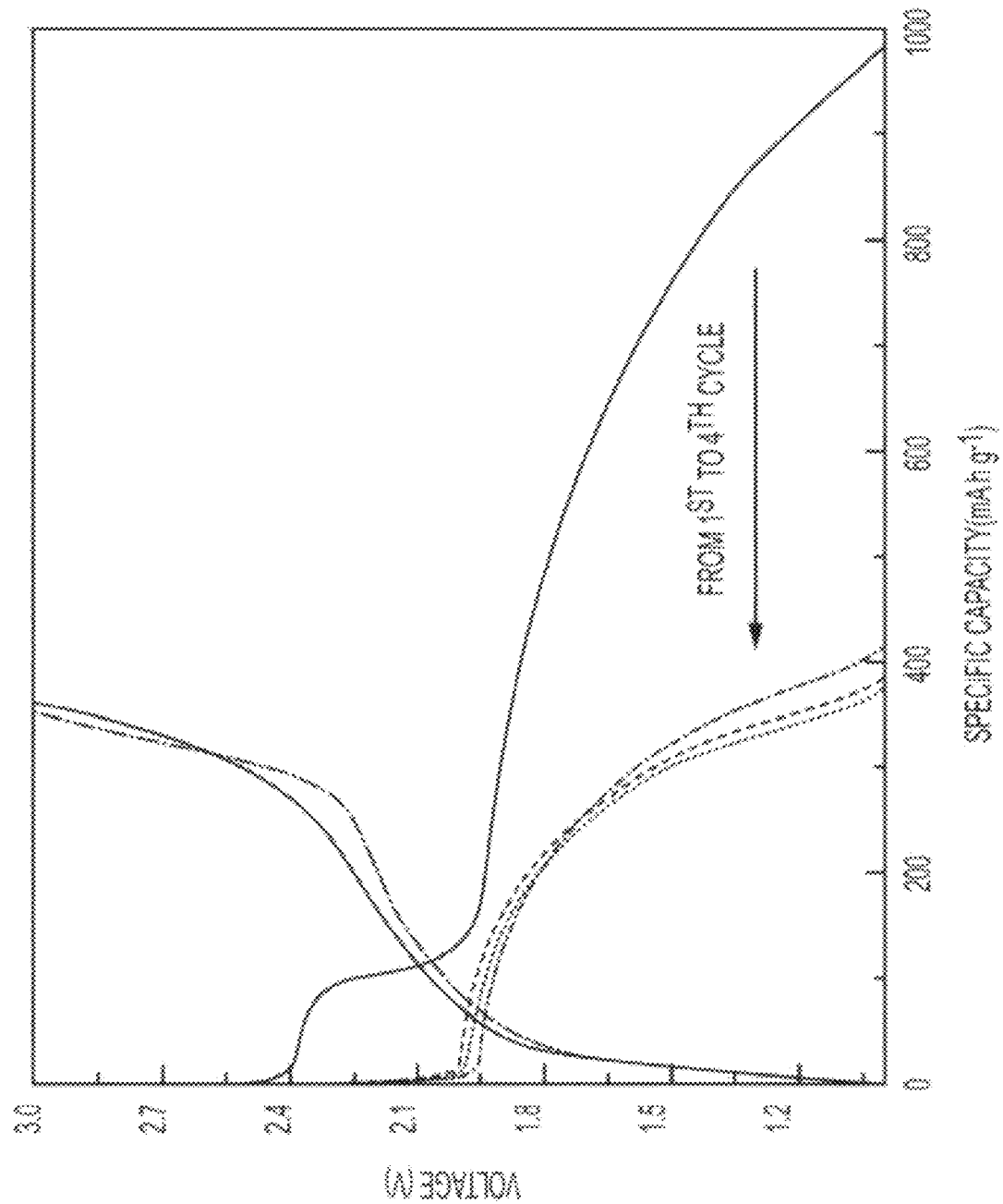
FIG. 3 is a 0.1 C charge and discharge curve of the lithium selenium battery of comparative Example 2.

Conditions are the same as in Example 1, with the exception that a one-step compound method is used to prepare the selenium and carbon composite. In this example, the dried selenium carbon mixture was heated at 5° C./min to 500° C. and soaked at this temperature for 23 hours to obtain selenium carbon composite material. The charge-discharge curve of a battery made from the thus obtained selenium. carbon composite material is shown in FIG. 3; the battery test results are: summarized in Table 1 below.

TABLE 1 summarized Battery Test Results

| Numbering | The first cycle discharge capacity (mAh/g) | The first cycle charge capacity/the first cycle discharge capacity (%) | The 50$^{th}$ cycle capacity (mAh/g) |
| --- | --- | --- | --- |
| Example 1 | 1,050 | 78.1 | 756 |
| Example 2 | 940 | 74.6 | 672 |
| Example 3 | 962 | 75.3 | 683 |
| Example 4 | 987 | 72.1 | 680 |
| Example 5 | 936 | 73.2 | 653 |
| Example 6 | 972 | 70 | 661 |
| Example 7 | 836 | 72.5 | 580 |
| Example 8 | 910 | 73 | 600 |
| Comparative Example 1 | 635 | 55 | 350 |
| Comparative Example 2 | 980 | 40.8 | 386 |

Having thus described a method of preparing a selenium carbon composite material, a method of making immobilized selenium and the use of the immobilized selenium, e.g., in a rechargeable battery, will be described.

Selenium is an element in the same group as oxygen and sulfur namely, Group 6 of the Periodic Table of the elements. Selenium may be advantageous over oxygen and sulfur in term of its substantially high electrical conductivity. US 2012/0225352 discloses making Li-selenium and Na-selenium rechargeable batteries, with good capacity and cycling capability. However, a certain level of polyselenide anions shuttle between the cathodes and anodes of such batteries, resulting in additional electrochemical performances that need to be substantially improved for practical uses. Literature relevant to this field includes the following:

"Electrode Materials for Rechargeable Batteries", Ali Aboulmrane and Khalil Amine, US Patent Application 2012/0225352, Sep. 6, 2012.

"Lithium-Selenium Secondary Batteries Having non-Flammable Electrolyte", Hui He, Bor Z. Jang, Yanbo Wang, and Aruna Zhamu, US Patent Application 2015/0064575, Mar. 5, 2015.

"Electrolyte Solution and Sulfur-based or Selenium-based Batteries including the Electrolyte Solution", Fang Dai, Mei Cai, Qiangfeng Xiao, and Li Yang, US Patent Application 2016/0020491, Jan. 21, 2016.

"A New Class of Lithium and Sodium Rechargeable Batteries Based on Selenium and Selenium-Sulfur as a Positive Electrode", Ali Abouimrane, Damien Dambournet, Kerena W. Chapman, Peter J. Chupa, Wei Wang, and Khalil Amine, J. Am. Chem. Soc. 2012, 134, 4505-4508.

"A Free-Standing and Ultralong-life Lithium-Selenium Battery Cathode Enabled by 3D Mesoporous Carbon/Graphene Hierarchical Architecture", Kai Han, Zhao Liu, Jingmei Shen, Yuyuan Lin, Fand Dai, and Hongqi Ye, Adv. Funct. Mater., 2015, 25, 455-463.

"Micro- and Mesoporous Carbide-Derived Carbon-Selenium Cathodes for High-Performance Lithium Selenium Batteries", Jung Tai Lee, Hyea Kim, Marin Oschatz, Dong-Chan Lee, Feixiang Wu, Huan-Ting Lin, Bogdan Zdyrko, Wan II Chao, Stefan Kaskel, and Gleb Yushin, Adv. Energy Mater. 2014, 1400981.

"High-Performance Lithium Selenium Battery with Se/Microporous Carbon Composite Cathode and Carbonate-Based Electrolyte", Chao Wu, Lixia Yuan, Zhen Li, Ziqi Yi, Rui Zeng, Yanrong Li, and Yunhui Huang, Sci. China Mater. 2015, 58, 91-97.

"Advanced Se-C Nanocomposites: a Bifunctional Electrode Material for both Li—Se and Li-ion Batteries", Huan Ye, Ya-Xia Yin, Shuai-Feng Zhang, and Yu-Guo Guo, J. Mater. Chem. A., May 23, 2014.

"Lithium Iodide as a Promising Electrolyte Additive for Lithium-Sulfur Batteries: Mechanisms of Performance Enhancement", Feixiang Wu, Jung Tae Lee, Naoki Nitta, Hyea Kim, Oleg Borodin, and Gleb Yushin, Adv. Mater. 2015, 27, 101-108.

"A Se/C Composite as Cathode Material for Rechargeable Lithium Batteries with Good Electrochemical Performance", Lili Li, Yuyang Hou, Yaqiong Yang, Minxia Li, Xiaowei Wang, and Yuping Wu, RSC Adv., 2014, 4, 9086-9091.

"Elemental Selenium for Electrochemical Energy Storage", Chun-Peng Yang, Ya-Xia Yin, and Yu-Guo Guo, J. Phys. Chem. Lett. 2015, 6, 256-266.

"Selenium@mesoporous Carbon Composite with Superior Lithium and Sodium Storage Capacity", Chao Luo, Yunhua Xu, Yujie Zhu, Yihang Liu, Shiyou Zheng, Ying Liu, Alex Langrock, and Chunsheng Wang, ACSNANO, Vol. 7, No. 9, 8003-8010.

Also disclosed herein is immobilized selenium comprising selenium and carbon. Immobilized selenium may comprise elemental form selenium or compound form selenium. Selenium may be doped with other element, such as, but not limited to, sulfur. The immobilized selenium enables the localization of elemental selenium atoms which function electrochemically properly without being shuttled between a cathode and an anode of a battery Immobilization of selenium allows an elemental selenium atom to gain two electrons during a discharge process and to form a selenide anion at the location where the selenium molecule/atom is immobilized. The selenide anion can then give up two electrons during a charging process to form an elemental selenium atom. Therefore, immobilized selenium can work as an electrochemical active agent for a rechargeable battery that has a specific capacity that may be up to a stoichiometric level, can have a Coulombic efficiency that may be ≥95%, ≥98%, or as high as 100%, and can achieve a substantially-improved sustainable cycling capability.

In a battery made with immobilized selenium the electrochemical behaviors of elemental selenium atoms and selenide anions during charging are processes that desirably function properly. Carbon skeletons possessing Sp$^2$ carbon-carbon bonds have delocalized electrons distributed over a conjugated six-member-ring aromatic π-bonds across G-band graphene-like local networks that are bounded by D-band carbon. In the presence of an electrical potential, such delocalized electrons may flow with little or no electrical resistance across the carbon skeleton. Selenium immobilization can also compress a carbon skeleton's Sp$^2$ carbon-carbon bonds, resulting in stronger carbon-carbon bonds, possibly leading to improved electron conductivity within the carbon skeleton network. At the same time, selenium immobilization may also lead to compression of selenium particles, resulting in stronger selenium-selenium chemical and physical interactions, possibly leading to improved electrical conductivity among immobilized selenium particles. When both carbon-carbon bonds and Se—Se bonds are enhanced due to selenium immobilization, carbon-selenium interactions are also enhanced by the compression in addition to the presence of a stabilized selenium portion to which carbon skeleton can bond. This portion of the selenium may act as an interface layer for a carbon skeleton to successfully immobilize the stabilized selenium portion. Therefore, electrons may flow with a minimal electrical resistance between the carbon skeleton and the immobilized selenium, whereupon the electrochemical charge/discharge processes may function efficiently in a rechargeable battery. This, in turn, allows the rechargeable battery to maintain a near-stoichiometric specific capacity and have the capability of cycling at almost any practical rate with a low level of damage to the electrochemical performance of the battery.

A carbon skeleton may be porous and may be doped with another composition. The pore size distributions of the carbon skeleton may range between sub angstrom to a few microns or to a pore size that a pore size distribution instrument can characterize by using nitrogen, argon, $CO_2$ or other absorbent as a probing molecule. The porosity of the carbon skeleton may comprise a pore size distribution that peaks in the range of at least one of the following: between sub-angstrom and 1000 angstroms, or between one angstrom and 100 angstroms, or between one angstrom and 50 angstroms, or between one angstrom and 30 angstroms, and or between one angstrom and 20 angstroms. The porosity of the carbon skeleton may further comprise a pore size distribution with more than one peak in the ranges described in the previous statement.

Immobilized selenium may favor carbon skeleton having small pore sizes in which electrons may be delivered and harvested quickly with minimum electrical resistance, which may allow the selenium to function more properly electrochemically in a rechargeable battery. The small pore size may also provide more carbon skeleton surface area where the first portion of the selenium can form a first interface layer for a second portion of selenium immobilization. In addition, the presence in a carbon skeleton having a certain portion of medium size pores and a certain portion of large size pores may also be beneficial for effective delivery of solvent lithium ions from bulk solvent media to a small pore region where lithium ions may lose coordinated solvent molecules and get transported in solid phase of lithium selenide.

The pore volume of the carbon skeleton may be as low as 0.01 mL/g and may be as much as 5 mL/g, or may be between 0.01 mL/g and 3 mL/g, or may be between 0.03 mL/g and 2.5 mL/g, or may be between 0.05 mL/g and 2.0 mL/g. The pore volume having pore sizes less than 100 angstroms, or less than 50 angstrom, or less than 30 angstroms, or less than 20 angstroms may be greater than 30%, or greater than 40%, or greater than 50%, or greater than 60%, or greater than 70%, or greater than 80% of the total measurable pore volume that can be measured by using a BET instrument with nitrogen, $CO_2$, argon, and other probing gas molecules. The BET determined surface area of the carbon may be greater than 400 $m^2/g$, or greater than 500 $m^2/g$, or greater than 600 $m^2/g$, or greater than 700 $m^2/g$, or greater than 800 $m^2/g$, or greater than 900 $m^2/g$, or greater than 1000 $m^2/g$.

The carbon may also be substantially amorphous, or it may have a characteristic of a very broad peak centered at a d-spacing around 5 angstroms.

The carbon may comprise $Sp^2$ carbon-carbon bonds, having Raman peak shifts featuring a D-band and a G-band. In an example, $Sp^2$ carbon-carbon bonds of the carbon feature a D-band centered at 1364±100 $cm^{-1}$ with a FWHM about 296±50 $cm^{-1}$ and a G-band center at 1589±100 $cm^{-1}$ with a FWHM about 96±50 $cm^{-1}$ in Raman spectrum. The ratio of the area of D-band to G-band may range from 0.01 to 100, or from 0.1 to 50, or from 0.2 and 20.

The carbon may be of any morphology, namely, for example, platelet, sphere, fiber, needle, tubular, irregular, interconnected, agglomerated, discrete, or any solid particles. Platelet, fiber, needle, tubular, or some morphology having a certain level of aspect ratio may be beneficial for achieving better inter-particle contact, resulting in better electrical conductivity, possibly enhancing rechargeable battery performance The carbon may be of any particle size, having a median particle size from a nanometer to a few millimeters, or from a few nanometers to less than 1000 microns, or from 20 nm to 100 microns.

The property of a carbon skeleton can affect selenium immobilization and interactions between the carbon skeleton surface and selenium particles can affect the performance of a rechargeable battery. The location of $Sp^2$ carbon in a carbon skeleton can aid in achieving Se immobilization. $Sp^2$ carbon from small carbon skeleton pores may be favored, which can be quantified by NLDFT surface area method, as discussed in the Example 9 herein. The surface area from carbon skeleton pores less than 20 angstroms may be ≥500 $m^2/g$, ≥600 $m^2/g$, ≥700 $m^2/g$, ≥800 $m^2/g$, ≥900 $m^2/g$, or ≥1,000 $m^2/g$. The surface areas from the carbon skeleton pores between 20 angstroms and 1000 angstroms may be 20% or less, 15% or less, 10% or less, 5% or less, 3% or less, 2% or less, or 1% or less of the total surface area of the carbon skeleton.

Immobilized selenium can comprise selenium that vaporizes at a temperature higher than elemental selenium, referring to the following definition of selenium vaporization: Elemental selenium in a Se-Super P composite loses 50% of its weight at a temperature of 480° C.; elemental selenium in a Se/Graphite composite loses its weight by 50% of the contained selenium at a temperature of 471° C. Immobilized selenium loses 50% of its weight at a temperature higher than 480° C., for example at a temperature ≥490° C., ≥500° C., ≥510° C., ≥520° C., ≥530° C., ≥540° C., ≥550° C., ≥560° C., ≥570° C., or ≥580° C. or more. Selenium in the immobilized selenium may need a kinetic energy of ≥9.5 kJ/mole, ≥9.7 kJ/mole, ≥9.9 kJ/mole, ≥10.1 kJ/mole, ≥10.3 kJ/mole, or ≥10.5 kJ/mole or more to overcome the bonding and or intermolecular forces in the immobilized selenium system and to escape to the gas phase. In an example, the last portion of the immobilized selenium that vaporizes can require a kinetic energy of ≥11,635 joules/mole (≥660° C.) to escape the carbon skeleton and may be critical for selenium immobilization and may work as interfacial material between the carbon skeleton and the majority of the immobilized selenium molecules. Therefore, this portion of the selenium that requires a kinetic energy of ≥11,635 joules/mole is called interfacial selenium. The amount of interfacial selenium in the immobilized selenium may be ≥1.5%, ≥2.0%, ≥2.5%, or 3.0% of the total immobilized selenium.

Immobilized selenium can comprise selenium that has an activation energy higher than that for conventional (non-immobilized) selenium to overcome in order for the selenium to escape from the immobilized Se—C composite system. The activation energy for non-immobilized selenium (Se-Super P composite system) was determined to be about 92 kJ/mole according to ASTM Method E1641-16. The activation energy for selenium in the immobilized selenium comprising selenium and carbon is ≥95 kJ/mole, ≥98 kJ/mole, ≥101 kJ/mole, ≥104 kJ/mole, ≥107 kJ/mole, or ≥110 kJ/mole. The activation energy for selenium in the immobilized selenium comprising selenium and carbon is ≥3%, ≥6%, ≥9%, ≥12%, ≥15%, or ≥18% greater than that for selenium in Se-Super P composite. The immobilized selenium can be more stable than non-immobilized selenium, which is the reason that the battery comprising immobilized selenium may cycle electrochemically better, probably due to the minimization (or elimination) of selenium shuttling between cathode and anode, resulting from selenium being immobilized in Se—C composite.

Immobilized selenium may comprise selenium that may be Raman-inactive or Raman-active, typically having a Raman peak at 255±25 cm$^{-1}$, or at 255±15 cm$^{-1}$, or at 255±10 cm$^{-1}$. Raman relative peak intensity is defined as the area of the Raman peak at 255 cm$^{-1}$ relative to the area of the D-band peak of the carbon Raman spectrum Immobilized carbon may comprise selenium having a Raman relative peak intensity of ≥0.1%, ≥0.5%, ≥1%, ≥3%, ≥5%. Immobilized selenium may contain ≥5% selenium, ≥10% selenium, ≥20% selenium, ≥30% selenium, ≥40% selenium, ≥50% selenium, ≥60% selenium, or ≥70% selenium.

Immobilized selenium can comprise selenium having a red shift from the Raman peak of pure selenium. A red shift is defined by a positive difference between the Raman peak location for the immobilized selenium and that for pure selenium. Pure selenium typically has a Raman peak at about 235 cm$^{-1}$. Immobilized selenium can comprise selenium that has a red shift of the Raman peak by ≥4 cm$^{1}$, ≥6 cm$^{1}$, ≥8 cm$^{-1}$, ≥10 cm$^{-1}$, ≥12 cm$^{-1}$, ≥14 cm$^{-1}$, or ≥16 cm$^{-1}$. A red shift in Raman peak suggests that there is a compression on the selenium particles.

Immobilized selenium can comprise carbon that may be under compression. Under compression, electrons can flow with a minimum resistance, which facilitates fast electron delivery to selenium and from selenium anions for electrochemical processes during discharge-charge processes for a rechargeable battery. D-band and or G-band in Raman spectrum for the Sp$^2$ carbon-carbon bonds of the carbon skeleton comprising the immobilized selenium may show a red shift, by ≥1 cm$^{-1}$, 24 2 cm$^{-1}$, ≥3 cm$^{-1}$, ≥4 cm$^{-1}$, or ≥5 cm$^{-1}$.

Immobilized selenium comprises selenium that can have a higher collision frequency than non-immobilized selenium. Such high collision frequency may result from selenium in the immobilized Se-C system that is under compression. The collision frequency for selenium in non-immobilized selenium was determined to be around 2.27× 10$^5$, according to the ATSM Method E1641-16. The collision frequency for selenium in the immobilized selenium comprising selenium and carbon is ≥2.5×10$^5$, ≥3.0× 10$^5$, ≥3.5×10$^5$, ≥4.0×10$^5$, ≥4.5×10$^5$, ≥5.0×10$^5$, ≥5.5×10$^5$, ≥6.0×10$^5$, or ≥8.0×10$^5$. The immobilized selenium can have a higher collision frequency by ≥10%, ≥30%, ≥50%, ≥80%, ≥100%, ≥130%, ≥150%, ≥180%, or ≥200% than that for non-immobilized selenium in Se—C composite. This may lead to better electron conductivity in the immobilized selenium system because of more collisions among selenium species. The immobilized selenium in Se—C composite would also have a higher collision frequency against the wall of the carbon host (e.g., a carbon skeleton), which may result in a better delivery or harvesting of electrons from the carbon skeleton during electrochemical cycling, which can lead to a battery (comprising immobilized selenium) that has improved cycling performances, such as attaining more cycles and or cycling at a much higher C-rate, which is highly desirable.

Immobilized selenium comprises selenium that has less tendency to leave its host material (carbon), having a kinetic rate constant that is ≤⅕, ≤1/10, ≤1/50, ≤1/100, ≤1/500, or ≤1/1000 of the kinetic rate constant for non-immobilized/conventional selenium. In our example, immobilized selenium comprises selenium that has less tendency to leave its host material (carbon), having a kinetic rate constant (at 50° C.) of ≤1×10$^{-10}$, ≤5×10$^{-11}$, ≤1×10$^{-11}$, ≤5×10$^{-12}$, or ≤5×10$^{-13}$.

Immobilized selenium can comprise selenium that may be amorphous, as determined by X-ray diffraction measurements. A diffraction peak having a d-spacing of about 5.2 angstroms is relatively smaller or weaker, for example, 10% weaker, 20% weaker, 30% weaker, or 40% weaker, than that for the carbon skeleton.

Immobilized selenium may be prepared by physically mixing carbon and selenium followed by melting and homogenizing (or mixing or blending) selenium molecules to achieve selenium immobilization. The physical mixing may be achieved by ball-milling (dry and wet), mixing with mortar and pestle (dry or wet), jet-milling, horizontal milling, attrition milling, high shear mixing in slurries, regular slurry mixing with blade, etc. The physically mixed mixture of selenium and carbon may be heated at a temperature that is at or higher than the melting point of selenium and below the melting temperature of carbon. The heating may be carried out in an inert gas environment such as, but not limited to, argon, helium, nitrogen, etc. The heating environment may comprise air or a reactive environment. Immobilization of selenium may be achieved by impregnating dissolved selenium into carbon, followed by evaporation of the solvent. The solvent for dissolving selenium may comprise an alcohol, an ether, an ester, a ketone, a hydrocarbon, a halogenated hydrocarbon, a nitrogen-containing compound, a phosphorus containing compound, a sulfur-containing compound, water, etc.

Immobilized selenium can be achieved by melting a large amount of selenium in the presence of carbon, followed by removing extra non-immobilized selenium.

An immobilized selenium system or body may comprise immobilized selenium ≥30%, ≥40%, ≥50%, ≥60%, ≥70%, ≥80%, or ≥90% of the total amount of selenium in the system or body. The non-immobilized selenium can vaporize at a temperature lower than the immobilized selenium.

An immobilized selenium system or body may comprise immobilized selenium that is doped with one or more additional/other element(s) from Group 6 of the Periodic Table, such as, for example, sulfur and/or tellurium. The dopant level may range from as low as 100 ppm by weight to as high as 85% of the weight of the immobilized selenium system or body.

Figure 6:
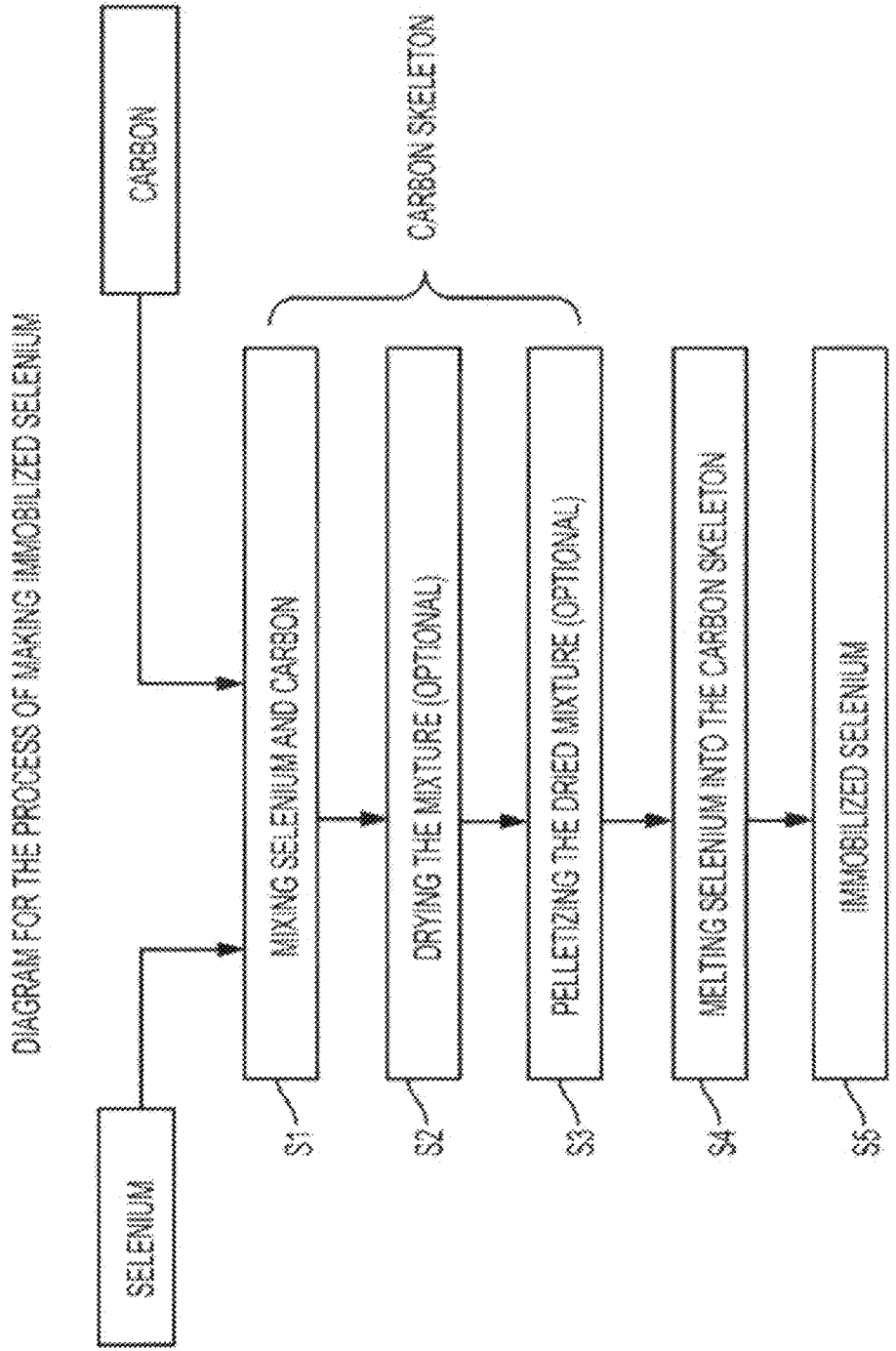
FIG. 6 is a flow diagram of a process of making immobilized selenium.

An example process of making immobilized selenium is illustrated in FIG. 6. In the process, selenium and carbon are mixed together (S1) under dry or wet conditions. The mixture can be optionally dried to a powder (S2) followed by optionally pelletizing the dried powder (S3). The results of step S1 and optionally steps S2 and S3 produce a carbon skeleton that is a starting material for step S4. In step S4, selenium is melted into the carbon skeleton. The selenium melted into the carbon skeleton is allowed to dry thereby producing the immobilized selenium of step S5. Preparation and characterization of immobilized selenium will be described later herein in connection with Example 10.

The immobilized selenium may be used as a cathode material for a rechargeable battery. For making a cathode, the immobilized selenium may be dispersed in a liquid media such as, but not limited to, water or an organic solvent. The cathode comprising the immobilized selenium may comprise a binder, optionally another binder, optionally an electric-conductivity promoter, and an electric charge collector. The binder may be inorganic or organic. An organic binder may be of a natural product, such as, for example, CMC, or a synthetic product, such as, for example, a SBR Rubber latex. An electrical-conductivity promoter can be a type of carbon, such as, graphite-derived small particles, graphene, carbon nano-tubes, carbon nano-sheet, carbon blacks, etc. An electric charge collector may be, for example, an aluminum foil, a copper foil, a carbon foil, a carbon fabric, or other metallic foils. The cathode can be prepared by coating an immobilized selenium-containing slurry (or slurries) onto the charge collector, followed by a typical drying process (air dry, oven-dry, vacuum oven-dry, etc.). The immobilized selenium slurry or slurries may be prepared by a high shear mixer, a regular mixer, a planetary mixer, a double-planetary mixer, a ball mill, a vertical attritor, a horizontal mill, etc. The cathode comprising immobilized selenium may be pressed or roller-milled (or calendared) prior to its use in a battery assembly.

A rechargeable battery comprising immobilized selenium may comprise a cathode comprising immobilized selenium, an anode, a separator, and an electrolyte. The anode may comprise lithium, sodium, silicon, graphite, magnesium, tin, and/or and suitable and/or desirable element or combination of elements from Group IA, Group IIA, Group IIIA, etc., of the periodic table of the elements (Periodic Table). The separator may comprise an organic separator, an inorganic separator, or a solid electrolyte separator. An organic separator may comprise a polymer such as, for example, polyethylene, polypropylene, polyester, a halogenated polymer, a polyether, a polyketone, etc. An inorganic separator may comprise a glass or quartz fiber, a solid electrolyte separator. An electrolyte may comprise a lithium salt, a sodium salt, or other salt, a salt of Group IA of the Periodic Table, a salt of Group IIA of the Periodic Table, and an organic solvent. The organic solvent may comprise an organic carbonate compound, an ether, an alcohol, an ester, a hydrocarbon, a halogenated hydrocarbon, a lithium containing-solvent, etc.

A rechargeable battery comprising immobilized selenium may be used for electronics, an electric or hybrid vehicle, an industrial application, a military application such as a drone, an aerospace application, a marine application, etc.

A rechargeable battery comprising immobilized selenium may have a specific capacity of 400 mAh/g active amount of selenium or higher, 450 mAh/g or higher, 500 mAh/g or higher, 550 mAh/g or higher, or 600 mAh/g or higher. A rechargeable battery comprising immobilized selenium may be able to undergo electrochemical cycling for 50 cycle or more, 75 cycles or more, 100 cycles or more, 200 cycles or more, etc.

A rechargeable battery comprising immobilized selenium may be able to be charged at 0.1 C, 0.2 C, 0.5 C, 1 C, 1.5 C, 2 C, 3 C, 4 C, 5 C, 6 C, 7 C, 8 C, 9 C, 10 C or faster. After conducting extensive high C-Rate charge-discharge cycling for 30 or more cycles (e.g., 5 cycles at 0.1 C, 5 cycles at 0.2 C, 5 cycles at 0.5 C, 5 cycles at 1 C, 5 cycles at 2 C, 5 cycles at 5 C, and 5 cycles at 10 C), a rechargeable battery comprising immobilized selenium may retain a battery specific capacity >30%, >40%, >50%, >60%, >70%, >80% of the $2^{nd}$ discharge specific capacity at a cycling rate of 0.1 C.

Following are several examples to illustrate the spirit of the present disclosure. These examples should not be construed in a limiting sense.

EXAMPLES

Method of Characterization

Scanning Electron Microscopy (SEM) images were collected on a Tescan Vega scanning electron microscope equipped with an energy dispersive analysis X-Ray (EDX) detector.

Raman spectra were collected by a Renishaw inVia Raman Microscope (confocal). Laser Raman spectroscopy is widely used as a standard for the characterization of carbon and diamond and provides readily distinguishable signatures of each of the different forms (allotropes) of carbon (e.g., diamond, graphite, buckyballs, etc.). Combined with photoluminescence (PL) technology, it offers a non-destructive way to study various properties of diamond including phase purity, crystal size and orientation, defect level and structure, impurity type and concentration, and stress and strain. In particular, the width (full-width-half-maximum, FWHM) of the first order diamond Raman peak at 1332 $cm^{-1}$, as well as the Raman intensity ratio between diamond peak and graphitic peaks (D-band at 1350 $cm^{-1}$ and G-band at 1600 $cm^{-1}$), is a direct indicator of diamond and other carbon material quality. Furthermore, the stress and strain levels in diamond or other carbon grains and films can be estimated from diamond Raman peak shift. It has been reported that the diamond Raman peak shift rate under hydrostatic stress is about 3.2 $cm^{-1}$/GPa, with the peak shifting to lower wavenumber under tensile stress and higher wavenumber under compressive stress. The Raman spectra discussed herein were collected using a Renishaw inVia Raman spectroscope with 514 nm excitation laser. More information about using Raman spectroscopy to characterize diamond is also available in the references (1) A. M. Zaitsev, *Optical Properties of Diamond,* 2001, Springer and (2) S. Prawer, R. J. Nemanich, *Phil. Trans. R. Soc. Lond.* A (2004) 362, 2537-2565.

The data for BET surface area and pore size distributions of carbon samples were measured by nitrogen absorption and $CO_2$ absorption with a 3Flex (Mircomeritics) equipped with a Smart VacPrep for sample degas preparations. The sample is typically degassed in Smart Vac-Prep at 250° C. for 2 hours under vacuum prior to $CO_2$ and $N_2$ absorption measurements. Nitrogen absorption is used to determine the BET surface area. Nitrogen absorption data and $CO_2$ absorption data were combined to calculate pore size distributions of a carbon sample. For the details about combining both $N_2$ and $CO_2$ absorption data for determining the pore size distributions for carbon materials, please refer to "Dual gas analysis of microporous carbon using 2D-NLDFT heterogeneous surface model and combined adsorption data of $N_2$ and $CO_2$", Jacek Jagiello, Conchi Ania, Jose B. Parra, and Cameron Cook, Carbon 91, 2015, page 330-337.

The data for thermogravimetric analysis (TGA) and TGA-differential scanning calorimetry (DSC) for immobilized selenium samples and the control samples were measured by Netzsch Thermal Analyzer. The TGA analysis was performed under an argon flow rate of ~200 mL/min at a heating rate of 16° C./min, 10° C./min, 5° C./min, 2° C./min, 1° C./min, and other heating rates. For the purpose of consistency, a typical amount of immobilized selenium sample used for TGA analysis was about 20 mg.

Activation energy and collision frequency of the immobilized selenium and non-immobilized selenium were determined by TGA following the procedures described in ASTM Method E1641-16.

X-Ray diffraction results for different carbon, Se-carbon samples, and immobilized selenium were collected on a Philip Diffractometer.

Battery cycling performances for rechargeable batteries comprising immobilized selenium were tested on Lanhe CT2001A Battery Cycling Tester. Charge and discharge currents of the rechargeable batteries comprising immobilized selenium were determined by the amount of selenium contained in the immobilized selenium and cycling rate (0.1 C, 0.5 C, 1 C, 2 C, 3 C, 4 C, 5 C, 10 C, etc.).

Example 9

Synthesis and Characterization of Carbon Skeleton

To form a first residue, a charge of 260 g potassium citrate was included in a crucible and the crucible was placed into a quartz tubing inside a tubular furnace. A stream of argon gas was flowed into the furnace and the furnace was heated at 5° C./min from room temperature (−20-22° C.) to 600° C. The furnace was held at this temperature for 60 minutes, followed by shutting-down the furnaces and removing the charge from the crucible after furnace cooling down, recovering 174.10 grams of processed residue. To form second and third processed residues, the same process described for the first residue was repeated for charges of 420 and 974 grams of potassium citrate, separately. The resulting second and third processed residues weighed 282.83 grams and 651.93 grams, respectively.

1108.9 grams from these three processed residues were combined together into a crucible, which was placed into the quartz tubing inside the tubular furnace and a flow of argon gas was streamed into the furnace. The furnace was heated at 5° C./min to 800° C. The furnace was held at 800° C. for 1 hour. The furnace was allowed to cool whereupon the crucible was removed from the quartz tubing and thereafter 1085.74 grams of a first final residue were recovered.

Following the same procedure described in this Example (800° C.), a charge of 120 grams of potassium residues introduced into the furnace produced about 77 grams of a second final residue (800° C.).

The combination of the first and second final residues resulted in about 1,163 grams of a third final residue.

The 1,163 grams of third final residue was then mixed with 400 ml of water to form a slurry which was separated approximately equally into four two-liter beakers. The pH of each slurry was measured to be greater than 13. Next, a concentrated hydrochloric acid solution was added to each beaker with a violent evolution of carbon dioxide, which subsided at a pH less than about 5. More hydrochloric acid solution was added to obtain a pH of about 1.9. Then the slurries were filtered and washed to filter cakes that were dried in an oven at 120° C. for about 12 hours, followed by vacuum drying at 120° C. for 24 hours resulting in four carbon skeleton samples, a total of about 61.07 grams.

Figure 7:
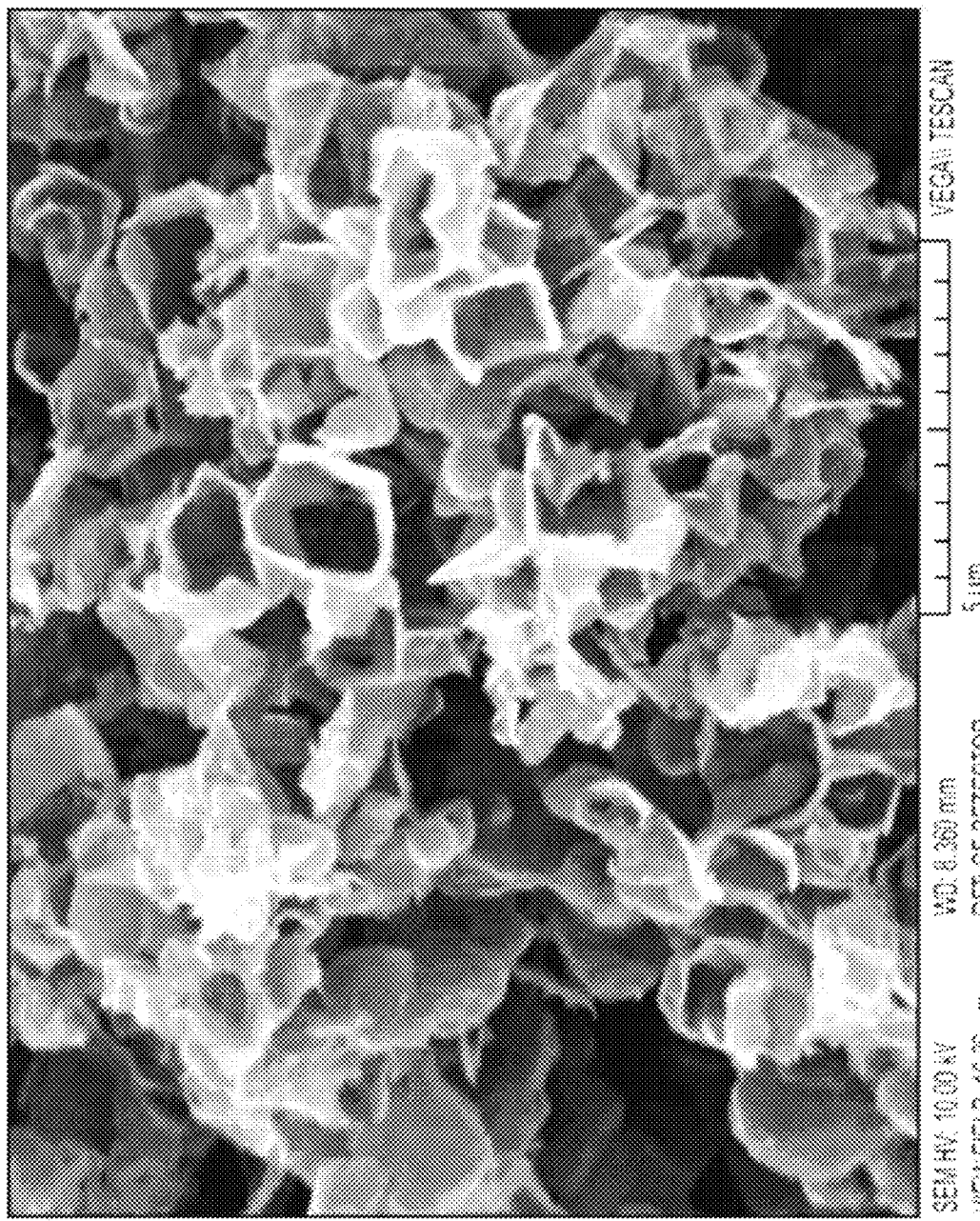
FIG. 7 is a scanning electron microscope image of a carbon skeleton prepared by the process of Example 9.

These carbon skeleton samples were characterized with SEM, XRD, Raman, BET/Pore-Size-Distributions. The SEM result for one carbon skeleton is shown in FIG. 7. Surface morphologies of typical carbon skeleton particles that are prepared in the process described in this Example, had sheet-like morphologies with their sheet edges being interconnected with sample thickness between 500 nm and 100 nm, and the sample width (or length) being between 0.5 and 2 µm, therefore having an aspect ratio (defined as the ratio of the longest dimension of the sample width (or sheet length) to the sample thickness)≥1, e.g., an aspect ratio≥5 or greater, or an aspect ratio≥10.

Figure 8:
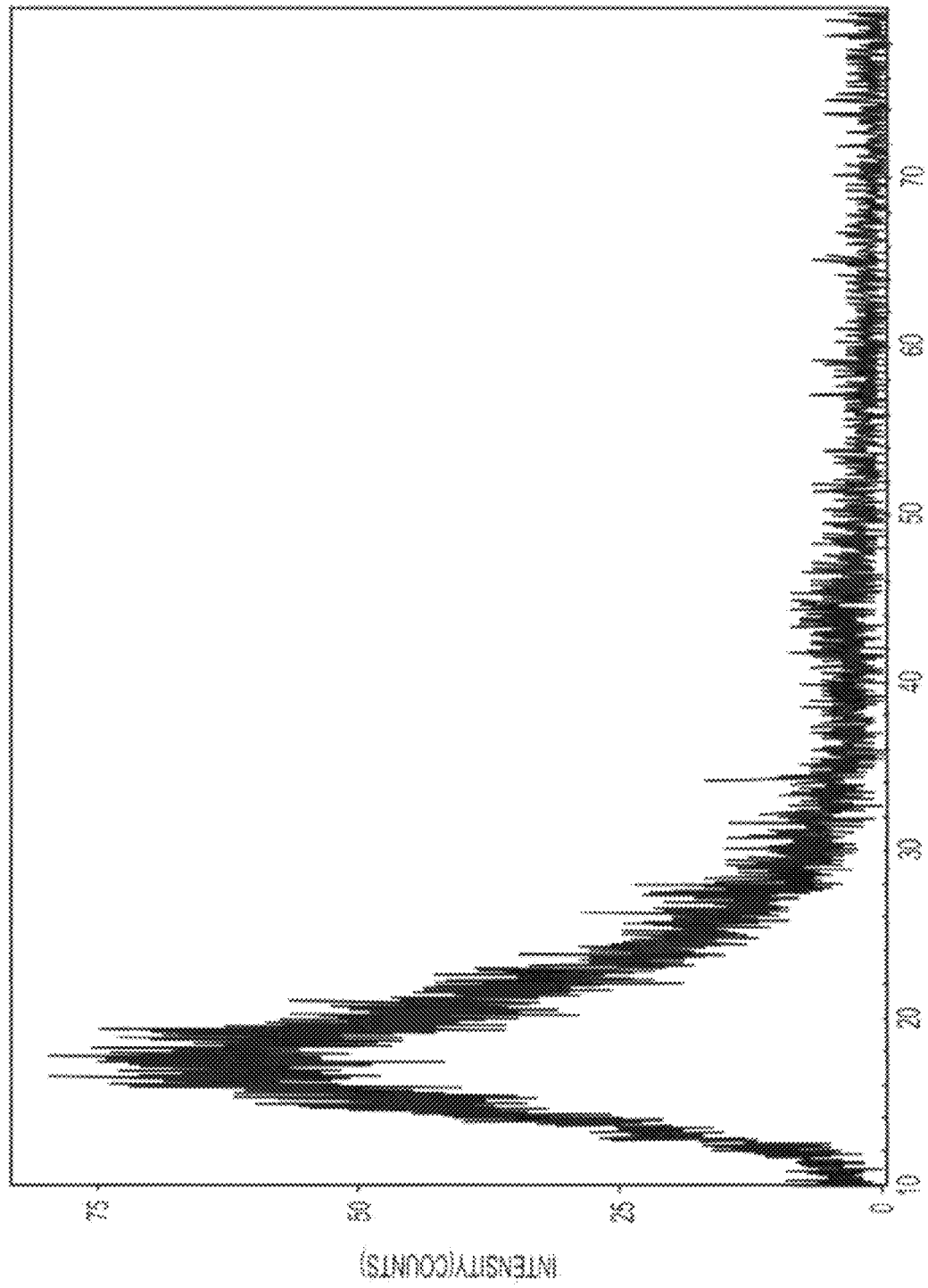
FIG. 8 is X-ray diffraction patterns for the carbon skeleton prepared by the process of Example 9.

X-Ray diffraction patterns of one carbon skeleton, shown in FIG. 8, shows that the carbon skeleton is substantially amorphous in phase. However, it does show a broad diffraction peak centered at around 2θ of about 17°, indicating a d-spacing about 5.21 angstroms.

Figure 9:
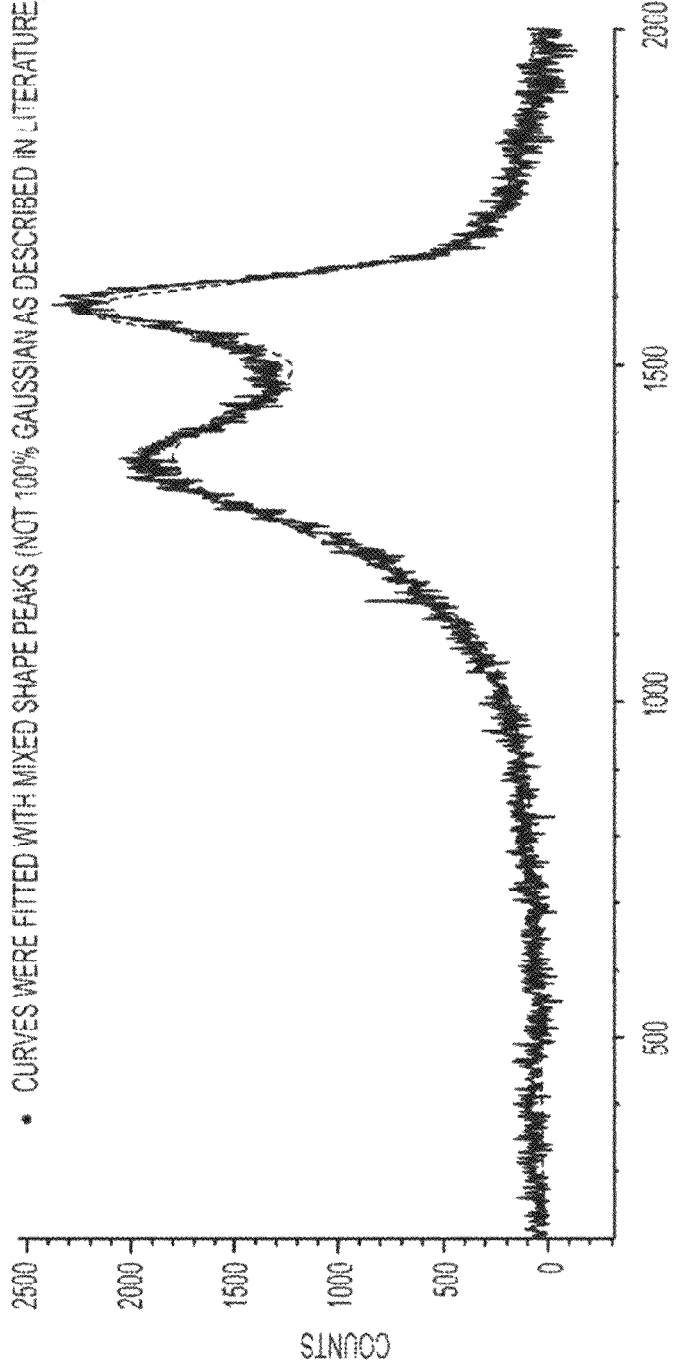
FIG. 9 is Raman spectrum of the carbon skeleton that was prepared by the process of Example 9.

Raman scattering spectroscopy results for one carbon skeleton is shown in FIG. 9, showing $Sp^2$ carbon having a D-band at about 1365 $cm^{-1}$ (Curve 1) and G-band at about 1589 $cm^{-1}$ (Curve 2) with a FWHM of 296 and 96 $cm^{-1}$, respectively. Both D-band and G-band show a mixture of Gaussian and Lorentian distributions; D-band has about 33% Gaussian distributions and G-band has about 61% Gaussian distributions. The ratio of the area for D-band to the area for G-band is about 3.5.

Figure 10A:
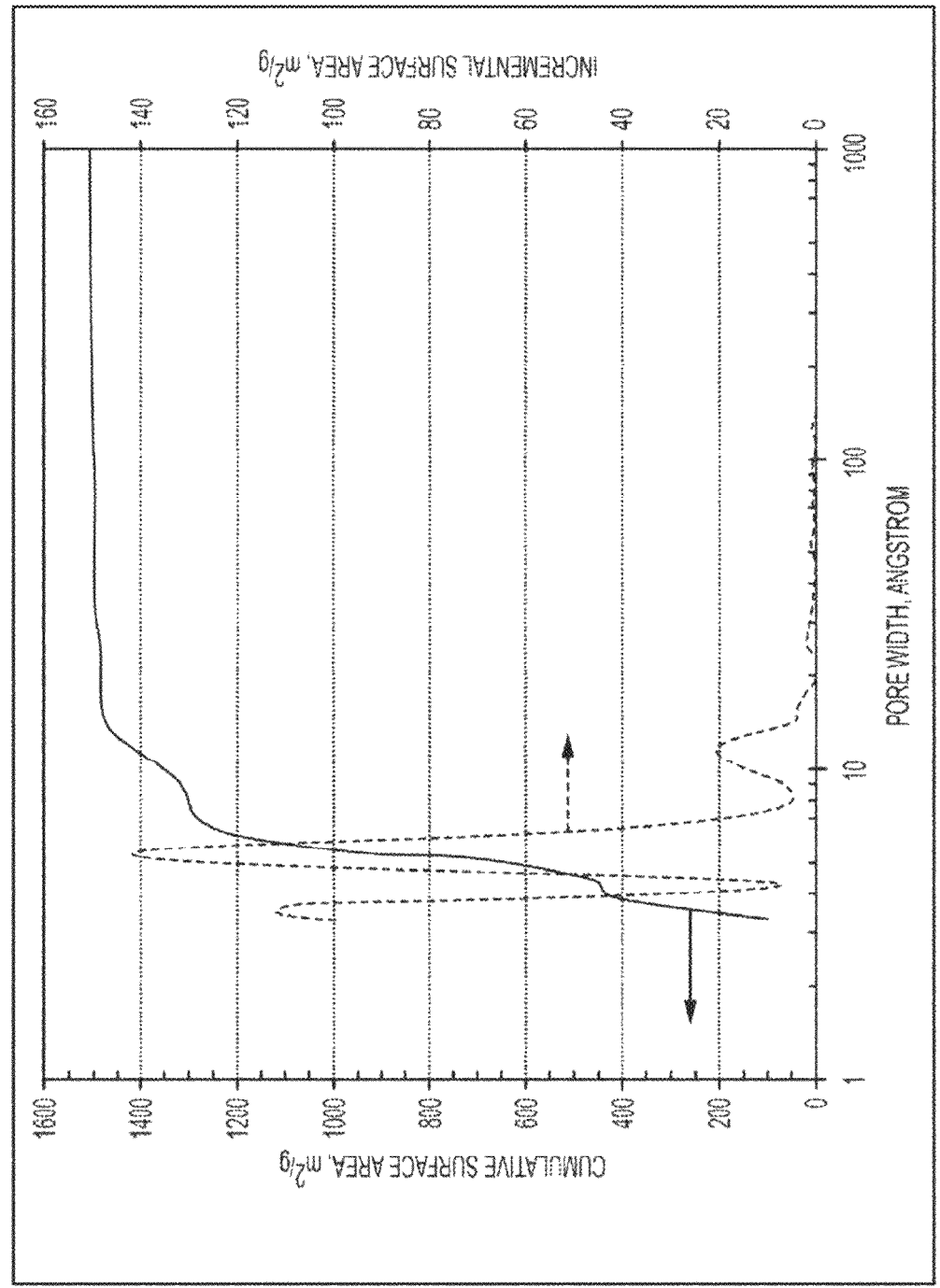
FIG. 10A is a graph of cumulative and incremental surface area for the carbon skeleton prepared by the process of Example 9.

BET surface area of one carbon skeleton was measured to be 1,205 $m^2/g$ by nitrogen absorption. The Incremental Pore Surface Area vs. the pore width is plotted in FIG. 10A by using NLDFT method, showing a Cumulative Pore Surface Area of 1,515 $m^2/g$. The discrepancy between BET surface area and NLDFT surface area may come from the fact that NLDFT distributions are calculated with both nitrogen and $CO_2$ absorption data; $CO_2$ molecules may enter the pores smaller than those pores that nitrogen molecules can enter. The NLDFT surface area in the pores peaked at 3.48 angstrom is 443 $m^2/g$, at 5.33 angstrom is 859 $m^2/g$, and at 11.86 angstrom (up to 20 angstroms) is 185 $m^2/g$, a total of 1,502 $m^2/g$ for the pores of 20 angstroms or smaller, while the NLDFT surface area from the pores between 20 angstrom and 1000 angstrom is only 7.5 $m^2/g$, and the surface area from the pores of 20 angstroms or greater is only about 0.5% of the total surface area.

Figure 10B:
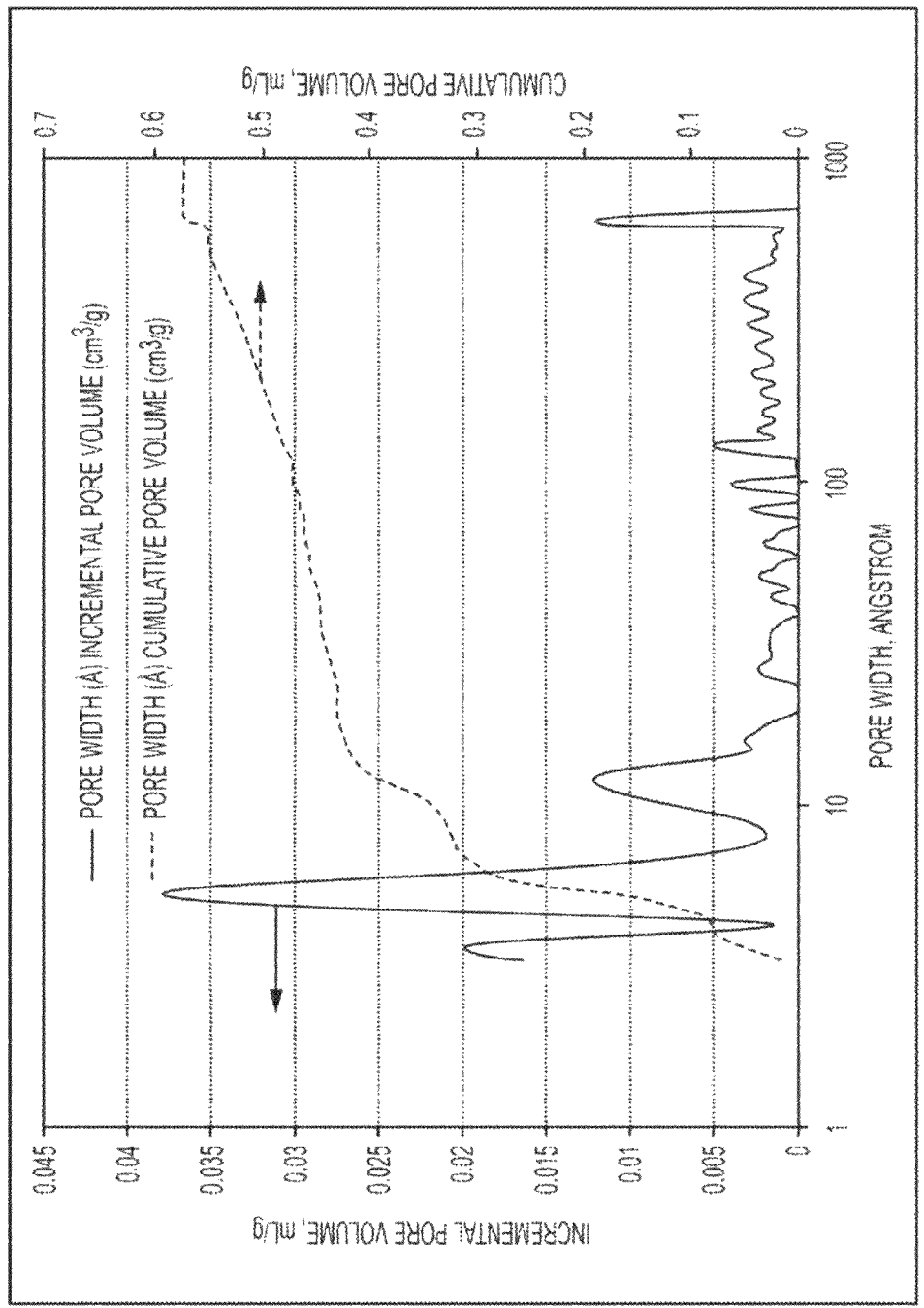
FIG. 10B is a graph of cumulative and incremental pour volumes for the carbon skeleton prepared by the process of Example 9.

The pore size distributions of the carbon skeleton sample were determined by nitrogen absorption and $CO_2$ absorption. The absorption results from nitrogen absorption and $CO_2$ absorption were combined to produce the pore-size-distribution shown in FIG. 10B. The relationship of Incremental Pore Volume (mL/g) vs. the pore width (angstrom) shows that there are three major peaks located at 3.66 angstroms, 5.33 angstroms, and 11.86 angstroms; the relationship of the Cumulative Pore Volume (mL/g) vs. pore width (angstrom) shows that there are about 0.080 mL/g pores under the peak of 3.66 angstroms, about 0.240 mL/g pores under the peak of 5.33 angstroms, about 0.108 mL/g pores under the peak of 11.86 angstroms, having 0.43 mL/g pores of 20 angstroms or smaller, 0.042 mL/g pores between 20 and 100 angstroms, and a total of 0.572 mL/g pores of up to 1000 angstroms.

Example 10

Preparation and Characterization of Immobilized Selenium

Include 0.1206 grams of selenium (showing bulk properties of selenium) into a set of agate mortar and pestle and include 0.1206 grams of the carbon skeleton that was prepared in accordance with Example 9 into the same agate mortar and pestle. Manually grind the mixture of selenium and carbon skeleton for about 30 minutes and transfer the ground mixture of selenium and carbon skeleton into a stainless steel die (10 mm in diameter). Press the mixture in the die to a pressure of about 10 MPa to form a pellet of the mixture. Then, load the pellet into a sealed container in the presence of an inert environment (argon) and place the sealed container containing the pellet into an oven. Heat the oven including the sealed container containing the pellet to 240° C. (above the melting temperature of selenium) for, example, 12 hours. Use, however, is envisioned of any combination of time and temperature, above the melting temperature of selenium, sufficient to cause the selenium and carbon to react, either partially or fully react, and form immobilized selenium having some or all of the features described in this application. Next, unload the pellet from the container after allowing the pellet to return to room temperature. The unloaded pellet is the immobilized selenium of this Example 10.

The immobilized selenium of this Example 10 was then characterized by TGA-DSC and TGA. TGA-DSC analysis results were collected for the immobilized selenium under a stream of 200 ml/min of argon gas at a heating rate of 10° C./min. There is no observable endothermic DSC peak at temperatures near the melting point of selenium (about 230° C.), indicating that the immobilized selenium of this Example 10 is different from the bulk-form of selenium molecules/atoms which should have a melting point at around 230° C. where there should be a endothermic peak.

An investigation revealed that the TGA-DSC data may not be reliable when the heating temperature reaches a point where selenium molecules start to escape from the TGA-DSC sample crucible (graphite or ceramics). To this end, gas phase selenium molecules (from the sample crucible) enter the argon carrier gas stream and appear to react with the TGA-DSC platinum sample holder, which distorts the actual TGA-DSC thermochemical behaviors. The released selenium molecules from sample crucible reacting with platinum sample holder, lead to a lower weight loss in this temperature region. The selenium-platinum composite in the platinum sample holder is then released into the gas phase when the heating temperature reaches a point that is beyond 800° C. A complete selenium release can occur at 1000° C. This investigation used up most of the immobilized selenium sample of this Example 10. Therefore, a new sample of the immobilized selenium (~16 grams) was prepared using the same process as was described in the earlier part of this Example 10.

Figure 11A:
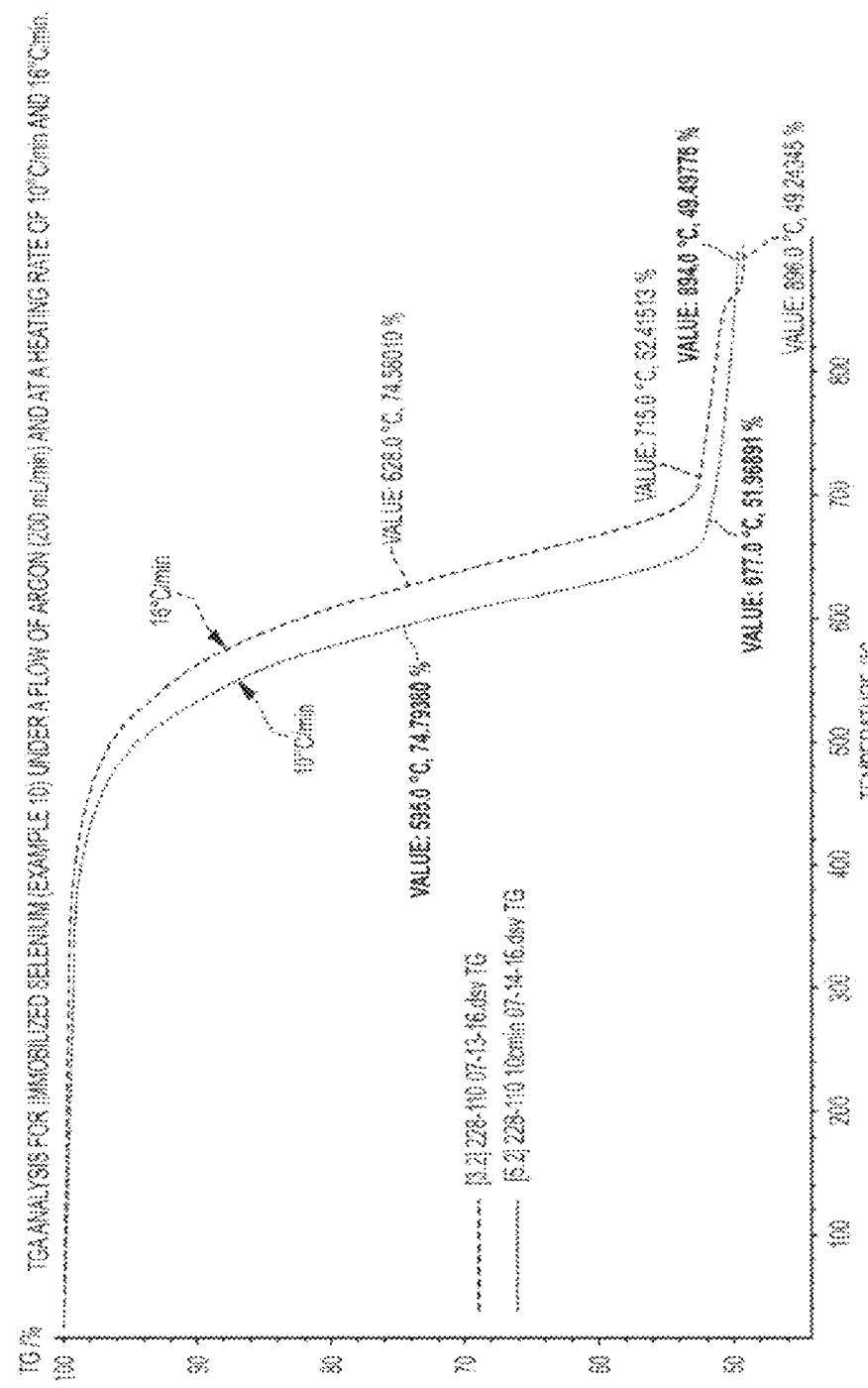
FIG. 11A is a graph of TGA analysis for the immobilized selenium that was prepared by the process of Example 10.
Figure 11B:
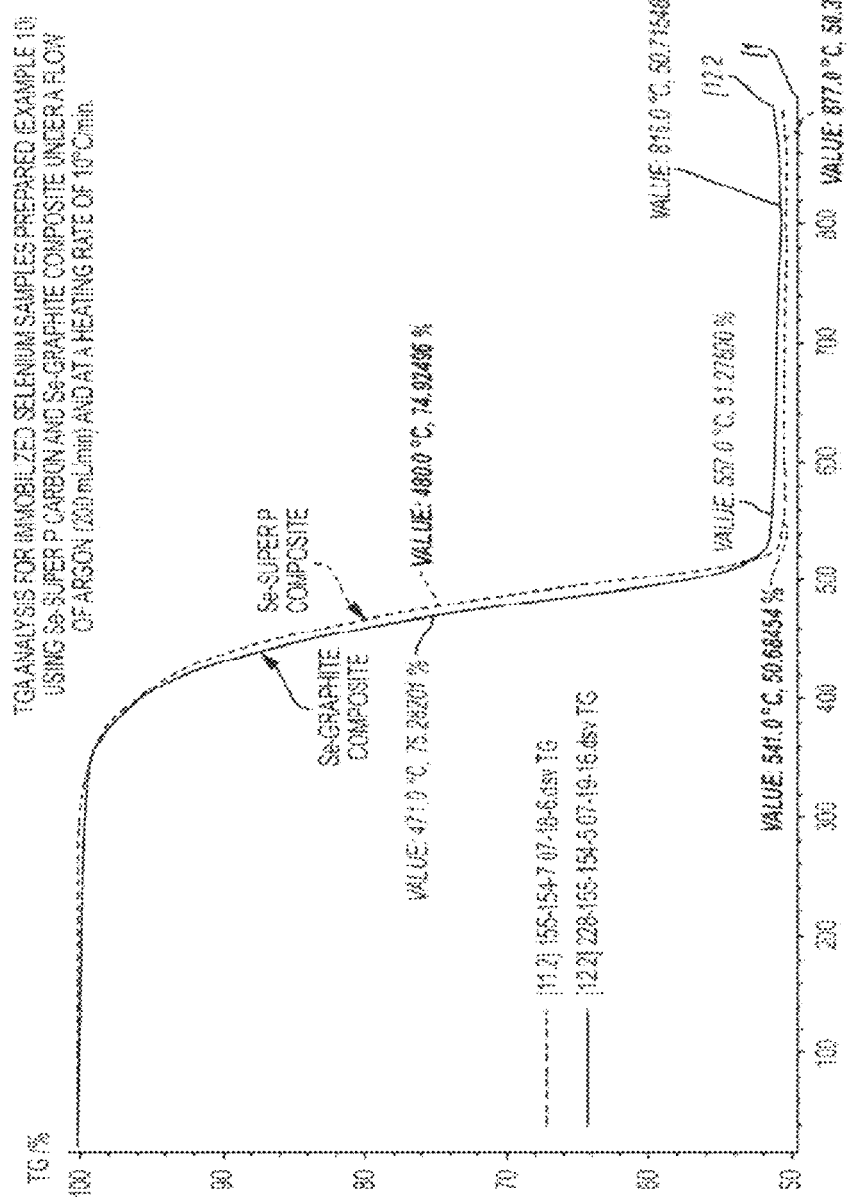
FIG. 11B is a graph of TGA analysis for non-immobilized selenium samples prepared by the process of Example 10 using Se-Super P carbon and Se-graphite.

The thermochemical behaviors of this new sample of immobilized selenium were studied by TGA analysis, which uses a ceramic sample holder that covers a very small thermocouple that is used for the TGA analysis. The TGA analysis results for this new immobilized selenium sample are shown in FIG. 11A along with the TGA analysis results (FIG. 11B) for selenium-carbon composites (made with 50-50 Se-Super P carbon composite, and Se-Graphite (ground graphite), in the same process as preparation of the immobilized selenium of this Example 10. Super P is a commercial grade carbon black widely used for lithium-ion battery industry. Ground graphite was prepared by grinding Poco 2020 graphite. The TGA analysis data are also summarized in the following Table 2.

Immobilized selenium can have an initial weight loss temperature starting at about 400° C. vs. 340° C. for Se-Super P carbon composite and the Se-Graphite carbon composite; a mid-point weight-loss temperature for immobilized selenium can be at about 595° C. vs. 480° C. for the Se-Super P composite and 471° C. for Se-Graphite composite; and main weight loss completed at about 544° C. for Se-Super P composite and Se-Graphite composite, and 660° C. for the immobilized selenium. The Se-Super P carbon composite and Se-Graphite carbon composite show less than 0.6% weight loss between 560° C. and 780° C., while immobilized selenium shows a weight loss of about 2.5% from the bottom of the main weight loss (~660° C. to 1000° C.). These results suggest that non-immobilized selenium (Se-Super P carbon composite and Se-Graphite composite) has ≤1.2% of the total selenium which can escape from the composite at a temperature of ≥560° C., while the immobilized selenium has about 5.0% of the total selenium which can escape from carbon skeleton at a temperature of ≥660° C. The following details are provided to give examples that provide insight to the thermochemical behaviors. However, these details are not to be construed in a limiting sense.

Using the data of TGA mid-weight-loss temperature as examples of thermochemical behaviors, as the heating temperature increases, the kinetic energy of the selenium molecules in Se-Super P composite and Se-Graphite composite increase to a level at which these selenium molecules have enough energy to overcome the intermolecular interactions among selenium molecules and escape from liquid phase of the selenium. Herein Kinetic Energy=3RT/2, wherein: R is gas constant and T is temperature in Kelvin.

It was observed that the average kinetic energy of selenium molecules for Se-Super P composite was measured to be 9,391 joules/mole when the selenium molecules escape from the mixture of Se-Super P composite. However, the immobilized selenium needs to gain more energy to have an average kinetic energy of about 10,825 joules/mole for selenium to leave the carbon skeleton to gas phase selenium molecules. It is believed that the selenium in immobilized selenium, either as an atomic form, as a molecular form, or as any form, may chemically interact with selenium and the carbon skeleton beyond intermolecular interactions of selenium. In addition, the last portion of selenium that escapes from the carbon skeleton between 660° C. to 1000° C. has an average kinetic energy in the range from 11,635 joules/mole to 15,876 joules/moles or more.

This suggests that selenium in the immobilized selenium is more stable than the selenium in conventional selenium-carbon composites. The stabilized selenium in the immobilized selenium of this Example 10 enhances the ability of selenium, either as atomic forms, as molecular forms, or in any forms, to stay inside the carbon skeleton during electrochemical processes, such as during charge and discharge cycling of a rechargeable battery comprised of the immobilized selenium. In an example, this last portion of selenium can require a kinetic energy of ≥11,635 joules/mole (≥660° C.) to escape the carbon skeleton and may be critical for selenium immobilization and may work as interfacial mate-

TABLE 2

| | | Immobilized Se in Example 10 | | | |
|---|---|---|---|---|---|
| | Se-Graphite Comp. Mid-Weight-Loss Temperature | Se-Super P Comp. | | Temp. at the bottom of the main wt. loss | End Temp. of TGA Expt. |
| Mid-Wt.-Loss Temp, ° C. | 471 | 480 | | 595 | 660 | 1000 |
| Mid-Wt.-Loss Temp, K | 744 | 753 | | 868 | 933 | 1273 |
| Kinetic Energy, Joule/Mole | 9,278 | 9,391 | | 10,825 | 11,635 | 15,876 | rial between carbon skeleton and the majority of the immobilized selenium molecules. The portion of interfacial selenium in the immobilized selenium may be ≥1.5%, ≥2.0%, ≥2.5%, or 3.0% of the total immobilized selenium.

Figure 11C:
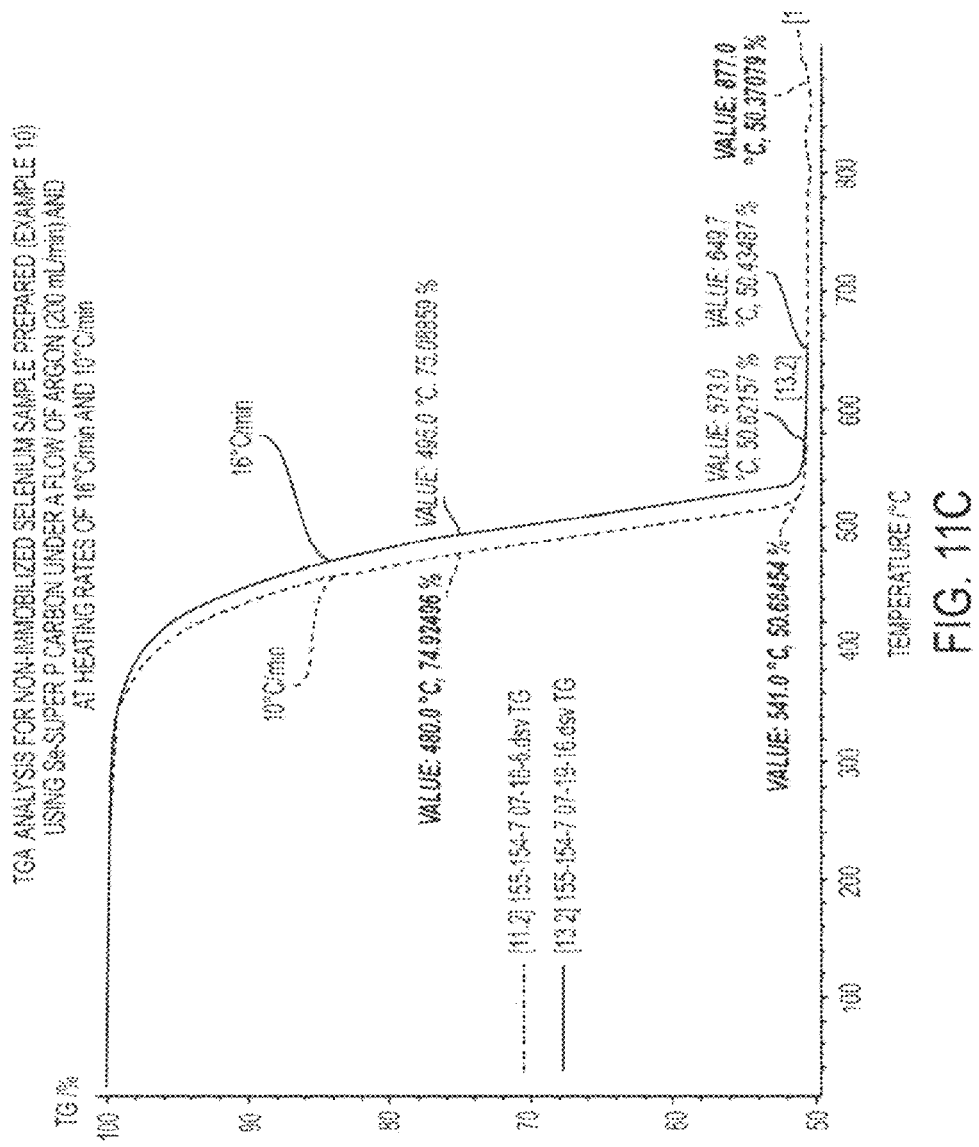
FIG. 11C is a graph of TGA analysis of the non-immobilized selenium sample prepared using the Se-Super P carbon (FIG. 11B) under a flow of argon gas and at heating rates of 16° C./min and 10° C./min.

FIG. 11A also shows the TGA studies of immobilized selenium with a heating rate of 16° C./min, having a temperature of 628° C. for the mid-point-weight-loss of the contained selenium. As shown in FIG. 11C, for Se-Super P composite, the temperature at the mid-weight-loss of the contained Se at a heating rate of 16° C./min is at 495° C. With different heating rates (e.g., 16° C./min, 10° C./min, 5° C./min, 2.5° C./min, and 1° C./min), activation energy and collision frequency may be determined and calculated using known methods, such as ASTM E1641-16 and E2958-14. The temperatures at 15% weight loss for different heating rates are tabulated as shown in the following Table 3.

TABLE 3

|  | Temperature (° C.) | | |
| --- | --- | --- | --- |
| β (° C./min) | Immobilized Se prepared by the process of Example 10 (228-110) | Immobilized Se prepared by the process of Example 10 (155-82-2) | Se-Super P Composite |
| 16 | 590.65 | 570.13 | 471.08 |
| 10 | 560.82 | 544.86 | 456.61 |
| 5 | 535.57 | 515.09 | 413.37 |
| 2.5 | 506.66 | 493.27 | 397.21 |
| 1 | 478.48 | 462.18 | 365.02 |
| Activation Energy, kJ/mole | 120.7 | 120.0 | 92.3 |
| Frequency of Collisions | $12.4 \times 10^5$ | $18.3 \times 10^5$ | $2.27 \times 10^5$ |

The activation energy for selenium (non-immobilized or conventional) in the Se-Super P composite was determined to be 92.3 kJ/mole with a frequency of collisions at $2.27 \times 10^5$. The activation energy for selenium in immobilized selenium (228-110 above) was also determined to be 120.7 kJ/mole with a frequency of collisions at $12.4 \times 10^5$. Another sample of immobilized selenium (155-82-2 above) that was prepared in the same procedures as Example 10 was also measured to have an activation energy of 120.0 kJ/mole and a frequency of collisions at $18.3 \times 10^5$.

The kinetic rate constant for selenium is calculated using the Arrhenius equation $$k = Ae^{-E_a/RT}$$

where k is the rate constant, $E_a$ is the activation energy, A is frequency of collisions, R is the gas constant, and T is the temperature in Kelvin.

Figure 11D:
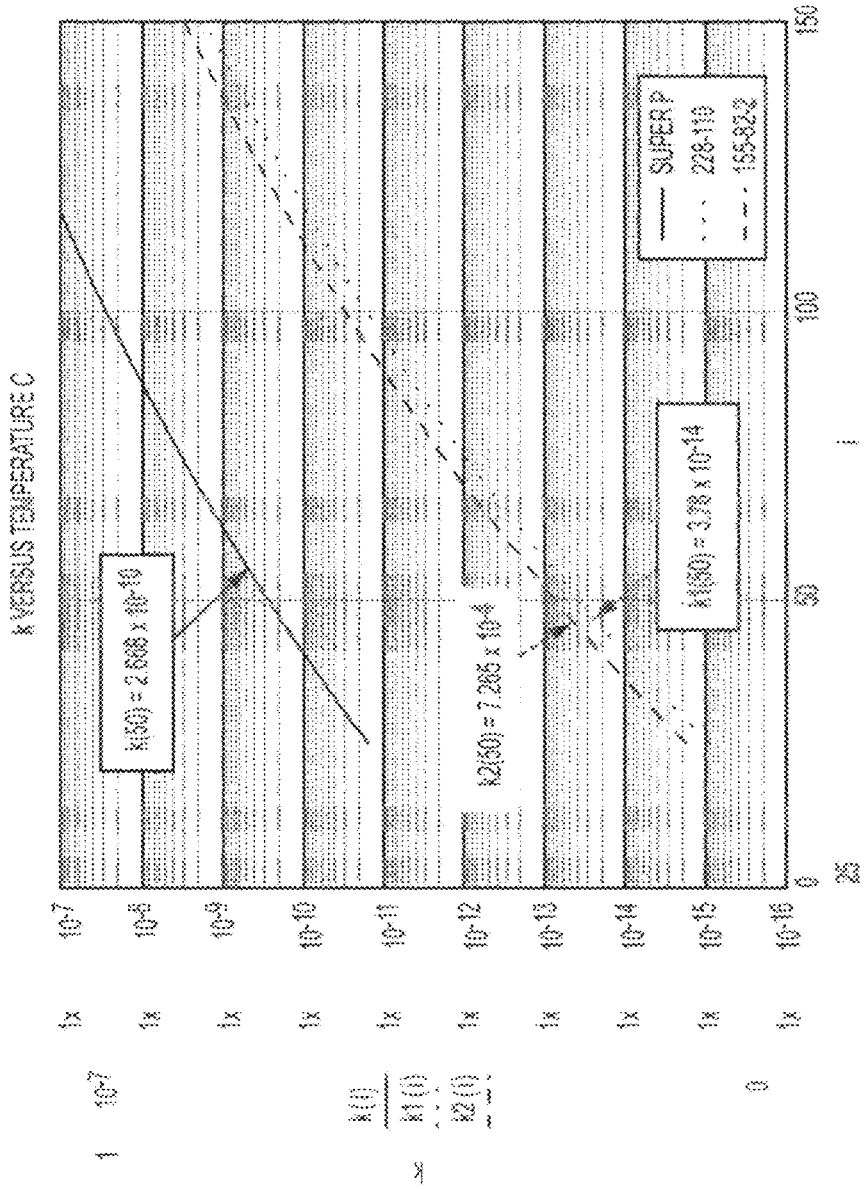
FIG. 11D is a graph of rate constants for non-immobilized selenium (Se-Super P composite-solid line), and 2 different samples of immobilized selenium (228-110 (dotted line) and 115-82-2 (dashed line)) prepared by the process of Example 10.

Referring to FIG. 11D, with above determined activation energy and collision frequency, the kinetic rate constant was calculated using the Arrhenius equation at different temperatures. FIG. 11D shows that non-immobilized selenium (Se-Super P composite-solid line) has much higher rate constant than that for immobilized selenium (228-110 (dotted line) and 115-82-2 (dashed line)), for example, about four orders of magnitude greater at 35° C. and about three orders of magnitude greater at 100° C. In an example, at 50° C., the rate constant for non-immobilized selenium (Super P) is $2.668 \times 10^{-10}$ while immobilized selenium has a rate constant at $7.26 \times 10^{-14}$ (155-82-2) and $3.78 \times 10^{-14}$ (228-110). Selenium that has a lower kinetic rate constant has less tendency to leave the host material (carbon), which may lead to better battery cycling performance.

Figure 12:
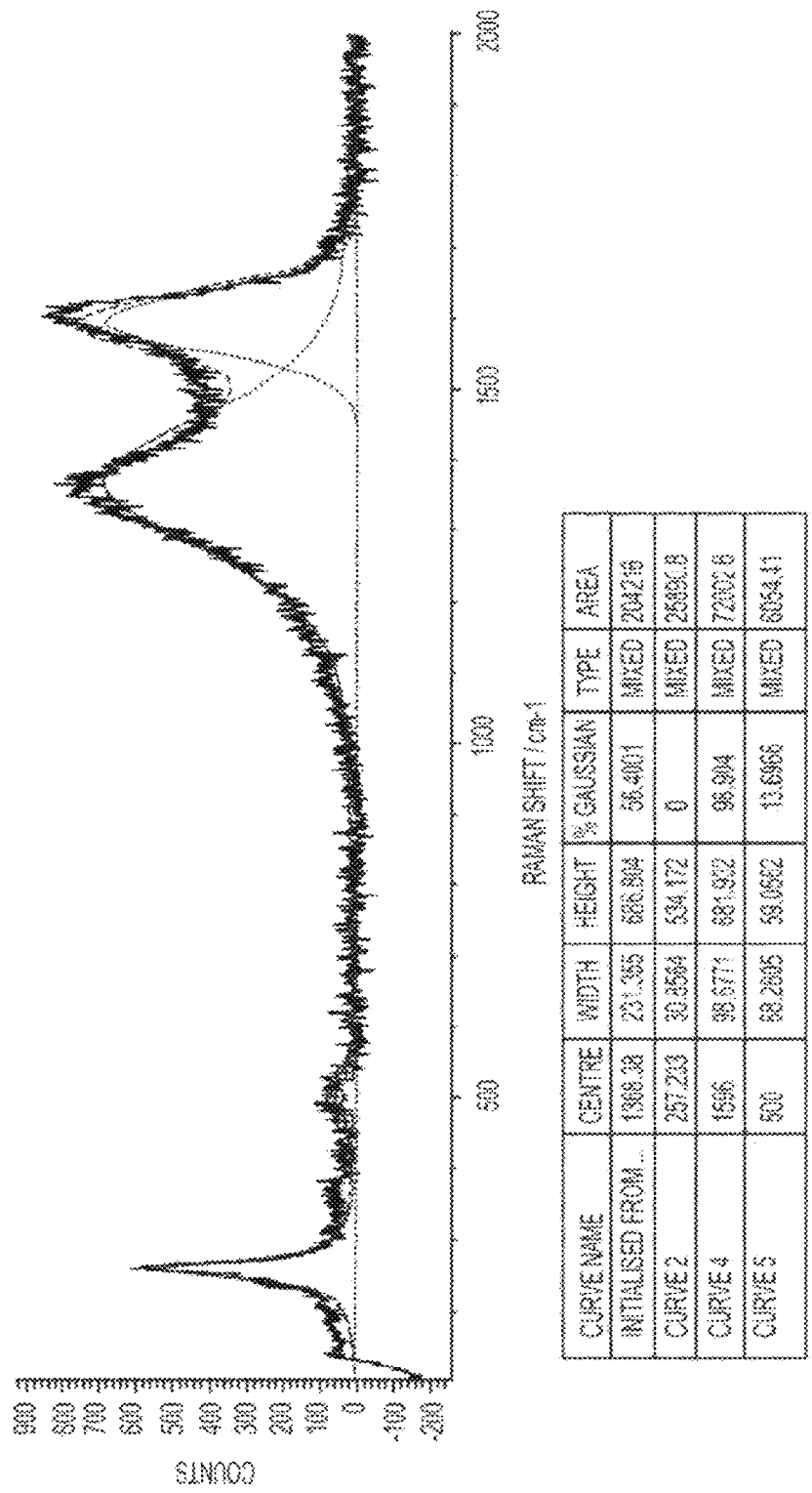
FIG. 12 is a graph of Raman spectrum of the immobilized selenium prepared by the process of Example 10.

FIG. 12 shows the spectrum of the immobilized selenium with Raman peaks of the D-band at 1368 cm$^{-1}$ and the G-band at 1596 cm$^{-1}$, having a ratio of the area for the D-band to the area for the G-band at 2.8. As compared to the Raman spectrum of the carbon skeleton shown in FIG. 9, selenium immobilization shifts both Raman peaks to a higher wavenumber, about 3 cm$^{-1}$ red shift for the D-band and 7 cm$^{-1}$ red shift for the G-band, which suggests that the bonding strength of Sp$^2$ carbon in the carbon skeleton is being strengthened, with a red shift of about 4 cm$^{-1}$ for the D-Band and a red shift of about 8 cm$^{-1}$ for the G-band. At the same time, the ratio of the area for the D-band to the area for the G-band was also decreased from about 3.4 to 2.8, suggesting that either the D-band gets relatively weaker or G-band gets relatively stronger.

A stronger G-band may be desirable since the G-band can relate to a type of carbon that allows the carbon skeleton to more readily conduct electrons, which can be desirable for electrochemical performances when used in a rechargeable battery. Bulk or pure selenium typically shows a sharp Raman shift peak at about 235 cm$^{-1}$. For immobilized selenium, the Raman spectrum in FIG. 12 shows a broad Raman peak at about 257 cm$^{-1}$ (~12.7% of the G-band in area) and a new broad hump at about 500 cm$^{-1}$ (about 3.0% of the G-band area). It is believed that selenium immobilization changes Raman characteristics for both carbon skeleton and selenium, with all Raman peaks shifted to a higher wavenumber, suggesting that both of carbon-carbon Sp$^2$ bonds for the carbon skeleton and selenium-selenium bonds of the selenium are under compression.

The compression resulting from selenium immobilization strengthens both carbon-carbon Sp$^2$ bonds for carbon skeleton and Se-Se bonds for selenium, creating stronger selenium-selenium and carbon-selenium interactions. Therefore, more kinetic energy would be needed for selenium to overcome the stronger Se-Se bonding and stronger carbon-selenium interactions, which explains the observations in TGA analysis of the immobilized selenium vs. Se-Super P composite and Se-Graphite composite.

Furthermore, under compression, the carbon skeleton would then have a better capability of conducting electrons at the bonding level; and under compression, selenium atoms or molecules would also have better capability of conducting electrons.

Stabilized selenium for the immobilized selenium along with enhanced electron conductivity across the carbon skeleton and selenium can be desirable in electrochemical processes, such as, for example, improved specific capacity for the active material with a minimum level of shuttling, improved cycling capability due to the immobilization, a capability of being charged and discharged at a higher rate, etc. However, this is not to be construed in a limiting sense.

Figure 13:
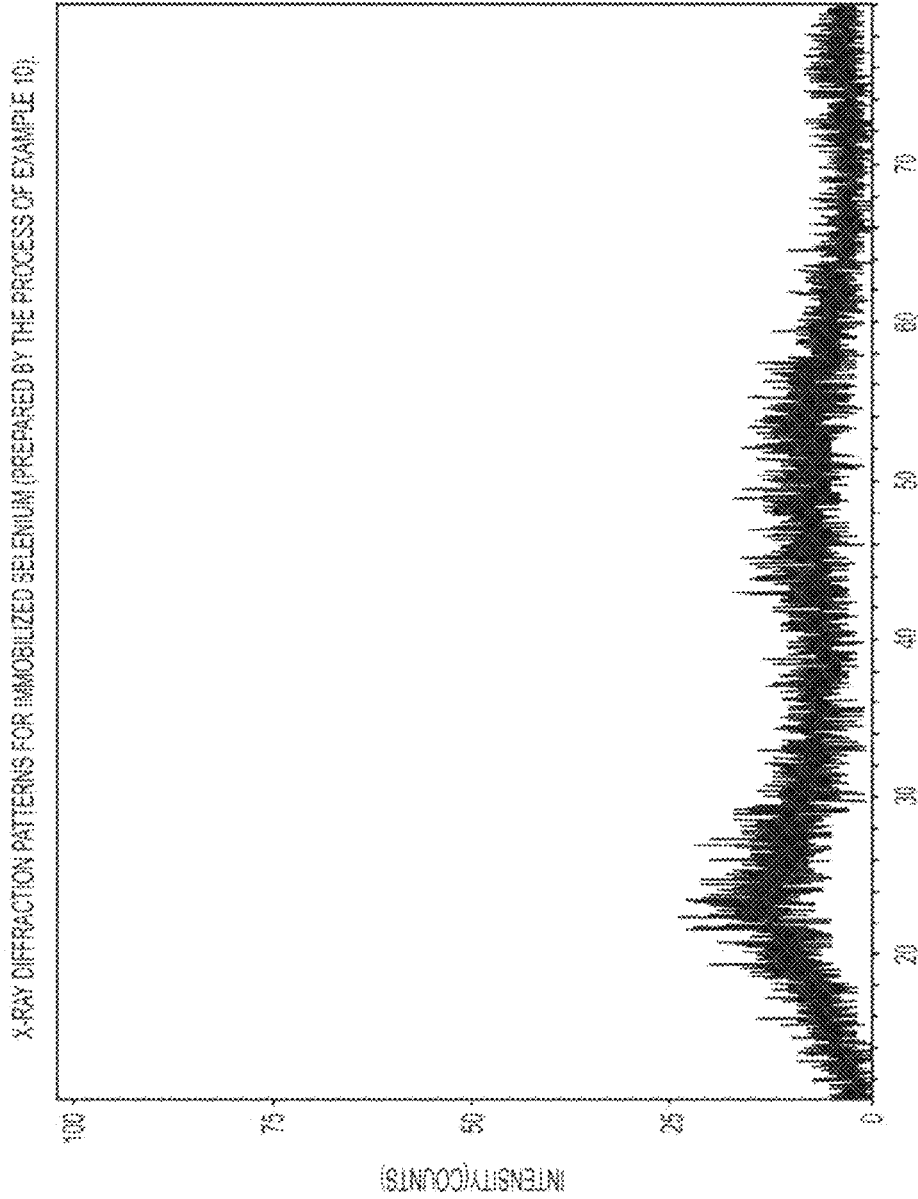
FIG. 13 is a graph of X-ray diffraction patterns for the immobilized selenium prepared by the process of Example 10.

X-ray diffraction patterns for the immobilized selenium prepared in accordance with Example 10, shown in FIG. 13, show a decrease in the intensity of the broad diffraction peak from the carbon skeleton with a d-spacing at about 5.21 angstroms—only about ⅓ the intensity, suggesting that immobilized selenium further makes the carbon skeleton more disordered, or causes more destruction to the order of the carbon skeleton. In an example, it is believed that this is because the compression forces are applied on the carbon-carbon $Sp^2$ bonds.

Figure 14:
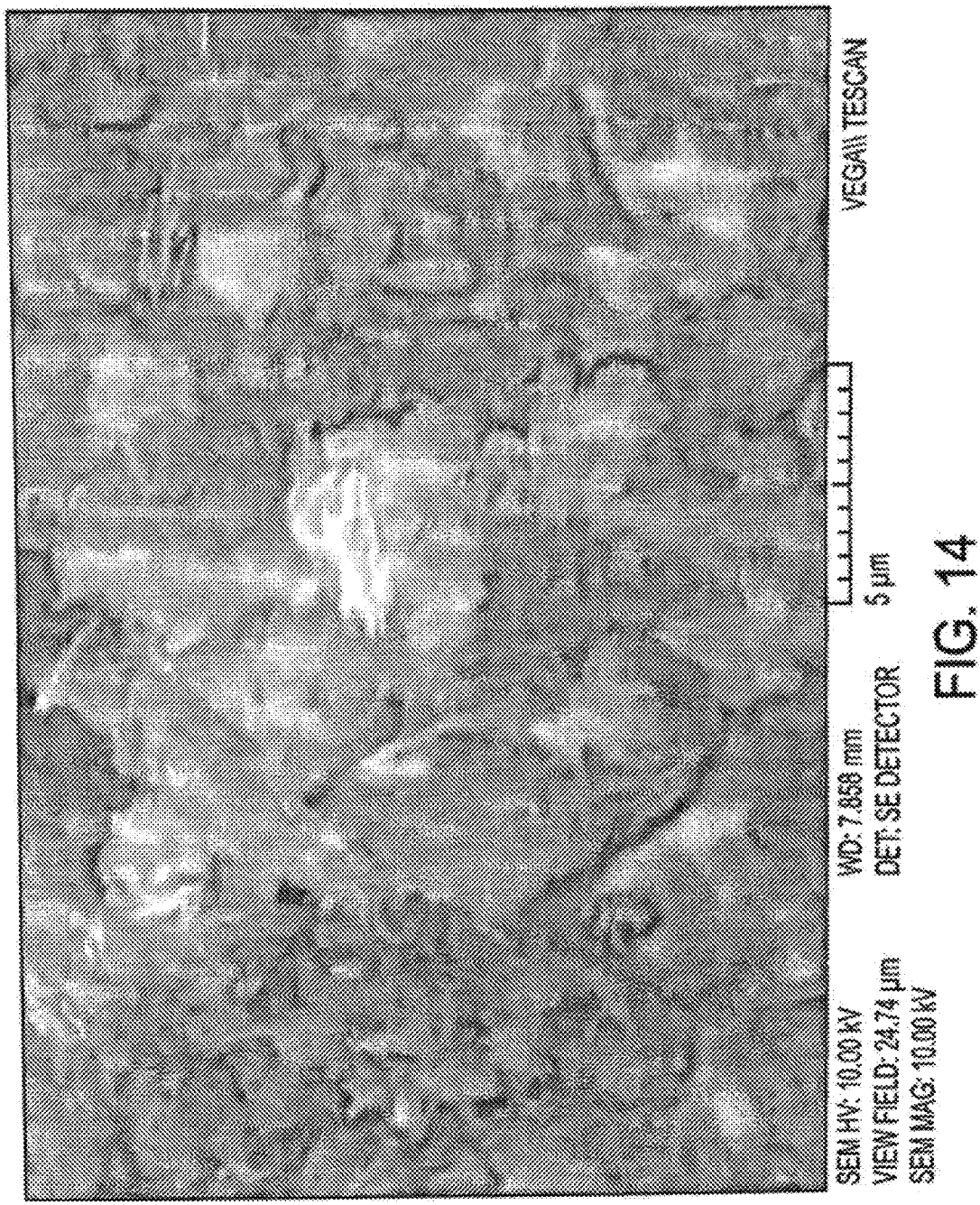
FIG. 14 is an SEM image of the immobilized selenium prepared by the process of Example 10.

FIG. 14 shows SEM image for the immobilized selenium that was prepared in accordance with Example 10, showing sheet-like morphologies, just like the image in FIG. 7 for carbon skeleton. Though there is about 50% selenium that was immobilized in the carbon skeleton, there is no observable selenium particles on the surfaces of the carbon skeleton, except that the inter-sheet connections have been destroyed, resulting in many flat sheets having high aspect ratios. These sheet-like morphologies can be highly desirable for forming oriented coating aligned along the flat-sheet directions, creating sheet surface to surface contacts, leading to improved inter-sheet electrical conductivity, which may result in superior electrical performance for electrochemical processes, such as in a rechargeable battery.

Example 11

Se Cathode Preparation

Into a mortar and pestle include 56 mg of the immobilized selenium that was prepared in accordance with Example 10; 7.04 mg of Super P; 182 μL of carboxymethyl cellulose (CMC) solution (which includes 1 mg of dry CMC for every 52 μL of CMC solution); 21.126 μL of SBR Latex dispersion (which contains 1 mg dry SBR Latex for every 6.036 μL SBR Latex dispersion); and 200 μL deionized water. Grind the particles, the binders, and water manually into a slurry for 30 minutes to produce a cathode slurry. The cathode slurry was then coated onto one-side of a piece of an electrically conductive substrate, e.g., a foil, and air-dried. In an example, the conductive substrate or foil can be an aluminum (Al) foil. However this is not to be construed in a limiting sense since use of any suitable and/or desirable electrically conductive material of any shape or form, is envisioned. For the purpose of description only, the use of Al foil to form a selenium cathode will be described herein. However this is not to be construed in a limiting sense.

The slurry coated Al foil was then placed into a drying oven and heated to a temperature of 55° C. for 12 hours, resulting in a selenium cathode comprised of a dried sheet of immobilized selenium on one side of the Al foil, with the other side of the Al foil being uncoated, i.e., bare aluminum.

The selenium cathode was then punched to cathode discs, each having a diameter of 10 mm Some of these cathode discs were used as cathodes for rechargeable batteries.

Example 12

Li—Se Rechargeable Battery Assembly and Testing

Figure 15:
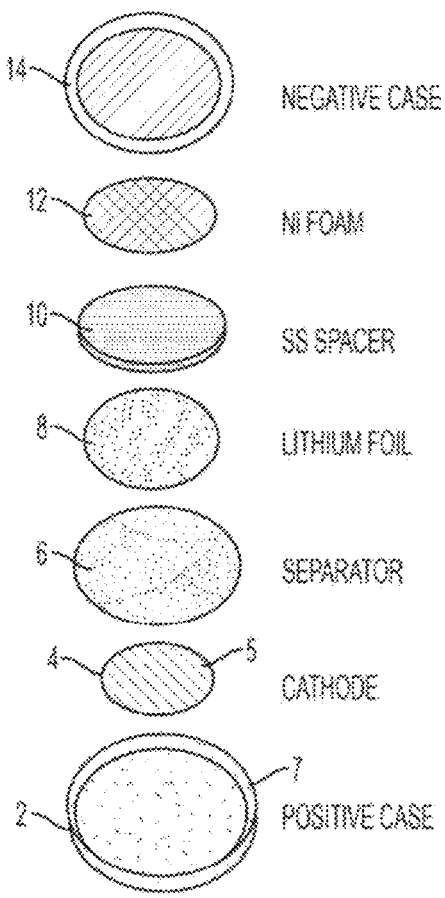
FIG. 15 is an exploded view of a coin cell battery including a cathode prepared according to the process of Example 11 or Example 13.

The cathode discs from Example 11 were used to assemble Li—Se rechargeable coil cell batteries in the manner described in the example discussed next and shown in FIG. 15. In this example, a 10 mm diameter cathode disc 4 from Example 11 was placed onto a base 2 of a 2032 stainless steel coin cell can which functions as the positive case of the coin cell (the "positive case" in FIG. 15) with the immobilized selenium sheet 5 facing upward, away from base 2 of the positive case and with the bare Al side facing and in-contact with the base 2 of the positive case. Next, a battery separator 6 (19 mm in diameter and 25 microns in thickness) was placed on top of the cathode disc 4 in contact with the immobilized selenium sheet 5. In an example, the battery separator 6 can be an organic separator, or an inorganic separator, or a solid electrolyte separator. The organic separator can be a polymer, for example, polyethylene, polypropylene, polyester, a halogenated polymer, a polyether, a polyketone, etc. The inorganic separator can be made from glass and/or quartz fiber.

Next, 240 μL of electrolyte 7 comprising $LiPF_6$ (1M) in ethylene carbonate (EC) and dimethyl carbonate (DMC) solvent (50-50 in weight) was introduced into the positive case 2 followed by placing a lithium foil disc 8 (15.6 mm in diameter and 250 microns in thickness) on a side of the separator 6 opposite the cathode disc 4. Next, a stainless steel (SS) spacer 10 was placed on a side of the lithium foil disc 8 opposite the separator 6 followed by placing one or more foam discs 12 made from, for example, nickel on a side of the SS spacer 10 opposite the lithium foil disc 8. The lithium foil 8, the SS spacer 10, and/or foam 12 disk can function as an anode. Finally, a case 14 made from 2032 stainless steel 14, to function as the negative of the coin cell (the "negative case" in FIG. 15), was placed on a side of the nickel foam disk(s) 12 opposite the SS spacer 10 and on the rim of the positive case 2. The positive case 2 and the negative case 14 were then sealed together under high pressure, e.g., 1,000 psi. The sealing of the positive and negative cases (2, 14) under high pressure also had the effect of compressing together the stack comprising (from bottom to top in FIG. 15) the cathode disc 4, separator 6, lithium foil 8, SS spacer 10, and Ni foam disc(s) 12. More than a dozen coin cell batteries were assembled using the battery separators described above and fiberglass separators. The assembled coil cell batteries were then tested under following conditions.

Some of the assembled coin cell batteries were tested under charge-discharge rates of 0.1 C and 1 C by using a Lanhe Battery Tester CT2001A. Each coin cell battery was tested: (1) rest for 1 hour; (2) discharge to 1V; (3) rest for 10 minutes; (4) charge to 3V; (5) rest for 10 minutes; repeat steps (2) to (5) for repeating cycling test.

Figure 16:
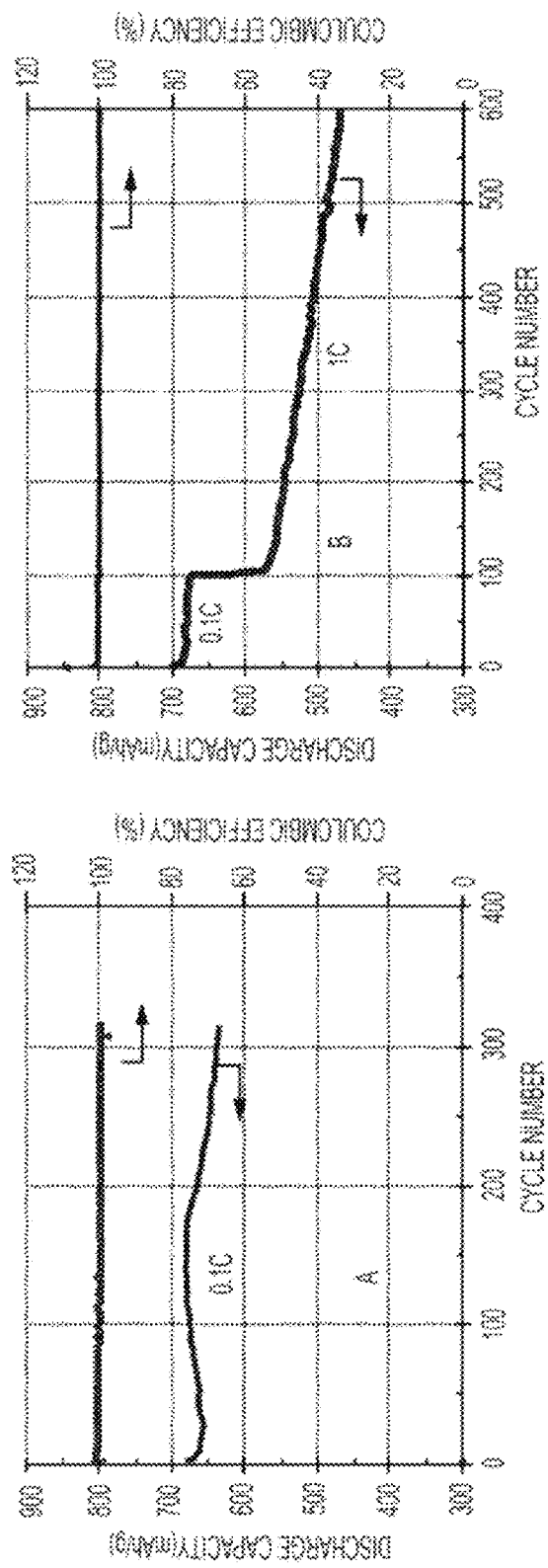
FIG. 16 are graphs of cycling test results for a first lithium-selenium coin cell battery (0.1 C) (left) and a second lithium-selenium coin cell battery (0.1 C and then 1 C) (right) of the type shown in FIG. 15 that were prepared by the process of Example 12.

The left graph of FIG. 16 shows the cycling test results (313 cycles at a charge-discharge rate of 0.1 C) for a coin cell made in accordance with Example 12 using the cathode prepared in accordance with Example 11, showing excellent cycling stability, having a specific capacity of 633.7 mAh/g after 313 cycles, which is a 93.4% retention of initial specific capacity. The first discharge specific capacity was higher than stoichiometric value, possibly due to some side reactions on the cathode and anode surfaces. From the second cycle on, the specific capacity decreased with cycling initially; however, the specific capacity increased slightly from about 30 cycles to about 120 cycles before staying stable to about 180 cycles and then decreasing. The right graph of FIG. 16 also shows excellent cycling stability (100 cycles at 0.1 C and then 500 cycles at 1 C) for another coin cell, having a specific capacity of 462.5 mAh/g at the $600^{th}$ cycle, which is a 66.0% retention of the $2^{nd}$ cycle capacity at 0.1 C or a 80.3% retention of the $105^{th}$ cycle capacity at 1 C. The Coulombic efficiency can be ≥95%, ≥98%, or as high as 100%, suggesting that there was no detectable amount of selenium being shuttled between cathode and anode. This electrochemical performance is believed to be the results of the immobilized selenium in the cathode, preventing selenium from being dissolved and shuttled from cathode 14 to anode 2.

Figure 17:
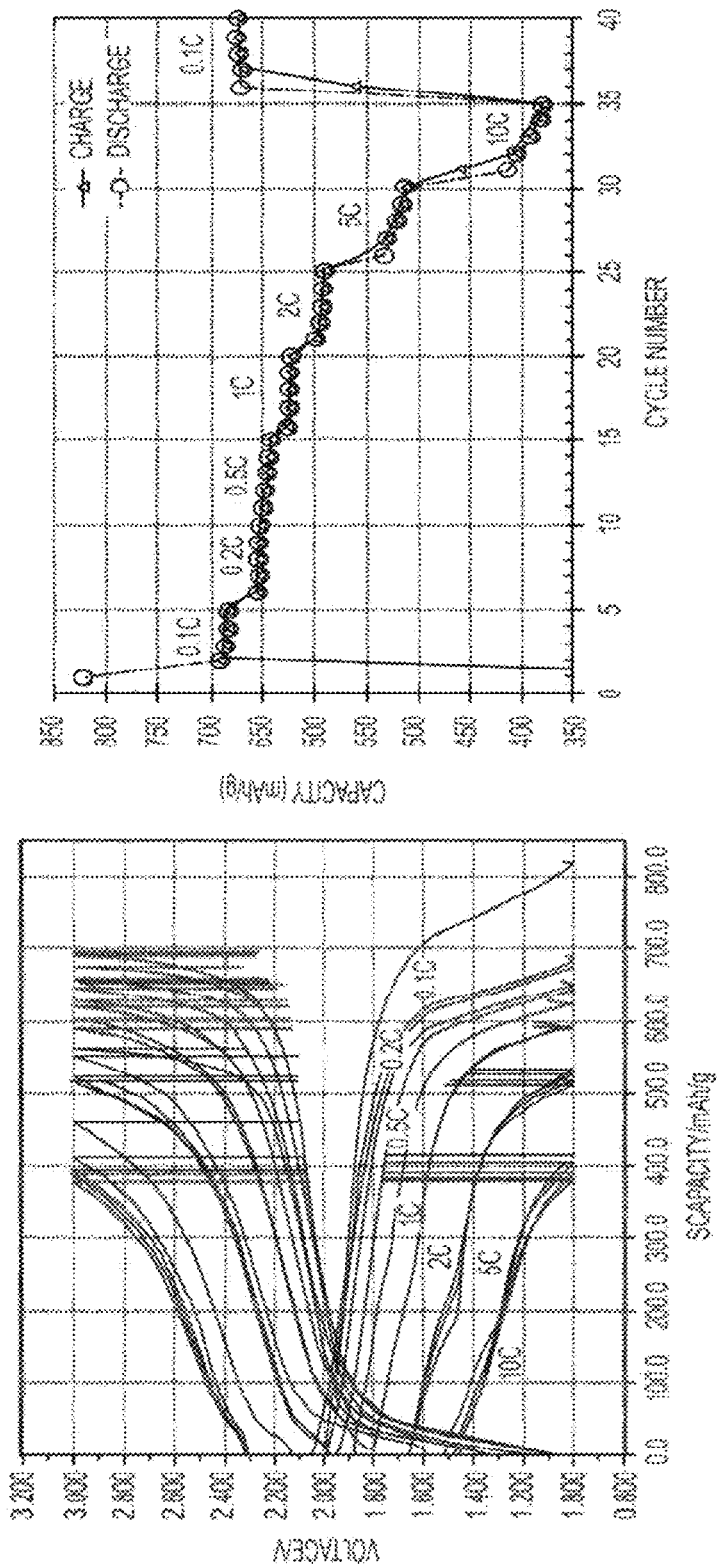
FIG. 17 are graphs of cycling tests for a lithium-selenium coin cell battery of the type shown in FIG. 15 that was prepared by the process of Example 12 at different cycling rates.

FIG. 17 shows cycling test results at different discharge-charge cycling rates (between 0.1 C and 10 C-rate) for coin cell that was assembled with a polymer separator described in Example 12. The testing protocols were similar to the tests described above except for the cycling rates (0.1 C, 0.2 C, 0.5 C, 1 C, 2 C, 5 C, and 10 C); five cycles of charge and discharge were performed for each C-Rate; then the cycling rate was returned to 0.1 C cycle. At the 0.1 C rate, the battery exhibited a specific capacity around stoichiometric value. In addition, the battery exhibited good stability in cycling for cycling rates of 0.2 C, 0.5 C, 1 C, and 2 C. The battery also exhibited fast charging and discharging capability, cycled 56% of stoichiometric capacity at 10 C-rate, though showing a declining specific capacity along cycling. In other words at the 10 C-rate the battery took 3.3 minutes to charge and discharge to/from a capacity of 56% of the stoichiometric value. Under such fast cycling rate, a conventional battery would not be expected to survive.

The Li—Se battery comprising immobilized selenium can recover its specific capacity to 670 mAh/g, 98% of its full capacity when cycled at 0.1 C-rate at the beginning of the test. It is believed that (1) the stabilization of selenium in the immobilized selenium cathode avoids selenium from leaving the carbon skeleton, avoiding the selenium from being shuttled between the cathode and anode during cycling, which enables the battery to have improved cycling performance; (2) both $Sp^2$ carbon-carbon bonds and carbon skeleton, selenium-selenium bonds, and carbon-selenium interactions may be under compression, possibly resulting in superior electrical conductivity within the carbon skeleton, within selenium particles, and among carbon and selenium interfaces, which may aid in achieving the observed cycling performance at high C-rates.

The immobilized selenium body comprising selenium and carbon prepared in accordance with the principles described herein can comprise one or more of the following features:
(a) a kinetic energy required for a selenium particle to escape the immobilized selenium can be ≥9.5 kJ/mole, ≥9.7 kJ/mole, ≥9.9 kJ/mole, ≥10.1 kJ/mole, ≥10.3 kJ/mole, or ≥10.5 kJ/mole;
(b) a temperature required for a selenium particle to escape the immobilized selenium can be can be ≥490° C., ≥500° C., ≥510° C., ≥520° C., ≥530° C., ≥540° C., ≥550° C., or ≥560° C.;
(c) the carbon can have a surface area (for pores less than 20 angstroms) ≥500 $m^2/g$, ≥600 $m^2/g$, ≥700 $m^2/g$, ≥800 $m^2/g$, ≥900 $m^2/g$, or ≥1,000 $m^2/g$;
(d) the carbon can have a surface area (for pores between 20 angstroms and 1000 angstroms) ≤20%, ≤15%, ≤10%, ≤5%, ≤3%, ≤2%, ≤1% of the total surface area;
(e) the carbon and/or selenium can be under compression. Benefits of the immobilized selenium where the carbon and/or selenium are under compression versus a carbon-selenium system where the carbon and/or selenium are not under compression can include: improved electron flow, reduced resistance to electron flow, or both, which can facilitate electron delivery to the selenium and from selenium anions during charging and discharging of a rechargeable battery that has a cathode comprised of the immobilized selenium;
(f) the immobilized selenium can comprise selenium that has an activation energy higher than the activation energy higher for conventional (non-immobilized) selenium in order for the selenium to escape from the immobilized Se—C composite system. In an example, the activation energy for non-immobilized selenium (Se-Super P composite system) was determined to be 92 kJ/mole, according to ASTM Method E1641-16. In contrast, in an example, the activation energy for selenium in the immobilized selenium comprising selenium and carbon can be ≥95 kJ/mole, ≥98 kJ/mole, ≥101 kJ/mole, ≥104 kJ/mole, ≥107 kJ/mole, or ≥110 kJ/mole. In another example, the activation energy for selenium in the immobilized selenium comprising selenium and carbon can be ≥3%, ≥6%, ≥9%, ≥12%, ≥15%, or ≥18% greater than that for selenium in Se-Super P composite;
(g) the immobilized selenium can comprise selenium that has higher collision frequency than non-immobilized selenium. In an example, the collision frequency for non-immobilized selenium was determined to be 2.27× $10^5$, according to the ATSM Method E1641-16. In contrast, in an example, the collision frequency for selenium in immobilized selenium, comprising selenium and carbon, can be is ≥2.5×$10^5$, ≥3.0×$10^5$, ≥3.5×$10^5$, ≥4.0×$10^5$, ≥4.5×$10^5$, ≥5.0×$10^5$, ≥5.5×$10^5$, ≥6.0×$10^5$, or ≥8.0×$10^5$. The immobilized selenium can have a collision frequency ≥10%, ≥30%, ≥50%, ≥80%, ≥100%, ≥130%, ≥150%, ≥180%, or ≥200% than for non-immobilized selenium in an Se—C composite; and
(h) the immobilized selenium can comprise selenium that has a kinetic rate constant that is ≤1/5, ≤1/10, ≤1/50, ≤1/100, ≤1/500, or ≤1/1000 of the kinetic rate constant for non-immobilized/conventional selenium. In an example, the immobilized selenium can comprise selenium that has a kinetic rate constant (at 50° C.) of ≤1×$10^{-10}$, ≤5×$10^{-11}$, ≤1×$10^{-11}$, ≤5×$10^{-12}$, or ≤5×$10^{-13}$.

With the carbon and/or selenium of the immobilized selenium under compression, the D-band and/or the G-band of Raman spectrum for the $Sp^2$ C—C bonds of the carbon (or carbon skeleton defined by said carbon) of the immobilized selenium can show a red (positive) shift, e.g., by ≥1 $cm^{-1}$, ≥2 $cm^{-1}$, ≥3 $cm^{-1}$, ≥4 $cm^{-1}$, or ≥5 $cm^{-1}$ from a carbon feedstock.

With the carbon and/or selenium of the immobilized selenium under compression, the selenium can have a red (positive) shift from the Raman peak of pure selenium (235 $cm^{-1}$), e.g., by ≥4 $cm^{-1}$, ≥6 $cm^{-1}$, ≥8 $cm^{-1}$, ≥10 $cm^{-1}$, ≥12 $cm^{-1}$, ≥14 $cm^{-1}$, or ≥16 $cm^{-1}$, which red shift can suggest compression on the selenium particles.

The immobilized selenium can be an elemental form of selenium and/or a compound form selenium.

The immobilized selenium comprising selenium and carbon can be also doped with one or more additional element(s) from Group 6 of the Periodic Table (hereinafter, "additional G6 element(s)"), including, for example, without limitation, sulfur and/or tellurium. The dopant level may range from as low as 100 ppm by weight to as high as 85% of the total weight of the immobilized selenium. In an example, the immobilized selenium can comprise 15%-70% carbon and 30%-85% selenium and, optionally, additional G6 element(s). In an example, the immobilized selenium can comprise (1) 15%-70% carbon and (2) 30%-85% selenium+ additional G6 element(s) mixture. In the mixture comprising selenium+additional G6 element(s), the additional G6 element(s) can comprise between 0.1%-99% of the mixture and selenium can comprise between 1%-99.9% of the mixture. However, these ranges of selenium+additional G6 element(s) are not to be construed in a limiting sense.

The immobilized selenium can include ≥5% selenium, ≥10% selenium, ≥20% selenium, ≥30%, ≥40% selenium, ≥50% selenium, ≥60% selenium, or ≥70% or higher selenium.

The immobilized selenium can optionally include another element, such as, for example, sulfur, tellurium, etc.

The immobilized selenium can be Raman-inactive or Raman-active. If Raman-active, the immobilized selenium can have a Raman relative peak intensity at $255\pm25$ cm$^{-1}$, at $255\pm15$ cm$^{-1}$, or at $255\pm10$ cm$^{-1}$.

The immobilized selenium can comprise selenium having a Raman relative peak intensity of $\geq0.1\%$, $\geq0.5\%$, $\geq1\%$, $\geq3\%$, or $\geq5\%$, herein, the Raman relative peak intensity is defined as the area of the Raman peak at 255 cm$^{-1}$ relative to the area of the D-band peak of the carbon Raman spectrum.

The carbon comprising the immobilized selenium can serve as a carbon skeleton for selenium immobilization. The carbon skeleton can have Sp$^2$-carbon-carbon bonds with a Raman D-band located at $1365\pm100$ cm$^{-1}$ and G-band located at $1589\pm100$ cm$^{-1}$; a D-band located at $1365\pm70$ cm$^{-1}$ and a G-band located at $1589\pm70$ cm$^{-1}$; a D-band located at $1365\pm50$ cm$^{-1}$ and a G-band located at $1589\pm50$ cm$^{-1}$; a D-band located at $1365\pm30$ cm$^{-1}$ and a G-band located at $1589\pm30$ cm$^{-1}$; or a D-band located at $1365\pm20$ cm$^{-1}$ and a G-band located at $1589\pm20$ cm$^{-1}$.

The carbon of the immobilized selenium can include Sp$^2$ carbon-carbon bonds, having Raman peaks featuring a D-band and a G-band. A ratio of the area of D-band to G-band can range from 0.01 to 100, from 0.1 to 50, or from 0.2 and 20.

The carbon of the immobilized selenium can include Sp$^2$ carbon-carbon bonds, having Raman peaks featuring a D-band and a G-band. Each of the D-band and the G-band can have a shift to a higher wavenumber $\geq1$ cm$^{-1}$, $\geq2$ cm$^{-1}$, or more.

The carbon of the immobilized selenium can be doped with one or more other elements in the period table.

The carbon of the immobilized selenium can be porous. The pore size distributions of the carbon skeleton can range between one angstrom to a few microns. The pore size distribution can have at least one peak located between one angstrom and 1000 angstroms, between one angstrom and 100 angstroms, between one angstrom and 50 angstroms, between one angstrom and 30 angstroms, or between one angstrom and 20 angstroms. The porosity of the carbon skeleton can have pore size distributions with more than one peak in the foregoing ranges.

The carbon of the immobilized selenium can include a pore volume between 0.01 mL/g and 5 mL/g; between 0.01 mL/g and 3 mL/g; between 0.03 mL/g and 2.5 mL/g; or between 0.05 mL/g and 2.0 mL/g.

The carbon of the immobilized selenium can include a pore volume (that has pore size<100 angstroms, <50 angstroms, <30 angstroms, or <20 angstroms) that can be >30%, >40%, >50%, >60%, >70%, or >80% of the total measurable pore volume.

The carbon of the immobilized selenium can include a surface area >400 m$^2$/g, >500 m$^2$/g, >600 m$^2$/g, >700 m$^2$/g, >800 m$^2$/g, >900 m$^2$/g, or >1000 m$^2$/g.

The carbon of the immobilized selenium can be amorphous and can have a broad peak centered at a d-spacing around 5.2 angstroms.

The carbon of the immobilized selenium can be of any morphology, platelet, sphere, fiber, needle, tubular, irregular, interconnected, agglomerated, discrete, or any solid particles. Platelet, fiber, needle, tubular, or some morphology having a certain level of aspect ratio may be beneficial for achieving better inter-particle contact, resulting in enhanced electrical conductivity (over immobilized selenium made from a different aspect ratio), which may be beneficial to an electrochemical cell, such as a rechargeable battery.

The carbon of the immobilized selenium can be of any particle size, having a median particle size between 1-9 nanometers and 2 millimeters, between 1-9 nanometers to <1000 microns, or between 20 nanometers to 100 microns.

The selenium of the immobilized selenium can be amorphous, e.g., as determined by X-ray diffraction. The diffraction peak of the selenium of the immobilized selenium, which can have a d-spacing about 5.2 angstroms may be weaker than the diffraction peak that for the carbon skeleton, e.g., 10% weaker, 20% weaker, 30% weaker, or 40% weaker.

In an example, a method of preparing the immobilized selenium can include:
 (a) physical mixing carbon and selenium. The physical mixing can be by ball-milling (dry and wet), mixing with mortar and pestle (dry or wet), jet-milling, horizontal milling, attrition milling, high shear mixing in slurries, regular slurry mixing with blade, etc.;
 (b) the physically mixed carbon and selenium of step (a) can be heated at the melting temperature of selenium or higher. The heating of the carbon and selenium mixture can occur in the presence of an inert gas environment such as, but not limited to, argon, helium, nitrogen, etc., or in an air or reactive environment;
 (c) optionally homogenizing or blending the heated carbon and selenium to achieve selenium immobilization; and
 (d) cooling the immobilized selenium of step (c) to ambient or room temperature.

In another example, immobilized selenium can be prepared by dissolving selenium onto carbon followed by evaporation. The solvent for dissolving the selenium can be an alcohol, an ether, an ester, a ketone, a hydrocarbon, a halogenated hydrocarbon, a nitrogen-containing compound, a phosphorus containing compound, a sulfur-containing compound, water, etc.

In another example, the immobilized selenium can be prepared by melting selenium onto carbon, followed by removing extra or excess non-immobilized selenium.

In an example, a method of making the immobilized selenium can include:
 (a) mixing selenium and carbon together under dry or wet conditions;
 (b) optional drying the mixture of step (a) at an elevated temperature;
 (c) optional pelletizing the dried mixture of step (b);
 (d) melting the selenium into the carbon to produce the immobilized selenium.

Immobilized selenium can be used as a cathode material for a rechargeable battery. The cathode can include an inorganic or an organic binder. The inorganic binder can be a natural product, such as, for example, CMC, or a synthetic product, such as, for example, SBR Rubber latex. The cathode can include an optional electric-conductivity promoter, such as, for example, graphite-derived small particles, graphene, carbon nano-tubes, carbon nano-sheet, carbon blacks, etc. Finally, the cathode can include a charge collector such as, for example, an aluminum foil, a copper foil, a carbon foil, a carbon fabric, or other metallic foil.

The method of making the cathode can include coating an immobilized selenium-containing slurry onto the charge collector, followed drying the slurry coated charge collector (e.g., air dry, oven-dry, vacuum oven-dry, etc.). The immobilized selenium can be dispersed into the slurry, which can be prepared by a high shear mixer, a regular mixer, a planetary mixer, a double-planetary mixer, a ball mill, a vertical attritor, a horizontal mill, etc. The slurry can then be coated onto the charge collector, followed by drying in air or in vacuum. The coated cathode can then be pressed or roller-milled (or calendared) prior to its use in a rechargeable battery.

A rechargeable battery can be made using the immobilized selenium described herein. The rechargeable battery can include a cathode comprising the immobilized selenium, an anode, and a separator separating the anode and the cathode. The anode, the cathode, and the separator can be immersed in an electrolyte, such as, for example, $LiPF_6$. The anode can be comprised of lithium, sodium, silicon, graphite, magnesium, tin, etc.

The separator can be comprised of an organic separator, an inorganic separator, or a solid electrolyte separator. The organic separator can comprise a polymer such as, for example, polyethylene, polypropylene, polyester, a halogenated polymer, a polyether, a polyketone, etc. The inorganic separator can comprise a glass or quartz fiber, or a solid electrolyte separator.

The electrolyte can comprise a lithium salt, a sodium salt, or other salt from Group IA, IIA, and IIIA, in an organic solvent. The organic solvent can comprise an organic carbonate compound, an ether, an alcohol, an ester, a hydrocarbon, a halogenated hydrocarbon, a lithium containing-solvent, etc.

The rechargeable battery can be used for electronics, an electric or hybrid vehicle, an industrial application, a military application, such as a drone, an aerospace application, a marine application, etc.

The rechargeable battery can have an electrochemical capacity of ≥400 mAh/g active amount of selenium, ≥450 mAh/g active amount of selenium, ≥500 mAh/g active amount of selenium, ≥550 mAh/g active amount of selenium, or ≥600 mAh/g active amount of selenium.

The rechargeable battery can undergo electrochemical cycling for ≥50 cycles, ≥75 cycles, ≥100 cycles, ≥200 cycles, etc.

The rechargeable battery can be charged and/or discharged at 0.1 C, 0.2 C, 0.5 C, 1 C, 1.5 C, 2 C, 3 C, 4 C, 5 C, 6 C, 7 C, 8 C, 9 C, 10 C or faster.

The rechargeable battery can retain a battery specific capacity >30%, >40%, >50%, >60%, >70%, or >80% of the $2^{nd}$ discharge specific capacity at a cycling rate of 0.1 C after conducting high C-Rate charge-discharge cycling (5 cycles at 0.1 C, 5 cycles at 0.2 C, 5 cycles at 0.5 C, 5 cycles at 1 C, 5 cycles at 2 C, 5 cycles at 5 C, and 5 cycles at 10 C).

The rechargeable battery can have a Coulombic efficiency ≥50%, ≥60%, ≥70%, ≥80%, ≥90%, or as high as around 100%.

Coloumbic efficiency of a battery is defined as follows:

$$\eta_c = \frac{Q_{out}}{Q_{in}}$$

Where $\eta_c$ is the Coloumbic efficiency (%)
$Q_{out}$ is the amount of charge that exits the battery during a discharge cycle.
$Q_{in}$ is the amount of charge that enters the battery during a charging cycle.

The rechargeable battery can be charged at C-rate of 0.1 C, 0.2 C, 0.5 C, 1 C, 1.5 C, 2 C, 3 C, 4 C, 5 C, 6 C, 7 C, 8 C, 9 C, 10 C or faster. A C-rate is a measure of the rate at which a battery is discharged relative to its maximum capacity. For example, a 1 C rate means that the discharge current will discharge the entire battery in 1 hour. For example, for a battery with a capacity of 100 Amp-hrs, this equates to a discharge current of 100 Amps A 5 C rate for this same battery would be 500 Amps, and a 0.5 C rate would be 50 Amps.

The cathode of the rechargeable battery can comprise one or more elements of a chalcogen group such as selenium, sulfur, tellurium, and oxygen.

The anode of the rechargeable battery can comprise at least one element of alkali metal, alkali earth metals, and group IIIA metals.

The separator of the rechargeable battery can comprise an organic separator or an inorganic separator.

The electrolyte of the rechargeable battery can comprise at least one element of alkali metals, alkali earth metals, and Group IIIA metals; and a solvent of the electrolyte can comprise an organic solvent, carbonate-based, ether-based, or ester-based.

The rechargeable battery can have a specific capacity of ≥400 mAh/g, ≥450 mAh/g, ≥500 mAh/g, ≥550 mAh/g, or ≥600 mAh/g.

The rechargeable battery can undergo electrochemical cycling for ≥50 cycles, ≥75 cycles, ≥100 cycles, ≥200 cycles, etc.

The rechargeable battery can have a specific capacity >30%, >40%, >50%, >60%, >70%, or >80% of the $2^{nd}$ discharge specific capacity at a cycling rate of 0.1 C after conducting high C-Rate charge-discharge cycling (5 cycles at 0.1 C, 5 cycles at 0.2 C, 5 cycles at 0.5 C, 5 cycles at 1 C, 5 cycles at 2 C, 5 cycles at 5 C, and 5 cycles at 10 C).

The rechargeable battery can have has a Coulombic efficiency ≥50%, ≥60%, ≥70%, ≥80%, or ≥90%.

Also disclosed is a composite comprising selenium and carbon, said composite can have a platelet morphology with an aspect ratio of ≥1, ≥2, ≥5, ≥10, or ≥20.

The selenium of the composite can be amorphous, e.g., as determined by X-ray diffraction. The diffraction peak of the selenium can have a d-spacing about 5.2 angstroms which may be weaker than that for a carbon skeleton, e.g., 10% weaker, 20% weaker, 30% weaker, or 40% weaker than the carbon skeleton.

In an example, the method of preparing the composite can include:
(a) physical mixing carbon and selenium. The physical mixing can be by ball-milling (dry and wet), mixing with mortar and pestle (dry or wet), jet-milling, horizontal milling, attrition milling, high shear mixing in slurries, regular slurry mixing with blade, etc.;
(b) the physically mixed carbon and selenium of step (a) can be heated to the melting temperature of selenium or higher and said heating can occur in the presence of an inert gas environment such as, for example, argon, helium, nitrogen, etc., or in an air or reactive environment; and
(c) the heated carbon and selenium of step (b) can be homogenized or blended as an aid to achieving selenium immobilization.

In another example, the composite can be prepared by dissolving selenium onto carbon followed by evaporation. The solvent for dissolving the selenium can include an alcohol, an ether, an ester, a ketone, a hydrocarbon, a halogenated hydrocarbon, a nitrogen-containing compound, a phosphorus containing compound, a sulfur-containing compound, water, etc.

The composite can be prepared by melting selenium onto (or into) carbon, followed by removing extra or excess non-immobilized selenium.

In an example, a method of making the composite can include:
(a) mixing selenium and carbon together under dry or wet conditions;
(b) optional drying the mixture of step (a) at an elevated temperature;
(c) optional pelletizing the dried mixture of step (b);
(d) melting the selenium into the carbon to produce the immobilized selenium.

The composite can be used as a cathode material for a cathode of a rechargeable battery. The cathode can include an inorganic or an organic binder. The inorganic binder can be a natural product, such as, for example, CMC, or a synthetic product, such as, for example, SBR Rubber latex. The cathode can include an optional electric-conductivity promoter, such as, for example, graphite-derived small particles, graphene, carbon nano-tubes, carbon nano-sheet, carbon blacks, etc. Finally, the cathode can include an electric charge collector such as, for example, an aluminum foil, a copper foil, a carbon foil, a carbon fabric, or other metallic foil.

The method of making the cathode can include coating an immobilized selenium-containing slurry onto the charge collector, followed by drying the slurry coated charge collector (e.g., air dry, oven-dry, vacuum oven-dry, etc.). The immobilized selenium can be dispersed into the slurry, which can be prepared by a high shear mixer, a regular mixer, a planetary mixer, a double-planetary mixer, a ball mill, a vertical attritor, a horizontal mill, etc. The slurry can then be coated onto the charge collector, followed by drying in room air or in a vacuum. The coated cathode can then be pressed or roller-milled (or calendared) prior to its use in a rechargeable battery.

A rechargeable battery can be made using the above-described composite. The rechargeable battery can be charged at 0.1 C, 0.2 C, 0.5 C, 1 C, 1.5 C, 2 C, 3 C, 4 C, 5 C, 6 C, 7 C, 8 C, 9 C, 10 C or faster.

Example 13

Preparation of Immobilized Selenium Doped with Sulfur, Electrode, and Batteries Thereof Following the principles and procedures described in Example 10, 5 atomic percent (at %) of selenium, 20 at % of selenium, 35 at % of selenium, and 50 at % of selenium were separately replaced by sulfur in the synthesis of immobilized sulfur-doped selenium detailed in the following Table 4. Samples of the sulfur-doped immobilized selenium were synthesized with the carbon skeleton prepared in accordance with the principles and procedures described in Example 9.

TABLE 4

| Sample ID | Se, at % | S, at % | Se, wt % | S, wt % |
|---|---|---|---|---|
| Se95S5 | 95 | 5 | 97.9 | 2.1 |
| Se80S20 | 80 | 20 | 90.8 | 9.2 |
| Se65S35 | 65 | 35 | 82.1 | 17.9 |
| Se50S50 | 50 | 50 | 71.1 | 28.9 |

The thus prepared samples of immobilized sulfur-doped selenium were then used to prepare a number of cathodes 4 comprising immobilized sulfur-doped selenium in accordance with the principles and procedures described in Example 11 for immobilized selenium.

The thus prepared cathodes comprising immobilized sulfur-doped selenium in this example were then used to prepare coin cell batteries in accordance with the principles and procedures described in Example 12.

The assembled coin cell batteries in this example were then tested in the battery tester described in Example 12, following the same testing protocols also described in Example 12, at 0.1 C and 1 C charging and discharging cycling rates.

Figure 18:
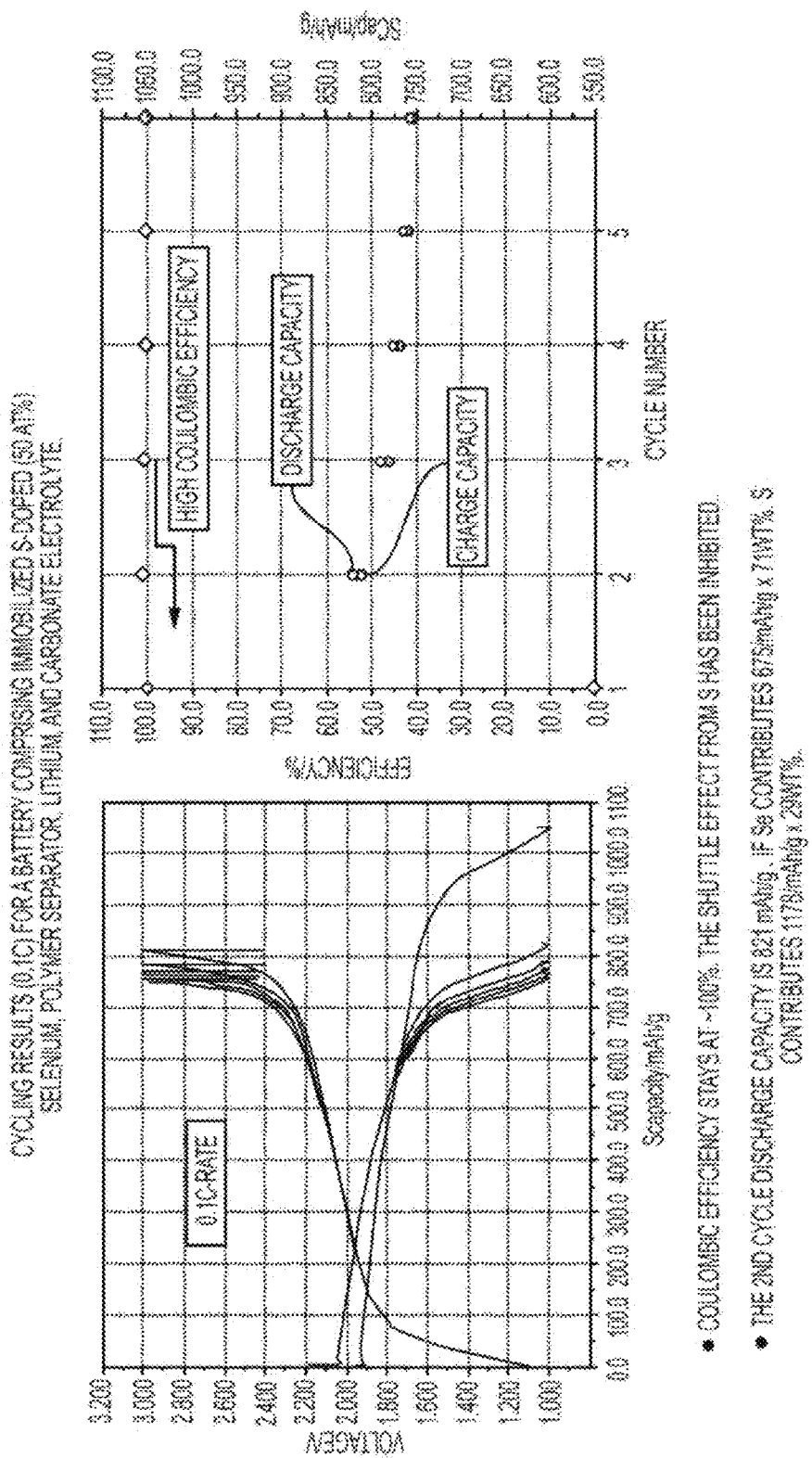
FIG. 18 are graphs of 0.1 C cycling test results for a lithium-sulfur-doped-selenium coin cell battery of the type shown in FIG. 15 made in accordance with Example 13 with a polymer separator.

The electrochemical cycling results at 0.1 C for coil cell batteries including a cathode comprised of immobilized sulfur-doped selenium cathode made with immobilized sulfur-doped selenium sample (Se50S50 in Table 4) are shown in FIG. 18, having a $2^{nd}$ cycle discharge capacity of 821 mAh/g (which is considered good) and a steady Coulombic efficiency ≥95%, typically ≥98% (which is also considered good), or as high as 100%.

If selenium is assumed to have a stoichiometric specific capacity of 675 mAh/g at the 0.1 C cycling rate, then sulfur specific capacity would be estimated to be about 1,178 mAh/g (which is considered good for sulfur). The Coulombic efficiency ≥95%, ≥98%, or as high as 100% indicates that there is no significant amount of sulfur being shuttled between the cathode and anode. Sulfur species in the immobilized sulfur-doped selenium battery function well in an electrolyte comprising carbonate. Typically, sulfur would not be expected to function well in a Li—S battery having carbonate as the electrolyte; a conventional Li—S battery typically uses an ether-based electrolyte. Carbonate-based electrolyte is typically used in present lithium-ion batteries. Carbonate-based electrolyte is more economical and much more widely available in the market place, as compared to ether-based electrolyte.

Figure 19:
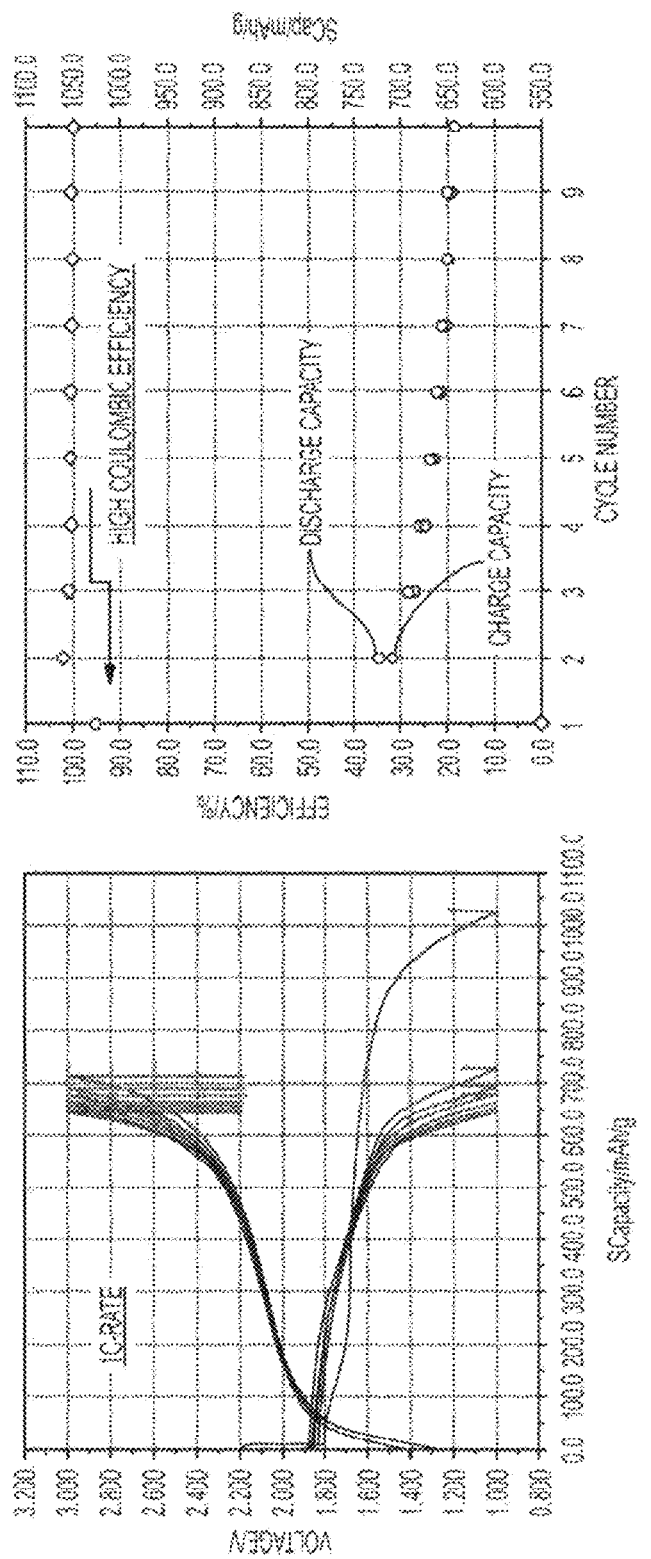
FIG. 19 are graphs of 1 C cycling test results for a lithium-sulfur-doped-selenium coin cell battery of the type shown in FIG. 15 made in accordance with Example 13 with a polymer separator.

The electrochemical cycling results at the 1 C cycling rate for coil cell batteries including a cathode comprised of immobilized sulfur-doped selenium cathode made with immobilized sulfur-doped selenium sample (Se50S50 in Table 4) are shown in FIG. 19, having a $2^{nd}$ cycle discharge capacity of 724 mAh/g and a steady Coulombic efficiency ≥95%, typically ≥98%, or as high as 100%.

If selenium is assumed to have a specific capacity of 625 mAh/g at the 1 C cycling rate, then the sulfur specific capacity would be estimated to be about 966 mAh/g (which is also unexpected). Sulfur is an insulator and has a very low electrical conductivity. Typically, a Li—S battery cannot cycle well at a fast cycling rate, such as at 1 C rate.

As can be seen, when used as a cathode material in a rechargeable battery, immobilized sulfur-doped selenium overcomes two fundamental issues associated with Li—S batteries, namely, shuttling effect and low cycling rate. With these two issues resolved, a battery including a cathode comprised of immobilized sulfur-doped selenium can have high energy density and high power density in real applications.

As can been seen, in an example, an immobilized sulfur-doped selenium system or body can be formed by the method comprising: (a) mixing selenium, carbon, and sulfur to form a selenium-carbon-sulfur mixture; (b) heating the mixture of step (a) to a temperature above the melting temperature of selenium; and (c) causing the heated mixture of step (b) to cool to ambient or room temperature, thereby forming the immobilized sulfur-doped selenium body.

The immobilized sulfur-doped selenium body of step (c) can comprise selenium and sulfur in a carbon skeleton body.

Step (a) can occur under a dry or a wet condition.

Step (b) can include homogenizing or blending the mixture.

Step (a) can include forming the selenium-carbon-sulfur mixture into a body. Step (b) can include heating the body to a temperature above the melting temperature of selenium. Step (c) can include causing or allowing the body to cool to ambient or room temperature.

Step (b) can include heating the mixture for a sufficient time for the selenium and carbon and sulfur to fully or partially react.

In another example, a method of preparing an immobilized sulfur-doped selenium system or body can comprise: (a) forming a carbon skeleton; and (b) melting selenium and sulfur into the carbon skeleton.

In another example, a method of forming an immobilized sulfur-doped selenium system or body can comprise: (a) mixing selenium and carbon and sulfur; and (b) following step (a), causing the selenium and sulfur to dissolve onto the carbon thereby forming the immobilized sulfur-doped selenium system or body.

A solvent for dissolving the selenium and sulfur can be an alcohol, an ether, an ester, a ketone, a hydrocarbon, a halogenated hydrocarbon, a nitrogen-containing compound, a phosphorus containing compound, a sulfur-containing compound, or water. The solvent can be added to one or more of the selenium, the sulfur, or the carbon prior to step (a), during step (a), or during step (b).

The method can further include (c) removing excess non-immobilized selenium, non-immobilized sulfur, or both from the immobilized sulfur-doped selenium system or body.

Also disclosed is a rechargeable battery comprising: a cathode comprised of immobilized sulfur-doped selenium disposed on an electrically conductive substrate; a separator disposed in direct contact with the electrically conductive substrate, and in contact with the immobilized sulfur-doped selenium; and an anode spaced from the cathode by the separator.

The rechargeable battery can further include the anode spaced from the separator by lithium. In an example, the lithium can be in the form of a lithium foil.

The rechargeable battery can further include the cathode, the separator, the anode, and the lithium immersed in an electrolyte.

In the rechargeable battery the immobilized sulfur-doped selenium can comprise a selenium-carbon-sulfur mixture, wherein the selenium and sulfur has been melted into the carbon.

In the rechargeable battery the separator can be formed from an organic material, an inorganic material, or a solid electrolyte.

The rechargeable battery can have a Coulombic efficiency ≥95%.

Discussion of Immobilized Chalcogen.

Immobilized chalcogen (system or both) comprises chalcogen and a carbon skeleton Immobilization of chalcogen may include pairing electron donor and electron acceptor of lone pair electrons. The amount of chalcogen in the immobilized chalcogen may be ≥1 wt %, ≥5 wt %, ≥10 wt %, ≥15 wt %, or ≥20 wt %. The low end of the chalcogen weight percentage may be more desirable for light chalcogen element such as oxygen or sulfur. Chalcogen comprising oxygen, sulfur, selenium, and/or tellurium may behave as an electron donor, donating lone pair electrons to an electron acceptor. Chalcogen may be in an elemental form, or in a compound form, such as chalcogenide or polychalcogenide. Chalcogen having lone pair electrons, formal negative charge, or partial negative charge ($\delta^-$) behaves as a nucleophile. A chemical species such as a molecule or an ion that donates a pair of electrons to form a new covalent bond is called a nucleophile which is from Greek for "nucleus loving". A carbon skeleton may behave as an electron acceptor. A carbon skeleton comprising a carbo-cation center may work as an acceptor of electrons that are donated by chalcogen. A carbon skeleton comprising centers that can accept electrons behaves as an electrophile. A molecule or an ion that donates electrons to form a new covalent bond is called an electrophile which is from Greek for "electron loving".

Figure 20B:
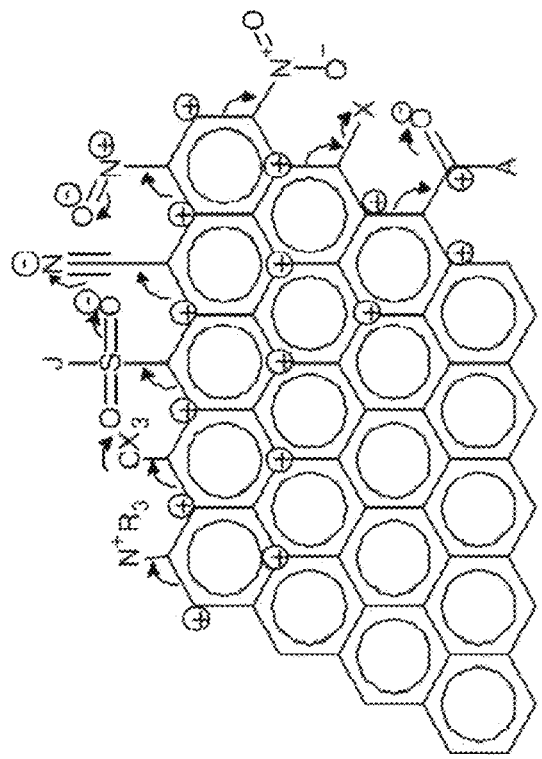
FIG. 20B is the model of FIG. 20A bonded with an electron-withdrawal deactivating chemical functional group, resulting in an electron-deficient carbo-cation center at para- and or ortho-position of the EMAC π-bonding system by resonances.
Figure 20A:
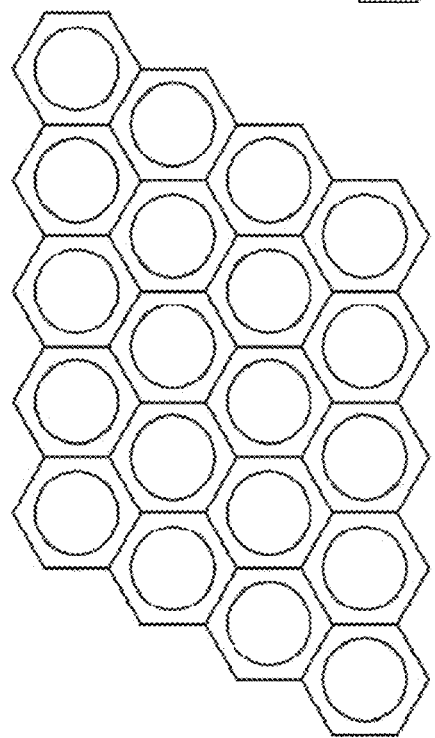
FIG. 20A is a model of an EMAC π-bonding system of a carbon skeleton.

FIG. 20A illustrates the advantages of immobilized chalcogen, namely: (1) the C=C bond may be strengthened for an improved electron conduction within a carbon plane; (2) d-spacing of a carbon skeleton may contract, which may result in improved electron conduction between the carbon planes; (3) chalcogen in immobilized chalcogen has a higher activation energy, which suggests that there are strong chemical interactions between the chalcogen and the carbon skeleton, so chalcogen is strongly anchored by donating lone pair electron to carbon skeleton, in which lone pair electrons of chalcogen may be part of the carbon's π-bonding system that is responsible for electron conduction, therefore, the electron flows between chalcogen and carbon are greatly improved, fundamentally addressing the limitation of chalcogen in its electrical conductivity, particularly for light chalcogen like oxygen, sulfur, and selenium; (4) chalcogen immobilization may prevent a polychalcogenide ion from forming, having one step electrochemical process during battery discharge and charge cycle, no shuttling of a polychalcogenide ion between anode and cathode, eliminating the risks for a cathode material like carbon to be oxidized by a polychalcogenide ion; (5) immobilized chalcogen may have a high collision frequency which may improve the electron flows between chalcogen and carbon; and (6) immobilized chalcogen may have a better ambient-oxidation stability for an improved shelf life and a better electrochemical RedOx stability for superior cycling performances of a rechargeable chalcogen battery comprising immobilized chalcogen.

A carbon skeleton may comprise a plane of an Extremely Massive Aromatic Conjugated (EMAC) π-bonding system, as shown in a simplified model in FIG. 20A. The carbo-cation center may be located on the EMAC π-bonding system, as shown by the circled "+" symbols in FIG. 20B. The EMAC π-bonding system may have a large number of resonances that stabilize a carbo-cation center. The carbo-cation center may be highly mobile in the EMAC π-bonding system through the large number of resonances, as shown in FIG. 20C. In other words, carbo-cation center in the carbon skeleton provides a mobile site as an electron acceptor at a location wherever there is a nucleophile, forming a chemical bond via an electron donor and an electron acceptor. The bonding via electron donor and electron acceptor is a coordination bond.

A mobile carbo-cation center on the EMAC π-bonding system is created by the presence of a deactivating chemical function group on the EMAC π-bonding system of the carbon skeleton, as shown FIGS. 20B-20C. A deactivating chemical functional group may withdraw electron(s) from EMAC π-bonding system, resulting in a reduced electron density for a carbon located at a para- or ortho-position in an aromatic ring, forming a carbo-cation center that has a deficient amount of electrons. Such carbo-cation center is mobile along the EMAC π-bonding system through resonances, as shown in FIG. 20C.

Figure 20D:
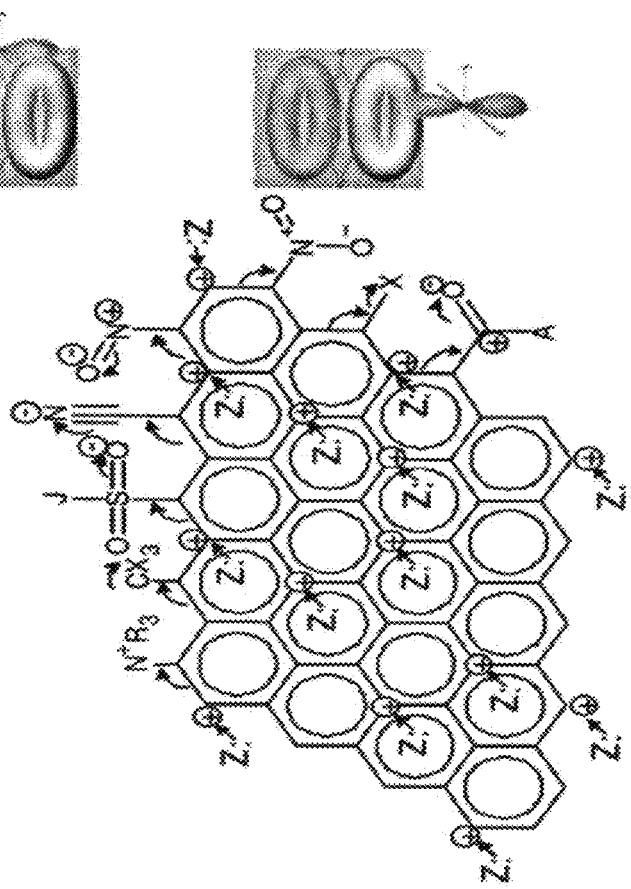
FIG. 20D is the model of FIG. 20C showing immobilized chalcogen in which the chalcogen donates lone pair electrons to a receptor of the lone pair electron at a carbo-cation center.
Figure 20C:
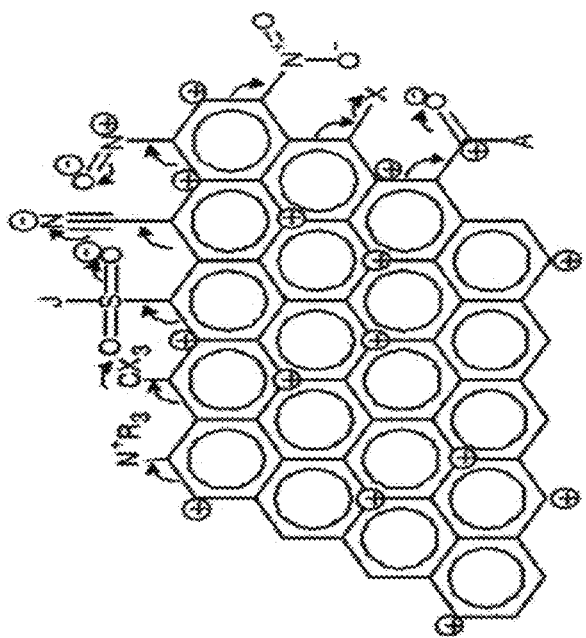
FIG. 20C is the model of FIG. 20B showing the carbo-cation center mobile through resonances.

FIG. 20D shows that chalcogen may be anchored onto a carbon skeleton via an electron donor-acceptor bonding mechanism Immobilized chalcogen comprises a carbon skeleton that comprises or includes a deactivating chemical functional group, desirably ≥0.1 millimole/gram (mmol/g), ≥0.5 mmol/g, ≥1.0 mmol/g, ≥1.5 mmol/g, ≥2.0 mmol/g, ≥2.5 mmol/g, or ≥3.0 mmol/g.

It is believed that the mobile carbo-cation center of the EMAC π-bonding system of a carbon skeleton may be an acid due to its ability to accept lone pair electrons from chalcogen. The mobile carbo-cation center may also be a soft acid due to its high mobility in the EMAC π-bonding system. The stability of the formed coordination bond, or the stability of the lone electron donor-accepter bond, of chalcogen as a ligand and carbo-cation of the EMAC π-bonding system as a soft acid follows the order O<<S≈Te. The lone pair electron may be donated to the carbo-cation center of the EMAC π-bonding system via shoulder-to-shoulder bonding and or head-to-head bonding, as shown in FIG. 20D. Such direct participating in the EMAC π-bonding system may be advantageous in electron conduction during a battery electrochemical process (discharging or charging process), overcoming a disadvantage of some chalcogen members like sulfur or oxygen that may be considered an electrical insulator. Immobilized chalcogen may allow a chalcogen rechargeable battery cycle at a high C-rate.

A deactivation chemical functional group on the EMAC π-bonding system of the carbon skeleton by itself may have a center that is electron deficient, as shown in FIG. 20B-20E, behaving as an electrophile.

With the presence of a deactivating chemical function group on the EMAC π-bonding system, the carbon skeleton by itself may be an electrophile, which is substantially benign to the electrophilic attack; therefore an electrophilic carbon skeleton may be chemically more stable towards electrophile.

It may be desirable to have an immobilized chalcogen comprising a carbon skeleton that comprises or includes a deactivating chemical function group on the EMAC π-bonding system, resulting in the presence of a mobile carbo-cation center along the EMAC π-bonding system, which is highly desirable for providing a lone pair electron acceptor site, accepting the electrons from an donor, for example, chalcogen, such as oxygen, sulfur, selenium, or tellurium.

In an example, the deactivation chemical functional group may be a nitrogen-containing group. Immobilized chalcogen can comprise a carbon skeleton comprising a chemical functional group comprising nitrogen, e.g., ≥0.1 mmol N/g, ≥0.5 mmol N/g; ≥1.0 mmol N/g, ≥1.5 mmol N/g, ≥2.0 mmol N/g, ≥2.5 mmol N/g, or ≥3.0 mmol N/g. A nitrogen-containing group may be a nitro group, —$NO_2$, or a nitroso group, —NO. A nitrogen-containing group may be an ammonium group, —$N^+R_3$, where R may be an alkyl group, an aryl group, or a H. A nitrogen-containing group may be a cyano group (—CN), a thiocyano group (—SCN), or an isothiocyano group (—NCS).

In an example, the deactivation chemical functional group may be a sulfur-containing group Immobilized chalcogen can comprise a carbon skeleton comprising a chemical functional group comprising sulfur, e.g., ≥0.1 mmol S/g, ≥0.5 mmol S/g, ≥1.0 mmol S/g, ≥1.5 mmol S/g, ≥2.0 mmol S/g, ≥2.5 mmol S/g, or ≥3.0 mmol S/g. The deactivating chemical functional group comprising sulfur may be —$SO_3H$ (a sulfonic acid) group or its salt (—$SO_3^-$), —SCN (a thiocyano group), —$SO_2R$ (a sulfonyl ester) group, where R may be an alkyl group, aryl group or halogen, —$SO_2CF_3$ (a trifluoromethyl sulfonyl ester group), —$SO_2$—O—R, or a sulfonium group (—$S^+R_2$), where R may be an alkyl group, aryl group or other organic functional group and R may not be the same. In an example, the deactivation chemical functional group may be a trihalomethyl group, —$CX_3$, where X may be F, Cl, Br, and I. The functional group of —$CF_3$ may be more favorable over the functional groups of —$CCl_3$, —$CBr_3$, or —$CI_3$. A highly halogenated alkyl group with more than one carbon may also be a deactivation chemical functional group that withdraws electron from the EMAC π-bonding system of a carbon skeleton Immobilized chalcogen can comprise a carbon skeleton comprising a chemical functional group comprising halogen (X), e.g., ≥0.1 mmol X/g, ≥0.5 mmol X/g, ≥1.0 mmol X/g, ≥1.5 mmol X/g, ≥2.0 mmol X/g, ≥2.5 mmol X/g, or ≥3.0 mmol X/g.

In an example, the deactivating chemical functional group may be a phosphorus-containing group. The phosphorus-containing group may be phosphonic acid group (—$PO_3H_2$) or its salt (—$PO_3H^-$, —$PO_3^{2-}$), a phosphonate (—$PO_3R_2$, —$PO_3HR$, or —$PO_3R^-$), or a phophonyl group (—POR2), where R is a arkyl, aryl, any organic functional group. The deactivating chemical functional group may be a phosphonium group (—$P^+R_3$) Immobilized chalcogen comprises a carbon skeleton comprising a chemical functional group comprising phosphorus may be ≥0.1 mmol P/g, ≥0.5 mmol P/g, ≥1.0 mmol P/g, ≥1.5 mmol P/g, ≥2.0 mmol P/g, ≥2.5 mmol P/g, or ≥3.0 mmol P/g.

Figure 20E:
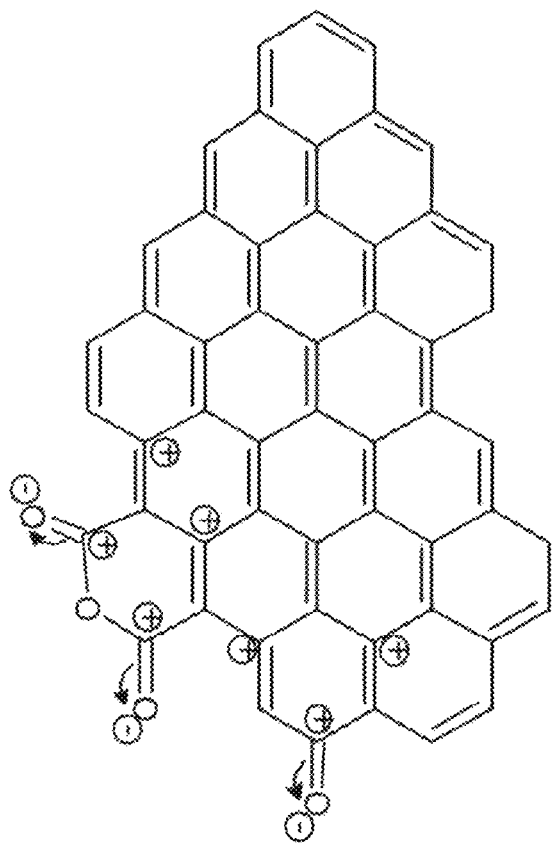
FIG. 20E is a model of a carbo-cation center created by the presence of a carbonyl group or an anhydride group as a part of EMAC π-bonding system via resonances, wherein the carbo-cation centers are mobile in the EMAC π-bonding system via resonances.

In an example, deactivation chemical function group may be an oxygen-containing functional group. The oxygen containing group may be a carbonyl-containing group, such as, —CHO (formyl group, or aldehyde group), —COR (acyl group, or ketone group), —COOH (Carboxyl group, or carboxylic acid group), —COOR (a carboxylate group, or ester group), etc. The deactivating chemical functional group may also be located inside the EMAC π-bonding system, as shown in FIG. 20E, in which a carbonyl group or an anhydride group, as an example, is part of the EMAC π-bonding system. Such electron-withdrawal effect may also generate carbo-cation centers by resonances. The carbo-cation centers are also mobile in the EMAC π-bonding system by massive number of resonances. Immobilized chalcogen comprises a carbon skeleton comprising a chemical functional group comprising oxygen, e.g., ≥0.1 mmol O/g, ≥0.5 mmol O/g, ≥1.0 mmol O/g, ≥1.5 mmol O/g, ≥2.0 mmol O/g, ≥2.5 mmol O/g, or ≥3.0 mmol O/g.

In an example, the amount of deactivating chemical functional group, for example, an oxygen-containing group, or groups, in the EMAC π-bonding system of a carbon skeleton may be characterized by the amount of the oxygen content. The oxygen-containing deactivating chemical group may be able to release carbon monoxide, carbon dioxide, and water at elevated temperatures in a stream of inert gas such as argon, helium, or nitrogen. When the temperature reaches about 400° C., the majority of water is released; and when the temperature reaches about 600° C., the majority of carbon dioxide is release; however, it is believed that even at a temperature of about 800° C., carbon monoxide is still being released at a rate similar to or higher than that at 600° C. An immobilized chalcogen may comprise oxygen-containing functional group that may released, under elevated temperature under a stream of inert gas, as water (desirably ≥100 ppm, ≥200 ppm, ≥300 ppm, ≥400 ppm, or ≥500 ppm, in weight) when heated up to 400° C.; as carbon dioxide (desirably ≥1,000 ppm, ≥1,200 ppm, ≥1,400 ppm, ≥1,600 ppm, or ≥1,800 ppm, or ≥2,000 ppm, in weight) when heated up to 600° C.; and/or as carbon monoxide (desirably ≥1,000 ppm, ≥1,200 ppm, ≥1,400 ppm, ≥1,600 ppm, or ≥1,800 ppm, or ≥2,000 ppm, in weight) when heated up to 800° C. The full or partial removal of the deactivating group comprising oxygen species (probably partial removal) from the EMAC π-bonding system of a carbon skeleton, renders the EMAC π-bonding system of the carbon skeleton not stable enough by electron withdrawal for the leftover or remaining electron-deactivating groups.

Thus, the carbon skeleton can become very reactive to the environment. In an example, a de-deactivated-chemical-functional-group carbon skeleton was sufficiently active to air that it caught fire by itself when exposed to room air at room temperature (~13° C. to ~26° C.). The fire self-sustained and turned red-hot. Therefore, the presence of an electron-withdrawing deactivating group may be critical and highly desirable for the carbon skeleton for immobilized chalcogen. As best understood, immobilized chalcogen desirably comprises a carbon skeleton that is highly active to ambient conditions after it is treated under a stream of inert gas, such as argon, at elevated temperatures, for example, ≥400° C., ≥500° C., ≥600° C., ≥700° C., or ≥800° C. More specifically, the carbon skeleton treated under a stream of inert gas at the above mentioned temperatures may catch fire by itself while exposed to air.

Immobilized chalcogen comprises chalcogen that has lone pair electrons and a carbon skeleton that is capable of accepting lone pair electrons from the lone pair electron donor, in this case, chalcogen. Lone pair electrons from chalcogen are donated to the carbo-cation centers that are mobile in the EMAC π-bonding system through resonances. This lone pair electron donor-acceptor bonding system in immobilized chalcogen leads to a higher concentration of electron density in EMAC π-bonding system of the carbon skeleton, resulting in a stronger C=C bond in the EMAC π-bonding system. Strengthening C=C bond in the immobilized chalcogen may enhance the electron conduction in the plane of the EMAC π-bonding system of a carbon skeleton.

Immobilized chalcogen desirably has an increase in wavenumber of the D-band Raman scattering peak by ≥2 cm$^{-1}$, ≥3 cm$^{-1}$, ≥4 cm$^{-1}$, ≥5 cm$^{-1}$, or ≥6 cm$^{-1}$. An immobilized chalcogen, particularly for immobilized chalcogen comprising sulfur, desirably has an increase in wavenumber of the D-band Raman scattering peak and or G-band Raman scattering peak by ≥1 cm$^{-1}$, ≥2 cm$^{-1}$, or ≥3 cm$^{-1}$. Herein, an increase in wavenumber, when used in connection with immobilized chalcogen, is with reference to the corresponding wavenumber (D-band, G-band, etc., of the carbon, by itself, i.e., without chalcogen, comprising the immobilized chalcogen).

The carbon skeleton can have both D-band and G-band Raman shifts; wherein the D-band pertains to the disordered C=C bonds and the G-band pertains to more ordered graphitic C=C bonds. The carbo-cation center present on the D-band related EMAC π-bonding system may be a softer acid than the carbo-cation center present on the G-band related EMAC π-bonding system of a carbon skeleton. Selenium is easier to polarize and is a softer ligand; sulfur is a small atom and more difficult to polarize, so it is a harder ligand. A softer ligand may preferentially bond onto a softer acid site whereas and a harder ligand may preferentially bond onto a harder acid site. Therefore, selenium seems to strengthen more in C=C bond in the D-band than sulfur and sulfur seems to strengthen more in C=C bond in the G-band. Even with a large portion of chalcogen being sulfur, the presence of smaller amount of selenium may be able to strengthen C=C bond in the D-band significantly.

In other words, the more the chalcogen is capable of donating lone pair electrons, the stronger the C=C bond is in the EMAC π-bonding system of the immobilized chalcogen system, which may enhance the electron conductivity in the plane of the EMAC π-bonding system of a carbon skeleton. For example, elemental sulfur or a reduced form of sulfur, such as $S^{2-}$ (sulfide), and $S_n^{2-}$ (polysulfide), etc., has lone pair electrons. Sulfur has an electron structure [Ne] $3s^23p^4$, selenium has an electron structure [Ar]$3d^{10}4s^24p^4$, and tellurium has an electron structure [Kr]$4d^{10}5s^25p^4$. Lone pair electrons in selenium and its reduced forms, e.g., selenide ($Se^{2-}$) and polyselenide ($Se_n^{2-}$), are further away from the nuclear (or nuclears) of the selenium atom than those in sulfur atoms. The lone pair electrons in selenium may be more capable of being donated, which may lead to a stronger donor-acceptor bonding system in immobilized selenium than that in immobilized sulfur. It is worthwhile to point out that immobilized Se/S shows that the strength of lone pair electron donor-acceptor bond increases with the presence of selenium. Lone pair electrons in tellurium are further away from nuclear than those in selenium. The lone pair electrons in tellurium may be even more capable of donating to the acceptor of the lone pair electrons, which may lead to an even stronger donor-acceptor bonding system in immobilized tellurium than in immobilized selenium, immobilized sulfur, or immobilized oxygen.

Tellurium may be more nucleophilic than selenium which may be more nucleophilic than sulfur, which may be more nucleophilic than oxygen.

Furthermore, oxygen has an electron structure [He] $2s^22p^4$. Lone pair electrons in oxygen and its reduced forms, oxide ($O^{2-}$), peroxide ($O_2^{2-}$), and superoxide ($O_2^-$), are closer from its nuclear (or nuclears) of the oxygen atom than those in sulfur. It is known that peroxide or superoxide is highly active; it is a strong oxidation agent that may oxidize carbon. A prior art lithium-oxygen or lithium-air battery may have difficulty achieving chemical stability of the cathode material involving carbon, since lithium peroxide or lithium superoxide may form as an intermediate chemical species during the electrochemical cycling process of a lithium-oxygen and lithium-air rechargeable battery. It is known that peroxide or superoxide is highly active and has a strong oxidation power, particularly towards carbon and other cathode materials.

From the same perspective, a polychalcogenide anion comprising chalcogen may behave similar to a peroxide ion or a superoxide ion in oxidizing the cathode material such as carbon. Accordingly, it may be desirable to avoid or prevent polychalcogenide formation during the electrochemical process of a rechargeable battery comprising chalcogen.

Discharge is one of the electrochemical processes of a battery, during which chalcogen at the cathode gains electrons. It is desirable to have the chalcogen gain electrons and form chalcogenide in one step:

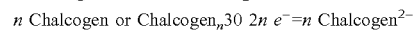

in which there is only one electrochemical discharge process

It is not, however, desirable to have the chalcogen gain electrons and form polychalcogenide

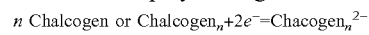

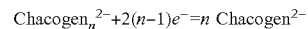

or

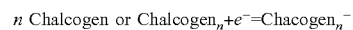

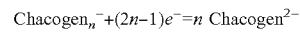

in which more than one electrochemical processes are present during discharge. Polychalcogenide is not desirable due to its shuttling effect (shuttle between cathode and anode) since a polychalcogenide ion may be soluble in a battery electrolyte; shuttling effect leads to a lower electrochemical efficiency, less than 100%, in which the electrochemical energy is converted to heat, presenting additional challenges in a chalcogen battery. Polychalcogenide is also not desirable due to its oxidizing capability to the host material, e.g. For example, under an electrochemical environment, polychalcogenide may be more electrochemically active, having an even stronger oxidizing capability towards a host material, particularly, carbon or a binder in the cathode. Oxidation of the cathode material like carbon or a binder is not desirable for a rechargeable battery, resulting in deterioration of a chalcogen cathode, which ultimately leads to failure in cycling capability of a rechargeable chalcogen battery.

In immobilized chalcogen, lone pair electrons of the chalcogen interact with the corresponding acceptor, a carbocation center of the EMAC π-bonding system of the carbon skeleton or a cationic center localized in the deactivation functional group, forming a coordination chemical bond. The donor-acceptor bonding system may not affect the RedOx capability of the chalcogen, allowing chalcogen element to gain electrons, being reduced, and form chalcogenide, and allowing chalcogenide to lose electrons, being oxidized, and form elemental chalcogen, completing an electrochemical RedOx cycle, making it possible for a rechargeable battery application. Polychalcogenide may be an intermediate between elemental chalcogen and the chalcogenide. Both chalcogenide and polychalcogenides have lone pair electrons and can also be immobilized in the immobilized chalcogen, just as chalcogen in its elemental form.

Immobilization of chalcogen may disorder or destroy the chalcogen crystalline structure. A crystalline chalcogen, such as selenium, sulfur, tellurium, or some combination thereof can be become disordered, losing its crystallinity, illustrated in X-Ray diffraction studies. Immobilized chalcogen changes the crystal structure of the chalcogen.

Immobilization of chalcogen may destroy the chemical bonding between chalcogen atoms. Elemental sulfur-sulfur bond has strong Raman shifts at 154 $cm^{-1}$, 217 $cm^{-1}$, 221 $cm^{-1}$, 473 $cm^{-1}$. In immobilized sulfur system or body, the sulfur-sulfur bond may somehow change and not be shown in the Raman spectrum. In the immobilized Se/S, there is no S—S and S—Se bond shown in Raman spectra for a sulfur content between 8.5 wt % and 100 wt % S.

The sulfur molecules, mainly $S_8$, with over 30 allotropes, such as cyclic $S_6$, $S_7$, $S_{12}$, or even $S_{18}$ may be in crystalline forms. With quenching, sulfur may be amorphous. But the amorphous form of sulfur typically converts to a crystalline form of sulfur. In the immobilized chalcogen comprising sulfur, either by itself, or as a mixture (immobilized Se/S), sulfur is no longer arranged in a crystalline form. Selenium is also no longer arranged in a crystalline form in immobilized selenium.

By donating the lone pair electrons from chalcogen to an electron-deficient carbo-cation center in the EMAC π-bonding system of a carbon skeleton comprising a deactivating group that withdraws electron, the chalcogen atom's lone pair electrons become part of the EMAC π-bonding system. The number of delocalized electrons in the EMAC π-bonding system is large; therefore, the large number of delocalized electrons in the EMAC π-bonding system in the immobilized chalcogen shield the interactions between the chalcogen nucleus and the valence electrons in the chalcogen. The chalcogen-chalcogen bond is weakened to a level that chalcogen behaves as an atom, not as a molecule, in a reduction-oxidation (RedOx) process by gaining two electrons to form chalcogenide ($2^-$) anion, directly, which then in-turn loses two electrons and forms elemental chalcogen, directly, without forming an intermediate species like a polychalcogenide anion. Immobilized chalcogen may only show one step of electrochemical behavior during its use as a cathode in a rechargeable battery.

Please note that there can be more than one charging or discharging behaviors in a chalcogen battery when chalcogen forms an intermediate, particularly, a polychalcogenide such as polysulfide ($S_n^{2-}$), polyselenide ($Se_n^{2-}$), etc. The immobilized chalcogen described herein may avoid or overcome the problem with chalcogenide rechargeable batteries, such as Li—S and Li—Se, particularly in shuttling effect of a polychalcogenide ion between the cathode and the anode during the battery's discharge and charge process. The most favorable solution to the shuttling effect of the polychalcogenide anion is to prevent it from forming or anchor it if formed by chalcogen immobilization in an immobilized chalcogen comprising chalcogen and a carbon skeleton comprising a deactivating chemical functional group. As best understood, immobilized chalcogen seems to only have one electrochemical process during discharge between 3V and 1V.

It is known in the art that chalcogen, like sulfur and selenium, forms polychalcogenide, such as polysulfide ($S_n^{2-}$) and polyselenide ($Se_n^{2-}$), that are soluble in a carbonate electrolyte in Li—S or Li—Se rechargeable battery using a carbonate electrolyte. In an example, to minimize shuttling effect an ether-based electrolyte may be used. Polychalcogenide ions have a relatively low solubility in an ether-based electrolyte than that in a carbonate-based electrolyte. Please note that carbonate-based electrolyte is the current standard in lithium ion batteries much more commercially available and less expensive than an ether-based electrolyte. The approach of minimizing the solubility of polychalcogenide in an ether electrolyte may not be an optimal solution, which is why chalcogenide battery still faces challenges in overcoming the shuttling effect for its commercialization.

If, however, an activating chemical functional group were present on an EMAC π-bonding system, the activating chemical functional group would donate electron(s) to the EMAC π-bonding system, resulting in an increase in electron density for a carbon located at a para- or ortho-position in an aromatic ring, forming a carbanion center that has extra electron(s). Such carbanion center is also mobile along the EMAC π-bonding system through resonances, which may have one or more of the following results, which may be undesirable: (1) the center of an electron-rich carbanion is prone to electrophilic attack, resulting in a carbon skeleton that is chemically less stable, as compared to the stability of carbon that has no activating chemical functional group or has carbocation in EMAC π-bonding system of a carbon skeleton; and/or (2) the presence of carbanion provides a center for electron transfer to adsorbed species such as $O_2$, $S_8$, $Se_8$, etc., forming $O_2^{2-}$, $S_n^{2-}$, $Se_n^{2-}$, etc., which has strong catalytic oxidation activity, in addition to their high solubility in an electrolyte solution, particularly, in a common carbonate electrolyte solution. From this perspective, a chalcogen molecule in an adsorbed form may not be desirable with respect to its easy conversion to a polychalcogenide ion; an adsorbed form of a chalcogen molecule may form if the interactions of chalcogen and carbon are stronger than physical interactions, reaching a chemisorption level (defined hereinafter, having an activation energy less than 95 kJ/mole, but higher than 40 kJ/mole), but do not reach a chemical bonding level (defined hereinafter having an activation energy of ≥96 kJ/mole).

In an example, immobilized chalcogen may be stable in an ambient environment, e.g., shelf life (at room temperature) ≥3 months, ≥6 months, ≥9 months, ≥12 months, ≥15 months, ≥18 months, ≥21 months, or ≥24 months during which the exothermal weight loss between 200-250° C. may be ≤2.0 wt %, ≤1.8 wt %, ≤1.6 wt %, ≤1.4 wt %, ≤1.2 wt %, or 1.0 wt % as determined by TGA analysis under a stream of inert gas such as argon.

The presence of a deactivating group in the EMAC π-bonding system is desirable for immobilized chalcogen comprising chalcogen and a carbon skeleton. As a comparative example, Elite C, an activated carbon available from Calgon Carbon of Pittsburgh, Pennsylvania, has an oxygen content around 1.3 wt %. This commercial carbon was used to host selenium by melting different amount of selenium (various amounts of Se, 50 wt %, 55 wt %, 60 wt %, 65 wt %, and 70 wt % Se) into the pores of the Elite C activated carbon. About 28 months later, it was discovered that the Elite C—Se composites deteriorated. It is believed that this deterioration is due to the chemical attack by the environmental air at room temperature, as revealed by TGA-DSC analysis The deteriorated Elite C—Se composites with 50 wt %, 55 wt %, 60 wt %, 65 wt % and 70 wt % selenium all showed major weight loss between 200-250° C. in TGA analysis in a stream of inert gas (argon) with an exothermal peak (measured by DSC analysis in the same TGA-DSC runs). Oxygen content analysis were conducted for some of these deteriorated Elite C—Se samples and the results showed the deteriorated Elite C—Se composites of 50 wt % and 65 wt % had an oxygen content around 24.0% for both samples, at around the same time frame of TGA-DSC analysis. The deteriorated Elite C—Se sample with 50 wt % Se had a weight loss of about 32.0 wt % between 200-250° C.; the Elite C—Se sample with 55 wt % Se had a weight loss of 27.5%; the Elite C—Se sample with 60 wt % Se had a weight loss of about 24.4%; and the Elite C—Se sample with 70 wt % Se had a weight loss of 17.7 wt %. It is believed that the weight loss between 200-250° C. for the deteriorated C—Se composites made with Elite C is related to carbon content. The higher the carbon content (or the lower the Se content) is, the more is the weight loss between 200-250° C. This suggests that the carbon in the Elite C—Se composites were oxidized by the environmental oxygen at room temperatures, which is not desirable.

It was also noted that freshly-made C—Se composites with Elite C did not show a notable weight loss between 200-250° C. (no observable exothermal behaviors), when analyzed when freshly made by TGA-DSC in a stream of argon.

As another comparative example, Maxsorb MSP20X, an activated carbon available from Kansai Coke Chemicals Co., LTD of Japan (hereinafter "Kansai"), also has oxygen content of around 1.5 wt % and was used to prepare a C—Se composite with a selenium content of 65 wt %. About 18 months later, this C—Se composite also exhibited an exothermal weight loss of about 2.4% at temperatures between 200-250° C., in the same ambient environment as Elite C—Se composites described above. This environmentally-deteriorated Maxsorb C—Se composite also showed an oxygen content of about 14 wt %.

The discoveries in above comparative examples show that a C—Se composite made with carbon having oxygen content less than 2% are not desirable, and it is prone to exothermal weight loss due to ambient environmental conditions, such as, without limitation, environmental oxygen or environmental moisture at room temperatures. As best understood, the exothermal weight loss at temperatures between 200° C. and 250° C. may be related to the percentage of carbon in the C—Se composite, which suggests that carbon in the C—Se composites have been attacked by the environmental oxygen or moisture, which was also evidenced by the substantial increase in oxygen content in the deteriorated C—Se samples. It has been observed that the oxygen level for freshly made C—Se composites is typically close to a number that is equal to the multiplication of the oxygen content of carbon feedstock and the percentage of the carbon in the C—Se composite. It has also been observed that the Elite C and Maxsorb MSP 20X activated carbons are stable under ambient environmental conditions. The selenium used to make the C—Se composites is chemically pure, typically greater than 99.5 wt %. The low oxygen content of Elite C or Maxsorb MSP 20X carbon may directly relate to the scarcity of deactivating chemical functional group comprising oxygen in the EMAC π-bonding system of a carbon skeleton.

In another example, an immobilized selenium sample comprising selenium and a carbon skeleton comprising a deactivating chemical functional group was prepared with a carbon skeleton having an oxygen content of around 9%. It was observed that this immobilized selenium sample still behaved the same in the TGA-DSC analysis in a stream of argon; after about 26 months there was no noticeable weight loss between 200-250° C., and there was no observable exothermal behavior in this temperature region. The presence of deactivating chemical functional group, in this example, comprising oxygen, in a carbon skeleton may be critical to the successful immobilization of the chalcogen.

In immobilized chalcogen, chalcogen is immobilized chemically. The lone pair electrons donor-acceptor bonding system in the immobilized chalcogen anchors chalcogen as an element, chalcogenide, or polychalcogenide, requiring a much higher energy for chalcogen to overcome the large activation energy barrier and escape.

The Van der Waals forces and capillary force are typically present in an S—C composite, a Se—C composite, or a Te—C composite, in which chalcogen, as a guest molecule, is melted into porous carbon which works as a host material. Van der Waals forces are typically about 4 kJ/mole and the strongest Van Der Waals forces may reach 40 kJ/more. Interactions involving Van der Waals forces and capillary forces are typically physical, not chemical. Physical interactions do not involve changes in the electron state of the guest and or host molecules, i.e., no chemical bonding. For a physically confined C-Chalcogen composite, chalcogen is confined by physical interactions such as Van der Waals interactions and capillary forces, or surface tensions due to the curvatures of the pores of the carbons.

When the forces involving the interactions among the guest molecules and the host reach a level needing an activation energy 96 kJ/mole or higher (or 1 eV) to overcome and escape, the interactions between the guest molecules and the host are more defined, reaching a level of chemical interactions. Chemical interactions typically involve changes in electron state of the molecules or atoms. Such changes may involve breaking an existing chemical bond, forming a new chemical bond, or strengthening an existing chemical bond, or weakening an existing chemical bond. The forces involving the guest molecules and the host at a level between 40 and 95 kJ/mole are transitional—a possible combination of physical interactions and chemical adsorption. In a state of chemical absorption, chalcogen may still exist as a chalcogen molecule, for example, as an adsorbed form of $O_2$, $S_8$, or $Se_8$, which then may in-turn accept electrons during a battery discharge process, forming a polychalcogenide ion, such as $O_2^{2-}$, $S_n^{2-}$, or $Se_n^{2-}$, which are not desirable.

An activation energy (at 15 wt % loss) that is required to overcome an immobilized chalcogen system comprised of chalcogen and a carbon skeleton, which may involve breaking a donor-acceptor bond of the lone pair electrons between chalcogen and carbon skeleton, may be ≥96 kJ/mole, ≥99 kJ/mole, ≥102 kJ/mole, ≥105 kJ/mole, ≥108 kJ/mole, or ≥111 kJ/mole. A higher activation energy for the immobilized chalcogen may ensure that chalcogen is properly anchored by strong chemical interactions, and is difficult to leave the immobilized chalcogen system, which is desirable for a stable cycling performance for a rechargeable battery comprising immobilized chalcogen. A higher activation energy may also suggest the presence of strong chemical interactions between chalcogen and carbon skeleton, ensuring a minimum level of formation of polychalcogenide.

The Log_pre-exponential constant (collision frequency) for an immobilized chalcogen is desirably ≥7.0, ≥7.2, ≥7.4, ≥7.6, or ≥7.8. Immobilized chalcogen may have a high collision frequency; therefore, chalcogen may have more interactions with the carbon skeleton for improved electrical conduction during electrochemical processes.

To escape an immobilized chalcogen system, chalcogen in the immobilized system requires sufficient kinetic energy. In one example, mid-weight-loss kinetic energy can be $-1,840.3x^2+90.075x+D$, where x is the sulfur weight percentage of the total of selenium and sulfur in the immobilized chalcogen system; D may be ≥9,500 J/mole≥9,700 J/mole, ≥9,900 J/mole, ≥10,000 J/mole, 10,200 J/mole, 10,400 J/mole, or ≥10,600 J/mole; the mid-weight-loss temperature is $-147.57 x^2+7.2227 x+C$, where C may be ≥510° C., ≥520° C., ≥530° C., ≥540° C., ≥550° C., 560° C., or ≥570° C.

Figure 20F:
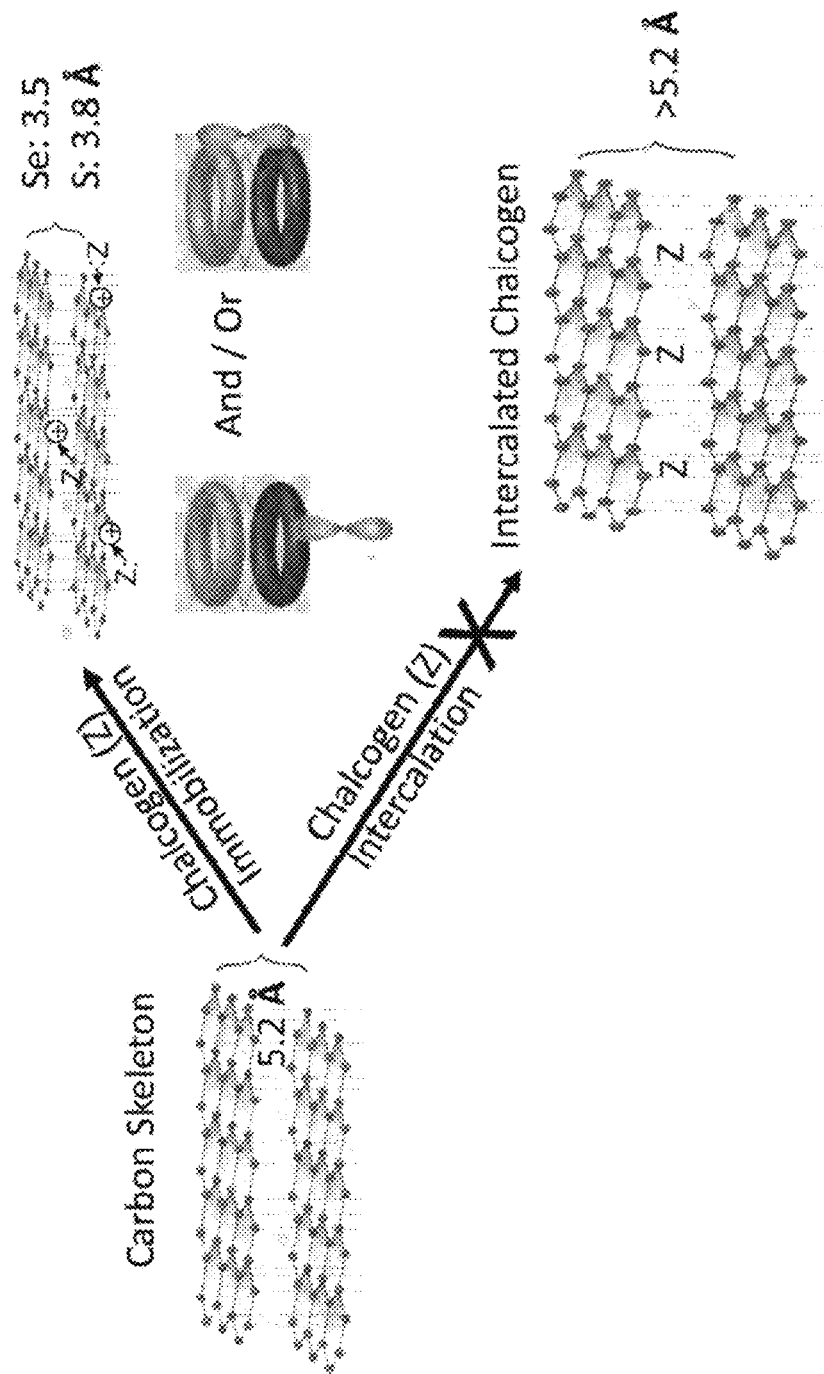
FIG. 20F is a model of d-spacing contracting of a carbon skeleton in immobilized chalcogen.

It is believed that the d-spacing of carbon skeleton contracts in the immobilized chalcogen, as shown in FIG. 20F. It has been observed that a sheet-like structure material like carbon has the sheet-like structure shown, for example, in FIGS. 20A-20C. The distance between carbon sheets, d-spacing, may be determined by X-ray diffraction. D-spacing expansion is typically observed for graphite that may be used as an anode in a lithium ion battery due to lithium intercalated between the graphite carbon sheets. The same phenomenon is also true for intercalated clays, a d-spacing expansion. It was observed that immobilized chalcogen has a d-spacing contraction, which suggests that there are (strong) chemical interactions pulling planes of the EMAC π-bonding system of carbon skeleton. In an example, it may be desirable to have a d-spacing contraction of ≥0.5 Å, ≥0.6 Å, ≥0.7 Å, ≥0.8 Å, or ≥0.9 Å.

Immobilized chalcogen may be used in a battery, a capacitor, or an energy storage device. A battery comprising immobilized chalcogen may be a primary battery or a secondary (or a rechargeable) battery. A battery comprising immobilized chalcogen may comprise a cathode, an anode, a separator, and an electrolyte Immobilized chalcogen may be used as a cathode material in a battery. The anode may be a metallic material, for example, a Group IA (an alkali metal like Li, Na, K, etc.) metal, a Group IIA (alkali earth like Mg, Ca, Ba, etc.) metal, a Group IIIA (such as Al, Ga, or In) metal, a Group IVA metal (such as Sn or Pb), a Group V metal (such as Sb or Bi), a semiconductor metal (such as Si, Ge, or As), a transition metal, or a rare earth metal as shown in the Periodic Table of Elements. Graphite may also be used as an anode material. A organic polymer film or an inorganic film may be used as a separator.

The surface of an organic polymer film may be modified for desirable properties of a battery. An organic-based electrolyte or an aqueous-based electrolyte may be used in a battery comprising immobilized chalcogen. An example of an organic-based electrolyte may be a carbonate-based electrolyte, an ether-based electrolyte, or other special organic-based electrolyte. Please note that a carbonate-based electrolyte is a common electrolyte used in current lithium ion rechargeable battery. An example of an inorganic-based electrolyte may be a solid electrolyte. A battery comprising immobilized chalcogen may have a hybrid electrolyte in which a solid electrolyte is used with dual functions, one allowing ions to conduct through the solid electrolyte membrane and the other preventing the transport of certain undesirable ions, thereby avoiding or preventing dendrite formation.

In an example, immobilized chalcogen may be applied or coated onto a charge collector like an aluminum foil, followed by assembling of a battery with lithium metal anode, a carbonate-based electrolyte, and a polymer separator, resulting in a battery comprising immobilized chalcogen. A battery comprising immobilized chalcogen may be able to discharge to a voltage as low as practically desired. This battery may have a single stage of discharge Voltage-Specific Capacity profile under a constant current with a C-rate from 0.001 to as high as 100 C-rate or greater, which suggests that chalcogen directly gains two electrons and forms chalcogenide, and have a cycling efficiency ≥90%, ≥95%, ≥97%, ≥98%, or ≥99%. This battery may have a multi-stage discharge Voltage-Specific Capacity profile, which may not desirable, but as long as its coulombic cycling efficiency is ≥90%, ≥95%, ≥97%, ≥98%, or ≥99%, since polychalcogenide ion is anchored in the immobilized chalcogen system, so it is difficult to for it to escape the immobilized chalcogen body or system and shuttle to the anode.

At C-rate of 1, a battery comprising chalcogen may have a specific capacity of ≥50%, ≥55%, ≥60%, ≥65%, or ≥70% at its tenth cycle and may be capable of retaining 70% of its capacity after ≥50 cycles, ≥100 cycles, ≥150, ≥200 cycles, or ≥250 cycles.

At a C-rate of 1, a battery comprising chalcogen may have mid-discharge voltage ≥1.2V, ≥1.3V, ≥1.4V, ≥1.5V, or ≥1.5V.

A battery comprising immobilized chalcogen may be able to discharge at a C-rate of ≥0.1, ≥0.3, ≥0.5, ≥1.0, ≥2.0, or ≥5.0.

A battery comprising immobilized chalcogen may retain a 50% of the specific capacity of the theoretical specific capacity of chalcogen in the battery for ≥50 cycles, ≥100 cycles, ≥150 cycles, ≥200 cycles, or ≥250 cycles.

EXAMPLES

DSC/TGA system available from TA Instruments of New Castle, Delaware, TGA-DSC was used to characterize thermal behaviors of samples. It was calibrated with Zn for temperature. Modulated mode was used to determine the activation energy and pre-exponential factor of carbon-selenium, carbon-sulfur, carbon-selenium/sulfur, and other samples in argon flows at a heating rate of 3.5° C./min with graphite crucibles (no lid). The TGA analysis was done in argon flows at a heating rate of 10° C./min with alumina crucibles with lid (alumina) on. Raman spectra were collected via a confocal Raman microscope with an Argon laser at 488 nm available from Renishaw—PLC having an office in West Perdue, Ill. X-ray diffraction results were collected on Philips' brand PD5000 system with a copper target. BET surface area and pore size distributions of the carbon were collected on a Micromeritics brand BET analyzer with nitrogen and $CO_2$ as probing molecules, separately, and the results were combined.

Examples for Preparations of Carbon Skeleton Comprising Deactivating Chemical Functional Group Comprising Oxygen.

Example 14

Carbon Skeleton Comprising Deactivating Functional Group Comprising Oxygen (9-10 wt %)—Large Crucible Under Static Conditions Potassium citrate (1 kg) was placed in a stainless crucible (boat-shape, 4.5 inches in diameter and 24 inches in length). The crucible was then placed inside a stainless steel tubular reactor with a diameter of 6 inches. In the presence of an argon flow, the reactor was heated at a heating rate 5° C./min to 600° C., soaked or held at 600° C. for one hour (for carbonization), and ramped at 3° C./min to 800° C., and soaked or held at 800° C. for two hours (for activation). The reactor was then cooled down to 180° C. and the argon flow was switched to a nitrogen flow that had bubbled through a water bubbler to pick up water molecules. The nitrogen flow carried the water molecules into the reactor to react with metallic potassium that formed during the carbon making process to avoid the metallic potassium from catching fire when exposed to ambient conditions.

The resulting mixture of the carbon skeleton with decomposed salts (mainly potassium carbonate), optionally, along with a base (potassium hydroxide) was slurried (mixed) in water. Hydrochloric acid was used to neutralize the slurry with an excess to reach a pH around 1. Then the carbon slurry was filtered with a filter press and washed with water to a conductivity of 10 μS/cm or less.

The washed carbon was then discharged from the filter press and dried in an oven at a temperature of ~120° C. resulting in a carbon skeleton comprising a deactivating group having oxygen contents at a level of about 9-10 wt %, which was surprisingly high.

It should be noted that it was observed that the oxygen content in the carbon skeleton appears to depend on the batch size of the potassium citrate. A small batch of potassium citrate may lead a carbon skeleton formed therefrom to have an oxygen content at a level of about 5 wt %.

Example 15

Carbon Skeleton Comprising Deactivating Functional Group Comprising Oxygen (~12-14 wt %)—Continuous in a Rotary Kiln Potassium citrate was fed from a hopper at a rate about 9 pounds per hour with a screw feeder into a rotary kiln with a diameter of 6 inches with a stainless bar sitting inside for the purposes of mixing and scraping. The kiln included four heating zones and was preheated with following temperature settings: the last zone temperature (Zone 4) was controlled at 600° C.; the temperature for Zone 3 was set at 400° C.; and the temperatures for first two zones (Zone 2 and Zone 1) were set at 150° C. When reaching steady state, the temperatures in Zones 3, 2, and 1 are typically higher than the set-points, e.g., between 400-500° C. for Zone 3, and between 300-400° C. for Zone 1 and Zone 2, due to the heat conducted from the Zone 4 to Zone 3, and further to Zone 2, and further to Zone 1. Zone 4 may be the only one that was actively heated. The kiln is tilted at an angle about 1° with a rotation speed about 6 rpm. An argon flow was purged counter to the flow direction of the potassium citrate while the potassium citrate was being carbonized. The potassium citrate was fed from the hopper into Zone 1 and, via the rotation of the rotary kiln, the potassium citrate was moved progressively through Zones 2-4 of the rotary kiln for discharge of carbonized potassium citrate and decomposed salts from Zone 4 of the into a metallic can. After about 4 hours after discharge into the metallic can, the reactions reached a steady state and the produced mixture included the carbonized carbon mixture for the next step of the process, namely, activation.

Next, the steady-state-produced carbonized carbon mixture from carbonization was then feed at a similar rate into the rotary kiln, from Zone 1 to Zone 4, a second time for activation at elevated temperatures, all zones controlled at 800° C., with a rotation speed of 4 rpm, tilted at 1° along with the argon flow counter to the direction of the flow of the carbonized carbon mixture. The collected mixture from the activation process contained the carbon skeleton for further processing.

Next, the mixture collected from the activation process was slurried (mixed) followed by mixing with hydrochloric acid, filtering and washing in a filter press, and drying in an oven at ~120° C. The thus produced carbon is a carbon skeleton comprising deactivated chemical function group, analyzed as having an oxygen content 12 wt %, even higher than the carbon skeleton materials produced from the large crucible under static conditions Examples for Immobilization of Chalcogen.

Example 16

Immobilization of Selenium with a Carbon Skeleton Comprising Deactivating Chemical Functional Group Comprising Oxygen (Oxygen Content About 9-10%)

Selenium powder (2.4 g) and a carbon skeleton with an oxygen content of 9.29 wt %, 2 g (60 wt % Se and 40 wt % carbon skeleton) were weighed into a ball-mill jar. The jar was then closed and milled in a double planetary mill for 40 minutes. The milled mixture was then dried under vacuum at 80° C. overnight and then transferred into an autoclave in an argon glovebox with a tight lid. Then the autoclave was transferred into a heating furnace for heating to a temperature set at 230° C. for 24 hours. The resulting sample is the immobilized chalcogen, in this case, immobilized selenium. The sample was analyzed for oxygen content of 2.6 wt %.

Example 17

Immobilization of Selenium with a Carbon Skeleton Comprising Deactivating Chemical Functional Group Comprising Oxygen (Oxygen Content About 12 wt %)

Following a similar procedure described in Example 16, immobilized chalcogen, in this case immobilized selenium, was prepared with carbon skeleton (50 wt % Se powder (2 g) and 50 wt % carbon skeleton) produced continuously in the rotary kiln described in Example 15, with 2 grams of a carbon skeleton having an oxygen content 12%. The immobilized selenium was analyzed three months after its preparation to have an oxygen content of 4.8 wt %.

Examples 16 and 17 demonstrate that the immobilized chalcogen, in this case, immobilized selenium comprises chalcogen, carbon, and oxygen.

Example 18

Figure 21:
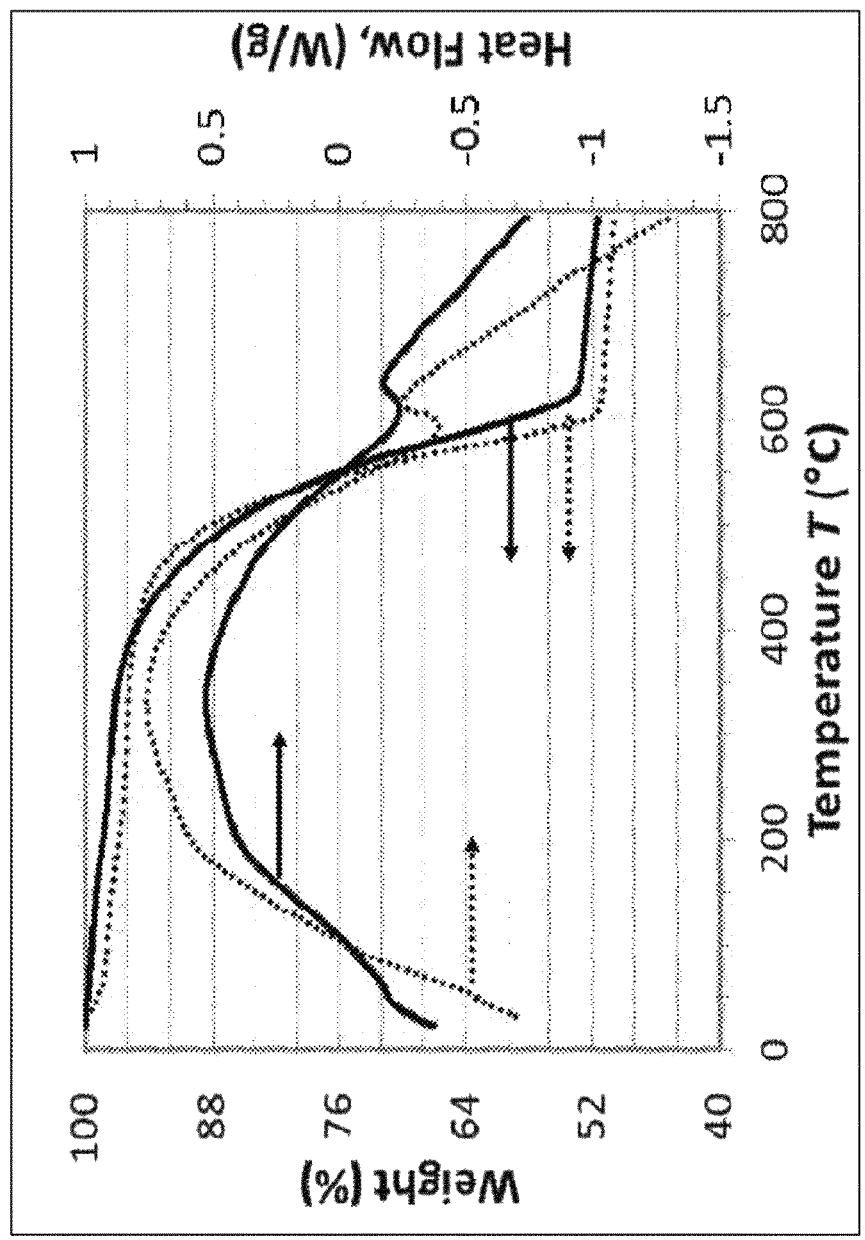
FIG. 21 shows TGA and DSC graphs of immobilized selenium sample C—Se478 (dotted lines) analyzed 4 months after its preparation and immobilized selenium sample C—Se100 (solid lines) analyzed 28 months after its preparation.

Stability of Immobilized Chalcogen, In This Case, Immobilized Selenium, Under Ambient Environments Following a similar procedure described in Examples 16 and 17, two immobilized selenium samples were prepared separately about two years apart, i.e., the second immobilized selenium sample (dashed line) was prepared about two years after the first (solid line). These immobilized selenium samples were analyzed via TGA-DSC, as shown in FIG. 21, showing that there is no aging effect on the TGA-DSC behaviors of the two samples after aging the samples under ambient conditions for more than two years and about four months, respectively, particularly focusing in the temperature between 200° C. and 250° C., for the two samples.

Comparative Example 3

Preparation of Carbon-Se Composites with Selenium and Commercial Carbons with Oxygen Content Less than 2% (e.g., Elite C and Maxsorb MSP20X)

Following a similar procedure described in Examples 16 and 17 using the commercially-available carbon Elite C, having an oxygen content of 1.19 wt %, C—Se composites with a Se content at 50 wt %, 55 wt %, 60 wt %, 65 wt %, and 70 wt % were prepared and stored in an ambient environment, e.g., ambient air at room temperature, pressure, and humidity. About 26-27 months later, these C—Se composite samples were analyzed for their TGA-DSC behaviors in a stream of argon. TGA-DSC results for 50 wt % Se, 60 wt % Se, and 70 wt % Se are shown in FIG. 22A (TGA) and FIG. 22B (DSC). As can be seen in FIGS. 22A and 22B, there is a substantial weight loss between 200-250° C. in the TGA analysis (FIG. 22A) after about two years aging in the ambient environment; the temperatures associated with the weight loss correspond to an exothermal peak in DSC (FIG. 22B). The level of weight loss correlates well with the intensity of the exothermal peak. The higher the weight loss at 200-250° C. is, the higher the exothermal peak in this temperature region is. It is also noted that the higher the carbon content is for the Elite C—Se composite, (or the lower the selenium content is for Elite C—Se), the higher is the degree of the exothermal weight loss between 200-250° C. This suggests that the carbon is somehow attacked by the environment.

About 26 months after its preparation, the Elite C—Se composite with 65 wt % Se was analyzed to have oxygen content about 24 wt %. This suggests that Elite C—Se composites are not stable under ambient conditions, somehow oxygen or moisture in the environment attacks the carbon in the presence of selenium in the Elite C—Se composites. The activated carbon of Elite C has low oxygen content, which may be the key, since it may not be stabilized by the presence of deactivating chemical functional group comprising oxygen (due to its low oxygen content).

In another example, another commercial activated carbon, Maxsorb MSP20X, analyzed to have oxygen content 1.33 wt %, was used to prepare first and second C—Se composites with the first C—Se composite having a Se content of 65 wt % Se and with the second C—Se composite having a Se content of 60 wt % Se. The second C—Se composite was prepared about 17 months after the first C—Se composite. Both of these samples were analyzed in TGA-DSC about the time the second C—Se composite was prepared for the purposes of studying environment aging stability of these composites that were made with commercial carbon materials. It was discovered that the first C—Se composite had an exothermal weight loss at temperatures between 200-250° C., with an exothermal weight loss (about 5% weight loss), very similar to the thermal behaviors of the above described Elite C—Se composites. It was also discovered that the first C—Se composition made with Maxsorb MSP20X had an oxygen content as high as 14 wt % after approximately 17-18 months of aging under ambient environmental conditions. The first C—Se composite was also oxidized by the environmental oxygen, confirming the discoveries made with C—Se composites made with Elite C activated carbon described above.

From the examples of Elite C—Se composites and Maxsorb-Se composites, it is believed that both of these carbons have low oxygen content, while the carbon skeleton materials from the above-described examples have significantly higher oxygen content. As best understood, the stability of immobilization of chalcogen may be strongly impacted by the presence of deactivating chemical group comprising oxygen.

Comparative Example 4

Preparations of Carbon-SeS$_2$ Composites with SeS$_2$ (Selenium Disulfide) and Multi-Walled Carbon Nanotube Materials, as Described in Ali Abouimrane et al, *J. Am. Chem. Soc.* 2012, 134-4505-4508

In their work, Abouimrane et al prepared C—SeS$_2$ composites by using multi-walled carbon nanotube (MWCNT) materials and SeS$_2$ at 160° C. for 12 hours in air with 70 wt % SeS$_2$ loading (30 wt % MWCNT). There are two MWCNT materials, namely MWCNT-1 and MWCNT-5

Following a similar procedure described in comparative example 3, examples of MWCNT-1 and MWCNT-5 materials were weighed 1.2 g and placed into separate milling jars, followed by adding 2.8 g SeS$_2$ separately to each jar, with SeS$_2$ loading targeted at 70 wt % (30 wt % of MWCNT). The mixtures were ball-milled for 15 minutes and separated from the milling jars. The samples were then placed into two separate crucibles, set inside a conventional heating oven at 160° C. for 12 hours in air, resulting in MWCNT-1_SeS$_2$ (70 wt %) and MWCNT-5_SeS$_2$ (70 wt %).

The MWCNT-5 material was also used to make a C—SeS$_2$ composite with a loading target of 38 wt % SeS$_2$ (62 wt % MWCNT-5), in the same way that immobilized chalcogen materials were prepared in accordance with Example 19 (described hereinafter). In this example, 2.48 gram MWCNT-5 was weighed into a milling jar along with 1.52 g SeS$_2$ powders, followed by ball-milling for 40 minutes. The milled mixture was then separated, pelletized, and placed inside a glass tubular reactor with a diameter of ~1 inch. The mixture was dried in-situ with a flow of argon at about 600 mL/min for 3 hours. Thereafter, with the argon flowing, the reactor was heated at a rate of 10° C./min to a temperature of 130° C., and the temperature was held there for 1.5 hours. The prepared C—SeS$_2$ composite sample was then cooled to room temperature and identified as MWCNT-5-_SeS$_2$, a C—SeS$_2$ composite made with MWCNT-5.

Comparative Example 5

Autoclaving Raw Material Selenium Powders, Raw Material Sulfur Powders, and Ball-Mill-Produced Mixtures of Selenium and Sulfur According to the Following Table 5 Without the Presence of Carbon Skeleton Comprising Deactivating Chemical Functional Group Comprising Oxygen

TABLE 5

| Sample ID | 258-50-1 | 258-50-2 | 258-50-3 | 258-50-4 | 251-70-2 | 258-46-1 | 258-46-2 | 258-46-3 | 258-46-4 |
|---|---|---|---|---|---|---|---|---|---|
| Active wt % | 62% | 55% | 50% | 42% | 38% | 36% | 32% | 28% | 26% |
| S wt % in Active | 0% | 8.5% | 17% | 34% | 45%* | 51% | 68% | 85% | 100% |
| Se wt % in Active | 100% | 91.5% | 83% | 66% | 55% | 49% | 32% | 15% | 0% |
| Carbon (Example 15), g | 3.80 | 4.47 | 5.00 | 5.81 | 6.20 | 6.39 | 6.84 | 7.18 | 7.43 |
| Sulfur, g | 0 | 0.47 | 0.85 | 1.42 | | 1.84 | 2.15 | 2.40 | 2.57 |
| Selenium, g | 6.20 | 5.06 | 4.15 | 2.77 | | 1.77 | 1.01 | 0.42 | 0 |
| SeS$_2$ | | | | | 3.80 | | | | |
| Total, g | 10 | 10 | 10 | 10 | 10 | 10 | 10 | 10 | 10 |
| Specific Capacity mAh/g | 418 | 419 | 420 | 421 | 422 | 422 | 422 | 423 | 423 |
| Temp, ° C. | 230 | 130 | 130 | 130 | 130 | 130 | 130 | 130 | 130 |

*SeS$_2$: 55 wt % Se and 45 wt % S

Table 5 shows a number of immobilized chalcogens (10 g each) listed by Sample ID prepared with the listed amounts of Se, S, SeS$_2$, and carbon skeleton with a relatively constant specific capacity (418-423 mAh/g) at a temperature of 230° C. for 100% Se sample and 130° C. for the rest of the samples.

To better illustrate the immobilization of chalcogen, the same mixtures as comparative example 4 were prepared without the carbon skeleton as control examples, according to Table 5, without the presence of carbon skeleton. The corresponding amounts of selenium and sulfur were weighed into a milling jar, followed by 40 minutes ball-milling in a double-planetary ball mill. Each milled mixture was separated from the milling beads and transferred into a separate ceramic crucible. A group of these selenium/sulfur mixtures and the starting raw materials (selenium powders and sulfur powders) in their corresponding crucibles were then placed inside an autoclave in an argon glovebox. Then the autoclave was transferred into a heating oven and the oven was heated to 130° C., and held at 130° C. for 24 hours. The corresponding samples were unloaded in ambient air at ambient temperature and placed into sample vials with corresponding labels.

In these contained examples, it was observed that the selenium powders seemed to grow in grain size, which is understandable since the melting point of selenium is 220° C. Therefore, selenium powders should not melt, but may experience grain growth during heating (Ostwald ripening phenomenon). It was also noted that both mixture of 8.5 wt % sulfur and 91.5 wt % selenium and that of 17 wt % sulfur and 83 wt % selenium did not melt at 130° C., but with some grain growth at this temperature. The mixtures of S—Se with sulfur contents of 34 wt %, 51 wt %, 68 wt %, and 85 wt %, and with the remainder Selenium, all melted at 130° C. Of cause, sulfur powders also melted at 130° C.

Figure 23:
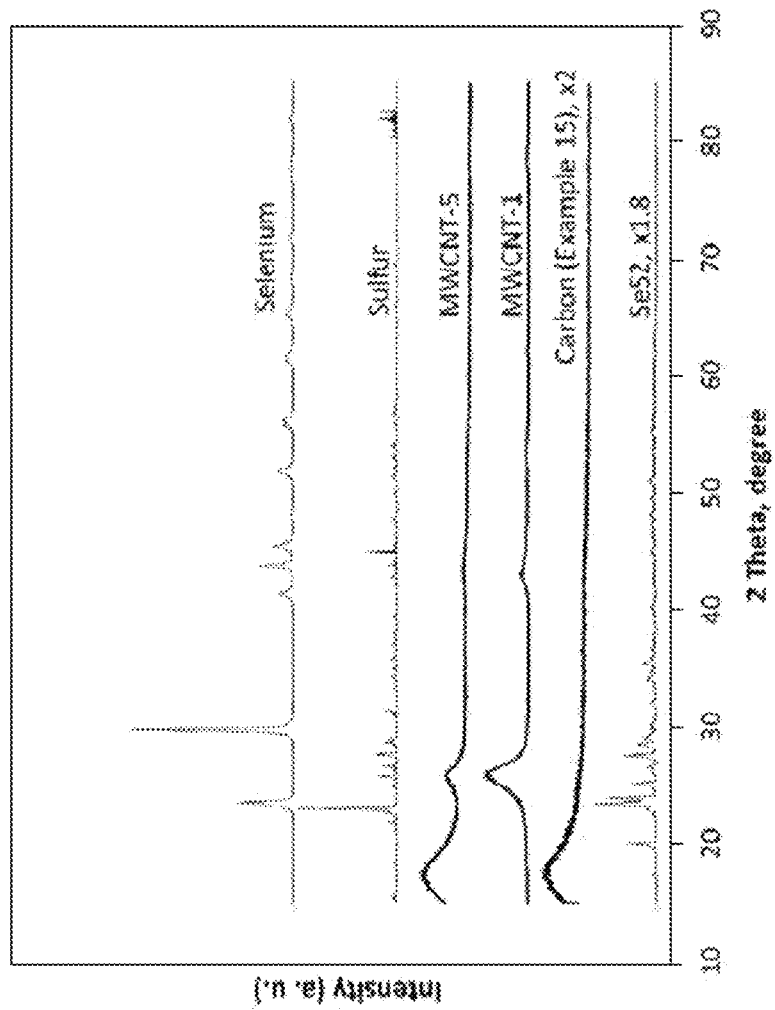
FIG. 23 shows X-Ray Diffraction (XRD) patterns for starting materials Se, S, SeS$_2$, and Carbons, including Multi-Walled Carbon Nanotubes (MWCNT), and carbon skeleton comprising deactivating chemical function group comprising oxygen.

FIG. 23 shows X-Ray diffraction patterns for the starting materials and selenium powders, sulfur powders, and SeS$_2$ powders are all crystalline materials.

Figure 24A:
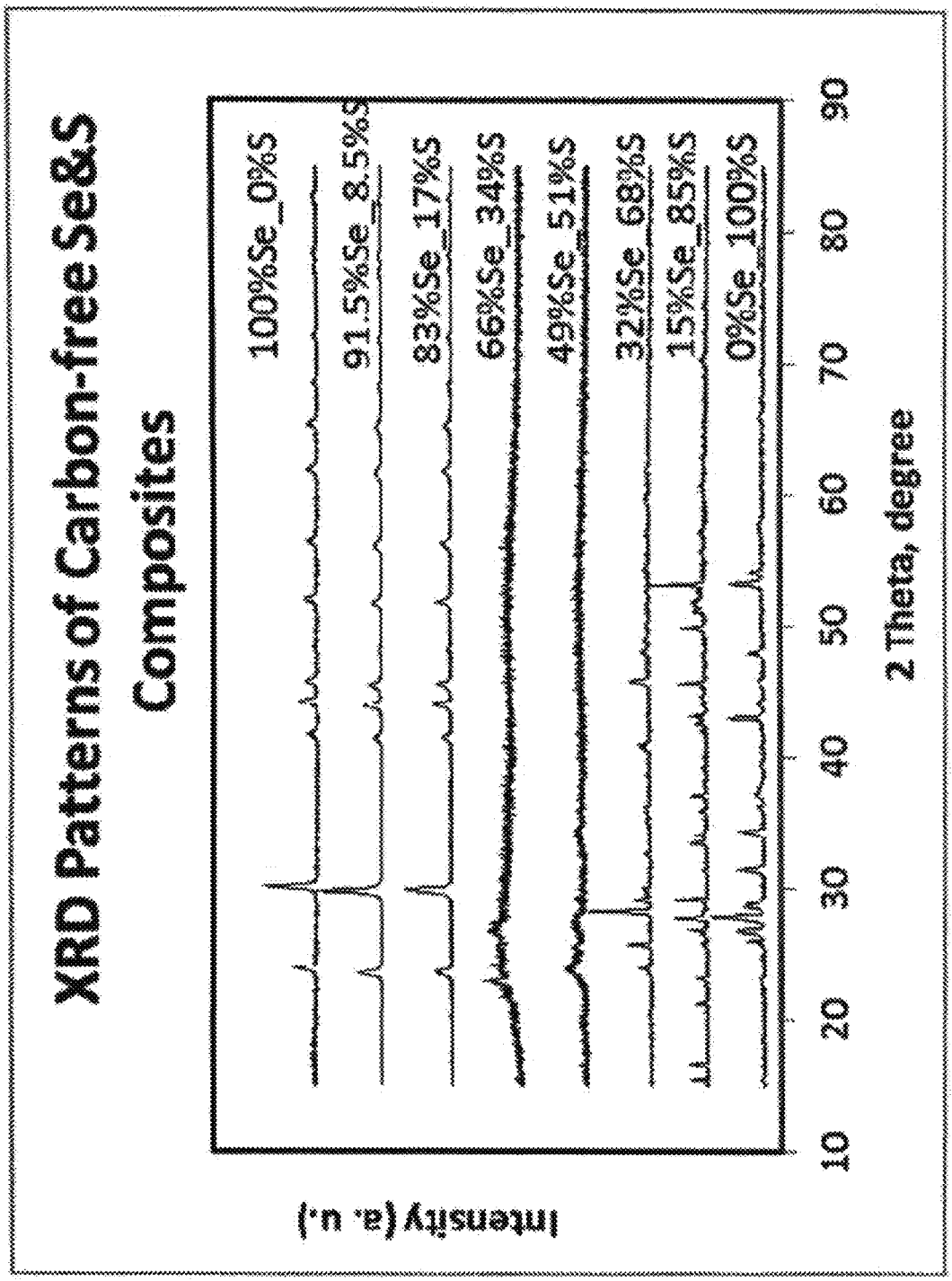
FIGS. 24A-24C show XRD patterns for autoclaved mixtures of sulfur and selenium (FIG. 24A), sulfur powders (FIG. 24B), and selenium powders (FIG. 24C), all without the presence of carbon skeleton comprising deactivating chemical functional group comprising oxygen.
Figure 24B:
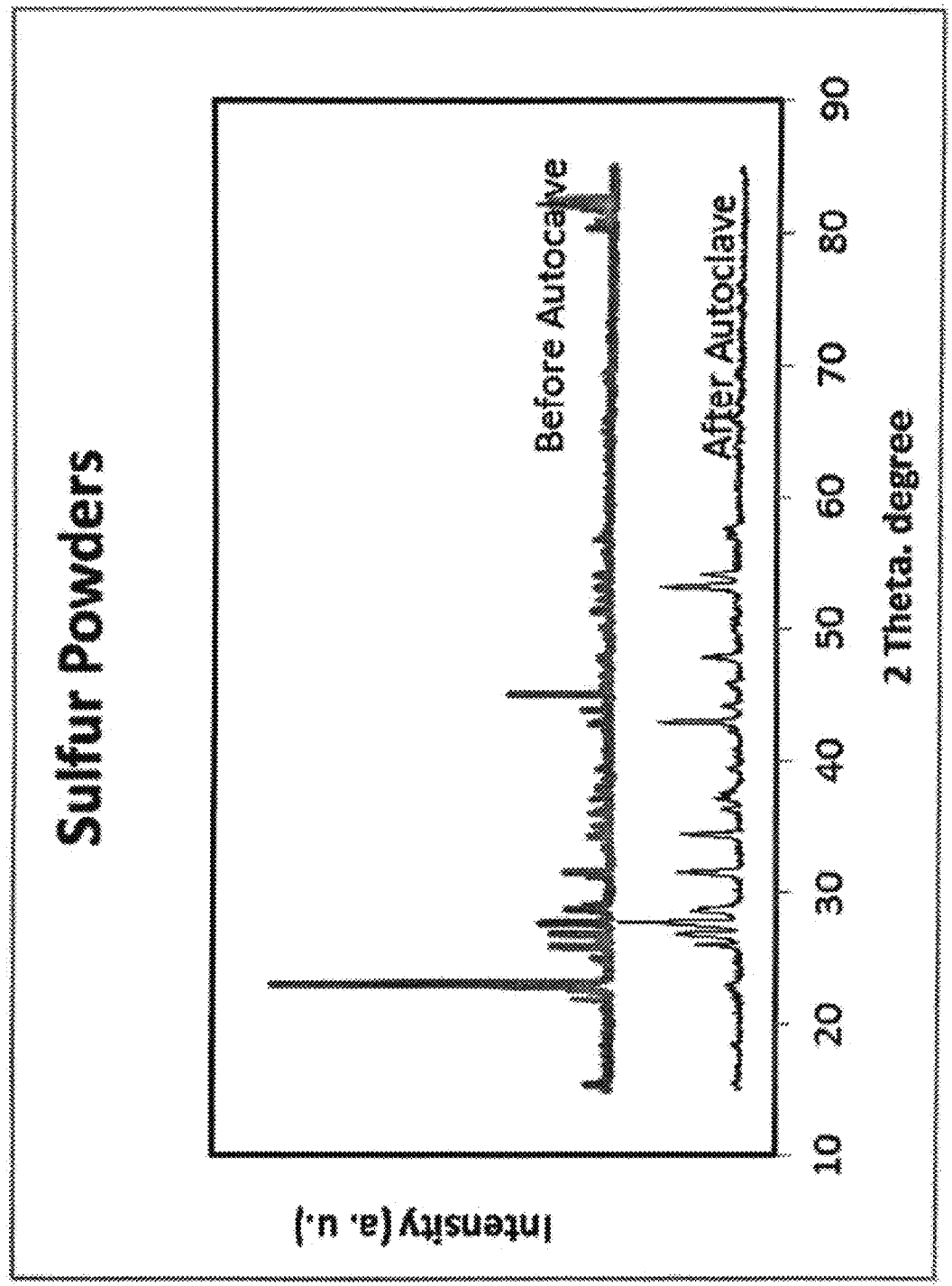
Figure 24C:
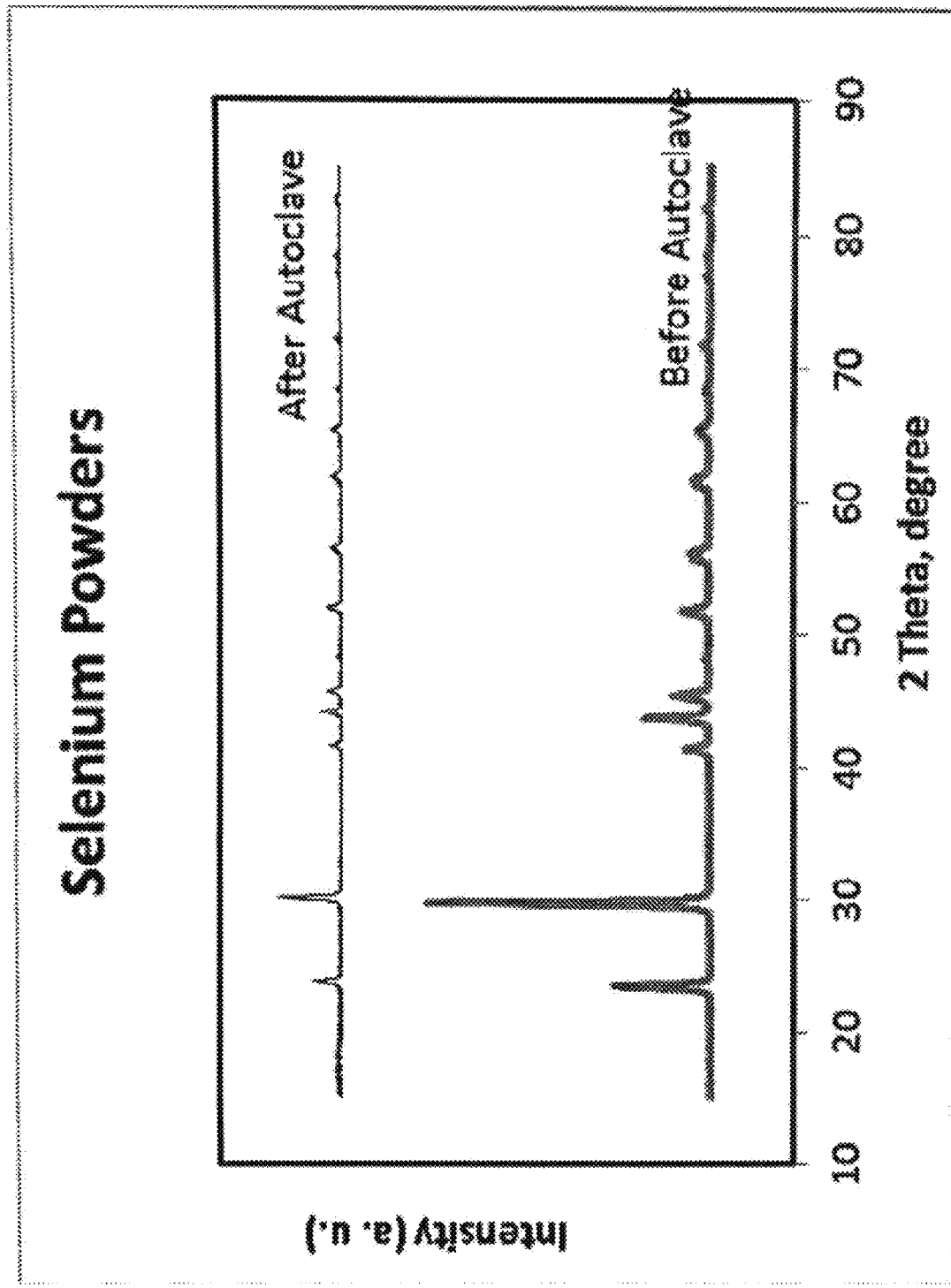

FIGS. 24A-24C are X-Ray diffraction (XRD) patterns for 130° C.-autoclaved mixtures of sulfur and selenium (FIG. 24A), sulfur powders (FIG. 24B), and selenium powders (FIG. 24C), all without the presence of carbon skeleton comprising deactivating chemical functional group comprising oxygen. FIGS. 24B-24C show that the 130° C.-autoclaved selenium and sulfur powders are still in crystalline forms, though sulfur may have changed from one phase to another phase. FIG. 24A shows that the autoclaved sulfur/selenium mixtures thereof are crystalline, though the autoclaved mixtures of 34 wt % sulfur and 51 wt % sulfur are less crystalline, possibly resembling the selenium disulfide's XRD patterns in FIG. 23.

Figure 25A:
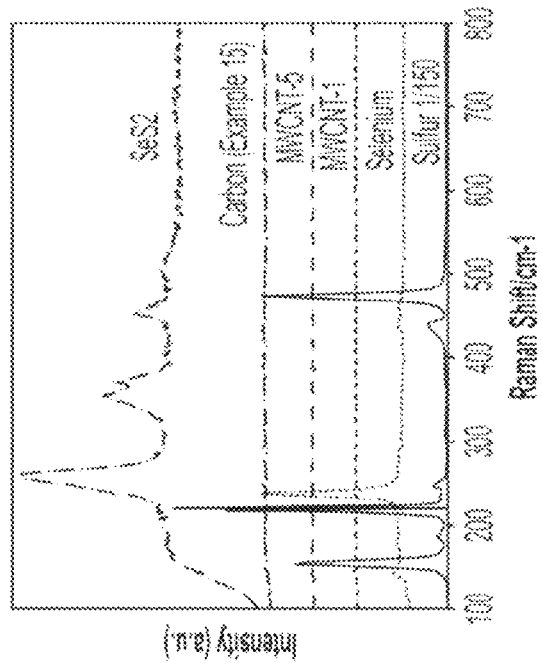
FIG. 25A shows Raman scattering spectra for starting materials Se, S, SeS$_2$, Carbons (Example 15), and Multi-Walled Carbon Nanotube Materials between 0-4000 cm$^{-1}$, wherein the Raman spectrum for sulfur is divided by 150.
Figure 25B:
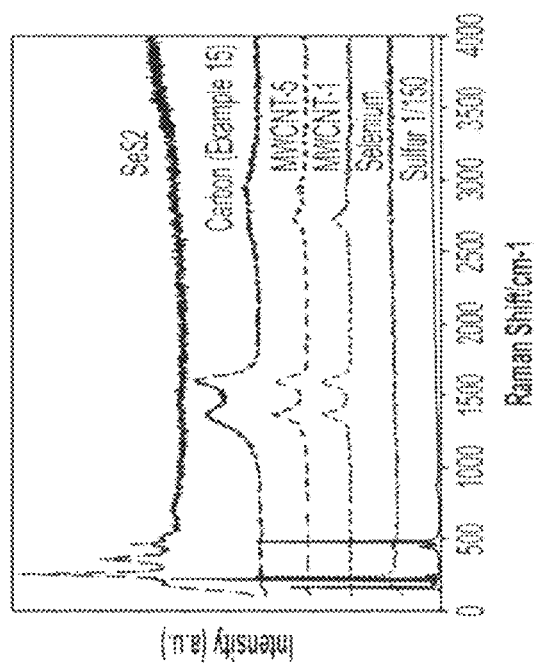
FIG. 25B is an isolated, enlarged view of the Raman scattering spectra of FIG. 25A between 100 and 800 cm$^{-1}$.

FIGS. 25A-25B show Raman scattering spectra for the starting materials and selenium powders, sulfur powders, and SeS$_2$ powders are all Raman scattering active, demonstrating the presence of Se—Se bond (237 cm$^{-1}$), S—S bond (154 cm$^{-1}$, 217 cm$^{-1}$, 221 cm$^{-1}$, and 473 cm$^{-1}$), and Se—S bond (255 cm$^{-1}$, 353 cm$^{-1}$, and 454 cm$^{-1}$) in these starting material.

Figure 26A:
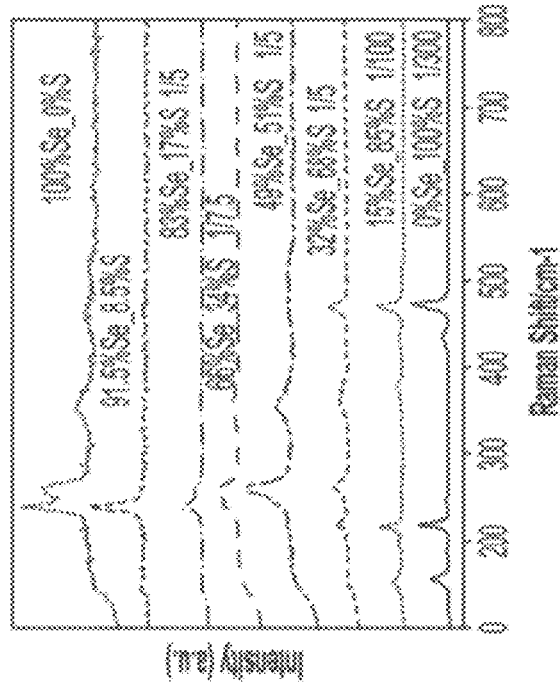
FIG. 26A shows Raman scattering spectra for autoclaved selenium, sulfur, and their mixtures without the presence of carbon skeleton comprising deactivating chemical functional group comprising oxygen (wherein some of Raman spectra are divided (1/X) as shown in the figure) between 0-4000 cm$^{-1}$.
Figure 26B:
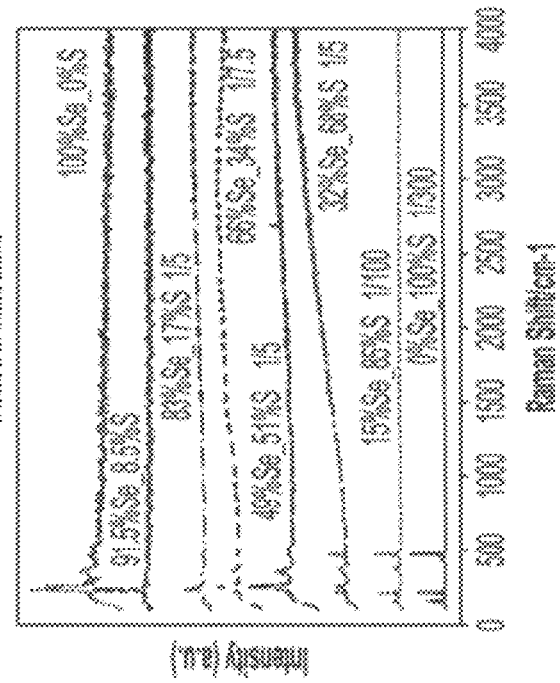
FIG. 26B is an isolated, enlarged view of the Raman scattering spectra of FIG. 26A between 100 and 800 cm$^{-1}$.

FIGS. 26A and 26B show Raman scattering spectra for the 130° C.-autoclaved selenium, sulfur, and mixtures of selenium and sulfur. These figures suggest the existence of Se—Se bond at 237 cm$^{-1}$ from pure selenium down to a mixture of 66% selenium; they also suggest that the existence of S—S bond from pure sulfur down to a mixture of 68% sulfur. These results suggest that there can be reaction of sulfur and selenium, forming selenium disulfide for those mixtures between 83% selenium and 32% selenium, or between 68% sulfur and 17% sulfur.

Example 19

Immobilization of Chalcogen Comprising Selenium, Selenium and Sulfur, SeS$_2$, or Sulfur with a Carbon Skeleton Comprising Deactivating Functional Group Comprising Oxygen (Oxygen Content Between 12-14%)

A number of samples of immobilized selenium, immobilized sulfur, immobilized SeS$_2$, and immobilized mixture of Se and sulfur were prepared according to the following procedures and the formulations listed in Table 5—targeting an almost constant specific capacity for the immobilized chalcogen that is used in a re-chargeable battery, namely, a specific capacity between 418 mAh/g for pure selenium-based immobilized chalcogen and 423 mAh/g for pure sulfur-based immobilized chalcogen. The carbon skeleton for this example was produced in a continuous process in a rotary kiln, described in Example 15 for preparing the immobilized chalcogen. It should be noted that this carbon skeleton comprised higher amounts of deactivating chemical functional group comprising oxygen (12-14%).

The amounts of carbon plus selenium, $SeS_2$, and/or sulfur were separately weighed and each was added into its own ball-mill jar in which there were milling beads. Then each sample of carbon plus selenium, $SeS_2$, and/or sulfur was then milled in a double planetary mill for 40 minutes. Each milled mixture was then separated from the milling beads, and pressed into pellets (which is optional; pellets were often broken). Then said mixture was transferred into the same glass reactor that was described in the second part of the comparative example 4. Then a stream of argon (~600 mL/min) gas was flowed through the mixture in the glass reactor for 3 hours to remove any physically absorbed water. The glass reactor was then heated at a heating rate of 10° C./min to 130° C. and the temperature was held at 130° C. for 1.5 hours while the argon gas flowed without interruption. After cooling down, the reacted mixture is the immobilized chalcogen. The detailed compositions of these immobilized chalcogen are identified in Table 5 above. In Table 5, sample 258-70-2 is immobilized $SeS2$ including 45% Sulfur, which can directly compare to the C—$SeS_2$ composites that were prepared with multi-walled carbon nanotubes, as described in comparative example 4.

Figure 27:
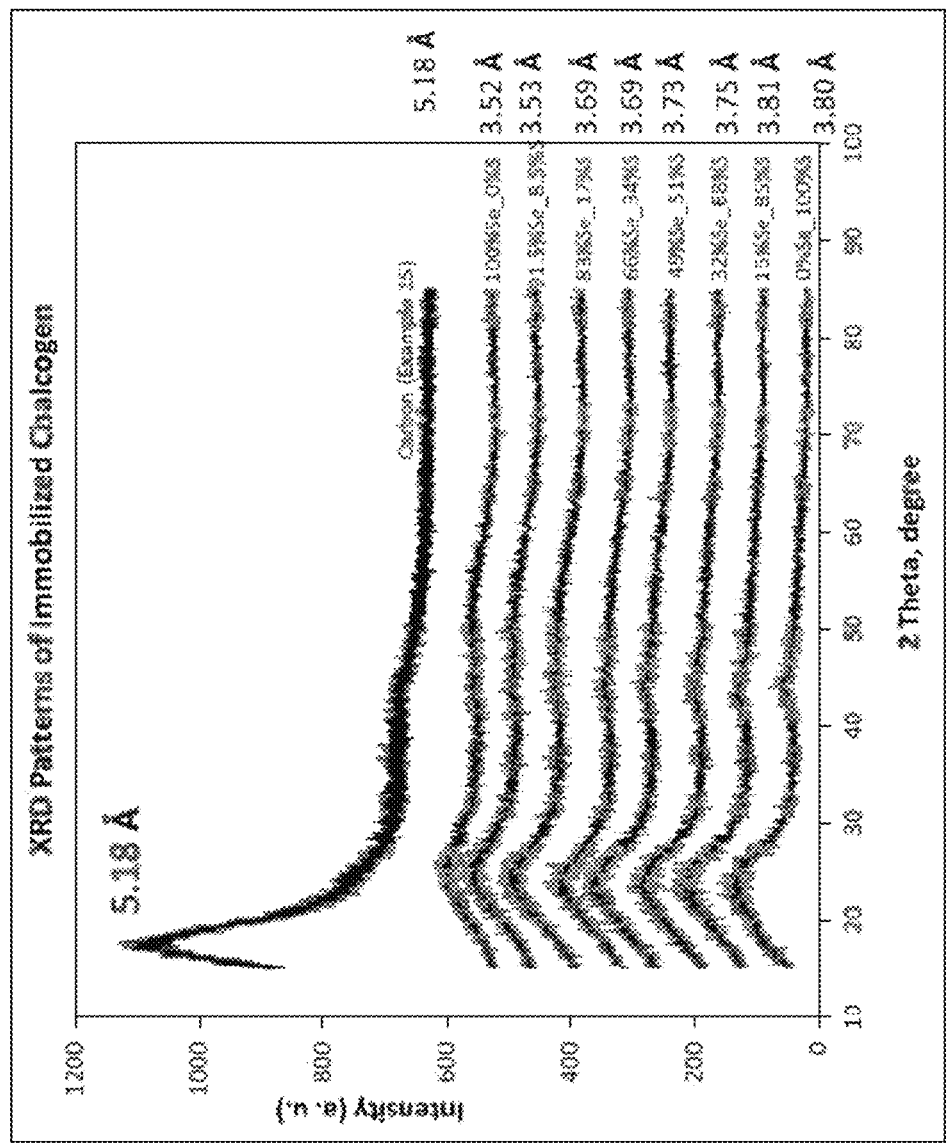
FIG. 27 shows XRD patterns for immobilized chalcogen comprising a carbon skeleton comprising deactivating chemical functional group comprising oxygen for different percent combinations of selenium and sulfur, along with an XRD pattern for a carbon skeleton for comparison.

FIG. 27 shows X-ray diffraction patterns for samples of immobilized chalcogen shown in Table 5 prepared from a carbon skeleton(s) comprising deactivating chemical functional group comprising oxygen and elemental selenium, elemental sulfur, or the combination of elemental selenium and elemental sulfur. Sample 251-70-2 in Table 5 is not represented in FIG. 27. The results show the absence of crystalline chalcogen, strongly suggesting that selenium or sulfur atoms may no longer be arranged in an ordered manner, e.g., ordered in a crystalline manner. In contrast, in this comparative example 5, 130° C.-autoclaved selenium, sulfur, or its mixtures are still substantially in a crystalline form. This surprising results suggests that the chemical bonding between Se—Se, S—S, or Se—S may have been changed. The chalcogen molecules with multi-atoms chaining together in cyclic forms may not be present in the immobilized chalcogen system.

FIG. 27 also shows the d-spacing contraction of samples of the immobilized chalcogen in Table 5. Carbon skeleton has EMAC π-bonding system along the carbon plane; an individual carbon plane may also be considered a single-walled graphene sheet. When planes of EMAC π-bonding system are stacked on the top each other, there exists a d-spacing, as shown in FIG. 20F. The XRD results of FIG. 27 for the carbon skeleton shows a diffraction peak at a 2 theta of about 17.1°, which corresponds to a d-spacing about 5.18 Å. After chalcogen is immobilized inside the carbon skeleton, the lone pair electrons of chalcogen may be donated to a carbocation centers on the EMAC π-bonding system of the carbon skeleton, forming an electron donor-acceptor bond, or a coordination bond between chalcogen and carbon skeleton. If such a type of donor-acceptor bonding is strong, the immobilized chalcogen may pull planes of the EMAC π-bonding system closer.

The stronger the bond is, the closer the distance between planes of the EMAC π-bonding system is. As discussed earlier, selenium may be more capable of donating its lone electrons to the carbo-cation center of the EMAC π-bonding system than sulfur. Therefore, immobilized selenium would have more d-spacing contraction than immobilized sulfur. It was surprising to discover that the 2 theta of the XRD peak for immobilized selenium (100 wt % Selenium) increased from 17.1° C. to about 25.3°, contracting the d-spacing from about 5.18 Å of the carbon skeleton to about 3.52 Å, a d-spacing contraction of about 1.64 Å; the 2 theta of the XRD peak for immobilized sulfur (100% Sulfur) increased from 17.1° to 23.4°, contracting the d-spacing from about 5.18 Å to about 3.80 Å, a d-spacing contraction of about 1.38 Å. As can be understood from the foregoing, with the increase in selenium percentage, the d-spacing contraction increases from 1.38 Å to 1.64 Å. Besides the d-spacing contractions, the immobilization of chalcogen may further disorder the carbon skeleton, showing a broader XRD peak. The reduced XRD intensity may be due to the carbon skeleton being diluted by the presence of chalcogen in an immobilized chalcogen system.

TABLE 6

| | Chalcogen (Z), wt % | Se, wt % of Z | S, wt % of Z | D-Band, cm−1 | G-Band, cm−1 | D-Band Shift, cm−1 | G-Band Shift, cm−1 | d-spacing, Å | $Ea_{@15\%WtLoss}$ kJ/mole | Log $A_{@15\%WtLoss}$ (1/min) |
|---|---|---|---|---|---|---|---|---|---|---|
| MWCNT-1 | | | | 1358.9 | 1588.4 | | | 3.44 | | |
| MWCNT-1-$SeS_2$ (70 wt %) Comparative Example 4 | 70 | 55 | 45 | 1360.7 | 1588.2 | 1.8 | −0.2 | 3.40 | 79.1 | 5.83 |
| MWCNT-5 | | | | 1360.4 | 1591.6 | | | 5.21 & 3.51 | | |
| MWCNT-5-$SeS_2$ (70 wt %) Comparative Example 4 | 70 | 55 | 45 | 1361.1 | 1589.9 | 0.7 | −1.7 | 5.06 & 3.49 | 85.6 | 6.42 |
| MWCNT-5-$SeS_2$ (38 wt %) Comparative Example 4 | 38 | 55 | 45 | 1360.9 | 1590.4 | −0.2 | −1.2 | 4.82 & 3.49 | 78.3 | 5.50 |
| Carbon (Example 15) | | | | 1370.2 | 1590.4 | | | 5.18 | | |

TABLE 6-continued

|  | Chalcogen (Z), wt % | Se, wt % of Z | S, wt % of Z | D-Band, cm − 1 | G-Band, cm − 1 | D-Band Shift, cm − 1 | G-Band Shift, cm − 1 | d-spacing, Å | $Ea_{@15\%WtLoss}$ kJ/mole | Log $A_{@15\%WtLoss}$ (1/min) |
|---|---|---|---|---|---|---|---|---|---|---|
| Immobilized Chalcogen | 62 | 100 |  | 1383.0 | 1588.5 | 12.8 | −1.9 | 3.52 | 144.8 | 8.25 |
|  | 55 | 91.5 | 8.5 | 1381.5 | 1594.4 | 11.3 | 4.0 | 3.53 | 142.4 | 8.52 |
|  | 50 | 83 | 17 | 1381.8 | 1591.8 | 11.5 | 1.4 | 3.69 | 137.3 | 8.63 |
|  | 42 | 66 | 34 | 1379.3 | 1591.8 | 9.1 | 1.4 | 3.69 | 138.3 | 8.81 |
|  | 38 (SeS$_2$) | 55 | 45 | 1375.9 | 1593.1 | 5.7 | 2.7 | 3.75 | 140.0 | 9.17 |
|  | 36 | 49 | 51 | 1378.3 | 1594.1 | 8.1 | 3.8 | 3.73 | 139.6 | 9.11 |
|  | 32 | 32 | 68 | 1379.6 | 1595.0 | 9.4 | 4.6 | 3.75 | 139.4 | 9.29 |
|  | 28 | 15 | 85 | 1380.0 | 1595.1 | 9.8 | 4.8 | 3.81 | 141.4 | 9.74 |
|  | 26 |  | 100 | 1375.0 | 1593.2 | 4.7 | 2.9 | 3.80 | 144.9 | 10.2 |

Table 6 shows D-Band and G-Band's Raman Scattering Locations and Their Shifts, Activation Energy, Log A, and d-Spacing for Immobilized Chalcogen and Control C-Chalcogen Composites Prepared with MWCNT Materials.

Figure 28:
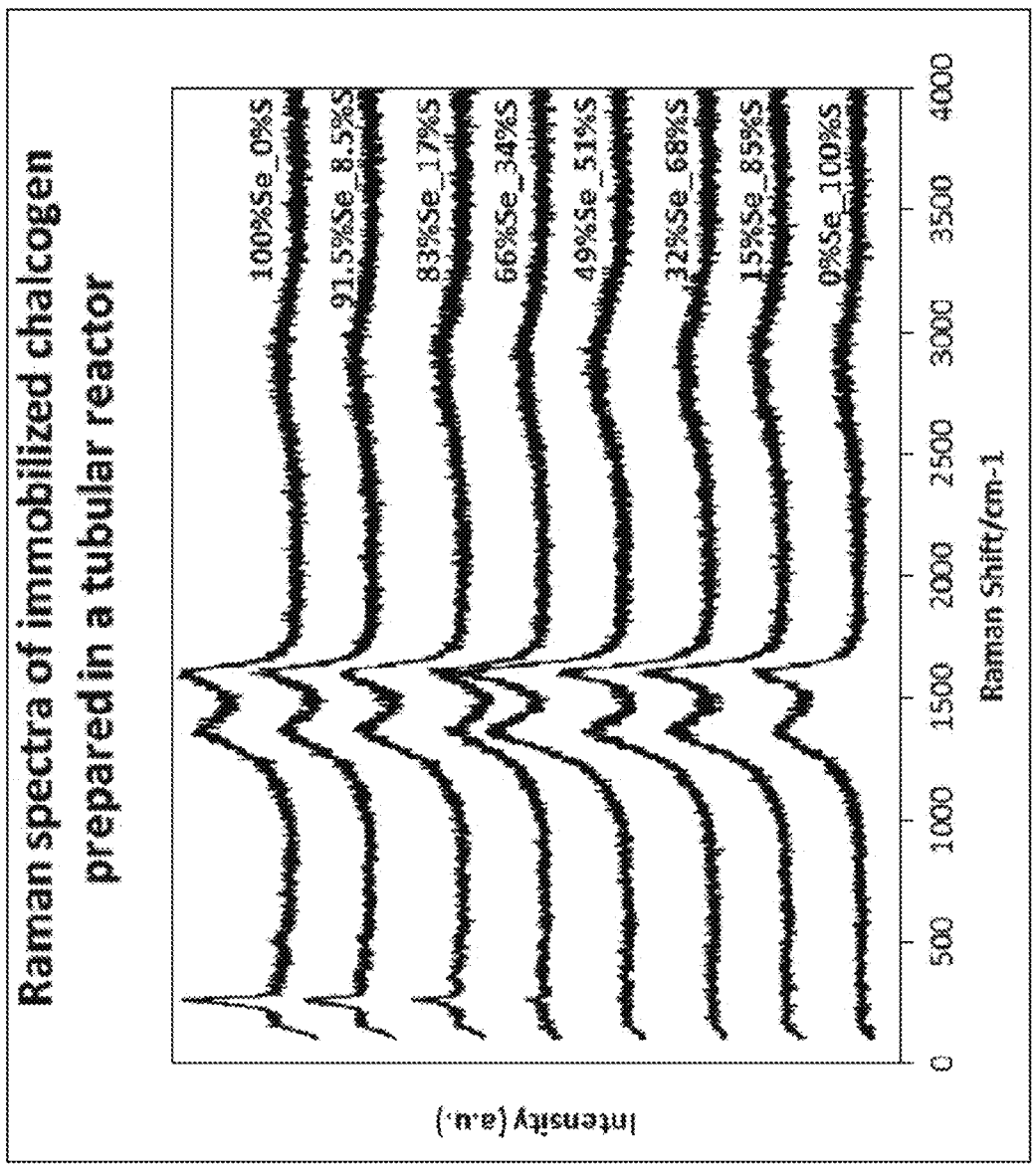
FIG. 28 shows Raman scattering spectra for immobilized chalcogen comprising a carbon skeleton comprising deactivating chemical functional group comprising oxygen for different percent combinations of selenium and sulfur.

FIG. 28 shows Raman scattering spectra for samples of the immobilized chalcogen of Table 5 that were prepared with a carbon skeleton comprising deactivating chemical functional group comprising oxygen. Sample 251-70-2 in Table 5 is not represented in FIG. 28. Chalcogen donates lone pair electrons to a carbo-cation center on the EMAC π-bonding system of a carbon skeleton comprising deactivating chemical functional group comprising oxygen. The donor-acceptor bonding strengthens the C=C bond in the EMAC π-bonding system of the carbon skeleton. It was surprising to discover the Raman scattering peaks of the C=C bonds increased for both D-band and G-band—direct evidence of the strengthening of C=C bond. The Raman peaks of FIG. 28 were determined via curve fitting and as listed in Table 6.

Selenium in the immobilized chalcogen seems to have more substantial wavenumber increase in D-band, ranging from 8.1 cm-1 to 12.8 cm$^{-1}$, than for pure sulfur (4.7 cm$^{-1}$), as shown in Table 6 above. In an example, sulfur in immobilized chalcogen seems to have more impact on the G-band shift to a higher wavenumbers, though the degree of G-band shift may be less than the degree of D-band shift, as shown in Table 6. In combination with the d-spacing contraction, the D-band Raman shift to higher wavenumber, and/or the G-band shift to a higher wavenumber, it appears that in an immobilized chalcogen (system or body), the chalcogen appears to donate its electrons to the EMAC of a carbon skeleton, strengthening the C=C bond, and pulling together the planes of the EMAC π-bonding system of the carbon skeleton. This type of donor-acceptor bonding system in immobilized chalcogen is desirable.

The electrons of chalcogen directly participate in the EMAC π-bonding system of a carbon skeleton, wherein the delocalized π-electrons are responsible for the electron conduction. This suggest(s) that the lone pair electrons of chalcogen directly participate in the electron conduction during an electrochemical process, such as a discharge process or a charge process of a battery, which overcomes the limitation of chalcogen in their electrical insulation properties, particularly for a light chalcogen like oxygen and sulfur.

It was surprising to discover that a battery comprising immobilized sulfur is able to charge and discharge at a high-C rate, as will be further discussed in connection with immobilized chalcogen being used as a cathode of a rechargeable battery. It is also advantageous that the lone pair electrons of chalcogen participate in electron conduction during a battery electrochemical process, which is not affected by the valence state of the chalcogen, either in its elemental state, or in a reduced state (−2). In addition, d-spacing contraction of the carbon skeleton in an immobilized chalcogen is also highly desirable, allowing electron flow more freely among the planes of the EMAC π-bonding system of a carbon skeleton.

FIG. 28 also shows the disappearance of Raman scattering peaks characteristic of sulfur-sulfur bond or selenium-sulfur bond, while the peak for selenium-selenium bonds at 237 cm-1 shifts to a higher wavenumber—about 258 cm$^{-1}$ (see FIG. 28, e.g., the plots for 100% Se-0%; 91.5% Se-8.5% S; and 83% Se-17% S). The redirection or disappearance of S—S and S—Se bonds suggest(s) that chemical interactions, such as donor-accepter bonding, or coordination bonding, may have been dissociated to an atomic form, or to a level that polysulfide ions are not able to form. It is believed that the Se-Se bond might have also been influenced so that polyselenide ions are not able to form.

Figure 29:
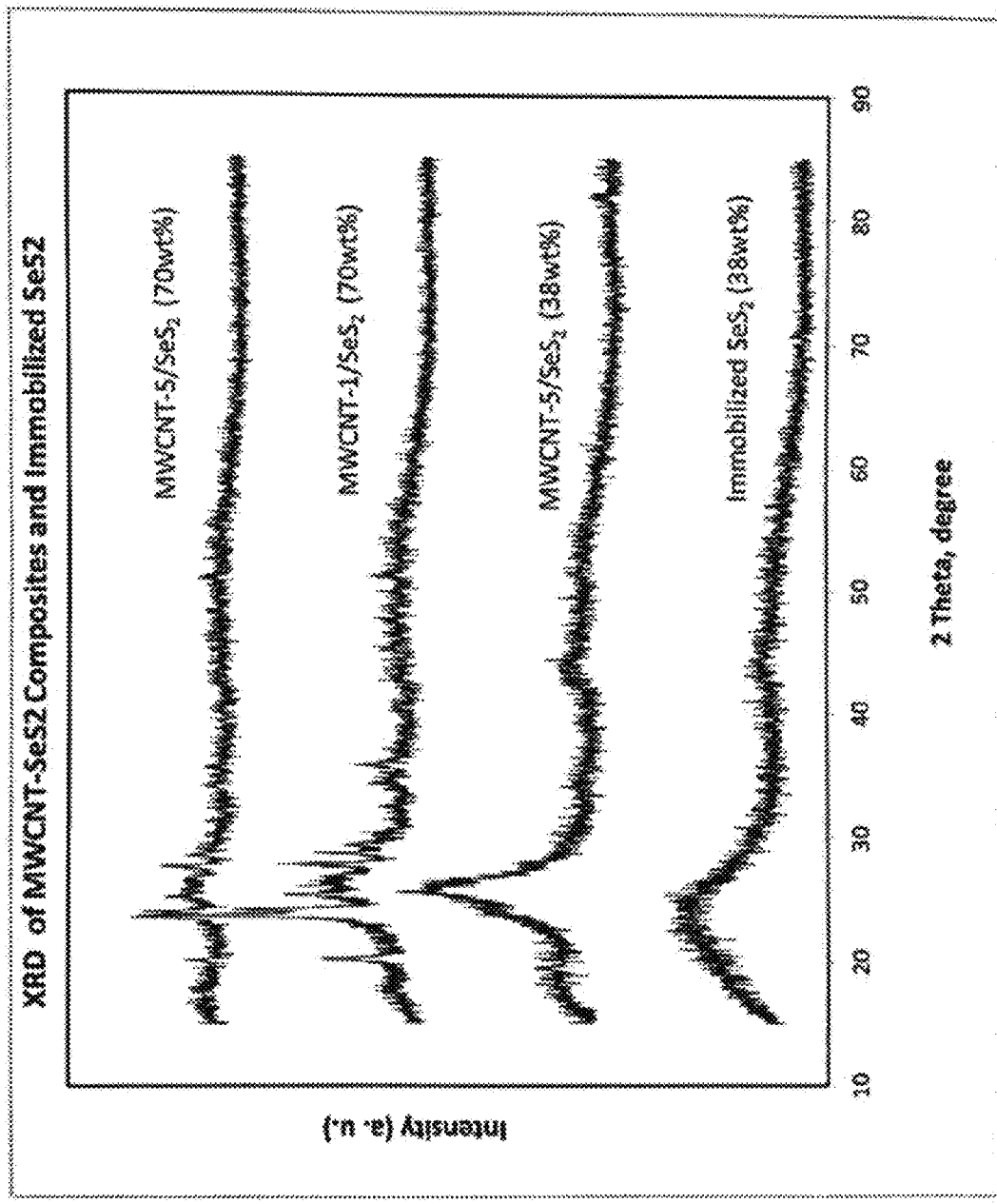
FIG. 29 shows XRD patterns for three MWCNT-SeS$_2$ composites (top three patterns) and an immobilized chalcogen (SeS$_2$—bottom pattern) each comprising a carbon skeleton comprising deactivating chemical functional group comprising oxygen, wherein the top two samples were prepared in air at 160° C. for 16 hours and the bottom two samples were prepared in flowing argon at 130° C. for 1.5 hours.

FIG. 29 shows XRD results for multi-walled carbon nanotube (MWCNT) and SeS$_2$ composites that were prepared in accordance with comparative example 4. By comparing the XRD results of FIG. 29 with the XRD results of FIG. 23, it can be seen that the XRD results for the starting materials of MWCNT (FIG. 23) show no significant d-spacing contraction for the three MWCNT samples, as shown in Table 6. However, in Table 6 (MWCNT-5 in Table 6 is for two samples having different d-spacing) the immobilized SeS$_2$ shows a d-spacing contraction from ~5.18 Å for the Example 15 carbon skeleton alone to ~3.75 Å for immobilized chalcogen having 55 wt % of Se and 45 wt % of S, a d-spacing contraction by about 1.43 Å, which agrees well with the immobilized chalcogen presented earlier. In addition, as shown in Table 6, there are still distinct XRD patterns that are characteristic of SeS$_2$ for the MWCNT-5-SeS$_2$ (70 wt %) and MWCNT-1-SeS$_2$ (70 wt %) that were made in air at 160° C. for 16 hours, and there are also traceable XRD pattern that may be related to the characteristics of SeS$_2$ for the sample MWCNT-5/SeS$_2$ (38 wt %) that was made in a flowing argon at 130° C. for 1.5 hours.

Figure 30:
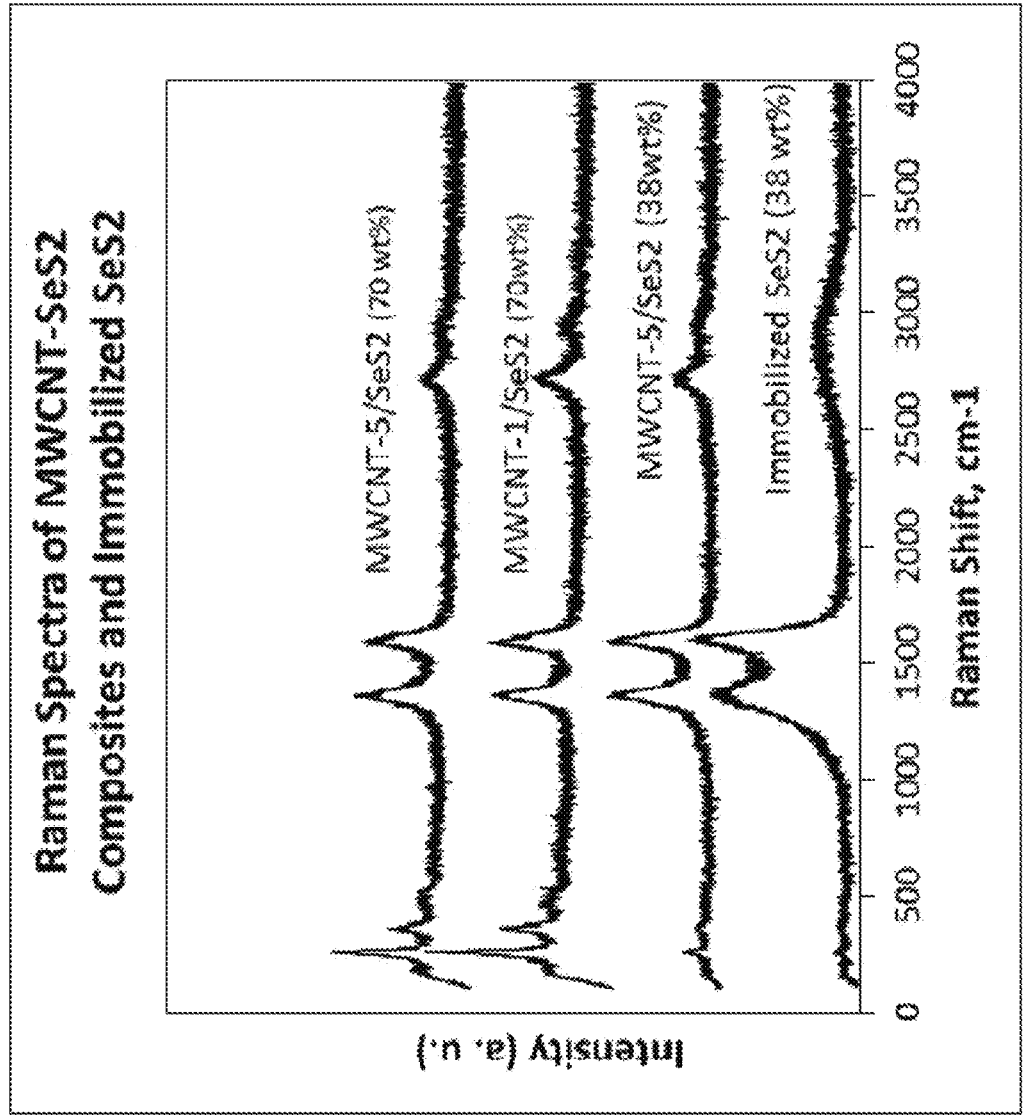
FIG. 30 shows Raman scattering spectra for three control MWCNT-SeS$_2$ composites (top three patterns) and immobilized SeS$_2$ (bottom pattern), wherein the top two samples were prepared in air at 160° C. for 16 hours and bottom two were prepared in flowing argon at 130° C. for 1.5 hours.

FIG. 30 shows Raman scattering spectra for the multi-walled carbon nanotube (MWCNT)-SeS$_2$ composites that were prepared in accordance with comparative example 4. Comparing the Raman results in FIG. 30 with the Raman results in FIGS. 25A-25B for the starting materials MWCNT-1, MWCNT-5, and SeS$_2$, it can be seen that the characteristics of SeS2 were shown for all MWCNT-SeS$_2$ composites (FIG. 30), suggesting that the chemical bonding of SeS$_2$ may not have been altered by MWCNT in these MWCNT-SeS$_2$ composites. There is no observable increase in the wavenumber in the D-band and no observable increase in the wavenumber for the G-band, and if any, this wavenumber(s) for the D-band and/or G-band would decrease(s), suggesting that $SeS_2$ may not have a significant chemical effect on C=C bonding in MWCNT. Therefore, the interaction of guest molecules, $SeS_2$, and the host material, in this case, MWCNT, may not reach a chemical level. However, the immobilized $SeS_2$ shows a wavenumber increase by 4.8 cm$^{-1}$ for D-band and 2.9 cm$^{-1}$ for G-band. Both the results of XRD (FIG. 27) and Raman (FIG. 30) support that immobilized chalcogen may have strong bonding between chalcogen and carbon skeleton, possibly by electron donor and acceptor bonding, or coordination bonding, which can result in a stronger C=C bond and a shorter distance between the planes of the EMAC π-bonding system of the carbon skeleton.

It has been observed that immobilized chalcogen can have strong chemical interaction of chalcogen and a carbon skeleton, which is highly desirable for its application in a rechargeable battery Immobilized chalcogen means that chalcogen is immobilized during a battery electrochemical process, such as a discharge process and a charge process, which may overcome the challenges facing a rechargeable chalcogen battery, namely, (1) formation of a polychalcogenide ion that is soluble, particularly for a heavier element like sulfur, selenium, or tellurium, in an electrolyte and shuttles to the anode during battery discharge process, reacting with the anode, for one aspect, consuming the electrical energy, and converting chemical energy into heat that needs to be removed or managed; followed by a charging process, wherein polychalcogenide may form at the anode again, which is then dissolved in the electrolyte and shuttles back to the cathode, further oxidizing the elemental chalcogen; during shuttling process, the electrochemical coulombic cycling efficiency is reduced, which is not desirable; and (2) the formation of polychalcogenide that may be detrimental to the chemical stability of the cathode materials such as carbon; polychalcogenide such as $O_n^{2-}$, $S_n^{2-}$, $Se_n^{2-}$, $Te_n^{2-}$, or their mixed form may be highly oxidative, particularly for a lighter element, which may be one reason that a chalcogenide battery in the art is not able to cycle well as a battery, particularly for oxygen and sulfur battery.

The immobilization of chalcogen is achieved by having stronger chemical interactions, or bonding, or electron donor-acceptor bonding, or coordination bonding, between chalcogen and a carbon skeleton. The level of such chemical bonding or interactions may be characterized by the kinetic energy required for chalcogen to escape from an immobilized chalcogen system. Kinetic energy for a chemical species is characterized by temperature:

$$KE = \frac{3RT}{2}$$

J/mole, where T is temperature (K) and R is the gas constant 8.314 J/mole-K

In immobilized chalcogen, chalcogen is bonded to a carbon skeleton, e.g., via a coordination bond or an electron donor-acceptor bond. Therefore, chalcogen needs to gain enough kinetic energy to break this chemical bond, or to overcome the chemical interactions, in addition to physical interactions between chalcogen and carbon skeleton, in order to escape from immobilized chalcogen system, or ultimately from the carbon skeleton. This may be determined by a TGA analysis. For each TGA analysis, a sample of about 15 mg of immobilized chalcogen was placed into an alumina crucible with a lid and placed in the TGA analyzer furnace chamber. The furnace chamber was closed with two separate flows of argon gas, one at 100 mL/min and another one at 50 mL/min. The sample was purged for 10 minutes in the argon flows, followed by ramping from room temperatures to 1,000° C. at a heating rate of 10° C./min while TGA data were acquired.

Figure 31A:
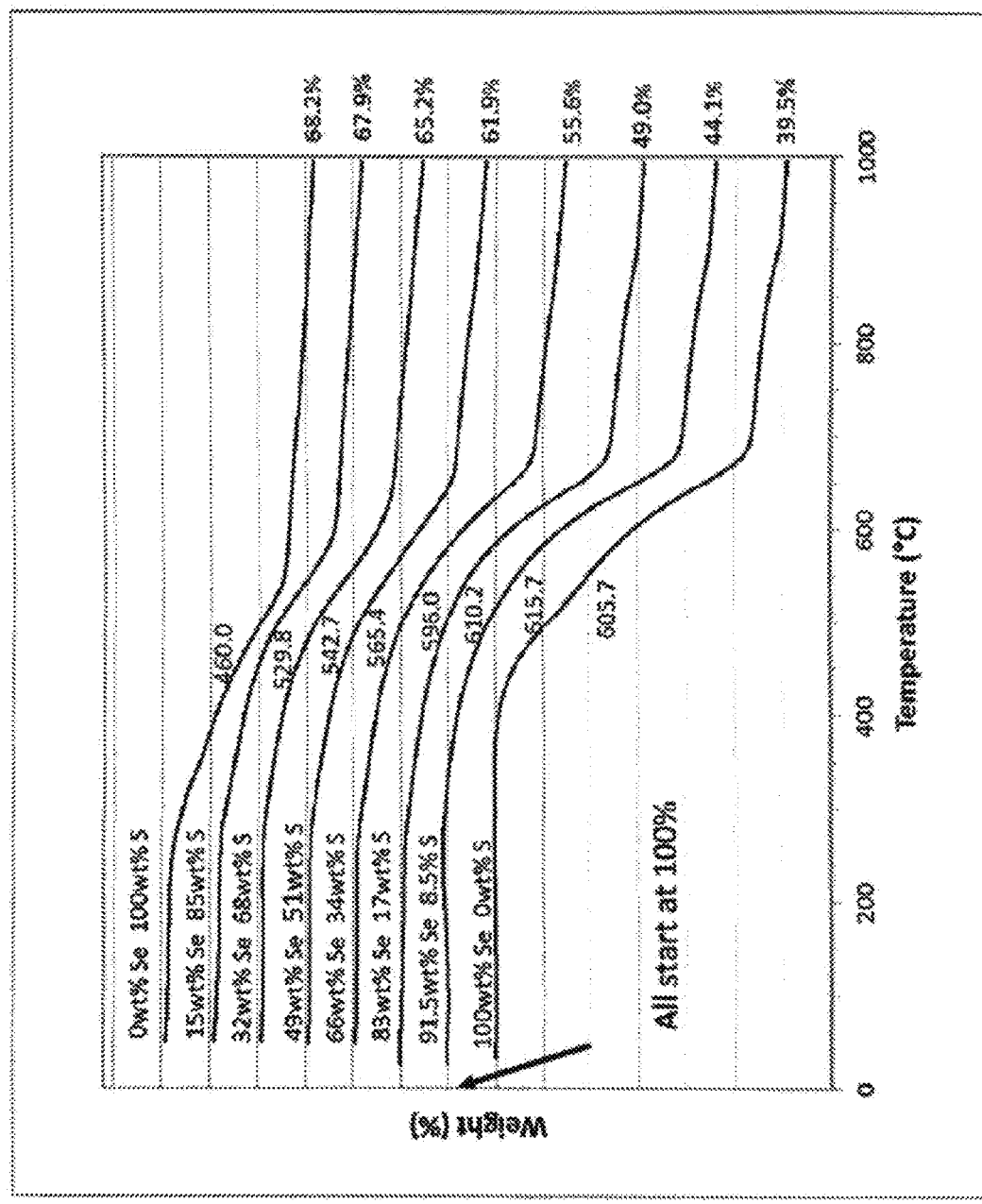
FIG. 31A shows TGA analysis of immobilized chalcogen with different contents of selenium, sulfur, and carbon skeleton at a heating rate 10° C./min.

FIG. 31A shows the TGA analysis results for immobilized chalcogen with different percentage of sulfur and selenium, from pure selenium to pure sulfur. The mid-weight-loss temperature is the temperature at the half way of the total weight loss for each immobilized chalcogen sample. The results seem to show the mid-weight-loss temperature is selenium or sulfur content dependent. The higher the sulfur content is, the lower the mid-weight-loss temperature is. The mid-weight-loss temperature for immobilized sulfur (pure) is 460° C. (surprising high) which suggests that the sulfur is indeed bonded to carbon skeleton in immobilized sulfur and needs a mid-weight-loss kinetic energy of 9.14 kJ/mole to overcome the bonding and escape from the carbon skeleton. The mid-weight-loss temperature for immobilized selenium (pure) is 605.7° C., which is higher than the one that was disclosed earlier (595° C. in Table 2), which may be due to the newly-disclosed immobilized selenium comprising a carbon skeleton having higher amounts of oxygen. It was noted that a carbon skeleton prepared from a continuous process with a rotary kiln (Example 15) has a higher oxygen content than that for the carbon skeleton produced under stationary conditions in a stainless crucible (Example 14), and which is higher than that for carbon skeletons produced from a smaller batch of potassium citrate. Even though it is not well understood why oxygen content increases with the batch size and from a stationary process to a continuous process, it is believed that an immobilized chalcogen comprising a carbon skeleton comprising a higher amount of deactivating chemical functional group comprising oxygen may have stronger chemical interactions between chalcogen and the carbon skeleton, which may be why the newly prepared immobilized selenium requires a higher level of mid-weight-loss kinetic energy (10.96 kJ/mole) to escape the immobilized chalcogen system.

Figure 31B:
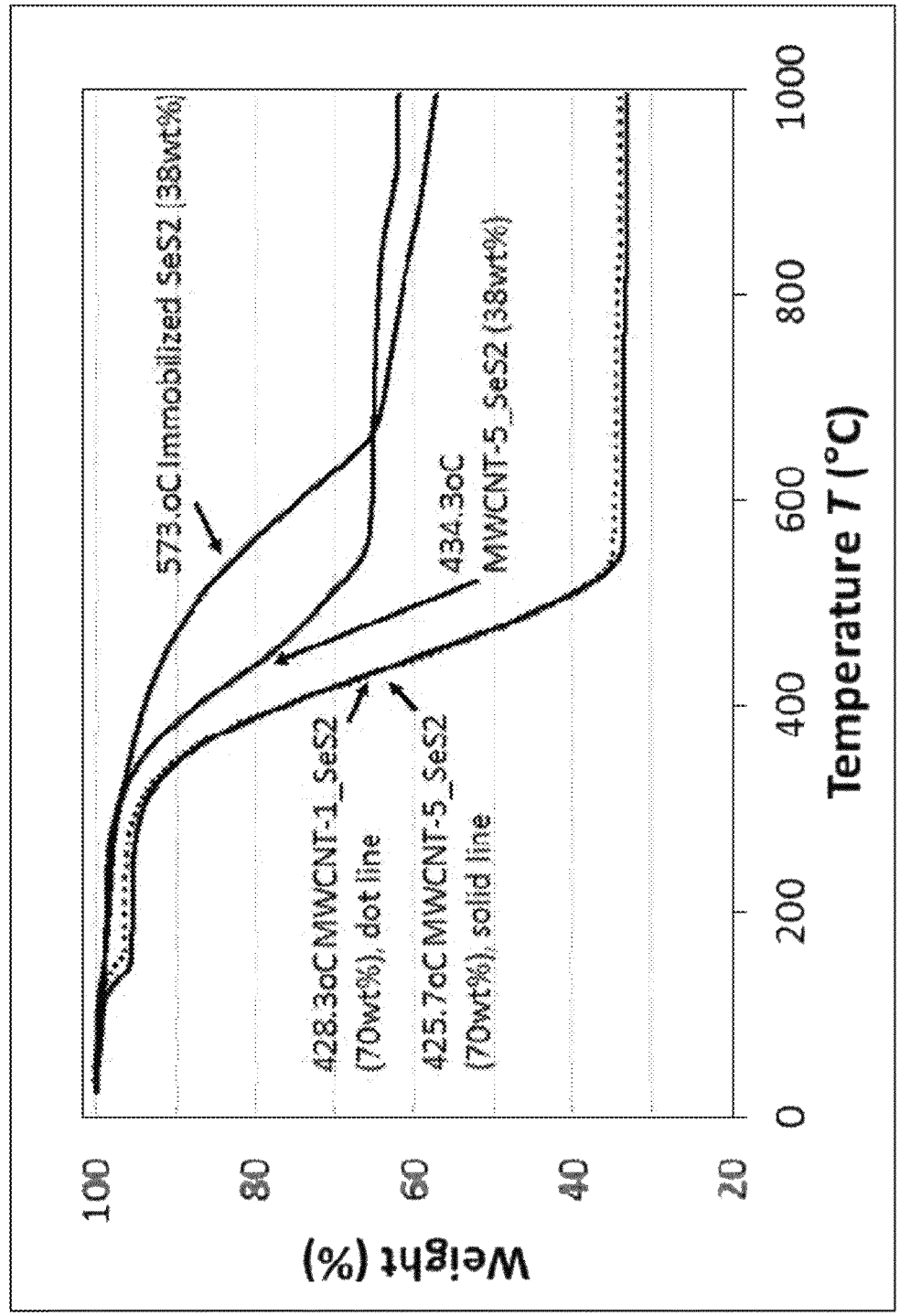
FIG. 31B shows TGA analysis (a heating rate of 10° C./min) of immobilized SeS2 (38 wt %) and Control C—SeS$_2$ composites made from Multi-Walled Carbon Nanotubes (MWCNT), wherein the MWCNT-1-SeS$_2$ (70 wt %) and MWCNT-5_SeS$_2$ (70 wt %) were prepared in air at 160° C. for 16 hours and the MWCNT-5_SeS$_2$ (38 wt %) was prepared in an argon flow at 130° C. for 1.5 hours.
Figure 32A:
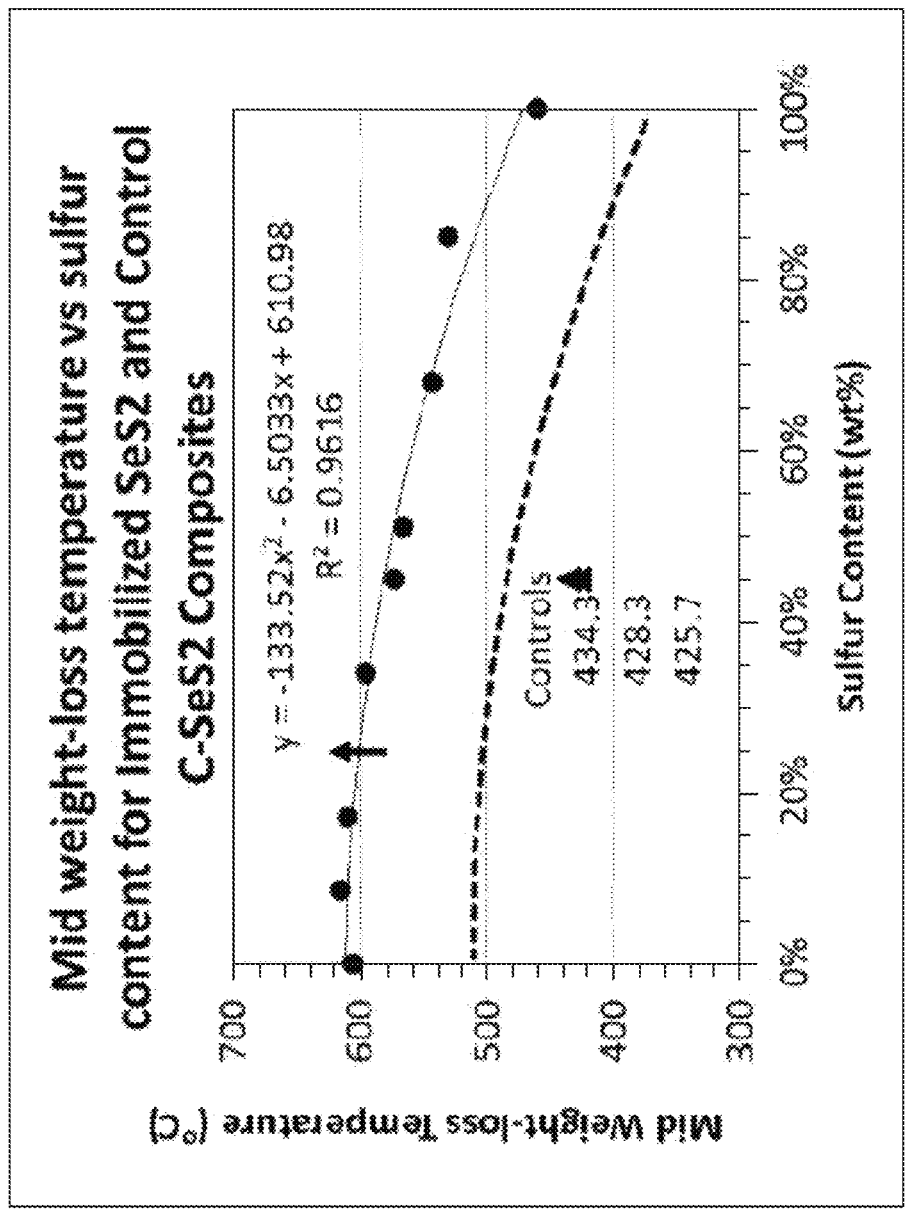
FIG. 32A shows mid-weight-loss temperature (by TGA Analysis in FIG. 31A) vs. sulfur wt % of the total of Se and S in immobilized chalcogen, wherein the solid circles represent measured data, the dashed line represents desirable mid-weight-loss-temperature (at or above the dashed line), and the solid triangles represent control C—SeS$_2$ composites prepared with MWCNT materials.
Figure 33A:
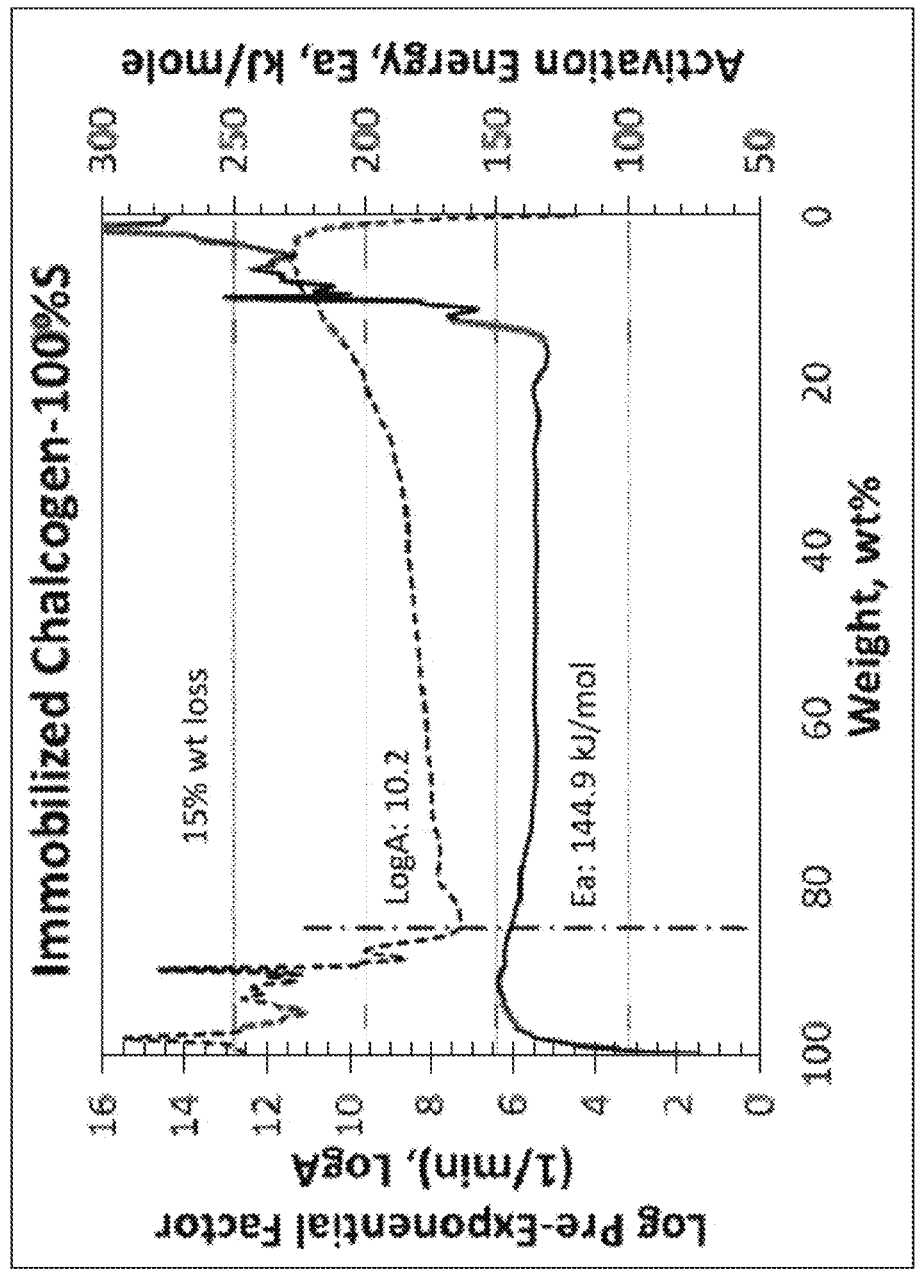
FIG. 33A shows activation energy (solid line) and log pre-exponential factor (dashed line) of immobilized chalcogen with 0 wt % Se_100 wt % S and carbon skeleton.
Figure 33B:
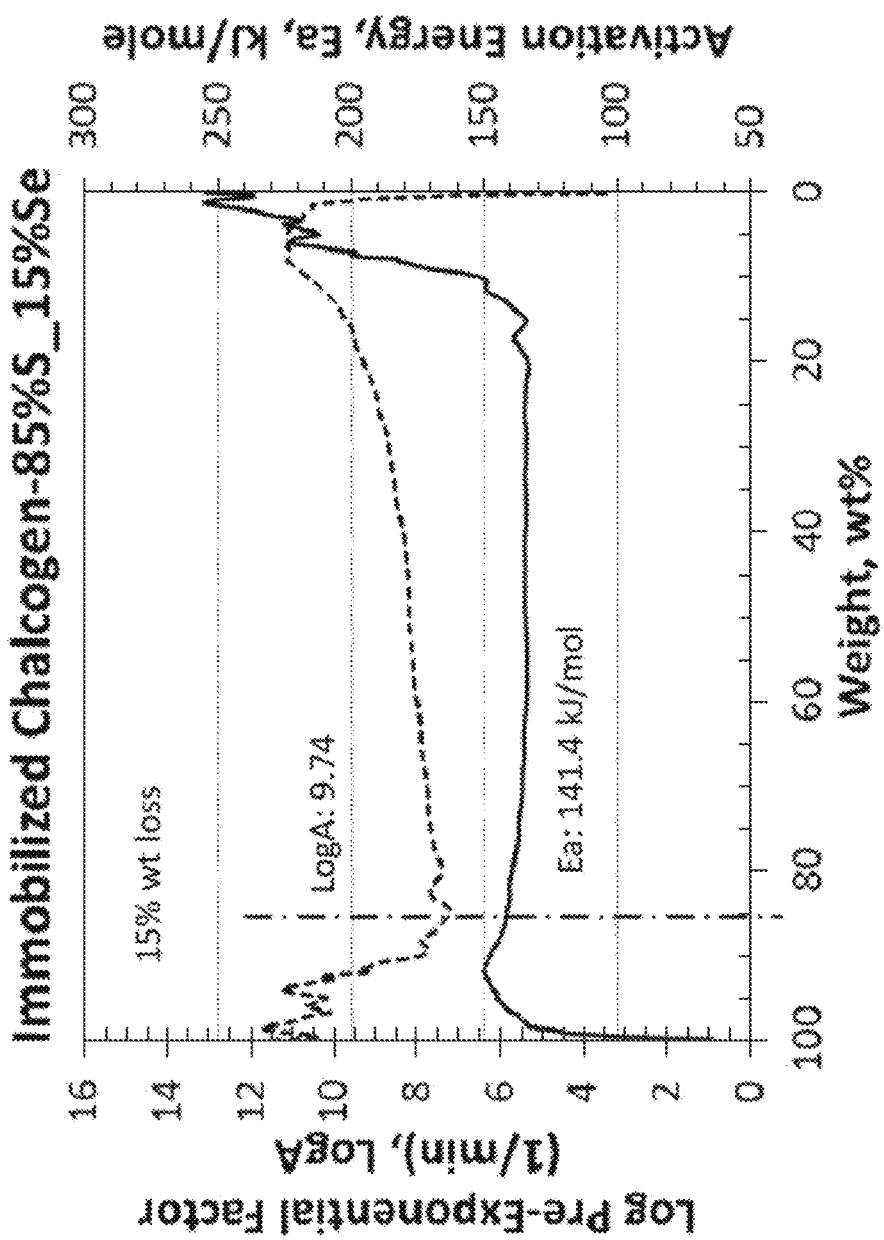
FIG. 33B shows activation energy (solid line) and log pre-exponential factor (dashed line) of immobilized chalcogen with 85 wt % S_15 wt % Se and carbon skeleton.
Figure 33C:
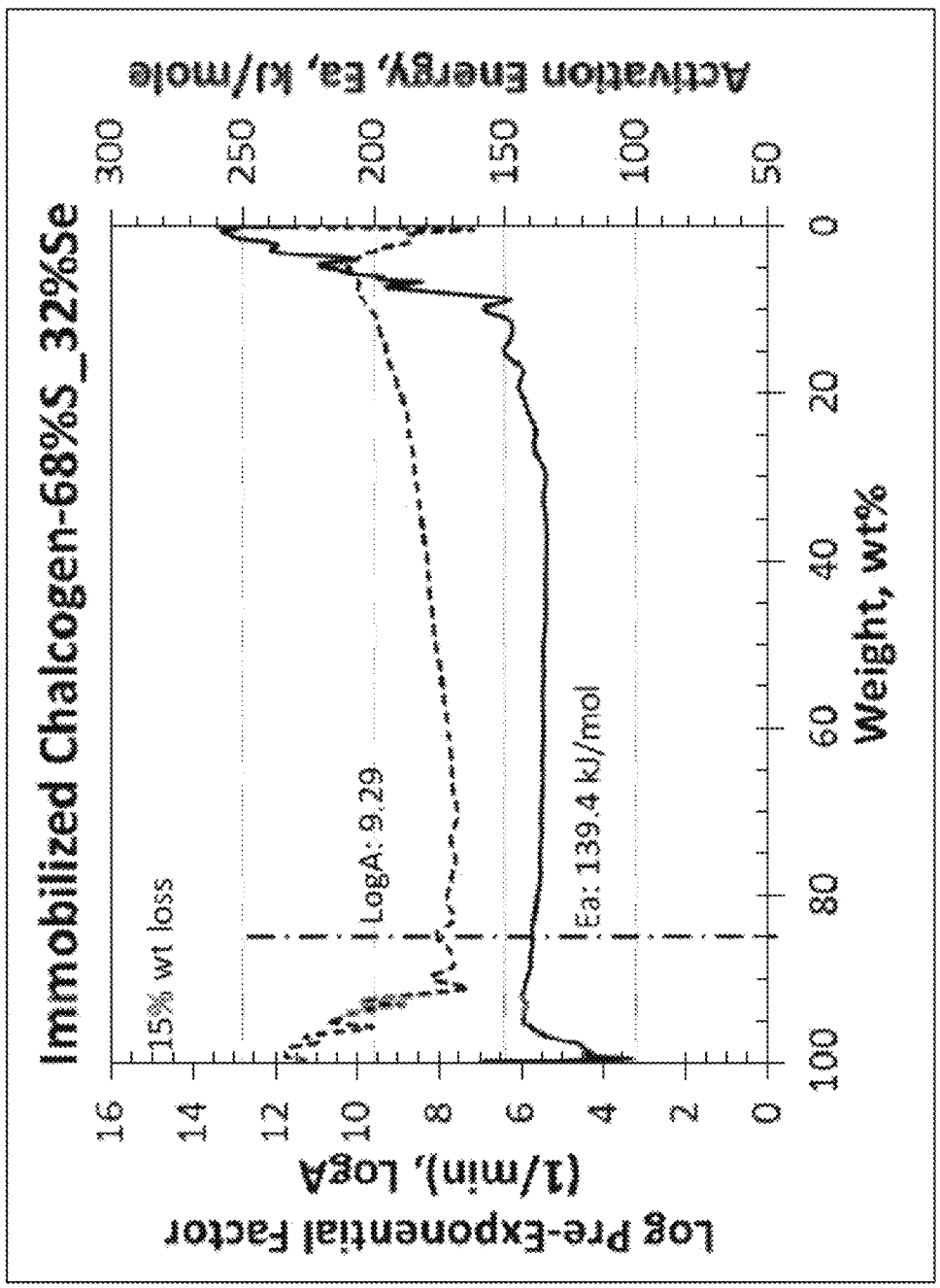
FIG. 33C shows activation energy (solid line) and log pre-exponential factor (dashed line) of immobilized chalcogen with 68 wt % S_32 wt % Se and carbon skeleton.
Figure 33D:
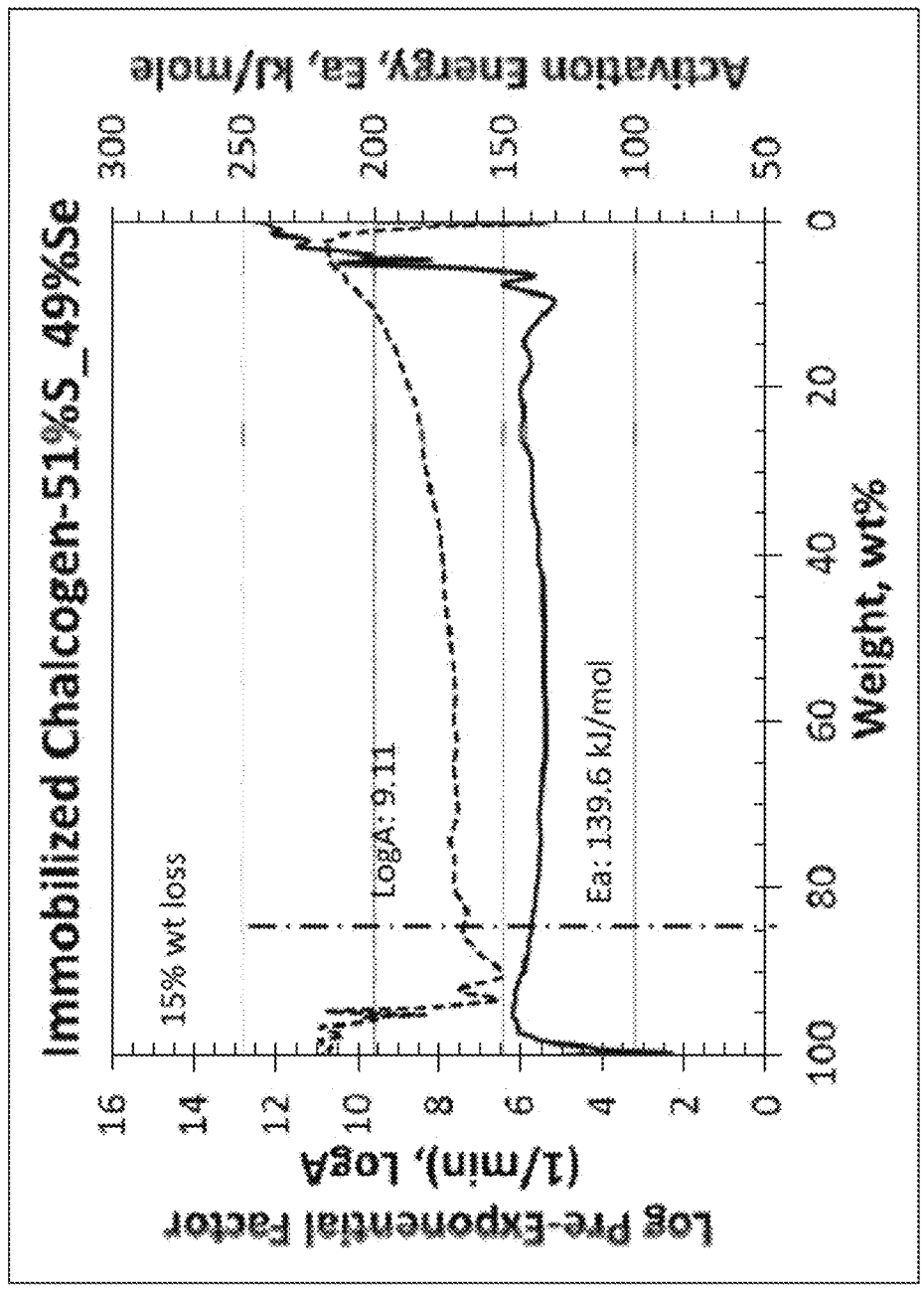
FIG. 33D shows activation energy (solid line) and log pre-exponential factor (dashed line) of immobilized chalcogen with 51 wt % S_49 wt % Se and carbon skeleton.
Figure 33E:
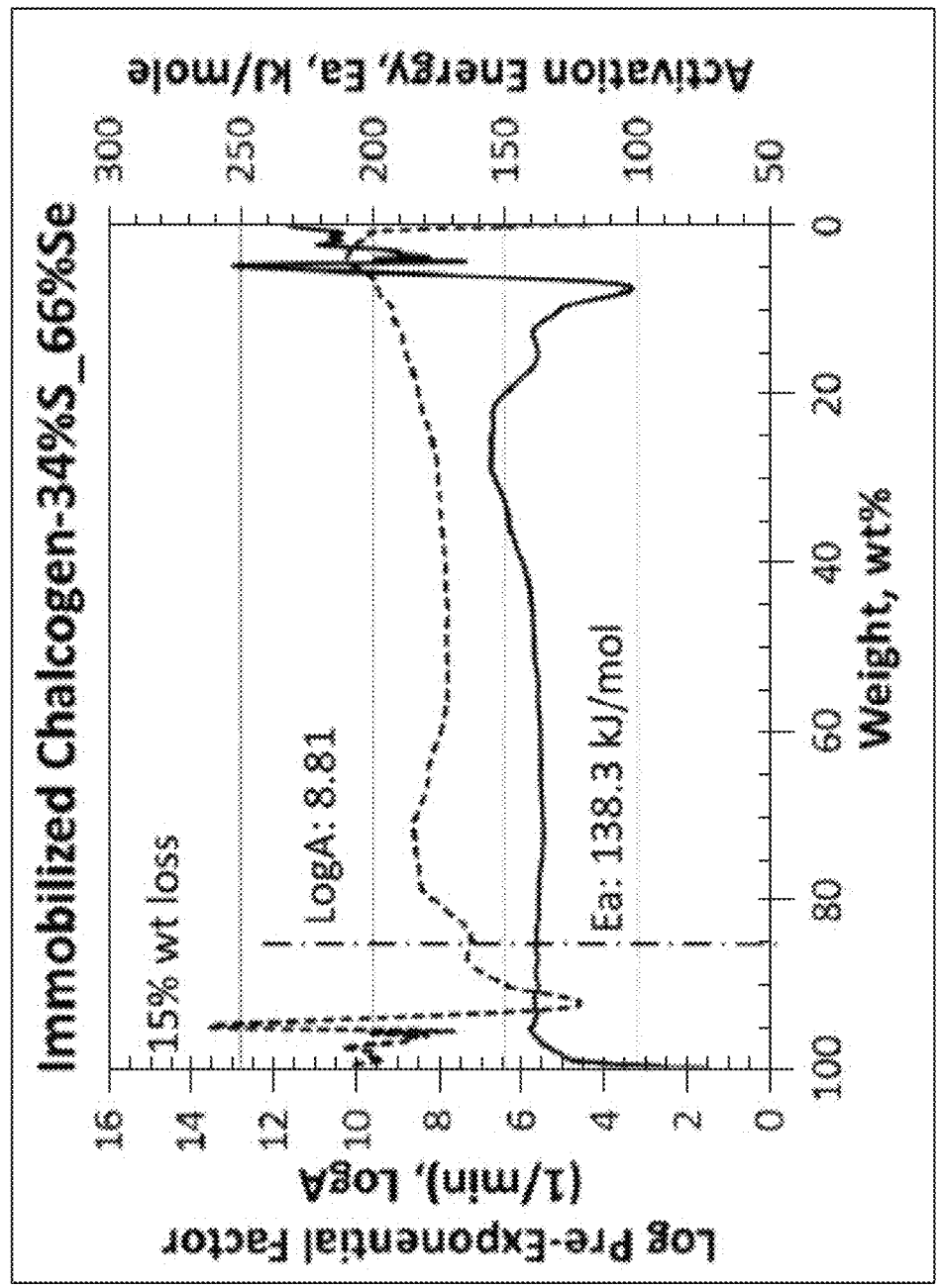
FIG. 33E shows activation energy (solid line) and log pre-exponential factor (dashed line) of immobilized chalcogen with 34 wt % S_66 wt % Se and carbon skeleton.
Figure 33F:
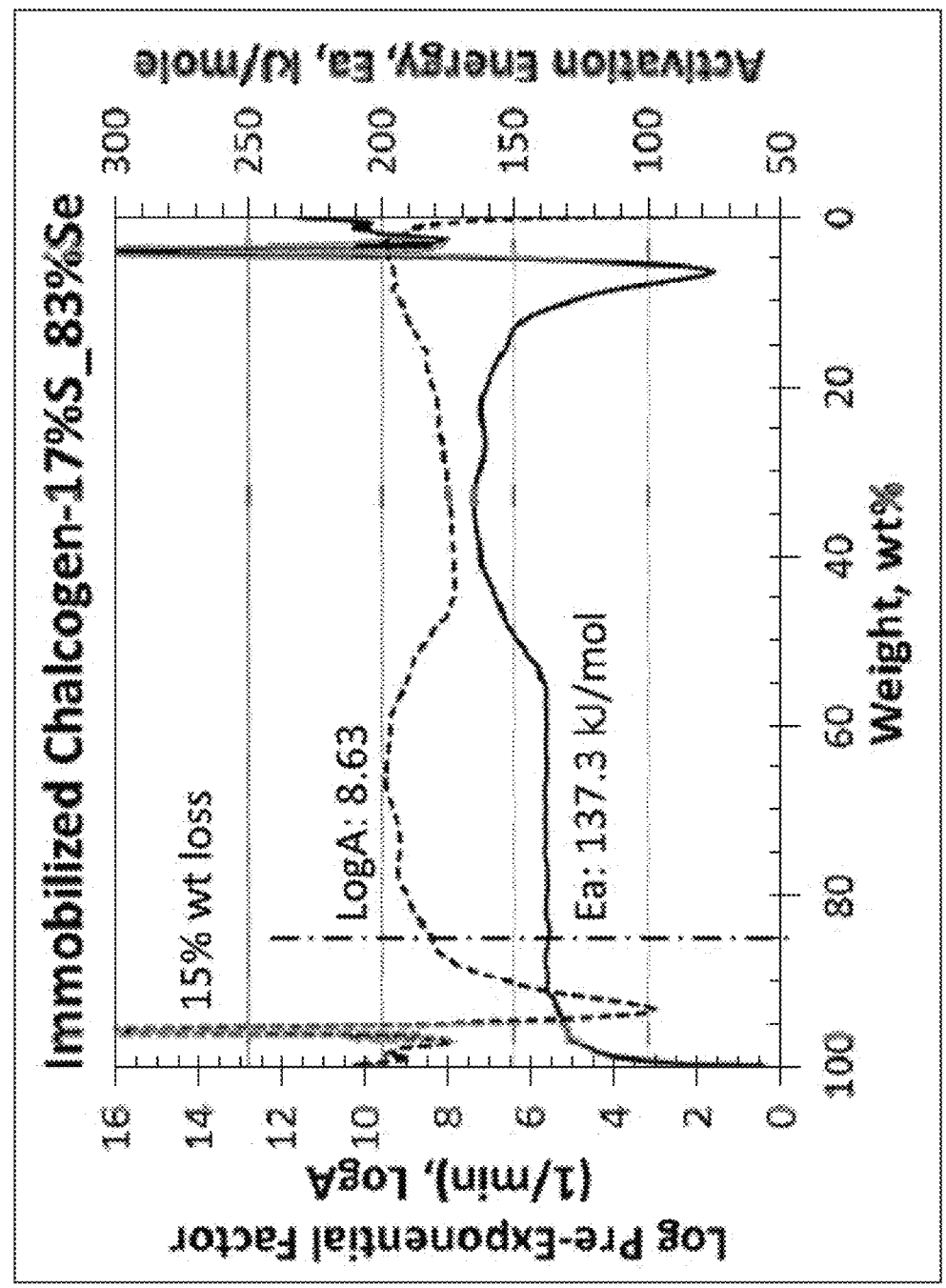
FIG. 33F shows activation energy (solid line) and log pre-exponential factor (dashed line) of immobilized chalcogen with 17 wt % S_83 wt % Se and carbon skeleton.
Figure 33G:
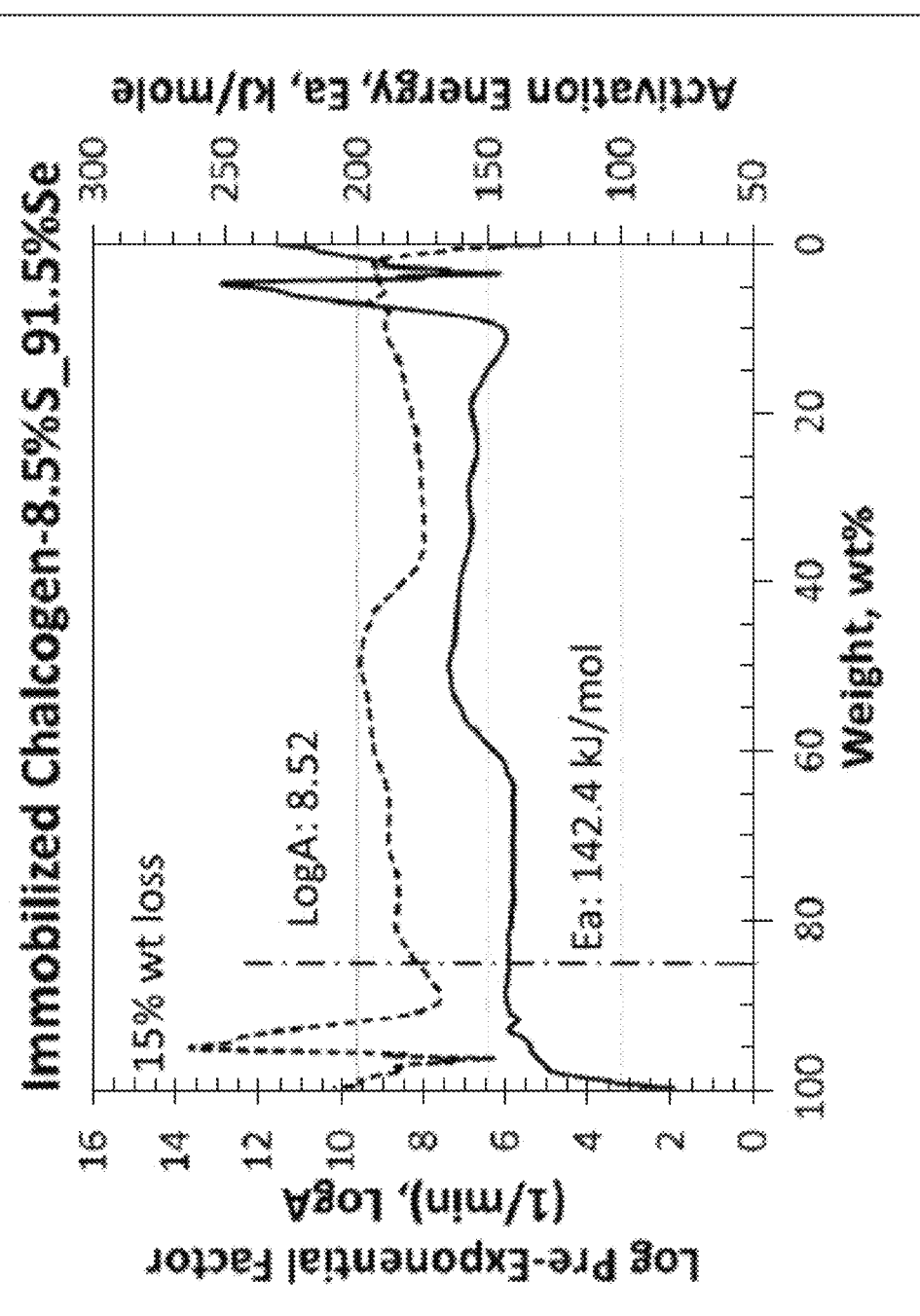
FIG. 33G shows activation energy (solid line) and log pre-exponential factor (dashed line) of immobilized chalcogen with 8.5 wt % S_91.5 wt % Se and carbon skeleton.
Figure 33H:
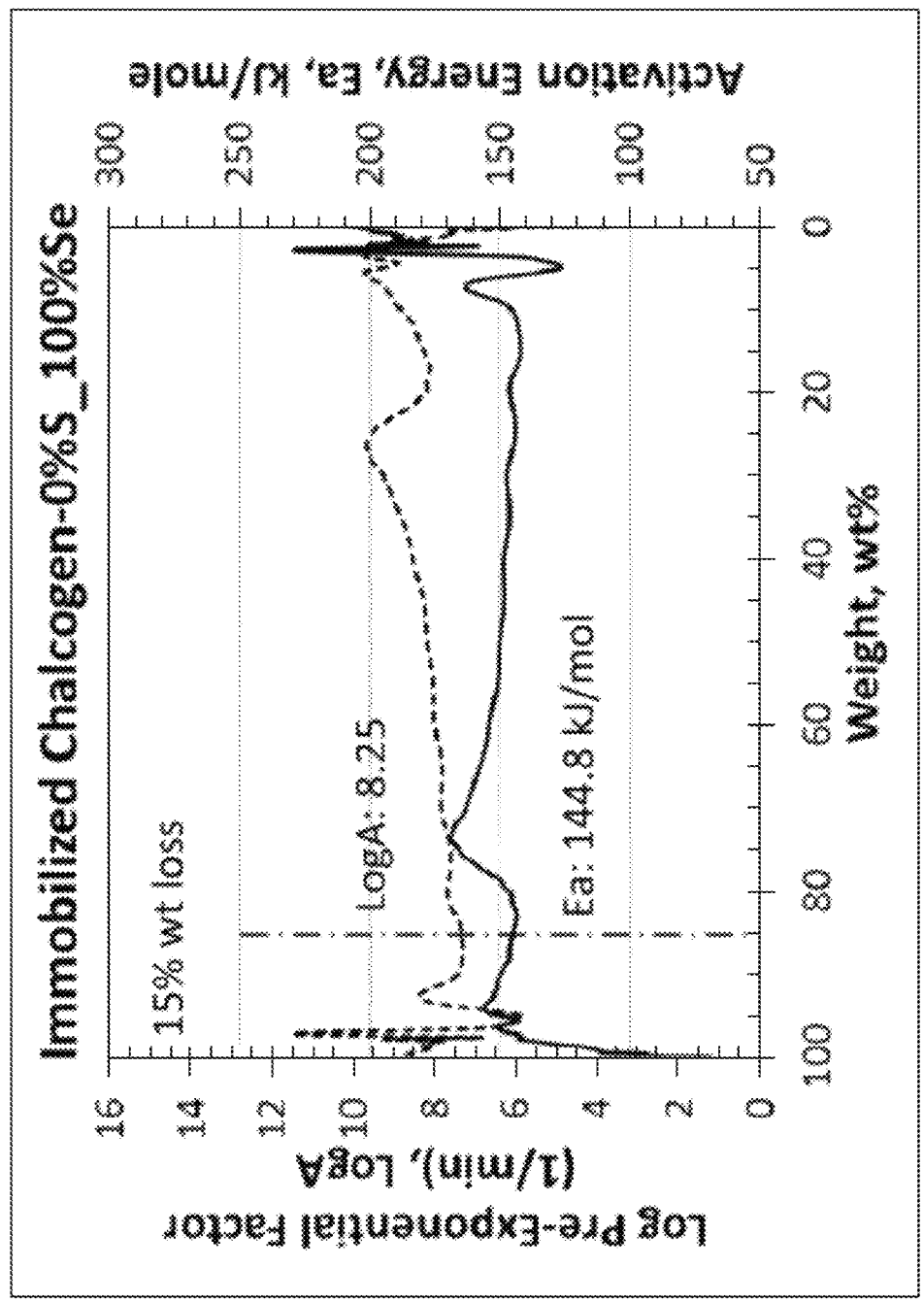
FIG. 33H shows activation energy (solid line) and log pre-exponential factor (dashed line) of immobilized chalcogen with 0 wt % S_100 wt % Se and carbon skeleton.
Figure 33I:
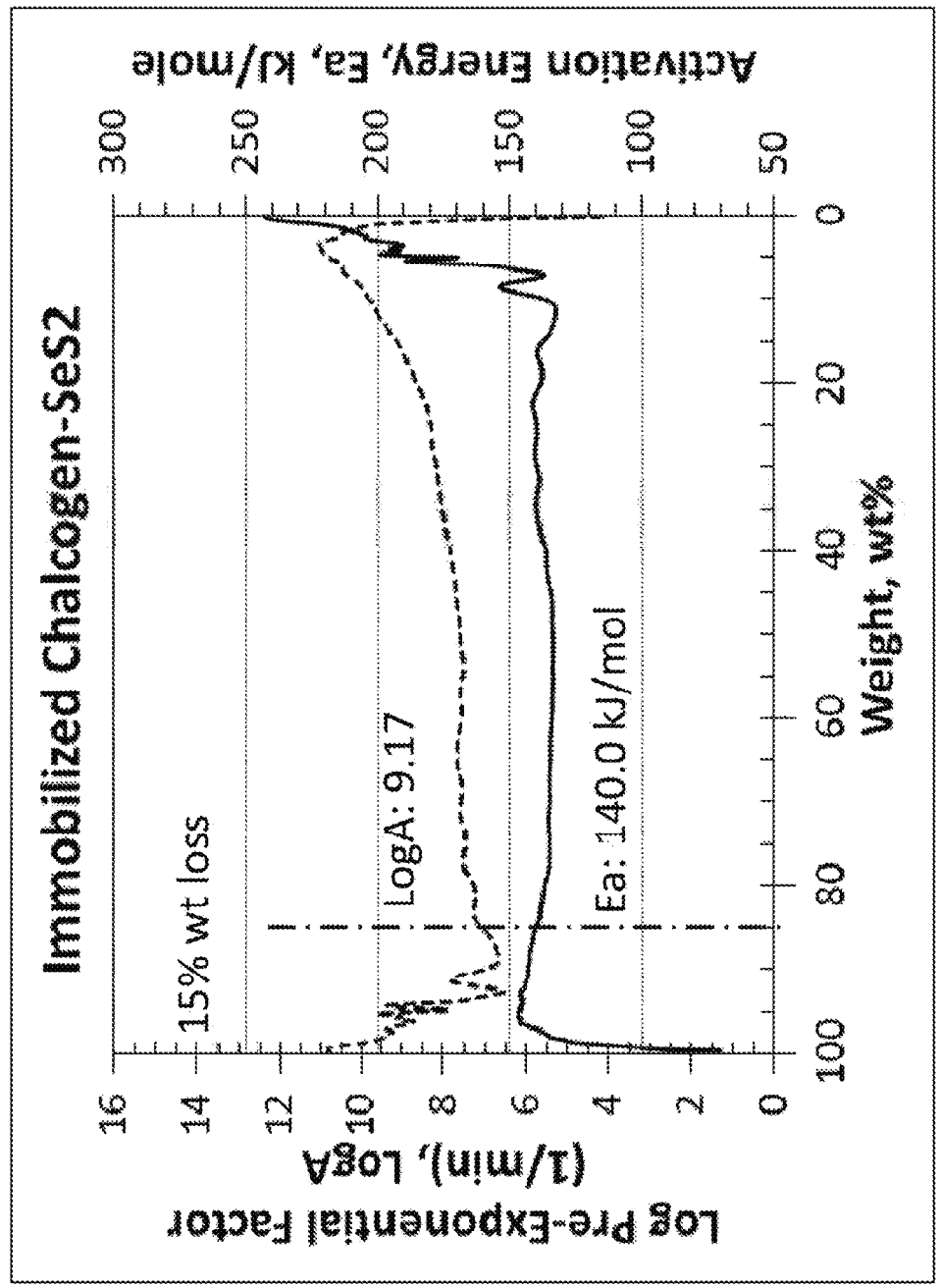
FIG. 33I shows activation energy (solid line) and log pre-exponential factor (dashed line) of immobilized chalcogen with SeS$_2$ and carbon skeleton.
Figure 33J:
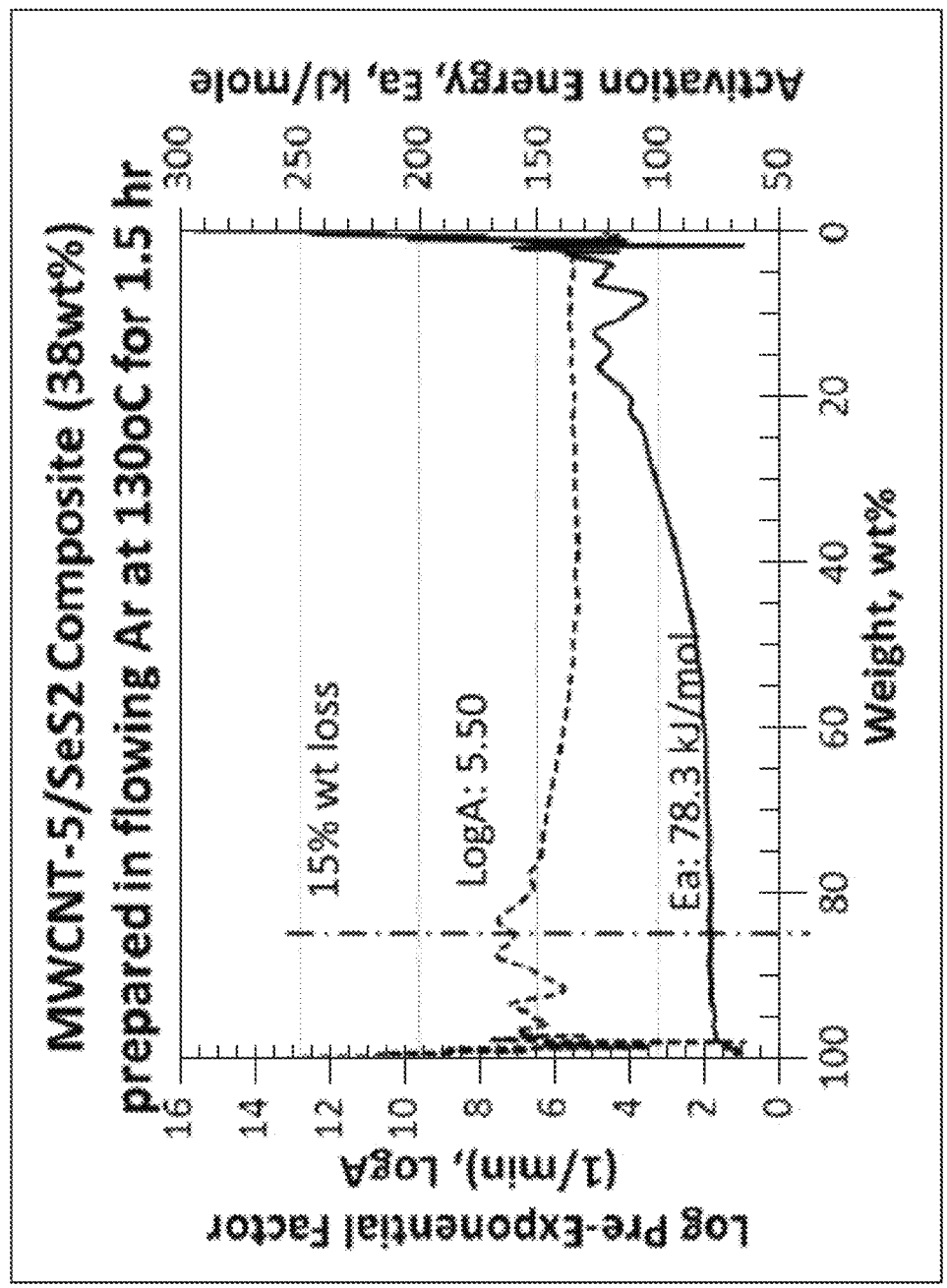
FIG. 33J shows activation energy (solid line) and log pre-exponential factor (dashed line) of MWCNT-5_SeS$_2$ (38 wt %) that was prepared in an argon flow at 130° C. for 1.5 hours.
Figure 33K:
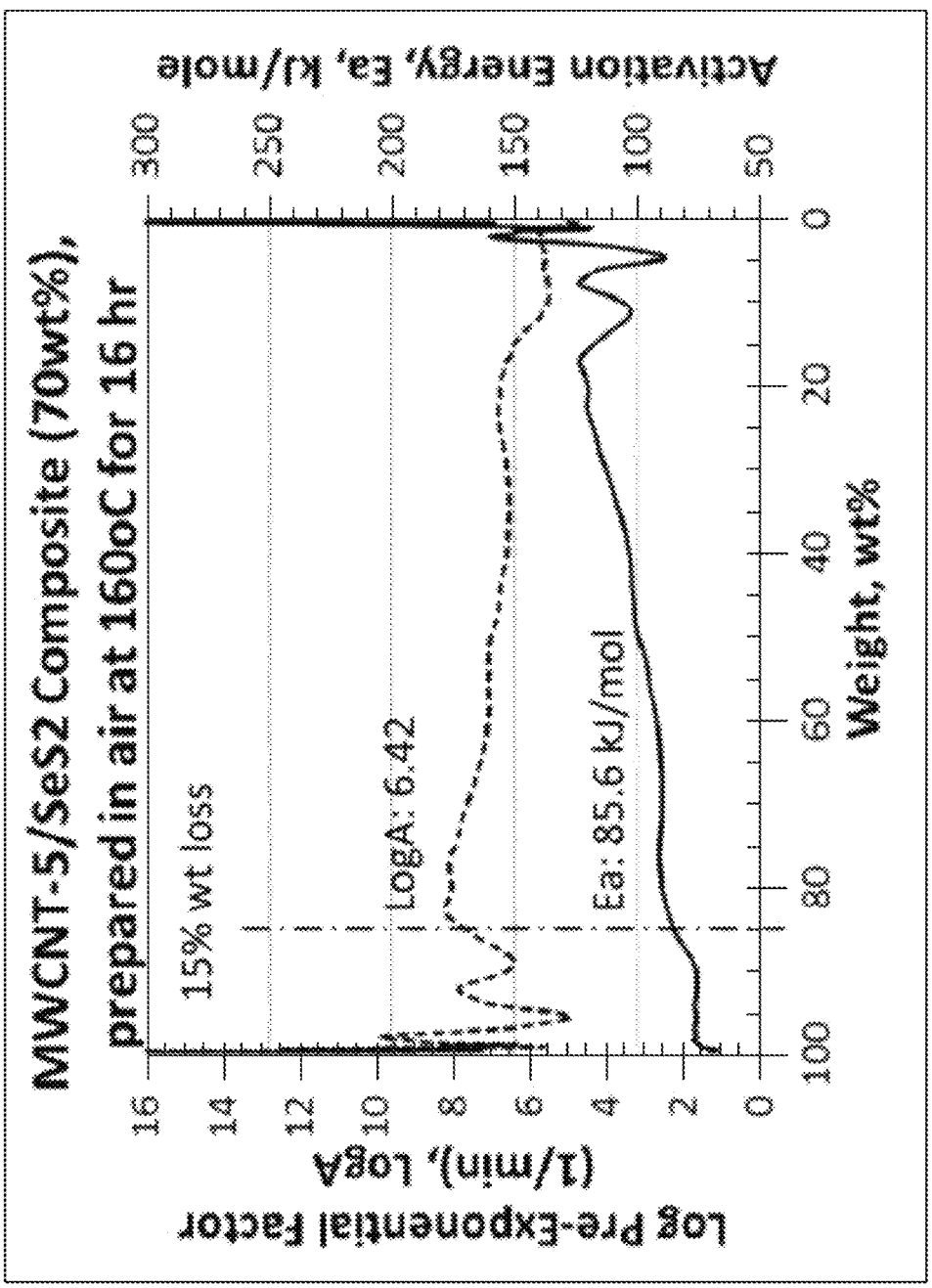
FIG. 33K shows activation energy (solid line) and log pre-exponential factor (dashed line) of MWCNT-5_SeS$_2$ (70 wt %) that was prepared in air at 160° C. for 16 hours.
Figure 33L:
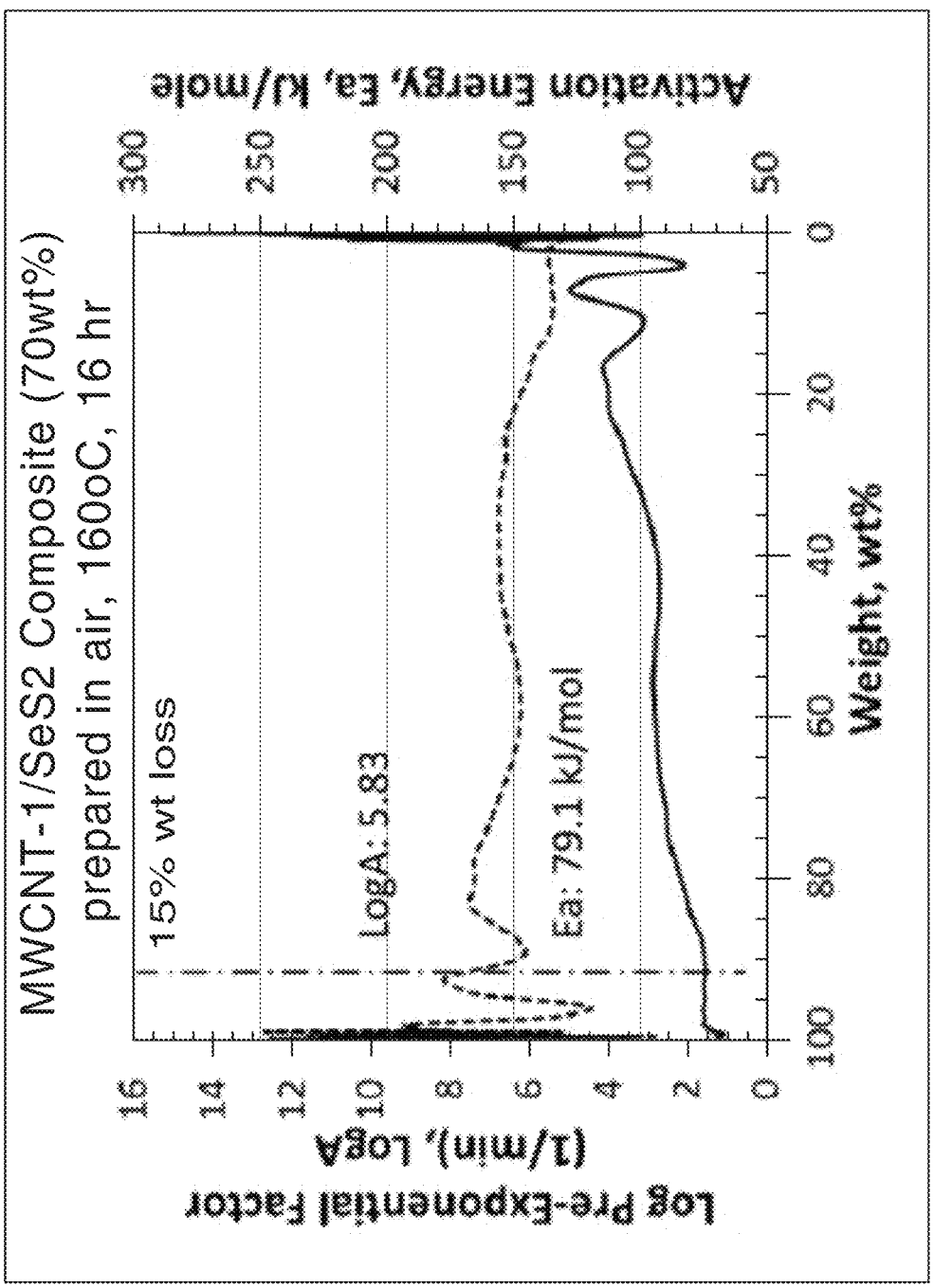
FIG. 33L shows activation energy (solid line) and log pre-exponential factor (dashed line) of WMCNT-1_SeS$_2$ (70 wt %) composite that was prepared in air at 160° C. for 16 hours.

The mid-weight-loss temperatures for other immobilized chalcogen with different percentages of selenium and sulfur are also shown in FIG. 31A. FIG. 31B shows TGA analysis of immobilized $SeS_2$ and a number of control samples. The data shown in FIGS. 31A-31B are plotted in FIGS. 32A-32B. In FIG. 32A, mid-weight-loss temperature vs. sulfur percentage were fitted with a quadratic model, described by the equation: $T=-147.57 x^2+7.2227x+C$, where C is a constant, in this case, 610.31° C., T is the mid-weight-loss temperature, x is the weight percentage of sulfur with respect to the total of selenium and sulfur in weight.

The chalcogen may need a mid-weight-loss kinetic energy of $4,840.3 x^2+90.075 x+D$ J/mole to overcome the chemical interactions and escape the immobilized chalcogen, where D is 11,018 J/mole and x is the weight percentage of sulfur of the total of sulfur and selenium in the immobilized chalcogen.

As described earlier, immobilization of chalcogen is achieved by having stronger chemical interactions, or bonding, or electron donor-acceptor bonding, or coordination bonding, between chalcogen and a carbon skeleton. The level of such chemical bonding or interactions may be characterized by the activation energy, an energy barrier that a chalcogen molecule needs to overcome in order for it to escape the immobilized chalcogen system. Details regarding activation energy, pre-exponential factor (a kinetic parameter—collision frequency), and Arrhenius law are known in the art.

Herein, the activation energy and pre-exponential factor of immobilized chalcogen and control samples, such as carbon-chalcogen MWCNT-SeS$_2$ composites, were determined by a temperature-modulating TGA method, wherein each sample, after placement in the furnace, was exposed to two separate streams or flows of argon gas in the furnace, one for balance purging (100 mL/min), and the other one particularly for the measurement (50 mL/min). Each sample was under the argon flow for 30 minutes for the purpose of removing physical water that may be absorbed on the sample. The temperature of the furnace was set to modulate at an amplitude of 5° C. with a period of 200 seconds and the temperature of the sample was raised from room temperatures to 150° C. and held isothermal for 5 minutes for equilibration. Then the temperature was ramped from 150° C. to 700° C. at a heating rate of 3.5° C./min while modulating the temperature at the amplitude of 5° C. for a period of 200 seconds. The modulated TGA data was collected between 150° C. and 700° C. for activation energy and pre-exponential factor in the temperature region between 150° C. and 700° C. The weight loss was justified to 100% of weight loss between temperatures of 200° C. and 700° C. For more information, please refer to (1) "Obtaining Kinetic Parameters by Modulated Thermogravimetry", R. L. Blaine and B. K. Hahn, J. Thermal Analysis, Vol. 54 (1998) 695-704, and (2) "Modulated Thermogravimetric Analysis: A new approach for obtaining kinetic parameters", TA-237, TA Instruments, Thermal Analysis & Rheology, a Subsidiary of Waters Corporation.

FIGS. 33A-33L show the results for activation energy and Log A, or logarithm of pre-exponential factor, for immobilized chalcogen (such as sulfur, pure selenium, mixtures of sulfur and selenium, and SeS$_2$). The figures also show the results for activation energy and Log A for the control samples of carbon-chalcogen composites prepared with SeS$_2$ and multi-walled carbon nanotubes in two different methods described in comparative example 4. It was observed that the modulated TGA analysis method described above produced two separate curves of Ea (activation energy, kJ/mole) and Log A (Log pre-exponential factor (1/min)) vs. weight loss. To be consistent with ASTM E1641-16 and E2954-14, as well as the previous disclosure, the data for activation energy and Log A at 15% weight loss for immobilized chalcogen and control C—SeS$_2$ samples were also prepared and tabulated in Table 6, showing the activation energy for immobilized chalcogen ranging from 137.3 kJ/mole to 144.9 kJ/mole Immobilized SeS$_2$ comprising a carbon skeleton comprising a deactivating chemical functional group comprising oxygen has an activation energy of 140 kJ/mole. However, the C—SeS$_2$ composites (70 wt %) that were prepared with two multi-walled carbon nanotubes MWCNT-5 and MWCNT-1 in air at 160° C. for 16 hours (described in comparative example 4) have an activation energy of 85.6 kJ/mole and 79.1 kJ/mole, respectively. The control sample MWCNT-5-SeS$_2$ composite (38 wt %) that was prepared in flowing argon at 130° C. for 1.5 hours has an activation energy 78.3 kJ/mole. As can be seen from Table 6 the interactions in the control composites do not reach a level of chemical interactions with a threshold 96 kJ/mole. The immobilized chalcogen all indeed reach a level of chemical interactions, 96 kJ/mole or greater.

Log A (Log Pre-Exponential Factor, a measurement of collision frequency) for each sample of immobilized chalcogen and for controls C—SeS$_2$ that were prepared with multi-walled carbon nanotubes are also shown in FIGS. 33B-33I, and 33J-33L, respectively, and tabulated in Table 6. The control samples show a Log A ranging from 5.50 and 6.42, which translates to a pre-exponential factor ranging between $3.16 \times 10^5$ and $6.76 \times 10^5$. Immobilized chalcogen shows a Log A between 8.25 and 10.2, which translates to a pre-exponential factor ranging between $1.79 \times 10^8$ and $1.58 \times 10^{10}$. And immobilized SeS$_2$ has a Log A 9.17, which translates to a collision frequency A $1.48 \times 10^9$.

Additional samples were also prepared using the same procedures described earlier in Example 19. One sample is an immobilized chalcogen with 34 wt % active material (chalcogen) with 100 wt % being sulfur; it has a theoretical specific capacity of 559 mAh/g-immobilized_Chalcogen, a 32% increase in specific capacity as compared to that (423 mAh/g-immobilized chalcogen) for the sample with a 26 wt % active (chalcogen) with 100 wt % being sulfur; this new sample was also characterized for activation energy (127.5 kJ/mole) and Log A (9.29). Another sample is an immobilized chalcogen with 42 wt % active material (chalcogen) with 51 wt % being sulfur having an 8% increase in specific capacity from 422 mA/g to 490 mAh/g-immobilized_chalcogen compared to a sample with 36 wt % active material (chalcogen) with 51 wt % being sulfur. The sample with a 42 wt % active material was measured for its activation energy (131.2 kJ/mole) and Log A (9.02). The next sample is an immobilized chalcogen 55 wt % active material (chalcogen) with 100 wt % being selenium, having a 12% decrease in specific capacity from 418 mAh/g to 374 mAh/g-immobilized_chalcogen, and its activation energy and Log A of the immobilized chalcogen were measured to 138.9 kJ/mole with a Log A of 7.99, respectively. These additional examples with either an increase in active material (or active loading) or a decrease in active material (or active loading) demonstrate that immobilized chalcogen has strong interactions that reach a level of chemical interactions (coordination bonding or donor-acceptor bonding), with an activation energy being 96 kJ/mole or greater and a collision frequency (A) being $1 \times 10^7$ or greater.

The experimental data of both activation energy and Log A (which can be translated to A, pre-exponential factor, or collision frequency) by $10^{Log\ A}$ demonstrate that immobilized chalcogen has strong interactions of chalcogen and carbon, reaching a level of chemical interactions, 96 kJ/mole, as well as a higher collision frequency. A high activation energy and or a high collision frequency is highly desirable; chalcogen is essentially anchored and is prevented from escaping from immobilized chalcogen system or carbon skeleton; chalcogen has high collision frequency to itself and to carbon skeleton; this would prevent shuttling of chalcogenide ion from happening since chalcogen is anchored, and a better electron conduction between chalcogen and carbon.

It is surprising to discover that the immobilized chalcogen described herein have an activation energy 11-25 kJ/mole higher than immobilized selenium described earlier herein and also have collision frequency 1-3 magnitudes higher. It is believed this is due to the carbon skeleton being produced from a continuous process in a rotary kiln having a higher amount of deactivating chemical functional group comprising oxygen.

Figure 34A:
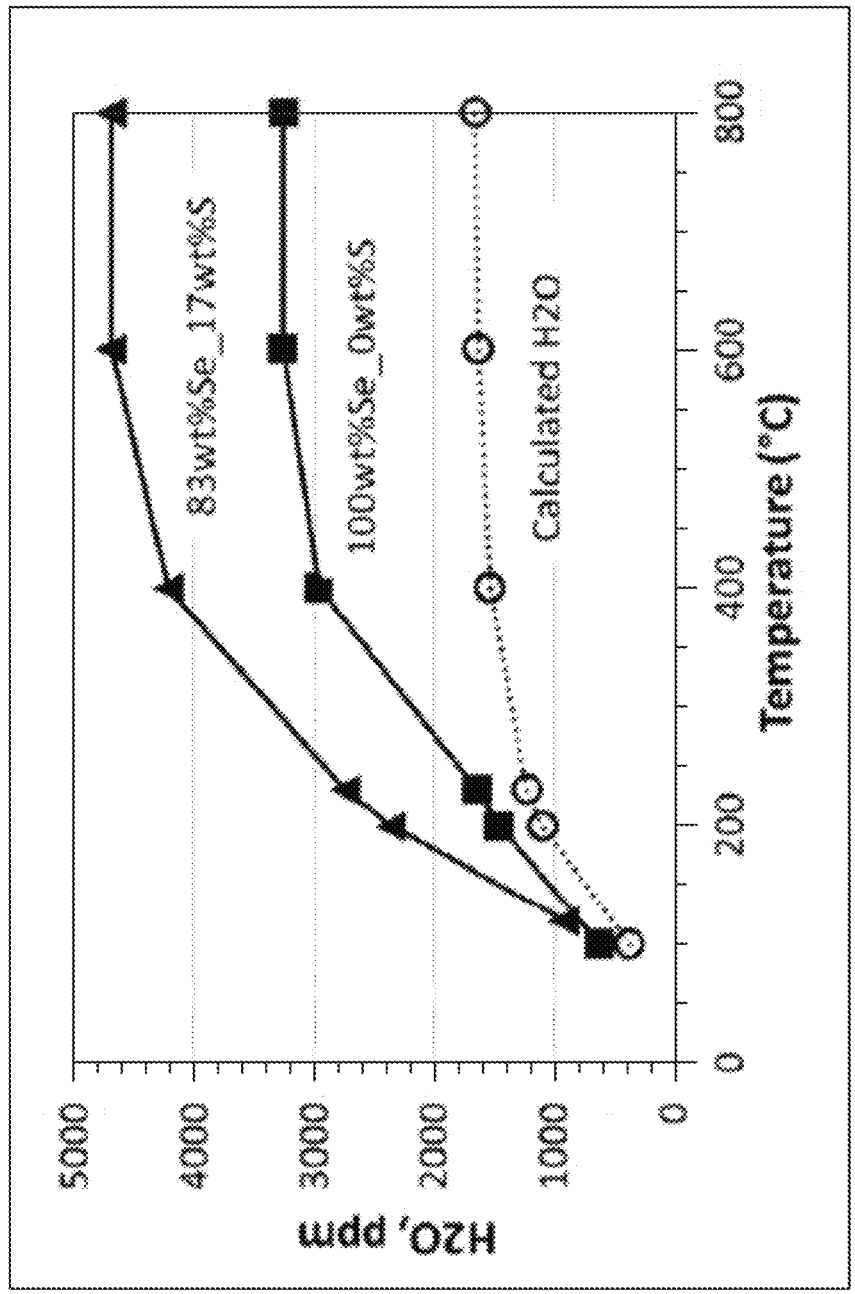
FIG. 34A shows gas chromatograph (GC) analysis of immobilized chalcogen for water release when heated in a stream of helium, wherein the solid triangles represent H$_2$O released from immobilized chalcogen with 83 wt % Se_17 wt % S, the solid squares represent H$_2$O released from immobilized chalcogen with 100 wt % Se_0 wt % S, and the open circles represent calculated H$_2$O released.
Figure 34B:
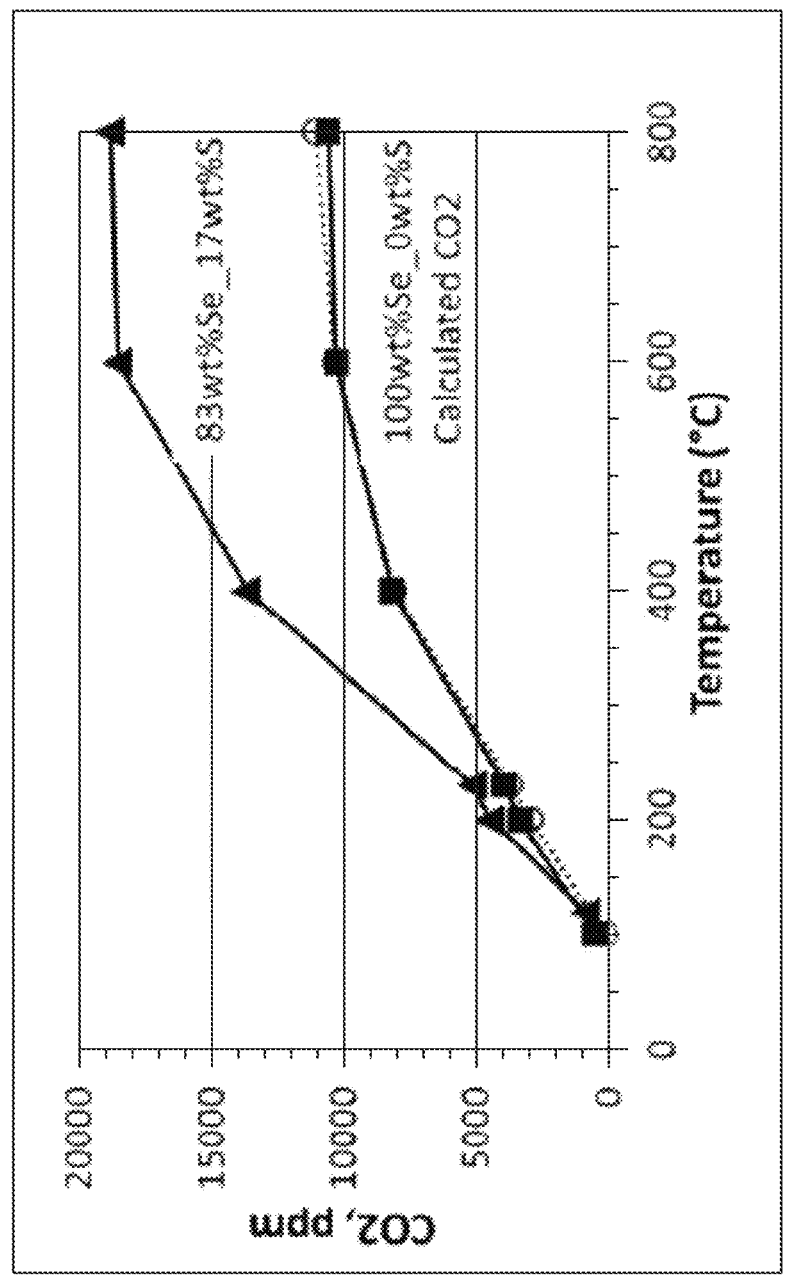
FIG. 34B shows gas chromatograph (GC) analysis of immobilized chalcogen for CO$_2$ release when heated in a stream of helium, wherein the solid triangles represent CO2 released from immobilized chalcogen with 83 wt % Se_17 wt % S, the solid squares represent CO$_2$ released from immobilized chalcogen with 100 wt % Se_0 wt % S, and the open circles represent calculated CO$_2$ released.
Figure 34C:
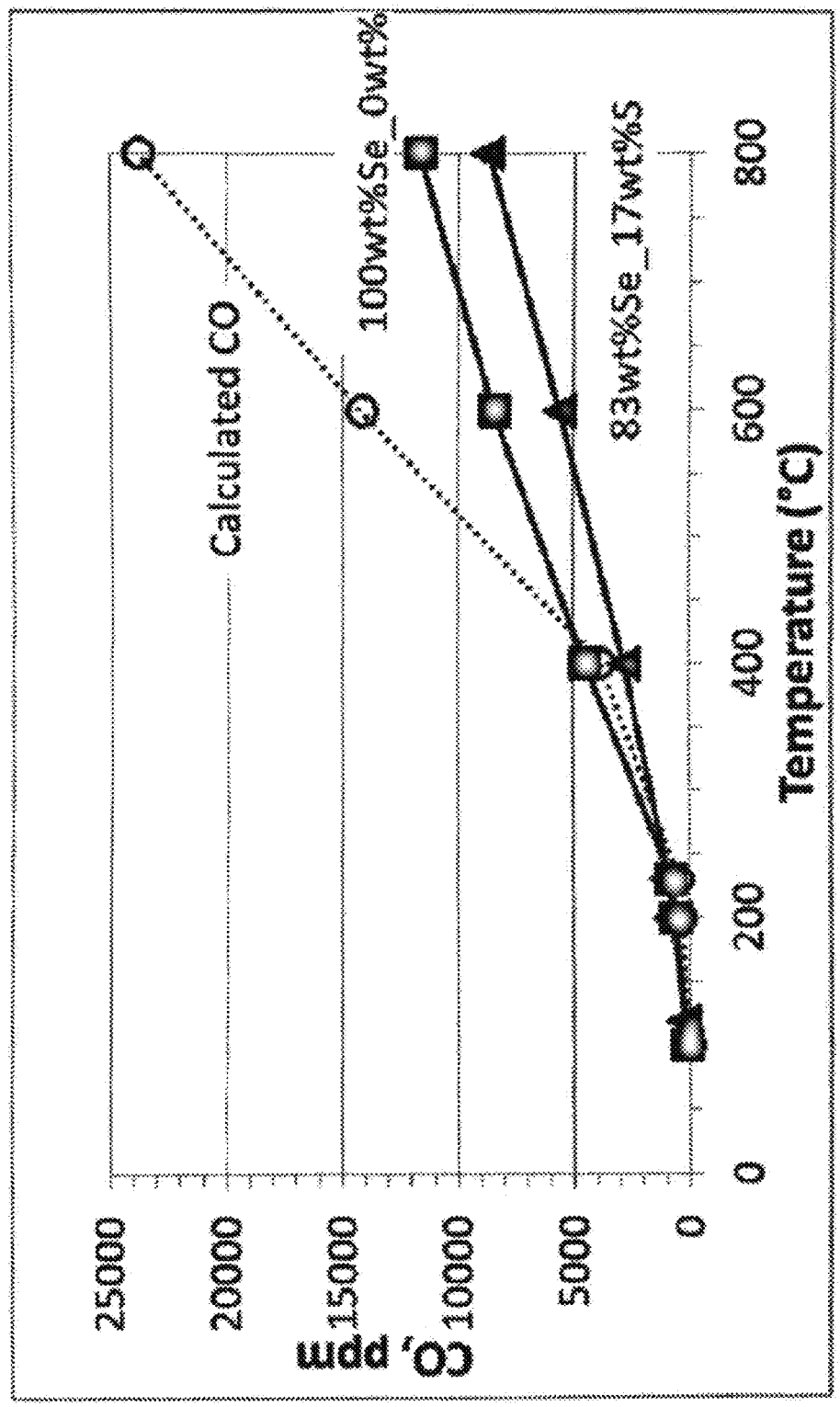
FIG. 34C shows gas chromatograph (GC) analysis of immobilized chalcogen for CO release when heated in a stream of helium, wherein the solid triangles represent CO released from immobilized chalcogen with 83 wt % Se_17 wt % S, the solid squares represent CO released from immobilized chalcogen with 100 wt % Se_0 wt % S, and the open circles represent calculated CO released.

Immobilized chalcogen comprises chalcogen and a carbon skeleton that comprises a deactivating chemical functional group that may comprise or include oxygen Immobilized chalcogen may release water molecules, CO$_2$ molecules, and or CO molecules at elevated temperatures. For example, a sample of immobilized chalcogen may be dried first at room temperature in a flow of inert gas, such as helium, for removal of physical absorbed water. The sample may then be heated from room temperature to a preset temperature rapidly by placing it (in a reactor with a stream of flowing helium) into a pre-heated furnace and hold at the preset temperature for 30 minutes. During this 30 minute period of time, a liquid nitrogen cold trap may be applied to trap water, $CO_2$, or any other condensable chemical species. Un-trapped species like CO pass the cold trap, and flow with the carrying gas (flowing helium) directly to a gas-chromatograph (GC) detector. The amounts of released water, $CO_2$, CO, or other chemical species such as COS may be quantified (ppm in weight). FIGS. 34A-34C show the results of cumulated amounts of released water ($H_2O$), $CO_2$, and CO from room temperature to 800° C. for immobilized chalcogen, 100 wt % Se_0 wt % S and 83 wt % S_17 wt % S, along with the corresponding amounts that are calculated from the starting materials.

FIG. 34A shows that a majority of water molecules are released from immobilized chalcogen in a temperature region between room temperatures and 400° C. The total amounts of water released between room temperatures and 800° C. were analyzed to be about 3,257 ppm (by weight) for the immobilized chalcogen with 100 wt % Se_0 wt % S and 4,690 ppm for the immobilized chalcogen with 83 wt % Se_17 wt % S. It is believed that the presence of sulfur enhances the amount of water released. In addition, it should be noted that the total amount of water released were projected to be about 1,652 ppm, about ⅓ to ½ of the actual amount of water released from the immobilized chalcogen. This may be additional evidence that immobilized chalcogen has strong chemical interactions between chalcogen and the carbon skeleton, which may influence the outcomes of stability of water-forming chemical functional group.

FIG. 34B show that a majority of $CO_2$ molecules are released from immobilized chalcogen in a temperature region between room temperatures and 600° C. The total amounts of $CO_2$ released between room temperatures and 800° C. were analyzed to be about 10,595 ppm for the immobilized chalcogen with 100 wt % Se_0 wt % S and 18,799 ppm for the immobilized chalcogen with 83 wt % Se_17 wt % S. It is believed that the presence of sulfur also enhances the amount of $CO_2$ released. It should be noted that the total amounts of $CO_2$ released were projected to be about 11,102 ppm, which is about the same as that for immobilized chalcogen with 100 wt % Se_0 wt % S, but only about a half of that for immobilized chalcogen with 83 wt % Se_17 wt % S. This may be further evidence that immobilized chalcogen has strong chemical interactions between chalcogen and the carbon skeleton, particularly influencing the stability of $CO_2$-forming chemical functional group with the presence of sulfur.

FIG. 34C shows CO molecules continue to release from immobilized chalcogen between room temperature and 800° C. with a trend beyond 800° C. The total amounts of CO released between room temperature and 800° C. were analyzed to be about 11,618 ppm for the immobilized chalcogen with 100 wt % Se_0 wt % S and 8,690 ppm for the immobilized chalcogen with 83 wt % Se_17 wt % S. It is believed that the presence of sulfur may not alter the amounts of CO released. It should be noted that, at temperatures between room temperature and 400° C., the amounts of CO released were consistent with the calculated amounts of CO released. When the temperature is higher than 400° C., the amounts of CO released are substantially lower than the calculated (23,775 ppm for CO released between room temperatures and 800° C.). This may be further evidence that chalcogen immobilization stabilizes the CO-forming chemical functional group through chemical interactions.

As can be understood from FIGS. 34A-34C, in immobilized chalcogen, e.g., an immobilized chalcogen body or system, chemical interactions of chalcogen and carbon skeleton influence the stability of deactivating chemical functional group (that may comprise oxygen) by forming water molecules, $CO_2$ molecules, and CO molecules at elevated temperatures.

Example 20

A Battery Comprising Immobilized Chalcogen—Fabrication, Testing, and Performances Immobilized chalcogen may be used as a cathode material for a battery, a capacitor, or an energy storage device. A battery comprising immobilized chalcogen used as a cathode material, may be paired with different anode materials, for example, a metallic material (such as an alkali metal, an alkali earth metal, a Group IIIA metal, a Group IVA metal, and a Group VA metal, and a transition metal), graphite, semiconductor material (such as silicon, germanium, arsenic, etc.), or a rare earth metal in the Periodic Table of the Elements.

A battery comprising immobilized chalcogen may have an organic electrolyte or an aqueous electrolyte. The organic electrolyte may be a carbonate-based or ether-based, or other organic-based electrolyte. A battery comprising immobilized chalcogen may have a separator that may be an organic polymer, an inorganic membrane, or a solid electrolyte that may also works as a separator of the battery.

A battery comprising immobilized chalcogen vs. controls in the following examples use lithium metal as an anode, a carbonate-based electrolyte (a common electrolyte in lithium ion battery), and a polymer separator.

A Li-Chalcogen Battery Comprising Immobilized Chalcogen vs. Control C—SeS2.

Figure 35:
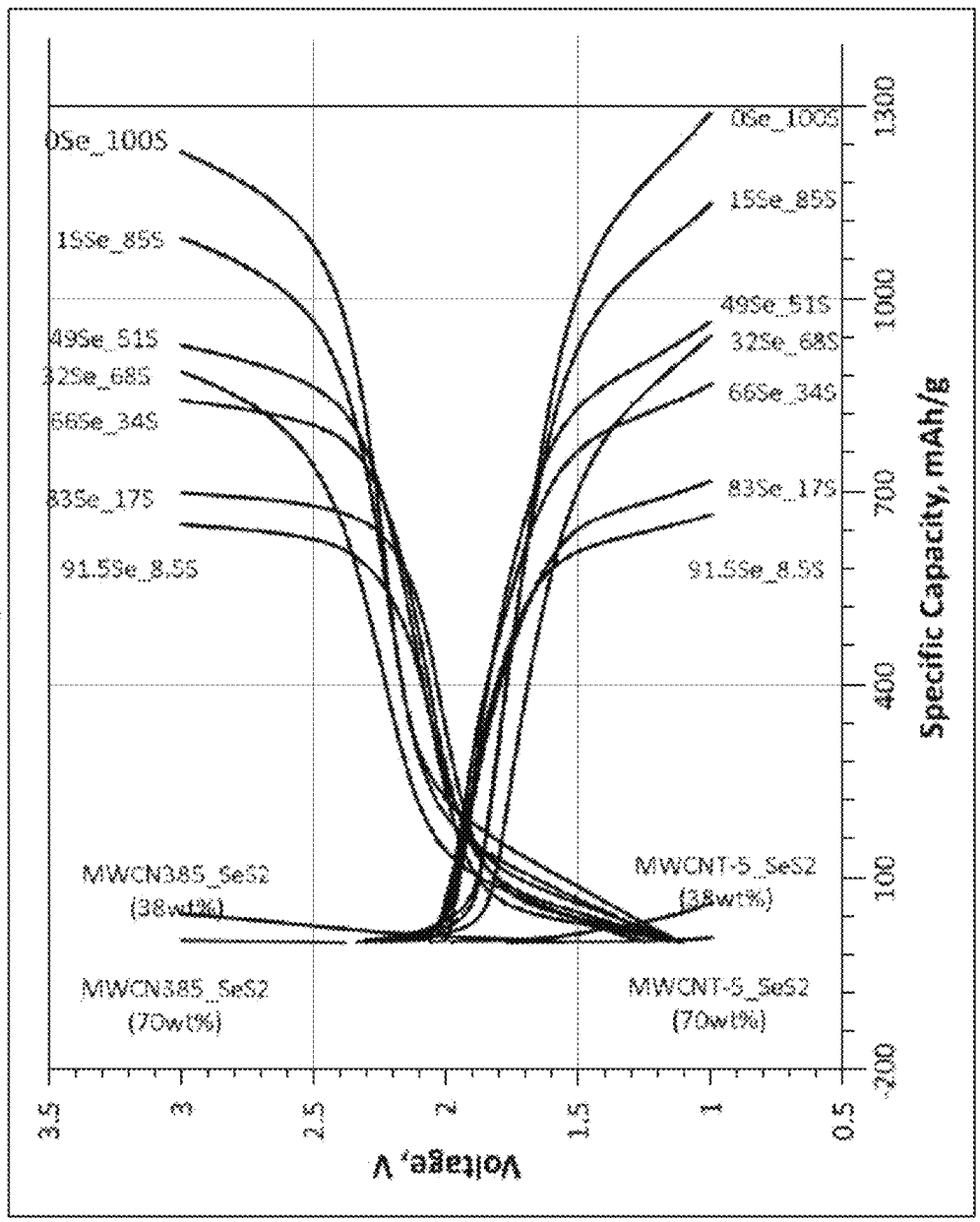
FIG. 35 shows plots (Voltage, V, vs. Specific Capacity, mAh/g—Chalcogen at a C-Rate of 1) of 10th discharge and charge cycles of a number of different batteries comprising immobilized chalcogens having different weight-percent (wt %) combinations of selenium and sulfur, wherein the theoretical specific capacity 675 mA/g-Se and 1,645 mAh/g-S were used to determine the electrical current at a specified C-rate.

Li-Chalcogen coin cell batteries of immobilized chalcogen and control C—$SeS_2$ composites tabulated in Table 6 were fabricated and tested in accordance with processes similar to those described in Example 12. Please note that a battery may show a specific capacity fast delay in the early cycles. FIG. 35 shows $10^{th}$ cycle discharge and charge results for a battery that was fabricated with immobilized chalcogen and control C—$SeS_2$ composites that were prepared with MWCNT materials at 1 C-rate. Please note that the cycling current for battery discharge or charge was determined by using the theoretical specific capacity of 675 mAh/g-Se and 1,645 mAh/g-S. Due to its low electrical conductivity, sulfur is typically considered as an electrical insulator, which is why a battery prepared with sulfur is typically cycled at a very low C-rate, 0.1 C-rate, and sometimes as low as 0.05 C-Rate, probably due to its intrinsically high internal electrical resistivity which results in an internal voltage drop.

The higher the C-rate is, the higher the internal voltage drop is. It is surprising to discover that the battery comprising immobilized chalcogen, particularly for those having a high content of sulfur, for example, 51 wt % sulfur, 68 wt % sulfur, 85 wt % S, or even 100 wt % sulfur, can discharge at 1 C-rate with a mid-voltage greater than 1.69V and deliver a specific capacity 70%-90% of a theoretical specific capacity. It was also noted that there is only one discharge stage, which suggests that either sulfur or selenium gains 2 electrons and from sulfide or selenide in a single electrochemical step. There is no intermediate step, which suggests that polychalcogenide ions, like polysulfide or polyselenide ions, did not form during the discharge process. FIG. 35 also shows that the batteries made with control C—SeS$_2$ that were prepared with MWCNT materials all have a very low specific capacity (both discharge and charge) at their tenth cycle, e.g., a discharge specific capacity of 61 mAh/g for MWCNT-5-SeS$_2$ (70 wt %) and 8.3 mAh/g for MWCNT_SeS$_2$ (38 wt %).

FIG. 35 also shows that a battery comprising immobilized chalcogen has a specific capacity (at $10^{th}$ cycle, mAh/g) 667 for 91.5 wt % Se_8.5 wt % S with a mid-voltage 1.853V; 718.7 for 83 wt % Se_17 wt % S with a mid-voltage 1.8235V; 869.7 for 66 wt % Se_34 wt % S with a mid-voltage 1.8269V; 967.7 for 49 wt % Se_51 wt % S with a mid-voltage 1.8059V; 944.4 for 32 wt % Se_68 wt % S with a mid-voltage 1.6587V; 1,150.6 for 15 wt % Se_85 wt % S with a mid-voltage 1.7101V; and 1,291.4 for 0 wt % Se_100 wt % S with a mid-voltage 1.6865V. However, batteries of C—SeS2 composites that were prepared with MWCNT-5, the 70 wt % sample (prepared in air) and the 38 wt % sample (prepared in argon flow) only have a tenth cycle's specific capacity of 8.3 and 61.1 mAh/g respectively, with a mid-voltage 1.1523V and 1.2636V, respectively; the batteries prepared with MWCNT_C—SeS2 composites performed poorly. Please note that the theoretical specific capacity for SeS$_2$ is 1,115 mAh/g. However, a battery comprising chalcogen, at its tenth cycle, delivers 88%, 85.6%, 86.6%, 82.7%, 70.8%, 76.7%, and 78.5% of the theoretical specific capacities with voltage of greater than 1.6V at a C-Rate of 1 for the immobilized chalcogen batteries discussed in this paragraph.

Figure 36:
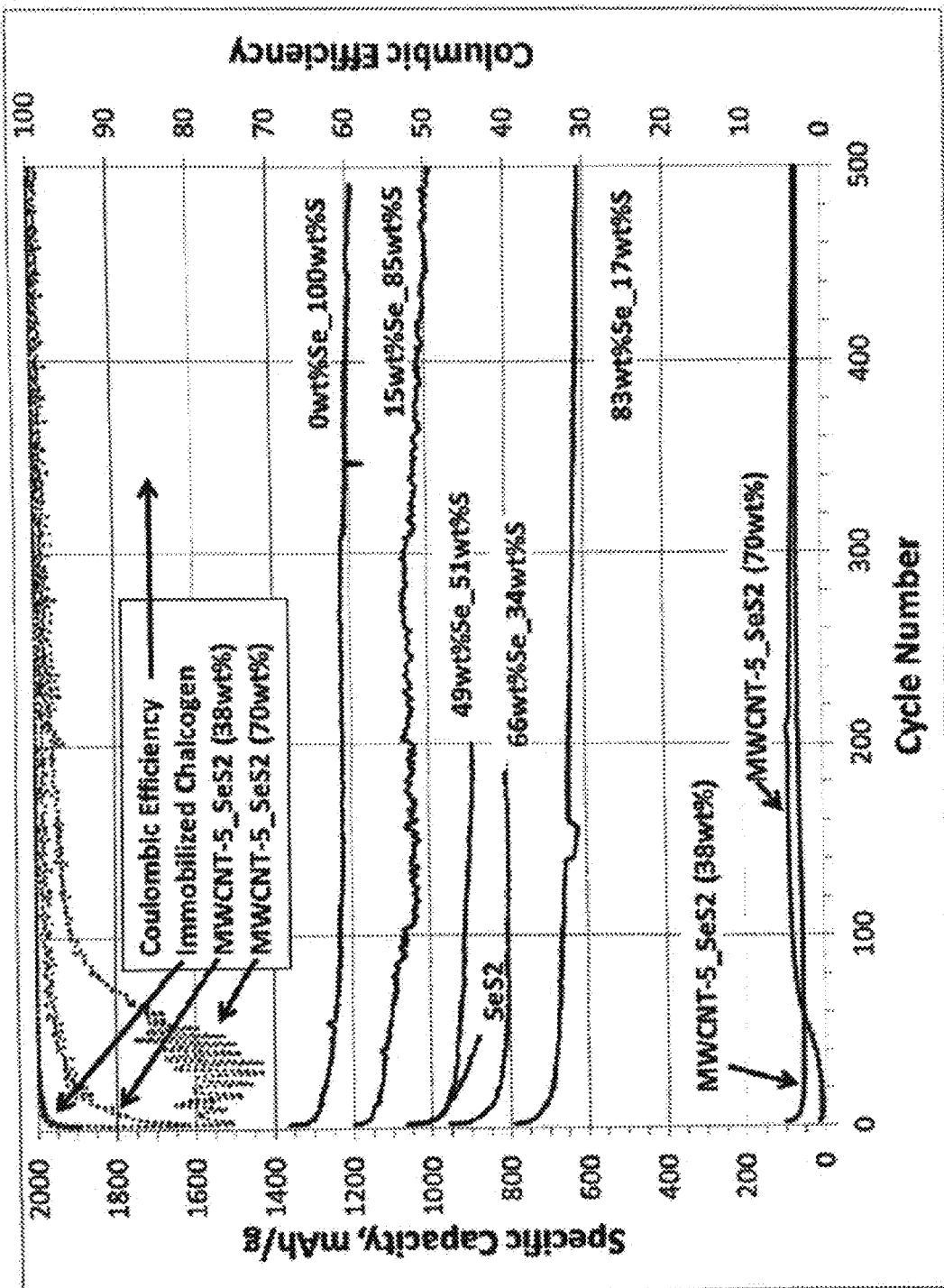
FIG. 36 shows plots of cycling performances of a number of different batteries comprising immobilized chalcogens having different weight-percent (wt %) combinations of selenium and sulfur, wherein the solid lines represent Specific Capacity vs. Cycle Number and the dashed line represents Coulombic Efficiency vs. Cycle Number.

FIG. 36 also shows the cycling efficiency data (Coulombic efficiency) for batteries comprising immobilized chalcogen, all about 100% for after less than 10 cycles, which suggests that the battery comprising immobilized chalcogen did not have shuttling effect of a polychalcogenide ion, which is consistent with a single step electrochemical process of Voltage vs. Specific Capacity discharge curve. Please note that the batteries fabricated in the current examples use carbonate-based LiPF$_6$ electrolyte, which is the same electrolyte system as a lithium ion battery. A Li—S battery would typically not perform due to the formation of polysulfide. The literature teaches using ether-based electrolytes to mitigate the shuttling effect of polysulfide ion. However, the presence of polysulfide ion may also slowly deteriorate the carbon in the cathode, drawing an analogy to the presence of peroxide or superoxide (in a lithium-air or lithium-oxygen battery) that is highly oxidative to carbon materials in the cathode.

Therefore, it is hard to achieve desirable cycling performances for a Li—S battery even if the shuttling is minimized by using a low-polysulfide-solubility ether-based electrolyte. In other words, minimizing the polysulfide solubility may not be a sound solution to its root cause, more likely, a compromised one, let alone its intrinsic property in its capability as an oxidizing agent that may slowly oxidize carbon materials on the cathode while the battery cycles. The batteries prepared with MWCNT-5_SeS$_2$ composites and a carbonate-based electrolyte show a low Coulombic efficiency, for example, 77% for MWCNT-5_SeS$_2$ (70 wt %) and 91% for MWCNT-5_SeS (38 wt %) at 10 cycles, and these batteries delivered less than 10% of the theoretical specific capacity of SeS$_2$ (1,112 mAh/g), which essentially did not perform.

FIG. 36 also shows the cycling performances of batteries comprising immobilized chalcogen, comparing against the control batteries that were fabricated with C—SeS$_2$ composites that were prepared with MWCNT materials. It is surprising that a battery comprising immobilized chalcogen cycles well at a 1 C-Rate well after 300 cycles, while the control batteries prepared with MWCNT materials barely perform as a rechargeable battery. It is also surprising to see a Li—S battery capable of delivering a specific capacity of more 1,210 mA/g-S at cycle 391, which is about 73.5% of the theoretical capacity (1,645 mAh/g) at a C-rate of 1. A battery prepared with immobilized chalcogen (15 wt % Se_85 wt % S) delivered 1,058 mAh/g at Cycle 388, which is about 70.5% of theoretical specific capacity (1,500 mAh/g) at a C-rate of 1. A battery prepared with immobilized chalcogen (SeS$_2$) delivered 877.2 mAh/g at Cycle 49, which is about 78.9% of the theoretical capacity (1,112 mAh/g). A battery prepared with immobilized chalcogen (83 wt % Se_17 wt % S) delivered a specific capacity of 614.2 mAh/g at Cycle 55, which is 73.1% of a theoretical specific capacity (840 mAh/g). Other batteries comprising immobilized chalcogen perform well against their theoretical specific capacity.

Further Description of Immobilized Chalcogen

There are at least two major challenges for a battery comprising an element of chalcogen, where the element of chalcogen is, for example, sulfur, selenium, tellurium, or even oxygen. One of the challenges is to prevent the formation of polychalcogenide anion(s). The second is to prevent such anion(s), if such anion(s) are formed, from shuttling between a cathode and an anode. These challenges may be the main reasons why it is difficult to provide a chalcogen-based battery that can cycle at a desirably high C-rate and with a desirable level of specific capacity, desirably, to be near a theoretical specific capacity of the chalcogen element, i.e., 418 mAh/g-Te, 675 mAh/g-Se, 1,675 mAh/g-S, and 3,375 mAh/g-O. Please note that the specific capacity for a lithium colbate (LiCoO$_2$) cathode of a lithium ion battery is only about 274 mAh/g-LiCoO$_2$.

Formation of a polychalcogenide ion is not desirable for a chalcogen-based rechargeable battery. It is known that a polychalcogenide ion like peroxide ($O_2^{2-}$) and or superoxide ($O_2^-$), such as Li$_2$O$_2$ and or LiO$_2$, formed in an oxygen-based cathode, is destructive for a cathode material consisting essentially of an electrical current collector element such as carbon or other oxidizable materials. For example, peroxide or superoxide may chemically attack carbon in an oxygen-based cathode or an air-based cathode, resulting in irreversible damage(s) to the cathode integrity, which could be the main cause responsible for fast deterioration of an oxygen/air-based battery. It is also known that a polychalcogenide ion, $Z_n^{m-}$ (where Z represents a chalcogen, n is an integer ranging from 2 to 8, and m is either 1 or 2), such as $S_8^{2-}$, $S_6^{2-}$, $S_4^{2-}$, $S_2^{2-}$, $Se_8^{2-}$, $Se_6^{2-}$, $Se_4^{2-}$, $Se_2^{2-}$, $Te_8^{2-}$, $Te_6^{2-}$, $Te_4^{2-}$, $Te_2^{2-}$, and or a hybrid polychalcogenide ion having more than one chalcogen element, may form in a chalcogen-based cathode during an electrochemical process (discharge and charge) of a battery. These polychalcogenide ions may behave similarly to how an oxygen-based polychalcogenide ion such as peroxide and superoxide does in its chemical attack on the cathode material(s), recognizing that the speed of the chemical attack may be slower by a non-oxygen-related polychalcogenide ion on the cathode material(s), resulting in a gradual deterioration, but difficult to detect or diagnose, of the cathode/battery during cycling of a rechargeable battery comprising a non-oxygen (more specifically, non-electrochemically-active-oxygen) chalcogen-based cathode.

Figure 37:
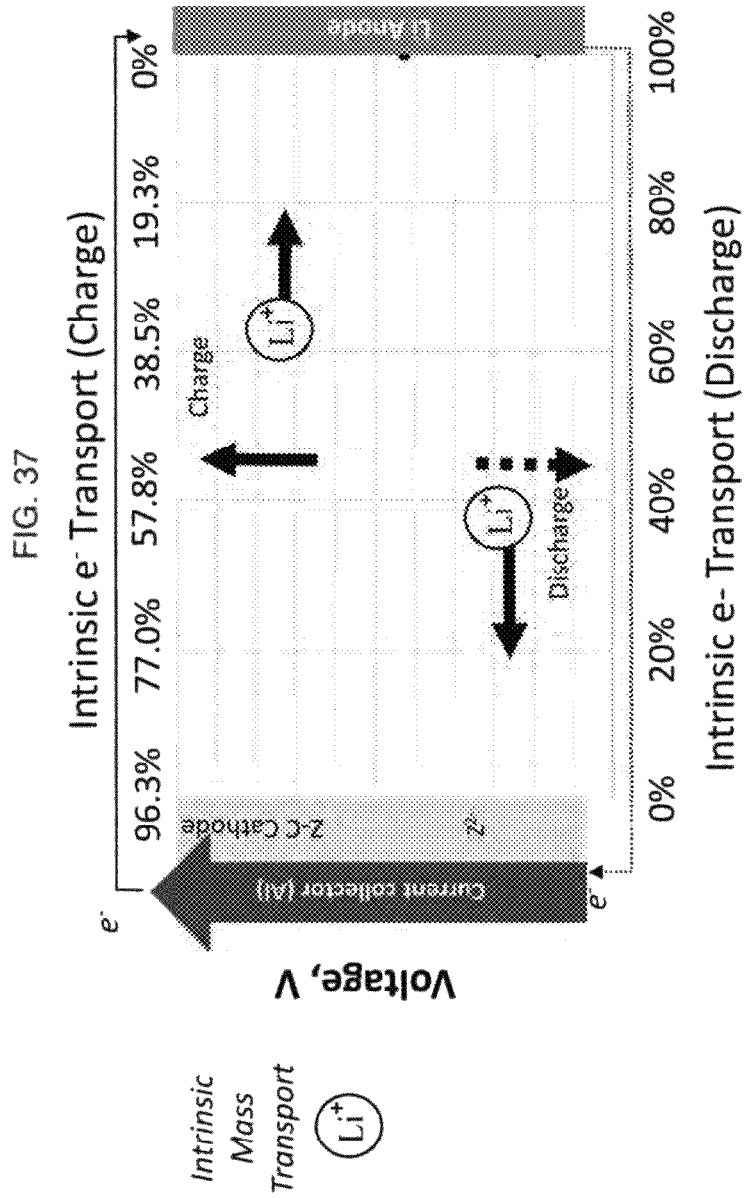
FIG. 37 is a graph which illustrates intrinsic electron transport and intrinsic mass transport for a chalcogen-based battery of the present disclosure.

Formation of a polychalcogenide ion also has another undesirable aspect—a conversion of chemical energy into heat that needs to be removed under battery thermal management. As shown in FIG. 37, which relates to an example of a chalcogen-based battery (of the present disclosure), more specifically, a sulfur-based battery that was at its 6th cycle with a cycling rate of 1 C-charage and 1 C-discharge, reduction of an elemental chalcogen atom may proceed with a one-step $2e^-$ electrochemical process, gaining 2 electrons from an external circuit and forming chalcogenide ion, $Z^{2-}$, at the cathode during a discharge process of a chalcogen-based battery. The electron transport between anode and cathode through an external circuit is desirable and intrinsic to a battery and is defined as intrinsic electron transport in the present disclosure. At the same time, cations like $Li^+$ transport from anode to cathode to balance the newly formed chalcogenide ion ($Z^{2-}$). This type of ion mass transport is also desirable and intrinsic for a rechargeable battery and defined as intrinsic mass transport in the present disclosure. Holding at a constant voltage for 5 min, the exemplified sulfur-based battery of the present disclosure showed a Coulombic efficiency of 96.3%; the Coulombic efficiency may be increased to around 100% if charging at a constant voltage 3V for a longer period of time.

Figure 38:
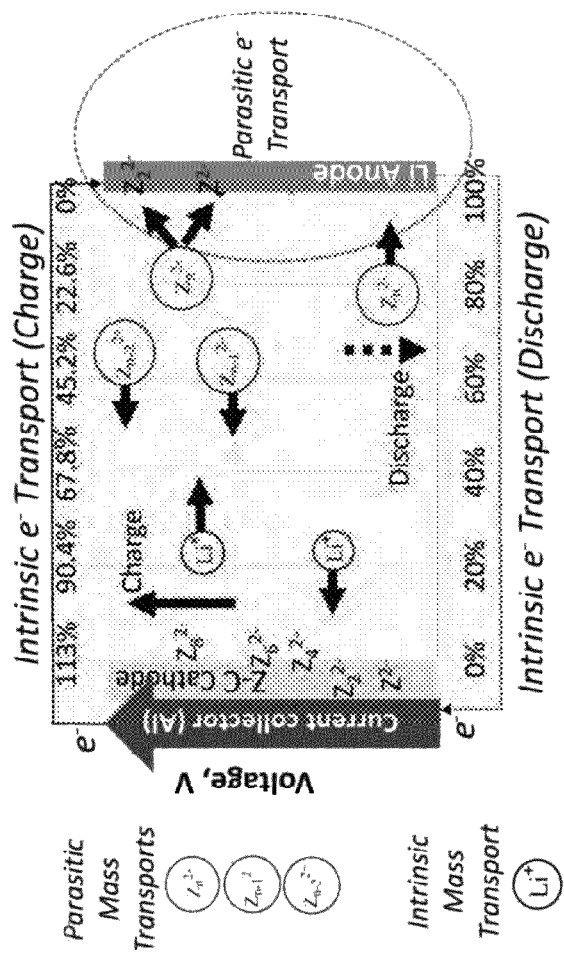
FIG. 38 is schematic illustration of formation of polychalcogenide ions, parasitic mass transport of chalcogenide ions from cathode to anode, and parasitic electron transport at an anode, and parasitic mass transport of chalcogenide ions between a cathode and an anode (that is, shuttling)

However, the reduction of elemental chalcogen may proceed through a multi-step $2e^-$ electrochemical process, in which chalcogen as a group gains $2e^-$ during a discharge process of a chalcogen-based battery, forming a polychalcogenide anion as an intermediate, $Z_n^{m-}$, as shown in FIG. 38, which refers to an example of a prior-art sulfur-based battery that cycles at a cycling rate of 0.1 C for discharge and 0.1 C for charge. The polychalcogenide anion may continue to gain electrons and forms a lower order polychalcogenide anion if the higher order polychalcogenide anion is somehow contained and anchored inside the cathode. However, polychalcogenide ions resulting from a multi-step $2e^-$ electrochemical process may be soluble in an electrolyte of a chalcogen-based battery, particularly when both polychalcogenide ions and the electrolyte are hydrophobic in nature. The dissolved polychalcogenide anion(s) may transport though a separator to the region near the anode and further react with the anode to form insoluble $Li_2Z_2$ or $Li_2Z$ on the anode, resulting in (1) an undesirable mass loss of an active material in the cathode, along with (2) an undesirable energy conversion from chemical energy to heat at the anode in a form of Redox reactions localized at the anode where the electron transfer occurs locally without transporting through an external circuit and doing work, but instead converting to heat. This type of undesirable mass transport of a polychalcogenide anion is defined as parasitic mass transport in the present disclosure; and this type of undesirable electron transfer occurring at the anode via a Redox mechanism is defined as parasitic electron transport.

Formation of a polychalcogenide ion has another undesirable aspect—shuttling effect. During a battery charging process, chalcogenide anions ($Z^{2-}$) may lose electrons and form a polychalcogenide anion intermediate, $Z_n^{2-}$. The polychalcogenide anion may then dissolve in the solvent of an electrolyte system, transport through a separator to the anode at which the polychalcogenide anion may react with the anode active material, for example, lithium, and form insoluble $Li_2Z$ and $Li2Z2$. A polychalcogenide ion ($Z_n^{2-}$) in an electrolyte may also react with insoluble $Li_2Z$ and $Li_2Z_2$ newly formed at the anode, forming a lower order polychalcogenide ion, $Z_{n-1}^{2-}$ or $Z_{n-2}^{2-}$, respectively. Polychalcogenide ion such as $Z_{n-1}^{2-}$ and $Z_{n-2}^{2-}$ may also be soluble in the electrolyte system, and then transport back to the cathode and be oxidized again by losing electrons, converting back to the original polychalcogenide anion, $Z_n^{2-}$. This type of soluble polychalcogenide ions transportation between cathode and anode during charging is called Shuttling. If appreciable amounts of the polychalcogenide anions participate in such undesirable Redox Shuttling, a significant level of parasitic current may persist, which results in a coulombic efficiency substantially lower than 100%. As shown in FIG. 38, the amount of charging capacity is 113% of the discharging capacity, indicating an estimated 13% of the electrons supplied during charge may result from the polychalcogenide shuttling, resulting in a lower Coulombic efficiency, 88%, which is 12% lower than 100%. Shuttling of polychalcogenide ion is undesirable, involving both undesirable parasitic mass transport and undesirable parasitic electron transport.

In connection with a chalcogen-based battery, it may be advantageous to limit the liberation of polychalcogenide ions and their subsequent transports including shuttling—through the cell. Parasitic electron transport and parasitic mass transport in a chalcogen-based battery are disadvantageous.

The present disclosure presents a solution to successfully control parasitic electron transfer and parasitic mass transport by preventing the formation of polychalcogenide ions, which also fundamentally tackles issues related to deterioration of the cathode material(s) that may be attacked by a polychalcogenide ion and to the undesirable shuttling of polychalcogenide ion(s), allowing a battery of the present disclosure to perform with a cycling life meaningful to practical applications.

Immobilized chalcogen (body or system) of the present disclosure comprises a chemical element from the chalcogen group (or Group 6A in the periodic table of chemical elements), an electrically conductive material, and a hydrophilic membrane gate. The chalcogen content may be between 0.1 wt % and 95 wt %, 20 wt. % and 90 wt %, or 30 wt % and 85 wt %. Chalcogen may be in an elemental form, in a compound form, or in an ionic form. However, the content for an immobilized chalcogen specifically related to oxygen as an active element may not be as high, for example, possibly between 0.001 wt % to 20 wt %, between 0.01 wt % and 15 wt %, or between 0.1 wt % and 10 wt %. More broadly speaking, in another example, the electrochemically active element may not necessarily be chalcogen element-related; it may be a cathode or an anode material that experiences a volume expansion or volume contraction during an electrochemical process. Silicon or carbon may be the electrochemically active element having large volume expansion and contraction during an electrochemical process.

Carbon may be the electrically conductive material. The carbon content may be between 1 wt % and 80 wt %, 3 wt % and 70%, or 6 wt % and 60 wt %. The carbon material may be porous; the carbon material may comprise a functional group that withdraws electrons out of the carbon matrix's EMAC system; the carbon material may have a carbo-cation center; the carbon material may provide a center that bonds to a chalcogen; and carbon and chalcogen may form a bond with a coordination bonding.

A hydrophilic membrane gate comprises a membrane capable of isolating two hydrophobic regions, one of which is a hydrophobic electrolyte system in a rechargeable battery and the other of which is the polychalcogenide ion(s) that may form in the cathode during discharge and or charge of a chalcogen-based battery. A hydrophilic membrane gate in an immobilized chalcogen of the present disclosure is analogous to a biological cell membrane that has a hydrophobic layer. The hydrophobicity of a biological cell membrane isolates an interior hydrophilic region of an aqueous electrolyte solution from an exterior hydrophilic region of another aqueous electrolyte solution. A biological cell membrane is typically made of a phospholipid that has two hydrophobic tails and one hydrophilic head. The hydrophobic tails of phospholipids aggregate together and form a hydrophobic layer of the membrane—a phospholipid bilayer—that is capable of isolating two hydrophilic regions, and the hydrophilic heads of phospholipids are oriented to the surfaces of the cell membrane so that both surfaces of the cell membrane are hydrophilic, allowing proper interactions with both interior and exterior hydrophilic regions for carrying out biological functions. The membrane formation via hydrophobic interactions of phospholipids leads to a great shape flexibility of a biological cell in life. Furthermore, there are ion-transport channels such as sodium channels, potassium channels, calcium channels, etc., ensuring a biological cell capable of carrying out ionic-related biofunctions properly. By using the same analogy, but oppositely, the present disclosure provides a hydrophilic membrane that behaves as a gate to isolate two hydrophobic regions in a chalcogen-based battery—a hydrophilic region for polychalcogenide ions (thermodynamic equilibrium product(s) of a chalcogen during an electrochemical or a Redox process) and a hydrophobic region for an electrolyte system. A hydrophilic membrane also performs as a gate to allow lithium ions and electrons to transport therethrough during an electrochemical process, ensuring proper intrinsic mass transport and electron transport in a chalcogen-based rechargeable battery. A hydrophilic membrane comprises a chain-like polymer comprising a proper level of hydrogen bond donor and hydrogen bond acceptor, ensuring a proper level of polymeric entanglement to achieve a proper level of elasticity, enabling the hydrophilic membrane gate to withstand either a tensile stress or a compression stress resulting from respective volume-expansion or volume-contraction during a respective discharge or charge process of a chalcogen-based battery.

Chalcogen may have a tendency to form a polychalcogenide ion thermodynamically after gaining electrons, establishing multiple chemical equilibriums between chalcogen and polychalcogenide ions, which is described as side reactions, or parasitic reactions, besides an intrinsic chemical equilibrium between an elemental form of a chalcogen and an ionic form of a chalcogenide ion, which is described as a main reaction, or as an intrinsic reaction. The parasitic and intrinsic reactions are in competition in a reaction system of a chalcogen-based battery. If a product of a chemical equilibrium is removed by forming a precipitate or dissolving into an electrolyte followed by transporting to the anode at which it is consumed by reacting with an anode material, the reaction shifts to the right of a chemical equilibrium. In the art, significant amount of polychalcogenide ion(s) forms, possibly due to significant dissolution of polychalcogenide ion(s) from cathode into an electrolyte system, and followed by its transport in an electrolyte system to an anode, and reacting with the anode material, which results in parasitic mass transport and parasitic electron transport owing to the parasitic reactions.

A hydrophilic membrane in an immobilized chalcogen of the present disclosure may prevent a polychalcogenide ion from forming, by isolating two hydrophobic regions in a chalcogen-based battery, ensuring that no parasitic product(s) (polychalcogenide ion(s)) is removed from the equilibriums of the parasitic reaction system of a chalcogen during an electrochemical process. More importantly, the product (lithium chalcogenide) of the intrinsic reaction, $Z+2e^-\to Z^{2-}$, is removed by forming a precipitate, $Li_2Z$, during discharge process of a chalcogen-based battery, or elemental Z (a precipitate) during charge process of a chalcogen-based battery. A hydrophilic membrane gate ensures that a battery made with an immobilized chalcogen comprising a hydrophilic membrane gate performs intrinsic mass transport and intrinsic electron transport during its electrochemical cycling process of a chalcogen-based battery.

The content of a hydrophilic membrane gate for an immobilized chalcogen of the present disclosure may be between 0.1 wt % and 40 wt %, 0.2 wt % and 30 wt %, and 0.3 wt % and 20 wt %.

A hydrophilic membrane may comprise a polymer chain with a group of atoms that are bonded together by bonds comprising a covalent bond that has a bonding energy ≥160 kJ/mol. A hydrophilic membrane comprising a covalent bond may adhere to an immobilized chalcogen particle and wind around the immobilized chalcogen particle, or it may adhere to more than one immobilized chalcogen particle and wind around immobilized chalcogen particles to form a substrate. Covalent bonding gives each polymer chain a strong mechanical strength for a hydrophilic membrane.

A polymer chain for a hydrophilic membrane gate may be selected from the following polymer categories or polymer systems, for example, coalescence polymers, condensation polymers, heat conversion polymers, inorganic polymers, lacquers polymers, oxygen reactive polymers, single component catalyzed/cross-linked polymers, solvent evaporation polymers, two-component catalyzed/cross-linked polymers, etc. It is desirable that a hydrophilic membrane holds an electrochemical active element, for example, the immobilized chalcogen together as a particle, and or holds the immobilized chalcogen particles together as a substrate, allowing the immobilized chalcogen to perform electrochemical processes of a battery (that is, discharge and charge). When the volume expansion or contraction of an electrode is within the limit of the elasticity of a hydrophilic membrane, a membrane with a strong inter-chain binding power ensures a battery comprising immobilized chalcogen maintains a desirable physical integrity and achieves a satisfactory discharge-charge cycling life.

It is worthwhile to mention that a membrane may fail (for example, experience a loss in physical integrity) if the discharge/charge related volume expansion or contraction exceeds the stress limit that the membrane can withstand. The deteriorated physical integrity of an electrode could give rise to undesirable physical misconnects in an electrode, resulting in undesirable electrical disconnects, preventing electrons flowing in or out of the electrode during an electrochemical process of a battery. This could lead to a fast decline in battery performance, and ultimately, a possibly complete battery failure.

A hydrophilic membrane gate of the present disclosure comprises a hydrogen bond donor, a hydrogen bond acceptor, or both of a hydrogen bond donor (A) and a hydrogen bond acceptor (B). A hydrogen bond donor and a hydrogen bond acceptor may form a hydrogen bond. A hydrogen bonding is a donor-acceptor interaction specifically involving a hydrogen atom, primarily an electrostatic force of attraction between a hydrogen atom that is covalently bound to a more electronegative atom or group (A), which is described as a hydrogen bond donor, and another electronegative atom (B) bearing a lone pair of electrons, which is described as a hydrogen bond acceptor. The energy of a hydrogen bond may vary between 4 and 160 kJ/mol, depending on the nature of the donor and acceptor atoms that constitute the bond, their geometry, and environment. A hydrogen bond is weaker than a covalent bond that has a bonding energy greater than 160 kJ/mol and stronger than Van der Waals forces that are physical interactions among molecules, ranging between 0.4 to 4 kJ/mol.

Hydrogen bond may be intermolecular (occurring between separate molecules) or intramolecular (occurring among parts of a molecule).

The hydrophilic membrane gate may comprise a hydrogen bond donor and or a hydrogen bond accepter with a content between 0.01 wt % and 95 wt %, between 0.1 wt % and 80 wt %, or between 1 wt % and 70 wt %.

A hydrophilic membrane gate comprising a hydrogen bond forming capability may be desirable, introducing a safe lock and or a self-heal mechanism allowing an electrode comprising an immobilized chalcogen of the present disclosure to expand and contract in volume more freely during an electrochemical process (discharge and charge), particularly when the discharge/charge related volume expansion or contraction is substantial, which is particularly the case for a chalcogen-based battery and or a silicon-based battery.

A safe lock mechanism of a hydrophilic membrane is analogous to an explosion-proof mechanism for a pressure vessel. A pressure vessel may have a limit pressure at or beyond which the vessel may fail catastrophically. An explosion proof vessel typically has a rupture disc, also known as a pressure safety disc, burst disc, bursting disc, or bursting diaphragm, protecting the pressure vessel from over-pressurization that may result in a catastrophic event—explosion. A rupture disc is a type of sacrificial part since it has a one-time-use membrane that fails at a pre-determined differential pressure, either positive or vacuum.

The bonding strength resulting from covalent bonding of a membrane is analogous to the limit pressure at which the pressure vessel may fail catastrophically when a pressure inside a pressure vessel reaches and exceeds the maximum pressure of the pressure vessel. The covalent bonding of a membrane may break when the volume expansion of a chalcogen-based particle or substrate creates a stress that exceeds bonding strength of a covalent bond of the membrane. The breakage of the covalent bond of the membrane is permanent, which is catastrophic, un-repairable, and undesirable.

Hydrogen bonding from a hydrophilic membrane comprising a capability of forming a hydrogen-bond provides a safe lock mechanism that is analogous to a rupture disc—a hydrogen bond breaks when the stress resulting from the volume expansion exceeds the strength of the hydrogen bond, providing a stress relief prior to reaching a stress level at which the covalent bonds of a membrane fail.

A major difference between the rupture of a rupture disc and the breakage of a hydrogen bond is that the former is sacrificial and the latter is operational. When the volume expansion of an electrode (such as a cathode comprising a chalcogen element) during an electrochemical process creates a tensile stress that is stronger than the strength of the hydrogen-bond of a hydrophilic membrane gate, the hydrogen bond breaks (separating the hydrogen-bond into two separate parts, a hydrogen bond donor and a hydrogen bond acceptor), resulting in a stress release resulting from the volume expansion. The hydrogen bond donor then finds a new hydrogen acceptor and forms a new hydrogen bond along polymer chains spontaneously. The hydrogen bond breaks and forms while the volume of an electrode expands while performing an electrochemical process, which is operational and highly desirable because it may avoid catastrophic breakage of a binder. Moreover, a hydrogen bond also breaks into a hydrogen bond donor and a hydrogen bond acceptor when a compression stress resulting from a volume contraction of an electrode performing an electrochemical process reaches or exceeds the strength of a hydrogen bond, prior to reaching a stress that could break the covalent bond of a binder.

Hydrogen bond breakage provides a mechanism of stress release. The hydrogen bond donor then finds a new hydrogen bond acceptor and forms a new hydrogen bond along polymer chains spontaneously. Both breakage and formation of hydrogen bond during volume expansion and contraction resulting from an electrode performing an electrochemical process are operational and not sacrificial. The former, breakage of hydrogen bonds, is a safe un-lock process and the latter, hydrogen bond formation, is a self-heal process of a hydrophilic membrane of the present disclosure. The hydrophilic membrane gate is truly "elastic" by stretching and entangling of a polymer chain via hydrogen bond breakage and formation, achieving safe un-lock and self-heal mechanisms, preventing catastrophic failures of volume-expansion and volume-contraction during respective discharge and charge processes of a chalcogen-based battery.

As an example, a hydrophilic membrane gate comprises a molecule comprising a hydroxyl group that is a hydrogen bond donor and or a hydrogen bond acceptor. As an example, a water molecule consists of two hydrogen atoms and one oxygen atom. Both of the hydrogen atoms that are covalently bonded with the oxygen atom are hydrogen bond donors and the central oxygen atom is a hydrogen bond acceptor. A water molecule is the most hydrophilic. As another example, the molecule may be a carbohydrate molecule. Carbohydrate is a hydrophilic molecule that has a level of hydrophilicity next to the water molecule. A carbohydrate molecule comprises carbon, hydrogen, and oxygen, typically with a hydrogen to oxygen ratio of 2:1 (as in water) with an empirical formula $C_m(H_2O)_n$, wherein m may or may not be different from n. Please also note that not every carbohydrate molecule conforms to this precise stoichiometric definition, for example, an uronic acid such as glucuronic acid in which a hydroxyl group of glucose is oxidized into a carboxylic acid, and for example, a deoxy sugar such as fucose in which a hydroxyl group of glucose is replaced with a hydrogen atom and a deoxyribose in which a hydroxyl group of ribose is replaced by hydrogen. Carbohydrate may be a saccharide molecule. A saccharide molecule may be a monosaccharide molecule, a disaccharide molecule, or a polysaccharide molecule, etc.

Figure 39:
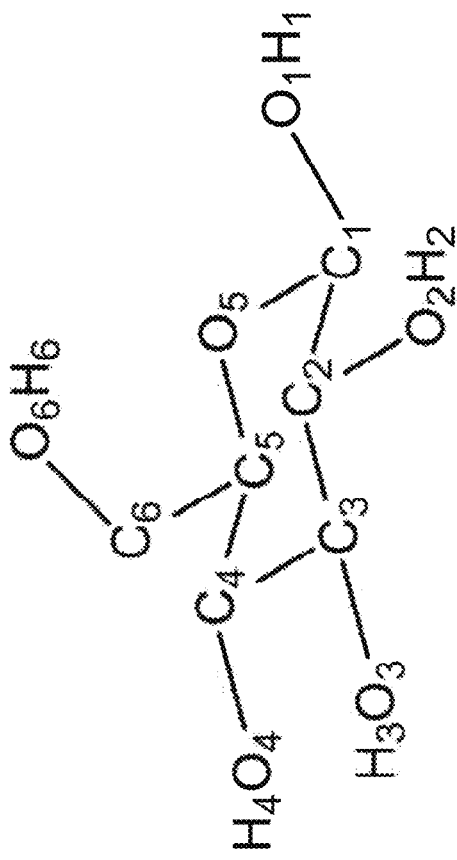
FIG. 39 illustrates a chemical structure for glucose (an example of a carbohydrate such as a saccharide) with detailed atom labeling.
Figure 40:
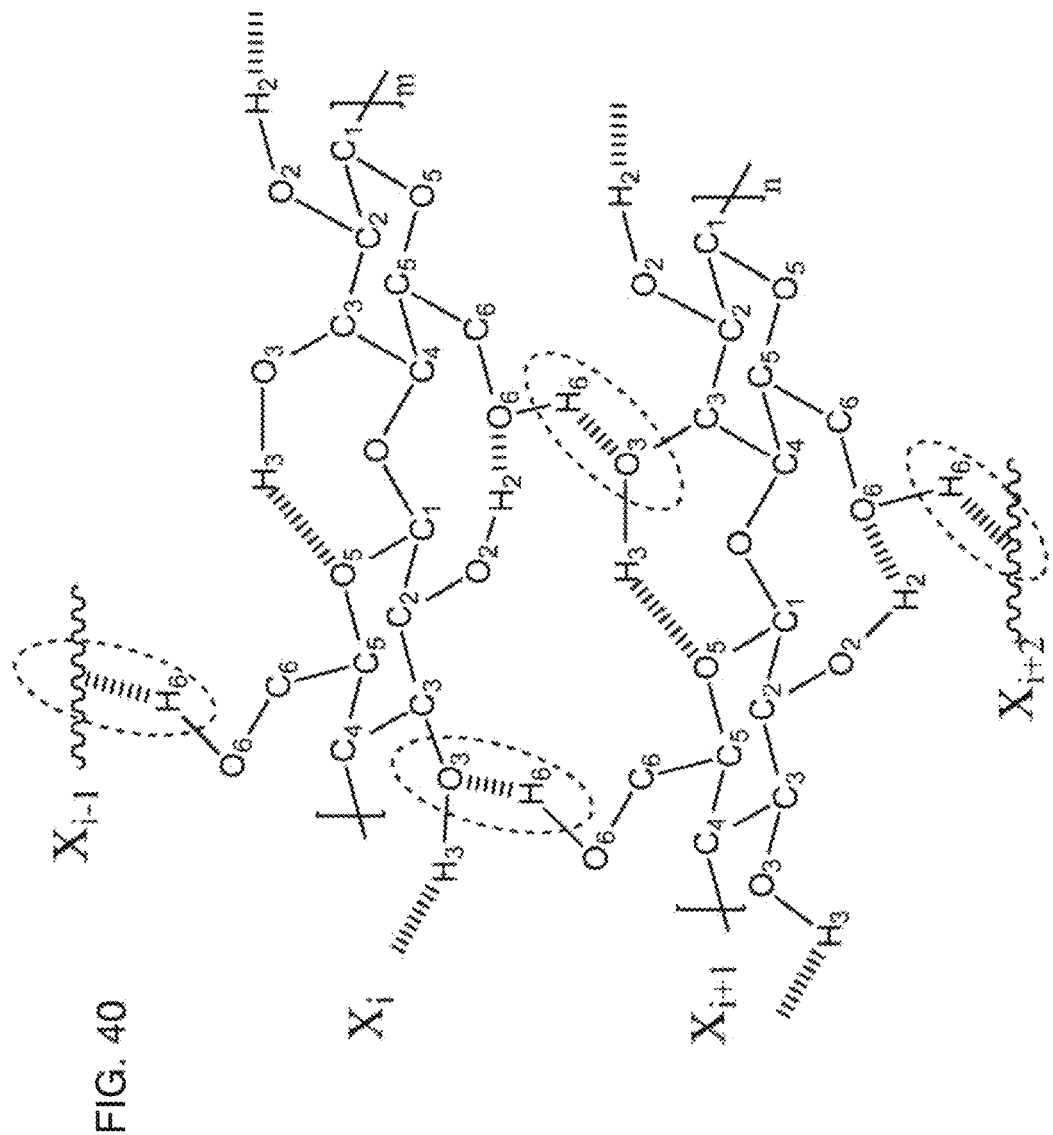
FIG. 40 illustrates a chemical structure for polysaccharide (an example of a carbohydrate) X and with, for example, glucose as basic chemical units that are connected by 1,4-glycosidic ether bonds.

FIG. 39 shows a chemical structure of a glucose molecule (with each atom labeled) as an example of a carbohydrate molecule, more specifically, a saccharide molecule, of the present disclosure. Hydroxyl groups at position 1, 2, 3, 4, and 6 are a hydrogen bond donor and a hydrogen bond acceptor. When two molecules of carbohydrate such as glucose are bonded together by forming a 1-4 glycosidic bond, it results in a disaccharide molecule. Multi-saccharide units may be linked together by forming 1-4 glycosidic bonds and form a polymeric chain of a polysaccharide molecule, for example, $X_i$ and $X_{i+1}$—non-branched chain polymers having n glucose units and m glucose units, respectively, as shown in FIG. 40. Please note that the polymeric chain may also be branched. Please also note that a 5-member ring fructose-based carbohydrate, or other carbohydrate molecule, is also within the scope of the present disclosure.

Intramolecular hydrogen bonding may be desirable for a hydrophilic membrane gate of the present disclosure. FIG. 40 also shows an example of hydrogen bond formation within a polysaccharide polymeric molecule (intramolecular), —$O_3$—$H_3$—$O_5$— and —$O_2$—$H_2$—$O_6$— with a polymeric chain of $X_i$ and $X_{i+1}$. A solid line is used to illustrate a covalent bond and a dashed line is used to illustrate a hydrogen bond. The hydrogen bonding such as intramolecular hydrogen bonding may be key for achieving a desirable level of hydrophilicity of a hydrophilic membrane gate of the present disclosure.

Intermolecular hydrogen bonding may also be desirable for a hydrophilic membrane gate of the present disclosure. FIG. 40 also shows an example of intermolecular hydrogen bond formation between two polysaccharide molecules of $X_i$ and $X_{i+1}$, —$O_6$—$H_6$—$O_3$—. Intermolecular hydrogen bond formation may occur between $X_{i-1}$ and $X_i$, $X_{i+1}$ and $X_{i+2}$, etc. This well-aligned intermolecular hydrogen bonding (—$O_6$—$H_6$—$O_3$—) may extend substantially in two dimensions. Strong preference in a large-scale chemical structure conformation among polysaccharide molecules may result in a strong tensile strength.

Strong intermolecular hydrogen bonding such as —$O_6$—$H_6$—$O_3$— may give dimensional rigidity to a hydrophilic membrane gate, allowing the hydrophilic membrane gate to withstand a moderate volume expansion during a discharge process of a chalcogen-based battery in the event the stress resulting from a moderate volume expansion is within the limit of the mechanical strength of a hydrophilic membrane gate. This type of hydrophilic membrane gate may be "glassy", rigid, and brittle.

However, well-aligned intermolecular hydrogen bonds (like —$O_6$—$H_6$—$O_3$—) may fail in the event the tensile stress resulting from a large volume expansion due to the discharge of a chalcogen-based battery exceeds the mechanical strength of a hydrophilic membrane gate; then the hydrophilic membrane gate may shatter into subregions. The boundaries of these shattered subregions may be the locations at which a hydrophobic polychalcogenide ion may dissolve preferentially into a hydrophobic electrolyte system of a chalcogen-based battery. In this event, the hydrophilic membrane gate is breached, which is not desirable, because it could detrimentally impact the fundamental performance and cycling life of a chalcogen-based battery.

Figure 41:
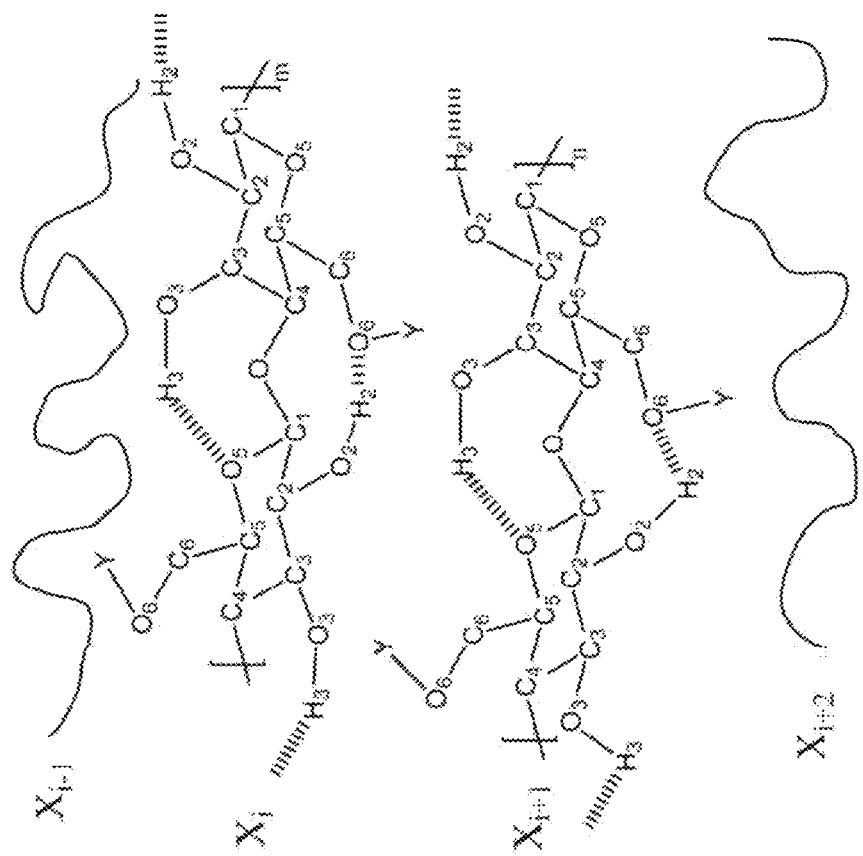
FIG. 41 is another illustration of a chemical structure for polysaccharide (an example of a carbohydrate) X, and with, for example, glucose as basic chemical units that are connected by 1,4-glycosidic ether bonds.

As an example, it may be desirable that a hydrophilic membrane gate is embodied by a partial or a complete removal of hydrogen bond hydrogen atom(s), for example, H6, as shown in FIG. 41, for limiting or completely eliminating a well-aligned intermolecular hydrogen bonding. Partial removal of intermolecular hydrogen bond hydrogen may lead to a lower level of alignment of polysaccharide/carbohydrate molecules in a hydrophilic membrane gate. Complete removal of intermolecular hydrogen bond hydrogen may achieve a complete misalignment of the polysaccharide molecules in a hydrophilic membrane gate. Misalignment resulting from removal of intermolecular hydrogen bond hydrogen may lead to some level of entanglement of polysaccharide molecules. Polymeric entanglement may occur within a polymeric polysaccharide molecule. Entanglement may lead to multi-molecule-entanglements. A hydrophilic membrane gate comprising entangled molecule(s) is "rubbery", flexible, and elastic. A rubbery/flexible/elastic hydrophilic membrane gate may expand and contract to a much greater degree than a glassy/rigid/brittle one. A rubbery/flexible/elastic hydrophilic membrane gate may allow a chalcogen-based battery to cycle by withstanding a much higher degree of expansion and or contraction during an electrochemical discharge or charge process of a chalcogen-based battery, particularly in an electrolyte system comprising a solvent having a hydrogen bond acceptor. The solvent having a hydrogen bond acceptor may work as a plasticizer, which further enhances the material properties in flexibility and elasticity.

Returning now to FIG. 39, a monosaccharide molecule like glucose has three hydrogen bond donors, Position 2, Position 3, and Position 6, besides hydroxyl groups at Position 1 and Position 4. Hydroxyl groups at Positions 4 and 6 are typically used to form glycosidic bonds (—O—, an ether bond) in a polysaccharide molecule. Hydroxyl group at Position 6 is typically an intermolecular hydrogen bond donor in a polysaccharide molecule. It may be difficult to achieve 100% selectivity in removing the hydrogen from the hydroxyl group at Position 6 in a polysaccharide molecule, though the hydroxyl group at Position 6 has a structurally-conformational preference in pointing outwards in a polysaccharide molecule environment. The removal of the hydrogen bond hydrogen at Position 6 may typically be more preferential over that at Position 2 and or Position 3.

The degree of hydrogen bond hydrogen removal from a carbohydrate or polysaccharide molecule may vary from 0% (no removal) to 100%, defined by a percentage of the amount of hydrogen bond hydrogen removed among the total amounts of the hydrogen bond hydrogen in a carbohydrate. For a complete removal of hydrogen bond hydrogen at Position 6, the level of hydrogen bond hydrogen removal would be ⅓, i.e., 33.3% if the selectivity of the removal of hydrogen bond hydrogen at Position 6 to that at Position 2 and that at Position 3 is 100%. To ensure a near-complete removal of the intermolecular hydrogen bond hydrogen, one may remove a little bit more than one hydrogen bond hydrogen out of three hydrogen bond hydrogens from a carbohydrate molecule, or a saccharide molecule. A proper level of entanglement of a polymeric chain may be achieved when the level of hydrogen bond hydrogen removal is less than 33.3%, for example, ≥31%, ≥32%, or ≥33%.

As an example, it is desirable to have a hydrophilic membrane gate comprising a carbohydrate, or a polysaccharide molecule, having a degree of removal between 31% and 99%, 32% and 95%, 33% and 90%, 34% and 85%, or 35% and 80%. The removal of hydrogen bond hydrogen atoms does not have to be selective in Position 6. The removal may occur at Position 2, and Position 3. Removal of hydrogen bond hydrogen, at any rate, decreases the concentration of hydrogen bond donor and increases the concentration of hydrogen bond acceptor, resulting in a reduction in the degree of intermolecular hydrogen bonding, making the hydrophilic membrane gate more flexible, more rubbery, and more elastic, which is an embodiment of the present disclosure, allowing the immobilized chalcogen to withstand a substantial volume expansion and volume contraction in an electrochemical process of a battery comprising an immobilized chalcogen.

In another example, partial removal of hydrogen bond hydrogen is analogous to the adjustment of a nameplate to a lower pressure limit, allowing a rupture disc to go off at a lower pressure limit and preventing a pressure vessel from a catastrophic failure—explosion.

The residual bond after the removal of a hydrogen bond hydrogen, as an example, X—$O_6$— at Position 6 in a polysaccharide or a carbohydrate molecule after H6 removing at Position 6 may be capped off by a new chemical functional group, called a capping group Y, as shown in FIG. 41. The capping group, for example, may be an ester group

[X—O-A, such as X—$O_6$—$SO_3^-$ (sulfate), X—$O_6$—$CO_2^-$ (carbonate), X—$O_6$—$PO_3^-$ (phosphate), X—$O_6$—$NO_2$ (nitrate), X—$O_6$—$BO_2^-$ (boronate), or other ester group, wherein the anion is balanced by an alkaline metal ion, for example, $Li^+$, $Na^+$, etc.], etc., an ether group (X—O—R, where R is alkyl, alkenyl, or alkynyl having 1 to 20 carbon atoms, 1 to 10 carbon atoms, 1 to 6 carbon atoms, or 1 to 4 carbon atoms, either un-branched or branched), or an ether group with a hydrocarbon group having an additional functional group (X—O—R'-G), for example, X—$O_6$—R'—$COO^-$ (alkylcarboxylate), X—$O_6$—R'—$SO_3^-$ (alkylsulfonate), X—$O_6$—R'—$PO_3^{2-}$ (alkylphosphate), etc., where R' may be a hydrocarbon group having 1 to 20 carbon atoms, 1 to 10 carbon atoms, 1 to 6 carbon atoms, or 1 to 4 carbon atoms, and the negative charge may be balanced by an alkaline metal ion, such as $Li^+$, $Na^+$, etc. These carbon atoms may be unbranched or branched. These carbon chains may have other substituted atom(s) or group(s). Please also note that the removal of hydrogen bond hydrogen may also occur for hydroxyl group(s) at Position 2 and Position 3 and the residual hydroxyl bond after removing the hydrogen bond hydrogen may also be capped by a capping group (X—O—Y) that has been discussed in the present disclosure.

It is desirable to achieve a proper level of elasticity for a hydrophilic membrane gate. The hydrophilic membrane gate comprises a material having a capability of forming hydrogen bond. The enhancement in entanglement of a polymeric chain after the partial removal of hydrogen bond hydrogen may suggest that the entangled polymeric molecules are relatively static. The entangled polymeric chains are capable of being stretched out without breakage during volume expansion resulting from discharge process of a chalcogen-based battery. The stretched polymeric chains may curl, or entangle again, during the volume contraction resulting from the charge process of a chalcogen-based battery. These stretching and curling processes are the safe unlock and self-heal mechanisms described previously in the present disclosure by hydrogen bond breakage and formation. Please note that partial removal of hydrogen bond hydrogen, particularly from —$O_6H_6$, may be intended to interrupt the inter-chain alignment, enhance the level of disorder among the polymeric chains, and allow an increase in polymeric chain entanglement. Intermolecular hydrogen bonding is still desirable, as stated earlier, possibly occurring at Position 2, Position 3, Position glycosidic oxygen, and Position 6 after partial hydrogen bond hydrogen removal, but at a higher level of disorder. It may not be desirable to remove all hydrogen bond hydrogen from the hydrophilic membrane gate, since it would imply that there is no hydrogen bond donor available for hydrogen bond to form, unless an additional component comprising a hydrogen bond donor is introduced.

Description of FIGS. 37-48

Examples in accordance with the present disclosure and comparative disclosure are described below in connection with FIGS. 37-48.

FIG. 37 refers to a chalcogen-battery of the present disclosure which performs with two intrinsic transports: intrinsic electron transport and intrinsic mass transport.

FIG. 38 refers to chalcogen-battery challenges, including: (1) formation of polychalcogenide ions; (2) parasitic mass transport of chalcogenide ions from cathode to anode for parasitic electron transport at anode; and (3) parasitic mass transport of chalcogenide ions between cathode and anode—shuttling.

FIG. 39 shows a chemical structure for glucose (an example of carbohydrate such as a saccharide) with detailed atom labeling.

FIG. 40 shows a chemical structure for polysaccharide (an example of a carbohydrate) $X_i$ and $X_{i+1}$ with glucose (as an example) as basic chemical units that are connected by 1,4-glycosidic ether bonds. Three hydroxyl groups at Positions 2, 3, and 6 may be a hydrogen bond donor and or a hydrogen bond acceptor. There are intramolecular hydrogen bonds, —$O_3H_3$—$O_5$ and —$O_2H_2$—$O_6$, illustrated in a polymeric strain $X_i$ and $X_{i+1}$. Intermolecular hydrogen bonds, —$O_6H_6$—$O_3$, also form between $X_i$ and $X_{i+1}$. The intermolecular hydrogen bonds, —$O_6H_6$—$O_3$, are also illustrated between polymeric strains $X_{i-1}$ and $X_i$ as well as between $X_{i+1}$ and $X_{i+2}$.

FIG. 41 shows a chemical structure for polysaccharide (an example of a carbohydrate) $X_i$ and $X_{i+1}$ with glucose (as an example) as basic chemical units that are connected by 1,4-glycosidic ether bonds. Hydrogen bond hydrogen at Position 6 (as an example) was removed (partially or completely) and capped by a new chemical functional group (Y), therefore, resulting in less well-aligned intermolecular hydrogen bond (—$O_6H_6$—$O_3$) formation, which further leads to a high level of molecular disorder and an enhancement of polymeric molecular entanglement. The hydroxyl groups at Positions 2 and 3 continue to be a hydrogen bond donor and or a hydrogen bond acceptor. There are intramolecular hydrogen bonds, —$O_3H_3$—$O_5$ and —$O_2H_2$—$O_6$, illustrated in a polymeric strain $X_i$ and $X_{i+1}$. Well-aligned intermolecular hydrogen bonds, —$O_6H_6$—$O_3$, between $X_i$ and between $X_{i-1}$ and $X_i$, or between and $X_{i+1}$ and $X_{i+2}$ may not exist anymore due to the removal of hydrogen bond hydrogen $H_6$. Hydrogen bond hydrogen at Position 2 or 3 may also be removed, which would result in a decrease in concentration of hydrogen bond donor and an increase in concentration of hydrogen bond acceptor.

Figure 42:
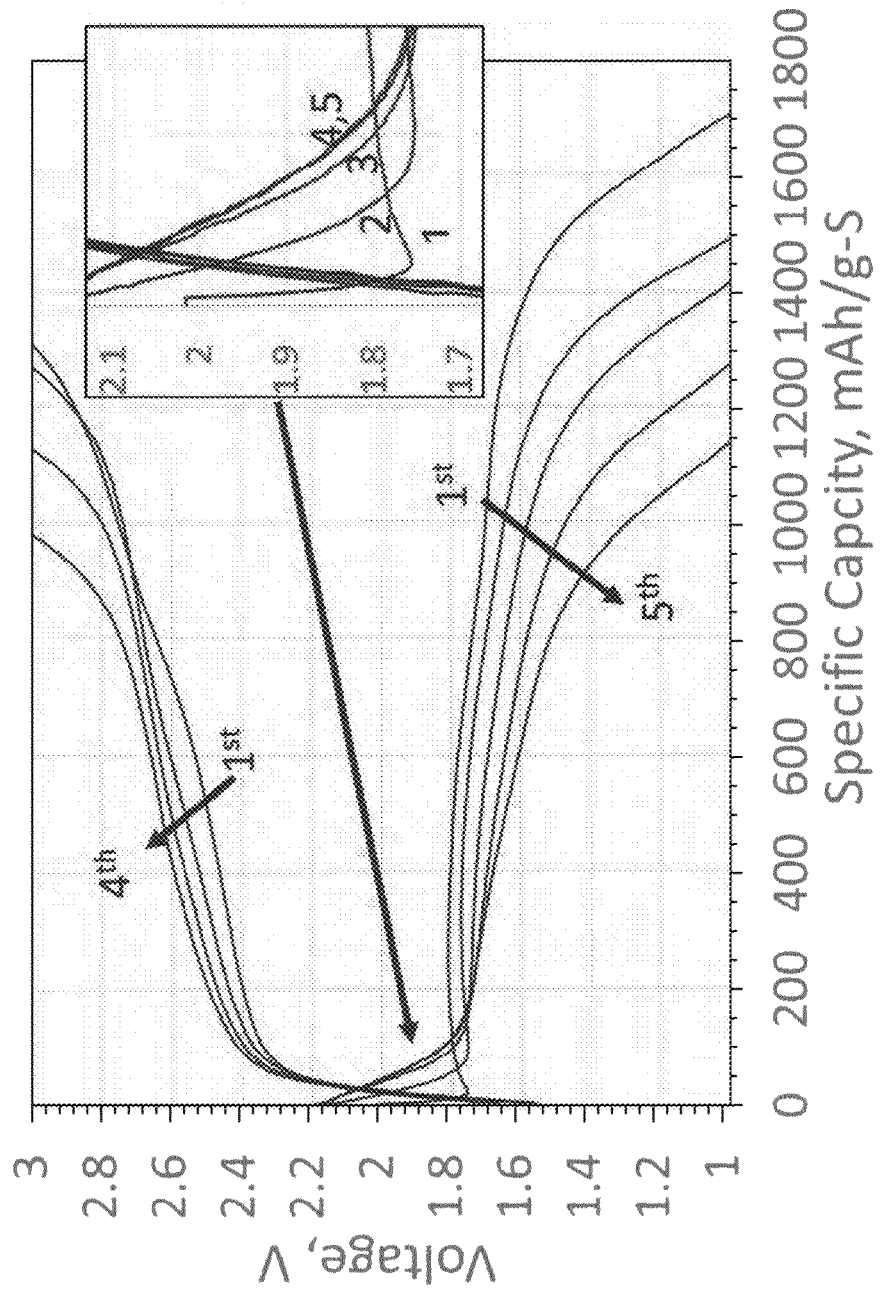
FIG. 42 shows battery discharge and charge curves for a comparative battery comprising sulfur, carbon, and a carbohydrate.

FIG. 42 shows battery discharge and charge curves for Comparative Example H1 (described below) which involves a battery comprising sulfur, carbon, and a carbohydrate—polysaccharide (having an average molecular weight of 90,000 g/mol) with a 23.3% level of hydrogen bond hydrogen removal, capped by X—O—$CH_2COO^-$, wherein the negative charge is balanced by an alkaline metal ion, for example, $Na^+$.

Figure 43:
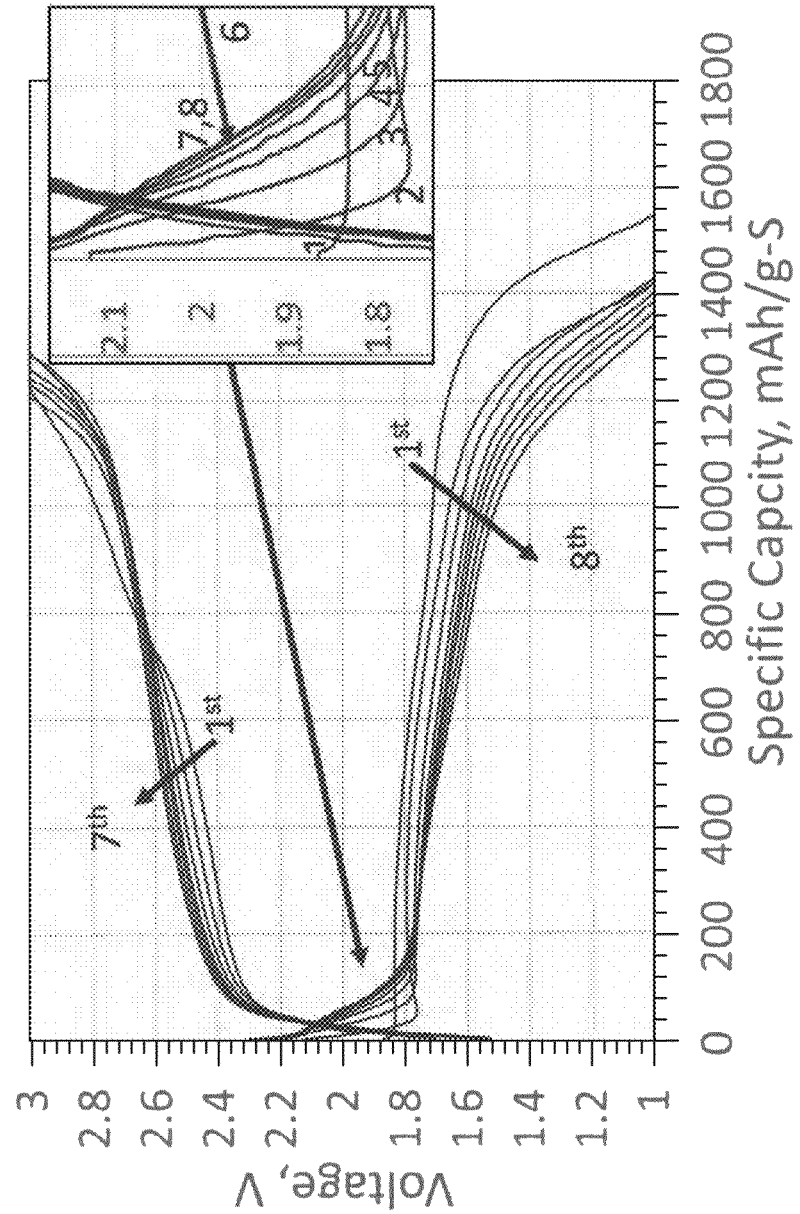
FIG. 43 shows battery discharge and charge curves for another comparative battery comprising sulfur, carbon, and a carbohydrate.

FIG. 43 shows battery discharge and charge curves for Comparative Example H2 (described below) which involves a battery comprising sulfur, carbon, and a carbohydrate—polysaccharide (having an average molecular weight of 250,000 g/mol) with a 23.3% level of hydrogen bond hydrogen removal, capped by X—O—$CH_2COO^-$, wherein the negative charge is balanced by an alkaline metal ion, for example, $Na^+$.

Figure 44:
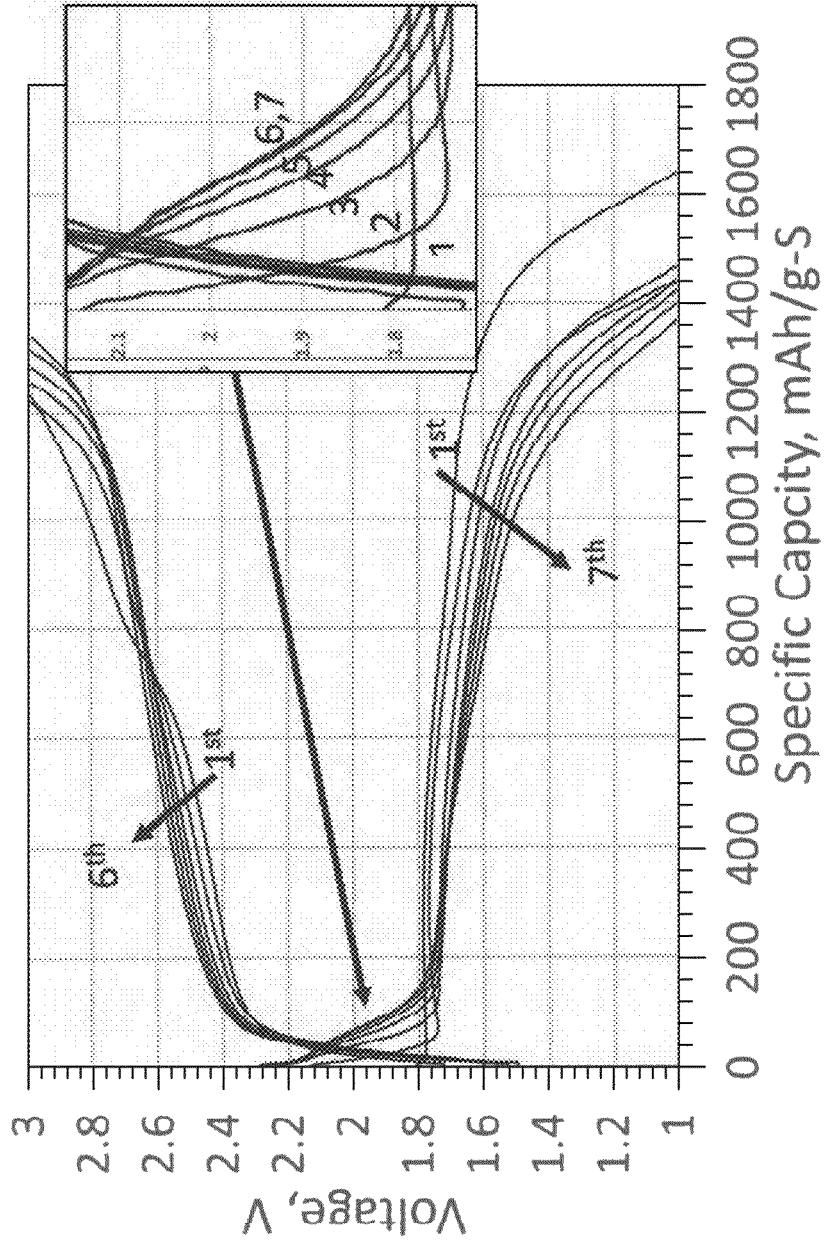
FIG. 44 shows battery discharge and charge curves for yet another comparative battery comprising sulfur, carbon, and a carbohydrate.

FIG. 44 shows battery discharge and charge curves for Comparative Example H3 (described below) which involves a battery comprising sulfur, carbon, and a carbohydrate—polysaccharide (having an average molecular weight of 250,000 g/mol) with a 30% level of hydrogen bond hydrogen removal, capped by X—O—$CH_2COO^-$, wherein the negative charge is balanced by an alkaline metal ion, for example, $Na^+$.

Figure 45:
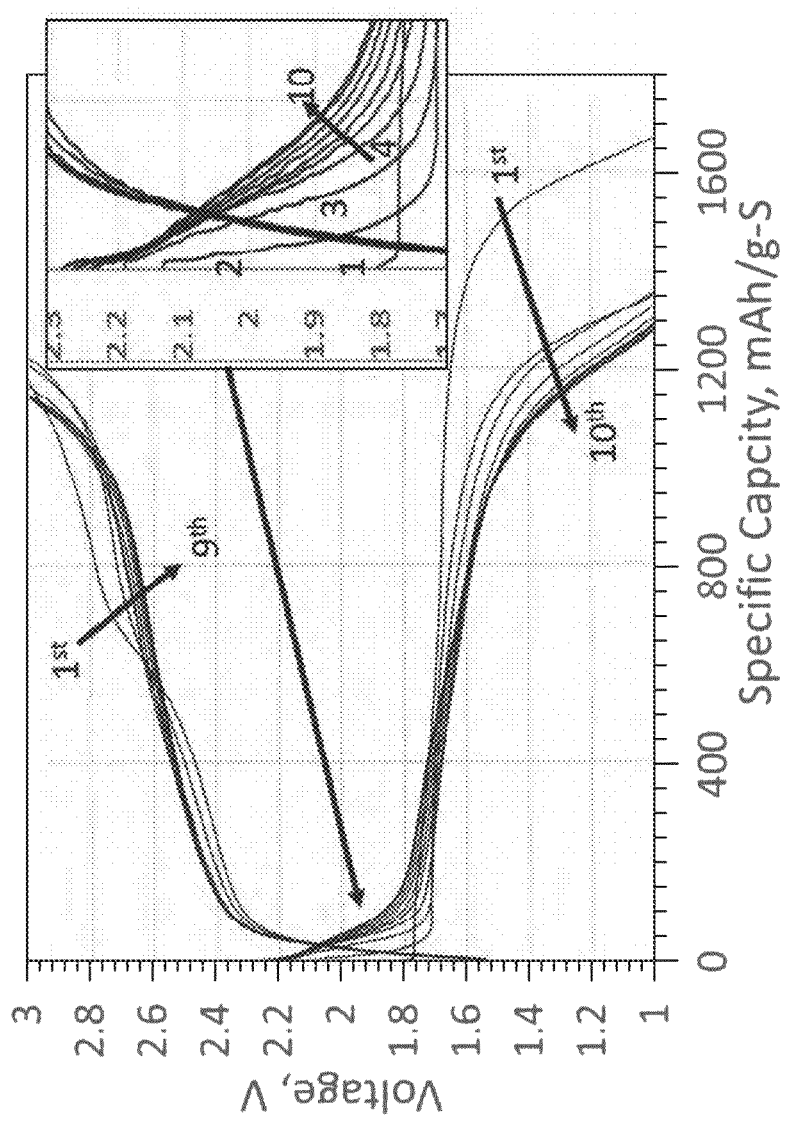
FIG. 45 shows battery discharge and charge curves for yet another comparative battery comprising sulfur, carbon, and a carbohydrate.

FIG. 45 shows battery discharge and charge curves for Comparative Example H4 (described below) which involves a battery comprising sulfur, carbon, and a carbohydrate—polysaccharide (having an average molecular weight of 700,000 g/mol) with a 30% level of hydrogen bond hydrogen removal, capped by X—O—CH$_2$COO$^-$, wherein the negative charge is balanced by an alkaline metal ion, for example, Na$^+$.

Figure 46:
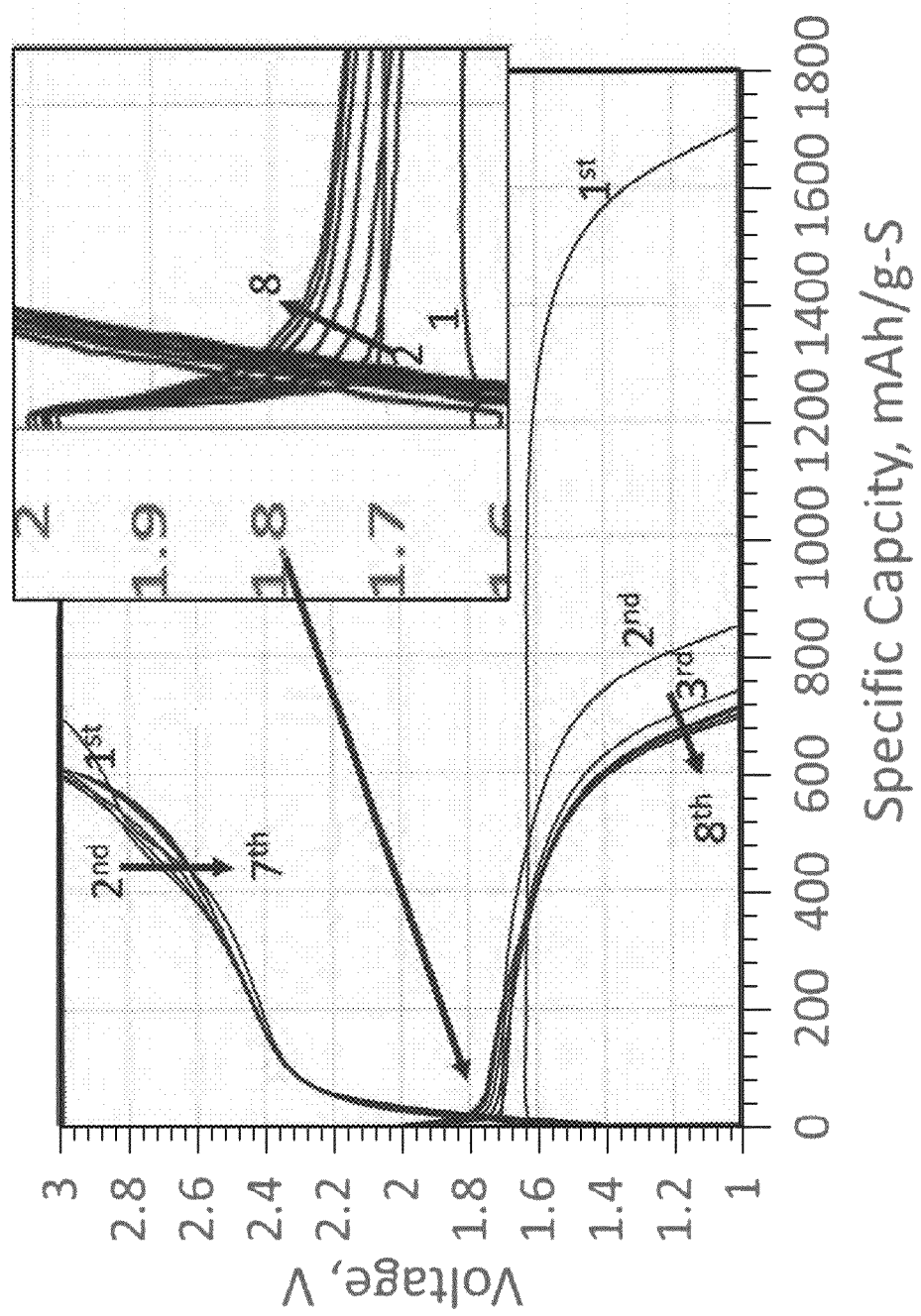
FIG. 46 shows battery discharge and charge curves for an example of a battery comprising sulfur, carbon, and a carbohydrate.

FIG. 46 shows battery discharge and charge curves for a battery constructed in accordance with the present disclosure (Example H5, described below), which comprises sulfur, carbon, and a carbohydrate—polysaccharide (having an average molecular weight of 250,000 g/mol) with a 40% level of hydrogen bond hydrogen removal, capped by X—O—CH$_2$COO$^-$, wherein the negative charge is balanced by an alkaline metal ion, for example, Na$^+$.

Figure 47:
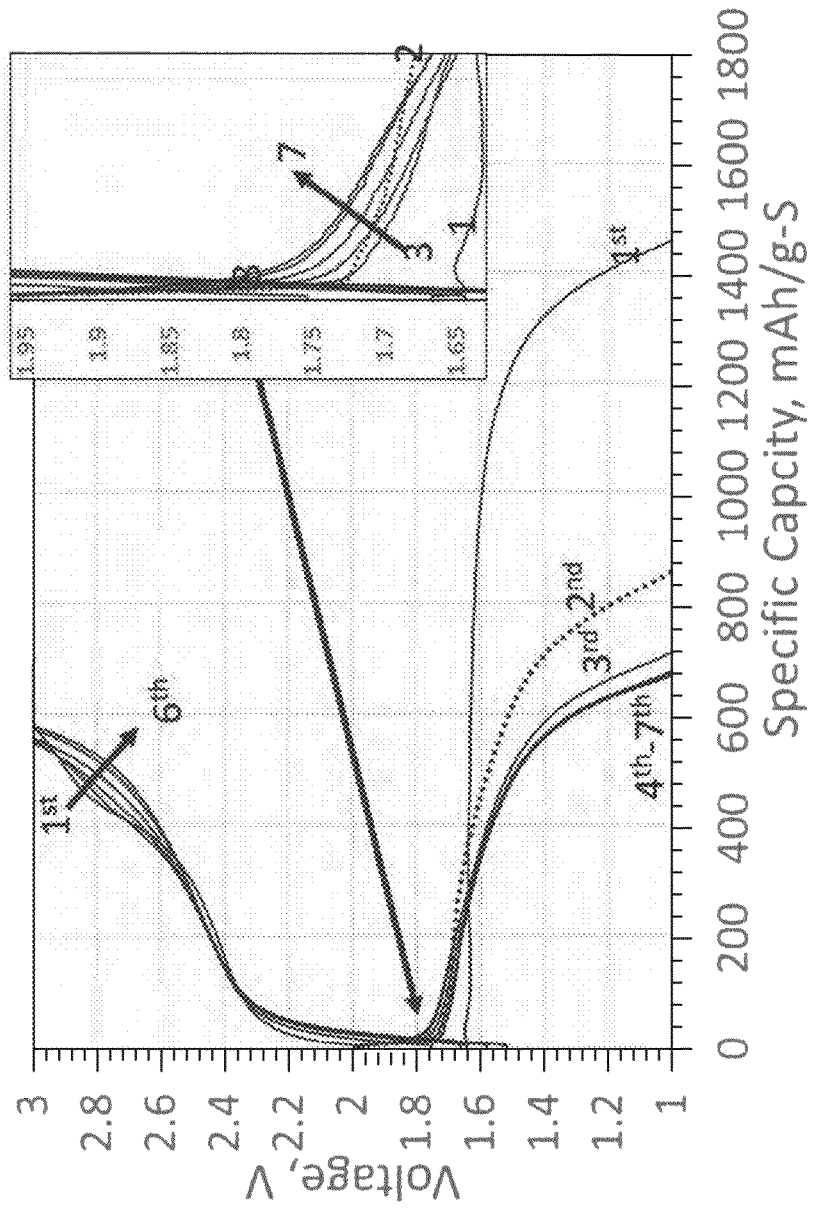
FIG. 47 shows battery discharge and charge curves for another example of a battery comprising sulfur, carbon, and a carbohydrate.

FIG. 47 shows battery discharge and charge curves for a battery constructed in accordance with the present disclosure (Example H6, described below), which comprises sulfur, carbon, and a carbohydrate—polysaccharide (an average molecular weight was not determined) with a 60% level of hydrogen bond hydrogen removal, capped by X—O—CH$_2$COO$^-$, wherein the negative charge is balanced by an alkaline metal ion, for example, Na$^+$.

Figure 48:
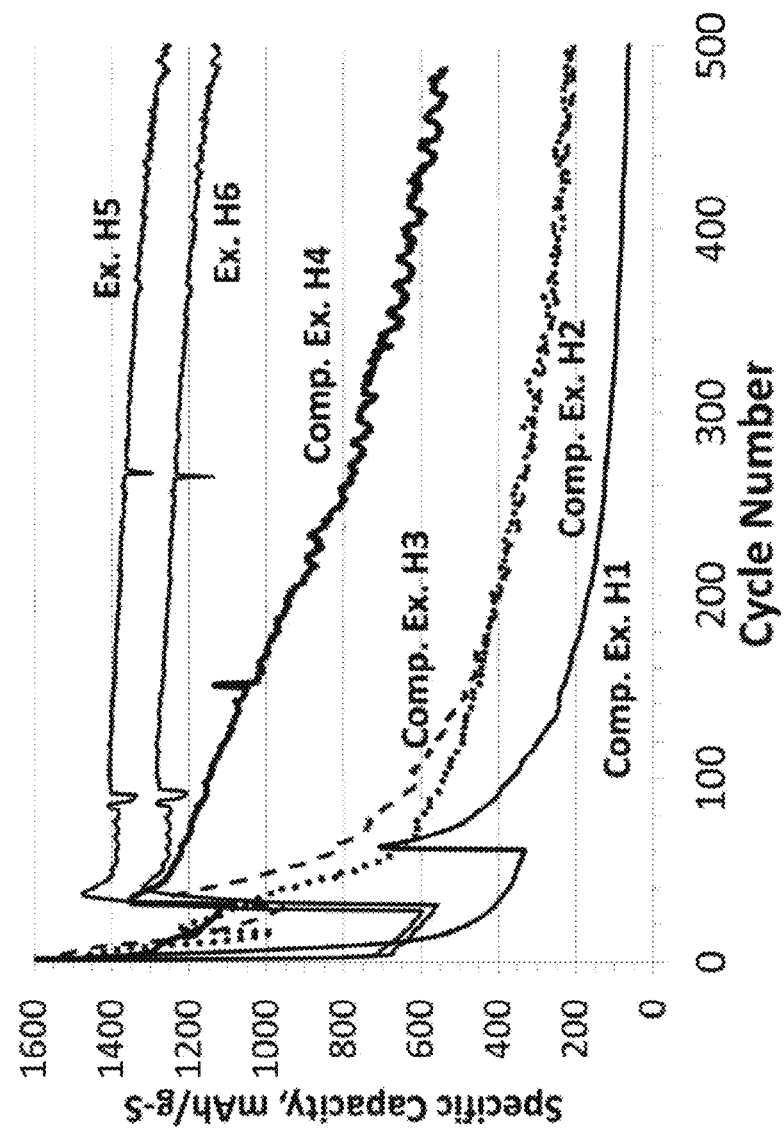
FIG. 48 is a graph showing battery cycling performance (Discharge Specific Capacity, mAh/g-S) at 1 C Charge and 1 C Discharge for examples of the present disclosure and comparative examples.

FIG. 48 shows cycling performances (Discharge Specific Capacity, mAh/g-S) at 1 C Charge and 1 C Discharge for batteries of Comparative Examples H1, H2, H3, and H4 and Examples H5 and H6.

EXAMPLES

Comparative Example H1

A Composite Consisting Essentially of Sulfur, Carbon, and a Polysaccharide (Having a Molecular Weight of 90,000 g/mol) with a 23.3% Level of Hydrogen Bond Hydrogen Removal, Capped by —O—CH$_2$—CO$^-$, Wherein the Negative Charge is Balanced by Na$^+$ A) Slurry Making:
1. Weigh the following composition into a 100 mL Nylon jar with milling balls with a dry composition of 80 wt % composite, 10 wt % Super P, 6.67 wt % a polysaccharide (having a molecular weight of 90,000 g/mol) with a 23.3% level of hydrogen bond hydrogen removal, and 3.33 wt % styrene-butadiene-rubber Latex (SBR):
   Composite of 64 wt % S and 36 wt % carbon: 2.5 g
   Super P carbon black: 0.31 g
   Polysaccharide (molecular weight: ~90,000 g/mol) with a 23.3% level of hydrogen bond hydrogen removal, capped by —O—CH$_2$COO$^-$, wherein the negative charge is balanced by Na$^+$ (3% in water): 6.91 g
   SBR Latex (10 wt % in water): 1.03
   Water: 4.65 g
2. Started the slurry milling without SBR Latex in a horizontal double-planetary mill for 270 minutes, stopped the mill, added 1.03 g of SBR Latex (10 wt %), and continued the slurry milling for another 90 minutes. The solar rotation speed was set at 14 rpm with a diameter of about 12 inches. The planet rotation speed directly relates to the solar rotation speed by a coupling gear (1:1).

B) Coating:
3. Separated the slurry from the milling media, and applied the slurry onto an aluminum foil (180 mm in width) as a coating which was dried at 60° C. at a coating speed of 38.7 mm/min.
4. The resulted substrate consists of sulfur, carbon, and a polysaccharide (having a molecular weight of 90,000 g/mol) with a 23.3% level of hydrogen bond hydrogen removal and is supported on an aluminum foil. The aluminum foil also plays a role as a current collector when the prepared composite is used as a cathode for a sulfur-based rechargeable battery.

C) Battery Assembly:
5. The composite as a substrate (or coating) in a supported form (prepared in B) was used to fabricate coin cell batteries following a similar procedure described above. A lithium metal disc (250 microns in thickness) was used as an anode; sometimes, a lithium disc of 600 microns in thickness may also be used; please note, for the present disclosure, there was no noticeable difference (in cycling performance) observed for a battery using a lithium disc of 250 microns or 600 microns in thickness. A disc of porous polymer membrane (25 microns in thickness) was used as a battery separator. An ether-based electrolyte was used as an electrolyte for the coin cell, though a carbonate-based electrolyte may also be used in a battery with a composite described in the present disclosure.

D) Battery Testing:
6. The assembled coin cell battery was then tested for its cycling performance starting with 1$^{st}$ discharge at a constant current of 1 C-rate to a voltage of 1V, and followed by 1$^{st}$ constant current charging at 1 C-rate to a voltage of 3V and holding at a constant voltage at 3V by varying the current for 5 more minutes; the processes of discharges and charges were alternated for the purpose of understanding the battery cycling performance. There is a rest of 5 minutes among discharge and charge processes during cycling.

FIG. 42 shows 1$^{st}$ 5-cycle discharge behaviors, specific capacity vs. voltage, of a coin cell battery of the Comparative Example H1 with a loading of active material 0.758 mg-S/cm$^2$. The 1$^{st}$ discharge curve shows a one-step 2e$^-$ electrochemical process of a sulfur-based battery, achieving a specific capacity of 1,705 mAh/g-S, within 2% of the sulfur's theoretical specific capacity, 1,675 mAh/g-S. There is no evidence to suggest that polysulfide ions might have formed during the 1$^{st}$ discharge process.

However, polysulfides might have formed during the 1$^{st}$ charge process, as shown in FIG. 42, showing a little deflection between a voltage of 2.5 v and 2.9V, corresponding to a specific capacity between about 500 mAh/g-S and 1,200 mAh/g-S. Polysulfide ions formed during this charging process might have dissolved into the electrolyte and transported to the anode and reacted with Li to form insoluble Li$_2$S$_2$ and or Li$_2$S. The dissolved polysulfide ions might also shuttle between cathode and anode. This type of behavior led to undesirable parasitic mass transport and parasitic electron transport.

The formation of the polysulfide ions may be due to the cracking of the membrane (formed of a polysaccharide with a 23.3% level of hydrogen bond hydrogen removal and SBR) formed during the coating process. The crack might occur in the membrane on a single particle of the cathode; the crack might form in the membrane that holds multiple particles together as a form of a substrate that was supported on a current collector—Al foil. The OH groups at Positions 2, 3, and 6 in the polysaccharide may form hydrogen bonds as a hydrogen bond donor and or a hydrogen bond acceptor, though oxygen atoms located at glycosidic bonds, Position 5, and, if there is any, the capping group Y, may also participate in the hydrogen bond formation as a hydrogen bond acceptor. However, intermolecular hydrogen bonds (—O$_6$H$_6$—O$_3$) may form in a well-aligned order among the polysaccharide polymeric chain molecules, making polymeric chains of polysaccharide molecules have a lower tendency of entanglement, resulting in a membrane being rigid and brittle. Such rigid and brittle membrane may possibly break during a discharge process of a sulfur-based battery due to a substantial discharge-related volume expansion. The breakage might also occur at the interfaces between the composite particles and the current collector. These types of breakages may not be fully repaired during a charge-related volume contraction process. The $1^{st}$ charge capacity (1,419 mAh/g-S) was significantly less than $1^{st}$ discharge capacity (1,705 mAh/g-S). Incomplete repair of the rigid membrane led to an observable level of polysulfide formation during further discharge processes, evidenced by the presence of a kink deflection and $3^{rd}$, $4^{th}$, and $5^{th}$ discharges, as shown in FIG. 42. The formation of polysulfides during discharge led to a fast decline in the specific capacity from 1,705 mAh/g-S at first discharge to 1,135 mAh/g-S at the $5^{th}$ discharge, and at the same time, the charge specific capacity also decreased from 1,419 mAh/g at $1^{st}$ charge to 1,084 mAh/g-S at the $4^{th}$ charge. Such kind of deterioration in cycling performance continued.

More long term cycling performance about the coin cell batteries from Comparative Example H1 is shown in FIG. 48 and will be described in more detail in the later section of the present disclosure.

Comparative Example H2

A Composite Formed of Sulfur, Carbon, and a Polysaccharide (Having a Molecular Weight of ~250,000 g/mol) with a 23.3% Level of Hydrogen Bond Hydrogen Removal, Capped by —O—CH$_2$—COO$^-$, Wherein the Negative Charge is Balanced by Na$^+$ Following the procedure described in Comparative Example H1, a composite comprising sulfur, carbon, and a polysaccharide (having molecular weight of 250,000 g/mol) with a 23.3% level of hydrogen bond hydrogen removal was prepared, and supported on an aluminum foil that works as a current collector in a sulfur-based rechargeable battery. The same protocols were applied for coin cell battery fabrications and battery cycling testing.

FIG. 43 shows $1^{st}$ 8-cycle discharge behaviors, specific capacity vs. voltage, of a coin cell battery of Comparative Example H2 with a loading of active material 0.707 mg-S/cm$^2$. The $1^{st}$ discharge curve shows a one-step 2e$^-$ electrochemical process of a sulfur-based battery, achieving a specific capacity of 1,658 mAh/g-S, within 1% of the sulfur's theoretical specific capacity, 1,675 mAh/g-S. There is no evidence to suggest that polysulfide ions might have formed during the $1^{st}$ discharge process.

However, polysulfides might have formed during the $1^{st}$ charge process, as shown in FIG. 43, showing a little deflection between a voltage of 2.5 v and 2.8V, corresponding to a specific capacity between about 500 mAh/g-S and 1,000 mAh/g-S. Polysulfide ions formed during this charging process might have also dissolved into the electrolyte and transport to the anode and react with Li to form insoluble Li$_2$S$_2$ and or Li$_2$S. The dissolved polysulfide ions might also shuttle between cathode and anode. This type of behavior led to undesirable parasitic mass transport and parasitic electron transport.

The formation of the polysulfide ions may be due to the cracking of the membrane (consisting essentially of a polysaccharide with a 23.3% level of hydrogen bond hydrogen removal and SBR Latex) formed during the coating process. The crack might occur in the membrane on a single particle of the cathode; the crack might form in the membrane that holds multiple particles together as a form of a substrate that was supported on a current collector—Al foil. The OH groups at Positions 2, 3, and 6 in the polysaccharide may form hydrogen bonds as a hydrogen bond donor and a hydrogen bond acceptor, though oxygen atoms located at glycosidic bonds, Position 5, and, if there is any, the capping group Y, may also participate in the hydrogen bond formation as a hydrogen bond acceptor. However, intermolecular hydrogen bonds (—O$_6$H$_6$—O$_3$) may form in a well-aligned order among the polysaccharide polymeric chain molecules, making polymeric chains of polysaccharide molecules have a lower tendency of entanglement, resulting in a membrane that is rigid and brittle.

The rigid and brittle membrane may possibly break during a discharge process of sulfur-based battery due to a substantial discharge-related volume expansion. The breakage might also occur at the interfaces between the composite particles and the current collector. Such breakage may not be fully repaired during a charge-related volume contraction process. The $1^{st}$ charge capacity (1,423 mAh/g-S) was significantly less than $1^{st}$ discharge capacity (1,658 mAh/g-S). Incomplete repairment of the rigid membrane led to an observable level of polysulfide formation during further discharge processes, evidenced by the presence of a kink in $3^{rd}$, $4^{th}$, $5^{th}$, $6^{th}$, $7^{th}$, and $8^{th}$ discharges, as shown in FIG. 43. This led to a decline in the discharge specific capacity from 1,658 mAh/g-S at first discharge to 1,437 mAh/g-S at the $8^{th}$ discharge, and at the same time, the charge specific capacity also decreased from 1,423 mAh/g at $1^{st}$ charge to 1,369 mAh/g-S at the $7^{th}$ charge. Please note that the deterioration rate for the battery of Comparative Example H2 is indeed less than that for the battery from Comparable Example H1. This may suggest that a carbohydrate, or more specifically, a polysaccharide with a higher molecular weight, 250K vs. 90K, may better withstand the stress resulting from a substantial discharge-related volume expansion of a sulfur-based rechargeable battery.

More long-term cycling performance beyond 8 cycles for coin cell batteries of the present Comparative Example H2 is shown in FIG. 48 and will be described in more detail in the later section of the present disclosure.

Comparative Example H3

A Composite Consisting Essentially of Sulfur, Carbon, and a Carbohydrate Such as Polysaccharide (Having a Molecular Weight of ~250,000 g/mol) with a 30% Level of Hydrogen Bond Hydrogen Removal, Capped by —O—CH$_2$—COO$^-$, Wherein the Negative Charge is Balanced by Na$^+$ Following the procedure described in Comparative Example H1, a composite comprising sulfur, carbon, and a carbohydrate such as a polysaccharide (having molecular weight of 250,000 g/mol) with a 30% level of hydrogen bond hydrogen removal was prepared, and supported on an aluminum foil that works as a current collector in a rechargeable sulfur-based battery. The same protocols were applied for coin cell battery fabrications and battery cycling testing.

FIG. 44 shows $1^{st}$ 7-cycle discharge behaviors, specific capacity vs. voltage, of a coin cell battery of Comparative Example H3 with a loading of active material 0.891 mg-S/cm$^2$. The $1^{st}$ discharge curve shows a one-step 2e$^-$ electrochemical process of a sulfur-based battery, achieving a specific capacity of 1,644 mAh/g-S, within 2% of sulfur's theoretical specific capacity, 1,675 mAh/g-S. There is no evidence to suggest that polysulfide ions might have formed during the $1^{st}$ discharge process.

However, polysulfides might have formed during the $1^{st}$ charge process, as shown in FIG. 44, showing a little deflection between a voltage of 2.5 v and 2.8V, corresponding to a specific capacity between about 600 mAh/g-S and 1,000 mAh/g-S. Polysulfide ions formed during this charging process might have dissolved into the electrolyte and transport to the anode and react with Li to form insoluble $Li_2S_2$ and or $Li_2S$. The dissolved polysulfide ions may also shuttle between cathode and anode. This type of behavior led to undesirable parasitic mass transport and parasitic electron transport.

The formation of the polysulfide ions may be due to the cracking of the membrane (consisting essentially of a polysaccharide with a 30% level of hydrogen bond hydrogen removal and SBR Latex) formed during the coating process. The crack might occur in the membrane on a single particle of the cathode; the crack might form in the membrane that holds multiple particles together as a form of a substrate that was supported on a current collector—Al foil. The OH groups at Positions 2, 3, and 6 in the polysaccharide form hydrogen bonds as a hydrogen bond donor and a hydrogen bond acceptor, though oxygen atoms located at glycosidic bonds, Position 5, and, if there is any, the capping group Y, may also participate in the hydrogen bond formation as a hydrogen bond acceptor. However, intermolecular hydrogen bonds ($—O_6H_6—O_3$) may form in a well-aligned order among the polysaccharide polymeric chain molecules, making polymeric chains of polysaccharide molecules have a lower tendency to entangle, resulting in a membrane that is rigid and brittle, even though the membrane of Comparative Example H3 might be more flexible and elastic than the membrane of Comparative Example H2.

A rigid and brittle membrane may break during a full discharge process of sulfur-based battery due to a substantial discharge-related volume expansion. The breakage might also occur at the interfaces between the composite particles and the current collector (Al foil). Such breakages may not be fully repaired during a charge-related volume contraction process. The $1^{st}$ charge capacity (1,359 mAh/g-S) was significantly less than $1^{st}$ discharge capacity (1,644 mAh/g-S). Incomplete repair of the rigid membrane led to an observable level of polysulfide formation during further discharge processes, evidenced by the presence of a kink deflection in $3^{rd}$, $4^{th}$, $5^{th}$, $6^{th}$, and $7^{th}$ discharges, as shown in FIG. 44. This led to a decline in the discharge specific capacity from 1,644 mAh/g-S at first discharge to 1,372 mAh/g-S at the $7^{th}$ discharge, and at the same time, the charge specific capacity also decreased from 1,359 mAh/g at $1^{st}$ charge to 1,298 mAh/g-S at $6^{th}$ charge. Please note that the deterioration rate for the battery of Comparative Example H3 is indeed better than that for the battery of Comparative Example H1, and similar to Comparative Example H2.

More long-term cycling performance beyond 7 cycles for coin cell batteries of Comparative Example H3 is shown in FIG. 48 and will be described in more detail in the later section of the present disclosure.

Comparative Example H4

A Composite Consisting Essentially of Sulfur, Carbon, and a Polysaccharide (Having a Molecular Weight of ~700,000 g/mol) with a 30% Level of Hydrogen Bond Hydrogen Removal, Capped by X—O—$CH_2$—$COO^-$, Wherein the Negative Charge is Balanced by $Na^+$ Following the procedure described in Comparative Example H1, a composite consisting essentially of sulfur, carbon, and a polysaccharide (having molecular weight of 700,000 g/mol) with a 30% level of hydrogen bond hydrogen removal was prepared, and supported on an aluminum foil that works as a current collector in a rechargeable sulfur-based battery. The same protocols were applied for coin cell battery fabrications and battery cycling testing.

FIG. 45 shows $1^{st}$ 10-cycle discharge behaviors, specific capacity vs. voltage, of a coin cell battery of Comparative Example H4 with a loading of active material 0.778 mg-S/$cm^2$. The $1^{st}$ discharge curve shows a one-step $2e^-$ electrochemical process of a sulfur-based battery, achieving a specific capacity of 1,670 mAh/g-S, within 1% of sulfur's theoretical specific capacity, 1,675 mAh/g-S. There is no evidence to suggest that polysulfide ions may have formed during the $1^{st}$ discharge process.

However, polysulfides might have formed during the $1^{st}$ charge process, as shown in FIG. 45, showing a little deflection between a voltage of 2.5 v and 2.9V, corresponding to a specific capacity between about 500 mAh/g-S and 1,000 mAh/g-S. Polysulfide ions formed during this charging process might have also dissolved into the electrolyte and transported to the anode and reacted with Li to form insoluble $Li_2S_2$ and or $Li_2S$. The dissolved polysulfide ions might also shuttle between cathode and anode. This type of behavior led to undesirable parasitic mass transport and parasitic electron transport.

The formation of the polysulfide ions may be due to the cracking of the membrane (consisting essentially of a polysaccharide with a 30% level of hydrogen bond hydrogen removal and SBR Latex) formed during the coating process. The crack might occur in the membrane on a single particle of the cathode; the crack might form in the membrane that holds multiple particles together as a form of a substrate that was supported on a current collector—Al. The OH groups at Positions 2, 3, and 6 in the polysaccharide form hydrogen bonds as a hydrogen bond donor and a hydrogen bond acceptor, though oxygen atoms located at glycosidic bonds, Position 5, and, if there is any, the capping group Y, may also participate in the hydrogen bond formation as a hydrogen bond acceptor. However, intermolecular hydrogen bonds ($—O_6H_6—O_3$) may form in a well-aligned order among the polysaccharide polymeric chain molecules, making polymeric chains of polysaccharide molecules have a lower tendency of entanglement, resulting in a membrane that is rigid and brittle, even though the membrane of the Comparative Example H4 might be much more flexible and elastic than the membrane of Comparative Examples H3, H2, and H1.

A rigid and brittle membrane, though improved, may still break during a full discharge process of a sulfur-based battery due to a substantial discharge-related volume expansion. The breakage might also occur at the interfaces between the composite particles and the current collector (Al foil). Such breakages may not be fully repaired during a charge-related volume contraction process. The $1^{st}$ charge capacity (1,291 mAh/g-S) was significantly less than $1^{st}$ discharge capacity (1,644 mAh/g-S). Incomplete repair of the rigid membrane led to an observable level of polysulfide formation during discharge process, evidenced by the presence of a kink deflection in $3^{rd}$, $4^{th}$, $5^{th}$, $6^{th}$, $7^{th}$, $8^{th}$, $9^{th}$, and $10^{th}$ discharges, as shown in FIG. 45. This led to a moderate decline in the discharge specific capacity from 1,644 mAh/g-S at first discharge to 1,267 mAh/g-S at the $10^{th}$ discharge, and at the same time, the charge specific capacity also decreased moderately from 1,290 mAh/g at $1^{st}$ charge to 1,220 mAh/g-S at the $9^{th}$ charge. Please note that the deterioration rate for the battery of Comparative Example H4 is indeed much better than that for the batteries of Comparative Examples H1, H2, and H3. A polysaccharide having a higher molecular weight may indeed be more desirable.

More long-term cycling performance beyond 10 cycles for coin cell batteries of Comparative Example H4 is shown in FIG. 48 and will be described in more detail in the later section of the present disclosure.

Example H5

A Composite Comprising a Chalcogen Element, an Electrically Conductive Material Such as Carbon, and a Carbohydrate Such as Polysaccharide (Having a Molecular Weight of ~250,000 g/mol) with a 40% Level of Hydrogen Bond Hydrogen Removal, Capped by —O—$CH_2$—$COO^-$, Wherein the Negative Charge is Balanced by an Alkaline Metal Ion, such as $Na^+$ Following the procedure described in Comparative Example H1, a composite comprising sulfur, carbon, and hydrophilic membrane gate such as a carbohydrate, for example, a polysaccharide (having molecular weight of 250,000 g/mol) with a 40% level of hydrogen bond hydrogen removal was prepared, and supported on an aluminum foil that works as a current collector in a rechargeable sulfur-based battery. The same protocols were applied for coin cell battery fabrications and battery cycling testing.

FIG. 46 shows $1^{st}$ 8-cycle discharge behaviors, specific capacity vs. voltage, of a coin cell battery of Example H5 with a loading of active material 0.870 mg-S/$cm^2$. The $1^{st}$ discharge curve shows a one-step $2e^-$ electrochemical process of a sulfur-based rechargeable battery, achieving a specific capacity of 1,703 mAh/g-S, within 2% of the sulfur's theoretical specific capacity, 1,675 mAh/g-S. There is no evidence to suggest that polysulfide ions may have formed during the $1^{st}$ discharge process.

Polysulfides might have formed during the $1^{st}$ charge process, as shown in FIG. 46, showing a little deflection between a voltage of 2.5 v and 3.0V, corresponding to a specific capacity between about 300 mAh/g-S and ~700 mAh/g-S. Polysulfide ions formed during this charging process might have also dissolved into the electrolyte and transported to the anode and reacted with Li to form insoluble $Li_2S_2$ and or $Li_2S$. The dissolved polysulfide ions might also shuttle between cathode and anode. This type of behavior may lead to undesirable parasitic mass transport and parasitic electron transport.

However, the immobilized sulfur of the present disclosure may possess a mechanism for a safe unlock during discharge and self-heal during charge, as compared to a composite in Comparative Examples H1, H2, H3 and H4. It is unexpected that a safe unlock system was successfully realized via a carbohydrate such as a polysaccharide by its hydrogen bond hydrogen removal of ≥31%, ≥32%, or ≥33%, for example, 40%. A removal of hydrogen bond hydrogen of ≥31%, ≥32%, or ≥33%, for example, 40%, may substantially decrease the ordered intermolecular hydrogen bonding among the carbohydrate molecules (such as polysaccharide molecules), resulting in a decrease in the safe unlock stress limit, allowing the hydrophilic membrane gate to safely unlock during the discharge-related volume expansion at a lower stress limit. In addition, disordering enhancement of the carbohydrate molecules (such as polysaccharide molecules) resulting from a removal of hydrogen bond hydrogen of ≥31%, ≥32%, or ≥33%, for example, 40%, may increase the entanglement of a polymeric chain of a carbohydrate molecule such as a polysaccharide molecule. Enhancement in the entanglement of a polymeric chain may lead to an increase in elongation limit by improving the elasticity of a hydrophilic membrane gate while stretched during a discharge-related volume expansion.

Moreover, it is unexpected that a complete self-heal of the hydrophilic membrane gate of the present disclosure was successfully achieved in about three cycles by a removal of hydrogen bond hydrogen of ≥31%, ≥32%, or ≥33%, for example, 40%, for the present example of the present disclosure. FIG. 46 shows that the deflection between 2.5V and 3.0V in the charge curves disappeared at $4^{th}$ charge, and the discharge specific capacity reaches a stable level at $4^{th}$ discharge and on. There is no evidence in polysulfide formation during discharge, shown in FIG. 46—no kink observed in the early stages of all discharges (from $2^{nd}$ Discharge to $8^{th}$ Discharge, further shown in the expanded window in FIG. 46).

The present example successfully embodies an immobilized chalcogen comprising a chalcogen element, an electrically conductive material, and a hydrophilic membrane gate having a well-functioned mechanism of safe unlock and self-heal, demonstrated by a removal of hydrogen bond hydrogen of ≥31%, ≥32%, or ≥33%, for example, 40%, from a carbohydrate molecule such as a polysaccharide molecule. The safe unlock and self-heal mechanism of the present disclosure may have been realized by successfully controlling hydrogen bond breakage and formation in a hydrophilic membrane gate of an immobilized chalcogen of the present disclosure.

More long-term cycling performance beyond 8 cycles for coin cell batteries of Example H5 is shown in FIG. 48 and will be described in more detail in the later section of the present disclosure.

Example H6

A Composite Comprising a Chalcogen Element, an Electrically Conductive Material Such as Carbon, and a Carbohydrate Such as Polysaccharide (Molecular Weight was not Determined) with a 60% Level of Hydrogen Bond Hydrogen Removal, Capped by —O—$CH_2$—$COO^-$, Wherein the Negative Charge is Balanced by an Alkaline Metal Ion, Such as $Na^+$ Following the procedure described in Comparative Example H1, a composite comprising sulfur, carbon, and a hydrophilic membrane gate comprising a carbohydrate such as a polysaccharide with a 60% level of hydrogen bond hydrogen removal was prepared, and supported on an aluminum foil that works as a current collector in a rechargeable sulfur-based battery. The same protocols were applied for coin cell battery fabrications and battery cycling testing.

FIG. 47 shows $1^{st}$ 7-cycle discharge behaviors, specific capacity vs. voltage, of a coin cell battery of Example H6 with a loading of active material 0.942 mg-S/cm$^2$. The $1^{st}$ discharge curve shows a one-step 2e$^-$ electrochemical process of a sulfur-based battery, achieving a specific capacity of 1,457 mAh/g-S, within 14% of the sulfur's theoretical specific capacity, 1,675 mAh/g-S. There is no evidence to suggest that polysulfide ions may have formed during the $1^{st}$ discharge process.

Polysulfides might have formed during the $1^{st}$ charge process, as shown in FIG. 47, showing a little deflection between a voltage of 2.5 v and 3.0V, corresponding to a specific capacity between about 300 mAh/g-S and ~550 mAh/g-S. Polysulfide ions formed during this charging process might have also dissolved into the electrolyte and transported to the anode and reacted with Li to form insoluble Li$_2$S$_2$ and or Li$_2$S. The dissolved polysulfide ions might also shuttle between cathode and anode. This type of behavior might lead to undesirable parasitic mass transport and parasitic electron transport.

However, the immobilized sulfur in this example may possess a mechanism for a safe unlock during discharge and self-heal during charge, as compared to a composite in Comparative Examples H1, H2, H3 and H4. It is unexpected that a safe unlock system was successfully realized via a carbohydrate such as a polysaccharide by its hydrogen bond hydrogen removal of ≥31%, ≥32%, or ≥33%, for example, 60%. A removal of hydrogen bond hydrogen of ≥31%, ≥32%, or ≥33%, for example, 60%, may further substantially decrease the ordered intermolecular hydrogen bonding among the carbohydrate (such as polysaccharide molecules), resulting in a further decrease in the safe unlock stress limit, allowing the hydrophilic membrane gate to safely unlock during the discharge-related volume expansion at a lower stress limit. In addition, disordering enhancement of the carbohydrate molecules (such as polysaccharide molecules) resulting from a removal of hydrogen bond hydrogen of ≥31%, ≥32%, or ≥33%, for example, 60%, may further increase the entanglement of a polymeric chain of a carbohydrate molecule such as a polysaccharide molecule. Enhancement in the entanglement of the polymeric chain may lead to an increase in elongation limit by improving the elasticity of the hydrophilic membrane gate while stretched during a discharge-related volume expansion.

Moreover, it is unexpected that a complete self-heal of the hydrophilic membrane gate of the present disclosure was successfully achieved in about three cycles by a removal of hydrogen bond hydrogen of ≥31%, ≥32%, or ≥33%, for example, 60% for the present example of the present disclosure. FIG. 46 shows that the deflection between 2.5V and 3.0V in the charge curves disappeared at $3^{rd}$ charge, and the discharge specific capacity reaches a stable level at $4^{th}$ discharge and on. There is no evidence in polysulfide formation during discharge, shown in the FIG. 47—no kink observed in the early stages of all discharges (from $2^{nd}$ Discharge to $8^{th}$ Discharge as shown in an expanded window of FIG. 47).

The present example successfully embodies an immobilized chalcogen comprising a chalcogen element, an electrically conductive material, and a hydrophilic membrane gate that successfully achieved a mechanism of safe unlock and self-heal, demonstrated by a removal of hydrogen bond hydrogen of ≥31%, ≥32%, or ≥33%, for example, 60%, from a carbohydrate molecule such as a polysaccharide molecule. The safe unlock and self-heal mechanism of the present disclosure may be realized by successfully controlling hydrogen bond breakage and formation in a hydrophilic membrane gate of an immobilized chalcogen of the present disclosure.

More long-term cycling performance beyond 7 cycles for coin cell batteries of Example H6 is shown in FIG. 48 and will be described below.

Example H7

Long-Term Cycling Performances of a Battery (from Examples H5 and H6) Comprising a Composite Comprising a Chalcogen Element, an Electrically Conductive Material such as Carbon, and Hydrophilic Membrane Gate Comprising a Carbohydrate such as a Polysaccharide with a Level of Hydrogen Bond Hydrogen Removal ≥31%, ≥32%, or ≥33%, Capped by —O—CH$_2$—COO$^-$, Wherein the Negative Charge is Balanced by an Alkaline Metal Ion, such as Na vs. Those for a Battery from Comparative Examples H1, H2, H3, and H4

FIG. 48 shows long-term cycling performances of batteries (Examples H5 and H6) of the present disclosure and those of the comparative examples. The discharge specific capacity for a battery of Comparative Example H1 deteriorated from 1,490 mAh/g-S at $2^{nd}$ discharge to 333 mAh/g-S at $61^{st}$ discharge, at an average rate of decline of 19.6 mAh/g-S per cycle. Then, the duration of constant voltage charge at 3V was extended from 5 min to a maximum of 2 hours as far as the charge current did not fall below 1/20 C. The discharge specific capacity was immediately increased to 703 mAh/g-S for $62^{nd}$ discharge, as compared to 333 mAh/g-S for $61^{st}$ discharge. From Cycle $62^{nd}$ and on, the specific capacity of the battery had a fast decline, following a power law of aX$^{-1.0688}$ with a R$^2$ of 99.8%, wherein a was a pre-power factor, 54,656, and X is a discharge specific capacity at i$^{th}$ cycle between Cycle 62 and Cycle 500. The results seem to suggest that the deterioration in discharge specific capacity follows a $1^{st}$ kinetic order reaction mechanism, suggesting a loss of active material during cycling. If a linear model is used, the battery showed an average decline of about 1.46 mA/h per cycle, from 703 mAh/g-S at $62^{nd}$ discharge to 63.5 mAh/g-S at $500^{th}$ discharge.

The cycling performance of a battery of Comparative Example H2 is also shown in FIG. 48. The discharge specific capacity deteriorated from 1,520 mAh/g-S at $2^{nd}$ discharge to 961 mAh/g-S at $31^{st}$ discharge, at an average decline rate of 19.2 mAh/g-S per cycle. Then the duration of the constant voltage charge at 3V was extended from 5 minutes to 2 hours as far as the charge current did not fall below 1/20 C. The discharge specific capacity was improved to 1,277 mAh/g-S at $32^{nd}$ discharge. Then i$^{th}$ discharge capacity of the battery deteriorated following a power model 13,541X$^{-0.669}$ with a R$^2$ of 99.7%, wherein i is the cycle number between Cycle 32 and Cycle 500. The exponent of the power is −0.669, which is greater than −1.0688. This suggests that the battery of Comparative Example H2 deteriorated slower than that of Comparative Example H1, following a kinetic order between $1^{st}$ order and $0^{th}$ order. In a linear model, this battery deteriorated at an average rate of 2.3 mAh/g-S per cycle between Cycle 32 and Cycle 500.

FIG. 48 also shows the cycling performance of a battery of Comparative Example H3; the discharge specific capacity deteriorated from a specific capacity 1,445 mAh/g-S at Cycle 2 to 980 mAh/g-S at Cycle 16 at a decline rate of 33.3 mAh/g-S per cycle. Then the duration of constant voltage at 3V was extended from 5 minutes to 2 hours as long as its charging current did not fall below 1/20 C. The discharge specific capacity was improved to 1,230 mAh/g-S at Cycle 17. The battery's discharge specific capacity then followed the power model $6,669.2X^{-0.542}$ with a $R^2$ of 98.2%, where X is the $i^{th}$ discharge specific capacity and I is the cycle number between Cycle 17 and Cycle 500. The exponent of the power, −0.542 is a little bit greater −0.669, which suggests a slower deterioration for the discharge specific capacity of the battery of Comparative Example H3 than that of Comparative Example H2, and follows a kinetic model between $1^{st}$ order and $0^{th}$ order. If a linear model is used, the deteriorated rate of the discharge specific capacity was averaged to be 2.1 mAh/g-S per cycle.

FIG. 48 also shows cycling performances of a battery of Comparative Example H4. The battery deteriorated from a discharge specific capacity of 1,350 mAh/g-S at $2^{nd}$ discharge to 1,116 mAh/g-S at $31^{st}$ discharge at a deterioration rate of 8.1 mAh/g-S per cycle, significantly lower that for Comparative Examples H1, H2, and H3. Then the duration of the constant voltage charge at 3V was extended from 5 minutes to 2 hours as far as the charge current did not fall below 1/20 C. The discharge specific capacity was improved to 1,347 mAh/g-S at Cycle $32^{nd}$ from 1,116 mAh/g-S at $31^{st}$ discharge. A two-hour constant voltage charge at 3V might have not been long enough. This was the reason the discharge specific capacity continued to improve to 1,349 mAh/g at Cycle 34. From Cycle 34 and on to Cycle 500, the battery follows a linear model with a slope of −1.69 mAh/g-S per cycle with a $R^2$ of 97.0%, instead of a power model, $6,466X^{0.383}$ with a $R^2$ of 91.79%, suggesting that the deterioration almost follows a $0^{th}$ order kinetic model.

The results from these Comparative Examples suggest that battery deterioration mechanism transformed from a $1^{st}$ order (Comparative Examples H1 and H2) to a $0^{th}$ order (Comparative Example H4) due to the increase in the level of hydrogen bond hydrogen removal from 23.3% to 30% accordingly, along with the molecular weight increase of a carbohydrate molecule such as a polysaccharide molecule from 90,000 g/mol to 700,000 g/mol. However, the improvement in cycling performance of batteries from Comparative Example H1 to H4 was still not good enough for attaining a chalcogen-based battery having a desirable cycling life. Though these Comparative Examples are used as a background for the description of the present disclosure, it is believed that a carbohydrate such as polysaccharide with a ~30% level of hydrogen bond hydrogen removal might still be within the spirit of present disclosure if a carbohydrate such as a polysaccharide of a significantly high molecular weight, say ≥800,000 g/mol, ≥900,000 g/mol, or ≥1,00,000 g/mol was used to make an immobilized chalcogen of the present disclosure.

FIG. 48 also shows the cycling performance for a battery of Example H5 of the present disclosure. Its discharge specific capacity decreased from 851 mAh/g-S at $2^{nd}$ discharge to 597 mAh/g-S at $28^{th}$ discharge at a decline rate of 9.8 mAh/g-S per cycle. Then the duration of the constant voltage charge at 3V was extended from 5 minutes to 2 hours as far as the charge current did not fall below 1/20 C. The discharge specific capacity was improved to 1,019 mAh/g at $29^{th}$ discharge, continued to gradually improve to 1,138, 1,235, 1,310, 1,370, 1,414, 1,453, 1,473, and eventually to 1,475 mAh/g-S at $37^{th}$ discharge. The gradual improvement may be because the battery did take a full two hours of constant voltage charge at 3V by reaching the time limit prior to reaching a charge current of 1/20 C. Then the battery took about 10 cycles to stabilize at a discharge specific capacity of 1,398 mAh/g-S at $47^{th}$ discharge. The battery was able to maintain its discharge specific capacity to 375 cycles with a linear model having a slope of −0.27 mAh/g-S and an intercept of 1,420 mAh/g-S with a $R^2$ of 95.3%. After 375 cycles, the slope was somewhat increased to about −0.55 mAh/g-S between Cycle 375 and Cycle 500. The battery still had a discharge specific capacity of 1,250 mAh/g-S at $500^{th}$ discharge, which is surprising and excellent for a sulfur-based battery. The battery of the present example has been continuing its cycling to Cycle $668^{th}$ with a discharge specific capacity of 1,085 mAh/g-S at Cycle 668, an unexpected and excellent result.

FIG. 48 also shows the cycling performance for a battery of Example H6 of the present disclosure. Its discharge specific capacity decreased from 856 mAh/g-S at $2^{nd}$ discharge to 559 mAh/g-S at $31^{st}$ discharge at a decline rate of 10.2 mAh/g-S per cycle. Then the duration of the constant voltage charge at 3V was extended from 5 minutes to 2 hours as far as the charge current did not fall below 1/20 C. The discharge specific capacity was improved to 951 mAh/g at $32^{nd}$ discharge, continued to gradually improve to 1,037, 1,116, 1,177, 1,224, 1,264, 1,295, 1,313, and eventually to 1,319 mAh/g-S at $40^{th}$ discharge. The gradual improvement may be because the battery did take a full two hours of constant voltage charge at 3V by reaching the time limit prior to reaching a charge current of 1/20 C. Then the battery took about 9 cycles to stabilize at a discharge specific capacity of 1,273 mAh/g-S at $49^{th}$ discharge. The battery was able to maintain its discharge specific capacity to 500 cycles with a linear model having a slope of −0.36 mAh/g-S and an intercept of 1,327 mAh/g-S with a $R^2$ of 97.1%, having a discharge specific capacity of 1,133 mAh/g-S at $500^{th}$ cycle, which is surprising and excellent for a sulfur-based rechargeable battery. The battery has been continuing its cycling to Cycle 687 with a discharge specific capacity of 930 mAh/g-S at Cycle 687, an unexpected and excellent result for a sulfur-based rechargeable battery.

A battery comprising an immobilized chalcogen comprising an element of chalcogen, an electrically conductive material such as carbon, and a hydrophilic membrane gate, more specifically, comprising a carbohydrate such as a polysaccharide with a level of hydrogen bond hydrogen removal of ≥31%, ≥32%, or ≥33% somehow successfully isolates two hydrophobic regions (a hydrophobic polychalcogenide region and a hydrophobic electrolyte region of a battery), prevents the polychalcogenide from leaving a cathode (and prevents significant formation of polychalcogenide), minimizes and or eliminates the undesirable parasitic mass transport and parasitic electron transport inside a battery, achieving desirable intrinsic mass transport and intrinsic electron transport in a chalcogen-based battery of the present disclosure via a mechanism of hydrogen bond breakage and formation in a hydrophilic membrane gate of the present disclosure, which leads to a desirable mechanism of a safe unlock during a discharge-related volume expansion and self-heal during a charge-related volume contraction of a chalcogen-based battery of the present disclosure.

Aspects of the present disclosure are summarized in the following Clauses 1-15:

Clause 1: An immobilized chalcogen (body or system) comprises a chemical element from the chalcogen group (that is, from Group 6A of the periodic table of chemical elements), an electrically conductive material, and a hydrophilic membrane gate. The chalcogen may be in an elemental form, in a compound form, or in an ionic form.

Clause 2: The chalcogen content in Clause 1 may be between 0.1 wt % and 95 wt %, 20 wt. % and 90 wt %, or 30 wt % and 85 wt %. However, the content for an immobilized chalcogen specifically related to oxygen as an active element may not be as high, and may be, for example, between 0.001 wt % to 20 wt %, between 0.01 wt % and 15 wt %, or between 0.1 wt % and 10 wt %.

Clause 3: The electrically conductive material in Clause 1 may be carbon. The carbon content may be between 1 wt % and 80 wt %, 3 wt % and 70%, or 6 wt % and 60 wt %. The carbon material may be porous; the carbon material may comprise a functional group that withdraws electron out of the carbon matrix's EMAC system; the carbon material may have a carbo-cation center; the carbon material may provide a center that bonds to a chalcogen; and carbon and chalcogen may form a bond with a coordination bonding.

Clause 4: The content of a hydrophilic membrane gate for an immobilized chalcogen in Clause 1 may be between 0.1 wt % and 40 wt %, 0.2 wt % and 30 wt %, and 0.3 wt % and 20 wt %.

Clause 5: A hydrophilic membrane gate in Clauses 1 and 4 comprises a membrane capable of isolating two hydrophobic regions, one of which is a hydrophobic electrolyte system in a rechargeable battery and another one of which is the polychalcogenide ion(s) that may form in the cathode during discharge and or charge of a chalcogen-based battery. A hydrophilic membrane also performs as a gate to allow lithium ions and electrons to be transported therethrough during an electrochemical process, ensuring proper intrinsic mass transport and electron transport in a chalcogen-based rechargeable battery.

Clause 6: A hydrophilic membrane gate in Clauses 1, 4, and 5 ensures that a battery made with an immobilized chalcogen comprising a hydrophilic membrane gate performs intrinsic mass transport and intrinsic electron transport during its electrochemical cycling process of a chalcogen-based battery.

Clause 7: A hydrophilic membrane gate in Clauses 1 and 4-6 comprising a hydrogen bond forming and breaking capability, and thereby providing a safe lock and or a self-heal mechanism allowing an electrode comprising an immobilized chalcogen of the present disclosure to expand and contract in volume more freely during an electrochemical process (discharge and charge), particularly when the discharge/charge related volume expansion or contraction is substantial, which is particularly the case for a chalcogen-based battery and or a silicon-based battery.

Clause 8: A hydrophilic membrane gate in Clauses 1, 4, 5, 6, and 7 comprises a chain-like polymer comprising hydrogen bond donor and or hydrogen bond acceptor with a content between 0.01 wt % and 95 wt %, between 0.1 wt % and 80 wt %, or between 1 wt % and 70 wt %.

Clause 9: A hydrophilic membrane gate in Clauses 1, 4, 5, 6, 7, and 8 may be a carbohydrate comprising carbon, hydrogen, and oxygen, typically with a hydrogen to oxygen ratio of 2:1 (as in water) with an empirical formula $C_m(H_2O)_n$, wherein m may or may not be different from n. However, not every carbohydrate molecule conforms to this precise stoichiometric definition; examples include an uronic acid such as glucuronic acid in which a hydroxyl group of glucose is oxidized into a carboxylic acid, and a deoxy sugar such as fucose in which a hydroxyl group of glucose is replaced with a hydrogen atom and a deoxyribose in which a hydroxyl group of ribose is replaced by hydrogen. Carbohydrate may be a saccharide molecule which may be a monosaccharide molecule, a disaccharide molecule, or a polysaccharide molecule, etc.

Clause 10: A hydrophilic membrane gate in Clause 9 comprises a carbohydrate with a partial removal of hydrogen bond hydrogen, having a level of hydrogen bond hydrogen removal at ≥31%, ≥32%, or ≥33%.

Clause 11: A hydrophilic membrane gate in Clause 9 comprises a carbohydrate, or a polysaccharide molecule, having a level of hydrogen bond hydrogen removal between 31% and 99%, 32% and 95%, 33% and 90%, 34% and 85%, or 35% and 80%.

Clause 12: A hydrophilic membrane gate in Clauses 9, 10, and 11 comprises a carbohydrate with the residual bond that may be capped off by a new chemical functional group (referred to herein as a capping group Y).

Clause 13. The capping group Y in Clauses 9, 10, 11, and 12 may be an ester group [X—O-A, such as X—O—$SO_3^-$ (sulfate), X—O—$CO_2^-$ (carbonate), X—O—$PO_3^-$ (phosphate), X—O—$NO_2$ (nitrate), X—O—$BO_2^-$ (boronate), or other ester group, wherein the anion is balanced by an alkaline metal ion, for example, $Li^+$, $Na^+$, etc.], etc., an ether group (X—O—R, where R is alkyl, alkenyl, or alkynyl having 1 to 20 carbon atoms, 1 to 10 carbon atoms, 1 to 6 carbon atoms, or 1 to 4 carbon atoms, either un-branched or branched), or an ether group with a hydrocarbon group having an additional functional group (X—O—R'-G), for example, X—O—R'—$COO^-$ (alkylcarboxylate), X—O—R'—$SO_3^-$ (alkylsulfonate), X—O—R'—$PO_3^{2-}$ (alkylphosphate), etc., where R' may be a hydrocarbon group having 1 carbon to 20 carbon atoms, 1 to 10 carbon atoms, 1 to 6 carbon atoms, or 1 to 4 carbon atoms, branched or unbranched, and the negative charge may be balanced by an alkaline metal ion, such as $Li^+$, $Na^+$, etc. These carbon chains may have other substituted atom(s) or group(s).

Clause 14: A chalcogen-based cathode comprising an immobilized chalcogen in Clauses 1 to 13.

Clause 15: A chalcogen-based battery comprising a cathode of an immobilized chalcogen in Clause 14. The battery may be, for example, a rechargeable battery (pouch cell or cylindrical) of the type illustrated in FIG. 4, although the battery and cathode are not limited to the constructions illustrated in the drawings and may have other suitable configurations.

Throughout this application (that is, throughout the claims and throughout the body of the specification), the term "comprises," and variations thereof such as "comprised" and "comprising," shall be understood to be open-ended in meaning, similar to the meaning of the word "includes," and corresponding variations thereof such as "included" and "including."

The examples described herein have been described with reference to the accompanying figures. Modifications and alterations will occur to others upon reading and understanding the foregoing examples. Accordingly, the foregoing examples are not to be construed as limiting the present disclosure.

The invention claimed is:

1. An immobilized chalcogen body or system, comprising:
   a chemical element from the chalcogen group;
   an electrically conductive material; and
   a hydrophilic membrane gate, the hydrophilic membrane gate comprising a plurality of carbohydrates bound to each other by intermolecular hydrogen bonding interactions, the carbohydrates comprising intermolecular hydrogen bonding —OR groups, wherein
   between 1% and 69% of the —OR groups of the plurality of carbohydrates are hydrogen bond donating —OH groups, and between 31 and 99% of the —OR groups of the plurality of carbohydrates are hydrogen bond accepting groups, wherein the chemical element from the chalcogen group is in an elemental form, in a compound form, or in an ionic form.

2. The immobilized chalcogen body or system of claim 1, wherein the chemical element from the chalcogen group is between 0.1 wt % and 95 wt % of the immobilized chalcogen body or system.

3. The immobilized chalcogen body or system of claim 1, wherein the chemical element from the chalcogen group includes oxygen and is between 0.001 wt % to 20 wt % of the immobilized chalcogen body or system.

4. The immobilized chalcogen body or system of claim 1, wherein the electrically conductive material includes a carbon material.

5. The immobilized chalcogen body or system of claim 4, wherein the carbon material constitutes between 1 wt % and 80 wt % of the immobilized chalcogen body or system.

6. The immobilized chalcogen body or system of claim 5, wherein the carbon material is porous.

7. The immobilized chalcogen body or system of claim 1, wherein the hydrophilic membrane gate constitutes between 0.1 wt % and 40 wt % of the immobilized chalcogen body or system.

8. The immobilized chalcogen body or system of claim 7, wherein the hydrophilic membrane gate includes a membrane configured to isolate first and second hydrophobic regions, wherein the first hydrophobic region contains a hydrophobic electrolyte system in a chalcogen-based rechargeable battery, and wherein the second hydrophobic region contains one or more polychalcogenide ions formed in a cathode during discharge or charge of the rechargeable battery.

9. The immobilized chalcogen body or system of claim 8, wherein the hydrophilic membrane gate is configured to allow lithium ions and electrons to transport therethrough during an electrochemical process.

10. The immobilized chalcogen body or system of claim 8, wherein the hydrophilic membrane gate is configured to permit intrinsic mass transport and intrinsic electron transport during electrochemical cycling processes of the rechargeable battery.

11. The immobilized chalcogen body or system of claim 8, wherein the hydrophilic membrane gate has a hydrogen bond forming and breaking capability, and thereby provides a safe lock and/or a self-heal mechanism for a chalcogen-based electrode of the rechargeable battery.

12. The immobilized chalcogen body or system of claim 1, wherein the carbohydrates comprise monosaccharides.

13. The immobilized chalcogen body or system of claim 1, wherein the carbohydrates comprise disaccharides.

14. The immobilized chalcogen body or system of claim 1, wherein the carbohydrates comprise polysaccharides.

15. The immobilized chalcogen body or system of claim 1, wherein the hydrogen bond accepting —OR groups are —OY groups, where Y comprises sulfate, carbonate, phosphate, boronate, a $C_1$-$C_{20}$ branched or unbranched alkyl group, a $C_1$-$C_{20}$ branched or unbranched alkenyl group, a $C_1$-$C_{20}$ branched or unbranched alkynyl group, a $C_1$-$C_{20}$ branched or unbranched alkylcarboxylate group, a $C_1$-$C_{20}$ branched or unbranched alkylcarboxylate group, a $C_1$-$C_{20}$ branched or unbranched alkylsulfonate group, or a $C_1$-$C_{20}$ branched or unbranched alkylphosphate group.

16. The immobilized chalcogen body or system of claim 15, wherein Y comprises:
sulfate, carbonate, phosphate, boronate, a $C_1$-$C_{20}$ branched or unbranched alkylcarboxylate group, a $C_1$-$C_{20}$ branched or unbranched alkylcarboxylate group, a $C_1$-$C_{20}$ branched or unbranched alkylsulfonate group, or a $C_1$-$C_{20}$ branched or unbranched alkylphosphate group; and
an alkaline metal ion.

17. A chalcogen-based cathode, comprising:
an electrically conductive material;
a chalcogen material immobilized in the electrically conductive material; and
a hydrophilic membrane gate, the hydrophilic membrane gate comprising a plurality of carbohydrates bound to each other by intermolecular hydrogen bonding interactions, the carbohydrates comprising intermolecular hydrogen bonding —OR groups, wherein
between 1% and 69% of the —OR groups of the plurality of carbohydrates are hydrogen bond donating —OH groups, and
between 31 and 99% of the —OR groups of the plurality of carbohydrates are hydrogen bond accepting groups.

18. The cathode of claim 17, wherein the electrically conductive material includes a carbon material.

19. A chalcogen-based rechargeable battery comprising the cathode of claim 18.

20. The battery of claim 19, wherein the hydrogen bond accepting —OR groups are —OY groups, where Y comprises sulfate, carbonate, phosphate, boronate, a $C_1$-$C_{20}$ branched or unbranched alkyl group, a $C_1$-$C_{20}$ branched or unbranched alkenyl group, a $C_1$-$C_{20}$ branched or unbranched alkynyl group, a $C_1$-$C_{20}$ branched or unbranched alkylcarboxylate group, a $C_1$-$C_{20}$ branched or unbranched alkylcarboxylate group, a $C_1$-$C_{20}$ branched or unbranched alkylsulfonate group, or a $C_1$-$C_{20}$ branched or unbranched alkylphosphate group.

21. The battery of claim 20, wherein Y comprises:
sulfate, carbonate, phosphate, boronate, a $C_1$-$C_{20}$ branched or unbranched alkylcarboxylate group, a $C_1$-$C_{20}$ branched or unbranched alkylcarboxylate group, a $C_1$-$C_{20}$ branched or unbranched alkylsulfonate group, or a $C_1$-$C_{20}$ branched or unbranched alkylphosphate group; and
an alkaline metal ion.

* * * * *